(12) United States Patent
Koishi

(10) Patent No.: US 9,313,396 B2
(45) Date of Patent: Apr. 12, 2016

(54) IMAGING DEVICE FOR DETERMINING BEHAVIOR OF A FOCUS ADJUSTMENT OF AN IMAGING OPTICAL SYSTEM AND NON-TRASITORY COMPUTER-READABLE STORAGE MEDIUM

(71) Applicant: OLYMPUS CORPORATION, Tokyo (JP)

(72) Inventor: Natsumi Koishi, Sagmihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/509,306

(22) Filed: Oct. 8, 2014

(65) Prior Publication Data

US 2015/0022712 A1    Jan. 22, 2015

Related U.S. Application Data

(63) Continuation of application No. PCT/JP2013/068976, filed on Jul. 11, 2013.

(30) Foreign Application Priority Data

| Jul. 12, 2012 | (JP) | 2012-156584 |
| Jul. 12, 2012 | (JP) | 2012-156585 |
| Jul. 12, 2012 | (JP) | 2012-156586 |
| Oct. 24, 2012 | (JP) | 2012-234953 |
| Oct. 24, 2012 | (JP) | 2012-234954 |
| Apr. 25, 2013 | (JP) | 2013-093023 |
| Apr. 25, 2013 | (JP) | 2013-093024 |

(51) Int. Cl.
*G03B 13/00* (2006.01)
*H04N 5/232* (2006.01)
(Continued)

(52) U.S. Cl.
CPC .............. *H04N 5/23212* (2013.01); *G02B 7/28* (2013.01); *G02B 7/34* (2013.01); *G02B 7/36* (2013.01); *G03B 13/32* (2013.01); *G03B 13/36* (2013.01); *H04N 5/23296* (2013.01)

(58) Field of Classification Search
CPC .......... H04N 5/23212; H04N 5/23296; H04N 5/23251; G02B 7/28; G02B 7/34; G02B 7/36; G02B 7/285; G03B 13/36; G03B 13/32; G03B 13/30
USPC .......... 348/333.03, 345, 349–356, 155, 222.1
See application file for complete search history.

(56) References Cited

U.S. PATENT DOCUMENTS

| 5,721,967 A | * | 2/1998 | Akashi | 396/51 |
| 5,907,431 A | * | 5/1999 | Stuttler | G02B 21/22 250/201.3 |

(Continued)

FOREIGN PATENT DOCUMENTS

| JP | 54-126026 A | 9/1979 |
| JP | 63-197176 A | 8/1988 |

(Continued)

OTHER PUBLICATIONS

International Search Report dated Oct. 29, 2013 issued in PCT/JP2013/068976.

(Continued)

*Primary Examiner* — Ngoc-Yen Vu
(74) *Attorney, Agent, or Firm* — Scully, Scott, Murphy & Presser, P.C.

(57) ABSTRACT

An imaging device includes an imaging unit configured to generate a moving-image signal by capturing an image of a subject formed by an imaging optical system, a focus adjustment information acquisition unit configured to acquire focus adjustment information related to human subjective focus adjustment, and a focus adjustment determination unit configured to determine behavior of the focus adjustment of the imaging unit using the focus adjustment information obtained by the focus adjustment information acquisition unit.

18 Claims, 102 Drawing Sheets

(51) Int. Cl.
    *G03B 13/32*     (2006.01)
    *G02B 7/28*     (2006.01)
    *G02B 7/34*     (2006.01)
    *G02B 7/36*     (2006.01)
    *G03B 13/36*     (2006.01)
    *H04N 5/228*     (2006.01)

(56) References Cited

U.S. PATENT DOCUMENTS

| | | | | |
|---|---|---|---|---|
| 5,913,079 | A * | 6/1999 | Aoyama et al. | 396/51 |
| 6,018,630 | A * | 1/2000 | Arai et al. | 396/51 |
| 2012/0154547 | A1 * | 6/2012 | Aizawa | G02B 7/285 348/47 |
| 2014/0176777 | A1 * | 6/2014 | Lu | 348/333.11 |
| 2015/0187115 | A1 * | 7/2015 | MacDonald | G06F 3/013 345/419 |

FOREIGN PATENT DOCUMENTS

| | | | |
|---|---|---|---|
| JP | 63-207278 | A | 8/1988 |
| JP | 03-097379 | A | 4/1991 |
| JP | 04-219080 | A | 8/1992 |
| JP | 06-038090 | A | 2/1994 |
| JP | 06-334915 | A | 12/1994 |
| JP | 08-005896 | A | 1/1996 |
| JP | 09-205574 | A | 8/1997 |
| JP | 2007-006305 | A | 1/2007 |
| JP | 2007-081767 | A | 3/2007 |
| JP | 2007-147804 | A | 6/2007 |
| JP | 2008-205650 | A | 9/2008 |
| JP | 2011-085871 | A | 4/2011 |
| JP | 2011-118021 | A | 6/2011 |
| JP | 2011-191386 | A | 9/2011 |
| JP | 2011-221284 | A | 11/2011 |

OTHER PUBLICATIONS

Ng, Ren et al., "Light Field Photography with a Hand-held Plenoptic Camera", Stanford Tech Report CTSR Feb. 2005.

* cited by examiner

FIG. 5

| | | SIZE OF SUBJECT | | | | T1 |
|---|---|---|---|---|---|---|
| | | EXTRA-LARGE | LARGE | MEDIUM | SMALL | |
| MOTION SPEED OF SUBJECT | CONSIDERABLY FAST | 0 | 0 | 0 | 0 | |
| | MODERATELY FAST | 1 | 1.2 | 1.1 | 1 | |
| | MODERATE | 0.8 | 1 | 0.9 | 0.8 | |
| | SLOW | 0.5 | 0.8 | 0.7 | 0.5 | |

FIG. 8

| SHUTTER SPEED | β |
|---|---|
| 1/30 | 1 |
| 1/60 | 0.99 |
| 1/120 OR MORE | 0.98 |

T2

※WHEN FRAME RATE
WHEN MOVING IMAGE IS CAPTURED IS 30 fps

FIG. 16

| | | MATCHING RESULT OF SUBJECT ||
| | | PRESENCE OF REGISTRATION | ABSENCE OF REGISTRATION |
|---|---|---|---|
| BRIGHTNESS ADJUSTMENT SPEED | FAST | 1 | 0.8 |
| | MODERATE | 0.8 | 0.6 |
| | SLOW | 0.4 | 0.2 |

| NUMBER OF SUBJECTS | PRESENCE OF CONTINUITY | ABSENCE OF CONTINUITY |
|---|---|---|
| 1 | 6 | 5 |
| 2 | 5 | 4 |
| 3 | 4 | 3 |
| 4 | 3 | 2 |
| 5 OR MORE | 2 | 1 |

| | | LUMINANCE PIXEL AVERAGE VALUE | | | | | |
|---|---|---|---|---|---|---|---|
| | | 240 OR MORE | 200 OR MORE/239 OR LESS | 150 OR MORE/199 OR LESS | 100 OR MORE/149 OR LESS | 99 OR LESS |
| ZOOM OPERATION SPEED | FAST | 0.1 | 0.4 | 0.6 | 0.4 | 0.1 |
| | MODERATE | 0.2 | 1 | 0.8 | 0.7 | 0.6 |
| | SLOW | 0.3 | 1 | 1 | 0.8 | 0.7 |

START TIMING OF FOCUS ADJUSTMENT
(NUMBER OF FRAMES FROM APPEARANCE OF
ANY SUBJECT IN FOCUS ADJUSTMENT TARGET AREA) T6

| SUBJECT COLOR SATURATION | PANNING SPEED | |
| --- | --- | --- |
|  | FAST | SLOW |
| HIGH | 10 | 5 |
| LOW | 15 | 7 |

FIG. 54

| SUBJECTIVE EVALUATION VALUE (LIKABILITY OF VIDEO) 10: LIKABLE  5: BOTH FINE  0: UNLIKABLE | |
|---|---|
| TEMPORAL CHARACTERISTIC A OF BEHAVIOR OF FOCUS ADJUSTMENT UP TO FOCUSED STATE | 5 |
| TEMPORAL CHARACTERISTIC B OF BEHAVIOR OF FOCUS ADJUSTMENT UP TO FOCUSED STATE | 3 |

FIG. 56

SUBJECTIVE EVALUATION VALUE (LIKABILITY OF VIDEO)
10: LIKABLE  5: NEITHER LIKABLE NOR UNLIKABLE  0: UNLIKABLE

|  | ABSENCE OF CAMERA WORK | PRESENCE OF CAMERA WORK |
|---|---|---|
| FAST FOCUS ADJUSTMENT | 8.13 | 7.84 |
| SLOW FOCUS ADJUSTMENT | 7.25 | 7.95 |

FIG. 62

|  |  | SIZE OF SUBJECT | | | | T11 |
|---|---|---|---|---|---|---|
|  |  | EXTRA-LARGE | LARGE | MEDIUM | SMALL | |
| MOTION SPEED OF SUBJECT | CONSIDERABLY FAST | 0 | 0 | 0 | 0 | |
| | MODERATELY FAST | 1 | 1.2 | 1.1 | 1 | |
| | MODERATE | 0.8 | 1 | 0.9 | 0.8 | |
| | SLOW | 0.5 | 0.8 | 0.7 | 0.5 | |

| SHUTTER SPEED | β |
|---|---|
| 1/30 | 1 |
| 1/60 | 0.99 |
| 1/120 OR MORE | 0.98 |

※WHEN FRAME RATE
WHEN MOVING IMAGE IS CAPTURED IS 30 fps

FIG. 69

| | | MATCHING RESULT OF SUBJECT ||
| | | PRESENCE OF REGISTRATION | ABSENCE OF REGISTRATION |
| --- | --- | --- | --- |
| FOCUS ADJUSTMENT SPEED | FAST | 1 | 0.8 |
| | MODERATE | 0.8 | 0.6 |
| | SLOW | 0.4 | 0.2 |

| NUMBER OF SUBJECTS | PRESENCE OF CONTINUITY | ABSENCE OF CONTINUITY |
|---|---|---|
| 1 | 6 | 5 |
| 2 | 5 | 4 |
| 3 | 4 | 3 |
| 4 | 3 | 2 |
| 5 OR MORE | 2 | 1 |

| | | LUMINANCE PIXEL AVERAGE VALUE | | | | |
|---|---|---|---|---|---|---|
| | | 240 OR MORE | 200 OR MORE/239 OR LESS | 150 OR MORE/199 OR LESS | 100 OR MORE/149 OR LESS | 99 OR LESS |
| ZOOM OPERATION SPEED | FAST | 0.1 | 0.4 | 0.6 | 0.4 | 0.1 |
| | MODERATE | 0.2 | 1 | 0.8 | 0.7 | 0.6 |
| | SLOW | 0.3 | 1 | 1 | 0.8 | 0.7 |

FIG. 93

|  |  | MATCHING RESULT OF SUBJECT ||
|  |  | PRESENCE OF REGISTRATION | ABSENCE OF REGISTRATION |
| --- | --- | --- | --- |
| FOCUS ADJUSTMENT SPEED | FAST | 1 SEC | 1.5 SEC |
| | MODERATE | 1.5 SEC | 2 SEC |
| | SLOW | 2 SEC | 2.5 SEC |

T16

TABLE FOR DETERMINING TIME REQUIRED FOR
BRIGHTNESS ADJUSTMENT FROM FOCUS ADJUSTMENT SPEED
AND SUBJECT MATCHING RESULT

FIG. 95

| TOURIST ATTRACTION (BUILDING) | TOURIST ATTRACTION (NATURE) | OTHERS |
|---|---|---|
| $\beta = 1.05$ | $\beta = 0.95$ | $\beta = 1$ |

FIG. 98

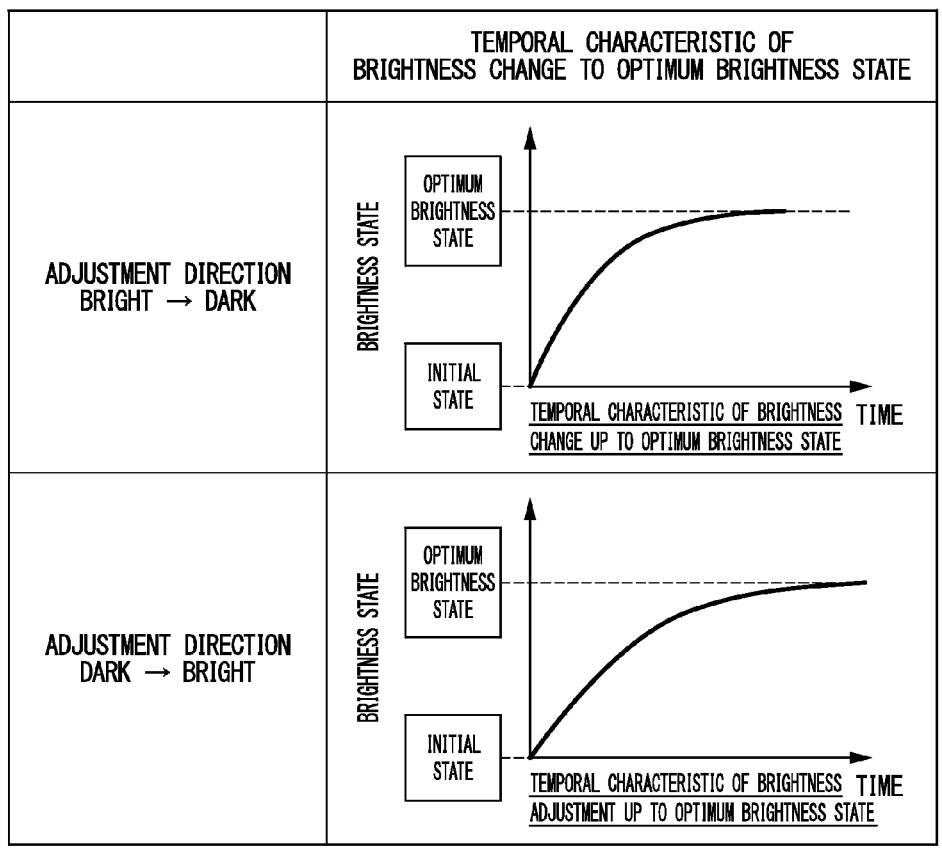

FIG. 99

DETERMINATION OF START TIMING OF BRIGHTNESS ADJUSTMENT
FROM COLOR SATURATION INFORMATION OF SUBJECT
(SEVERAL SECONDS FROM APPEARANCE OF SUBJECT IN STATE
IN WHICH BRIGHTNESS ADJUSTMENT IS PERFORMED
IN BRIGHTNESS ADJUSTMENT TARGET AREA TO START OF BRIGHTNESS ADJUSTMENT)

T17

| HIGH COLOR SATURATION LEVEL | MEDIUM COLOR SATURATION LEVEL | LOW COLOR SATURATION |
|---|---|---|
| 0.5[sec] | 0.7[sec] | 1[sec] |

FIG. 101

| BRIGHTNESS | LIKABILITY SCORE OF 0 TO 10 | | |
|---|---|---|---|
| ADJUSTMENT DIRECTION | CHARACTERISTIC (a) | CHARACTERISTIC (b) | CHARACTERISTIC (c) |
| DARK → BRIGHT | 8.2 | 7.7 | 5.6 |
| BRIGHT → DARK | 7.5 | 8.3 | 6.4 |

FIG. 102

| PANNING SPEED | LIKABILITY SCORE | | |
|---|---|---|---|
| | CHARACTERISTIC (LEFT) | CHARACTERISTIC (CENTER) | CHARACTERISTIC (RIGHT) |
| LOW SPEED | 8.6 | 6.4 | 5.7 |
| MEDIUM SPEED | 7 | 8.2 | 6.9 |
| HIGH SPEED | 6.4 | 7.7 | 8.2 |

IMAGING DEVICE FOR DETERMINING BEHAVIOR OF A FOCUS ADJUSTMENT OF AN IMAGING OPTICAL SYSTEM AND NON-TRASITORY COMPUTER-READABLE STORAGE MEDIUM

This application is a continuation application of an international application PCT/JP2013/068976, filed Jul. 11, 2013. Priority is claimed on Japanese Patent Applications No. 2012-156584, No. 2012-156585, and No. 2012-156586, filed Jul. 12, 2012, Japanese Patent Applications No. 2012-234953 and No. 2012-234954, filed Oct. 24, 2012, and Japanese Patent Applications No. 2013-093023 and No. 2013-093024, filed Apr. 25, 2013. In this application, the content of the above-described Japanese applications and the above-described PCT international application is incorporated herein by reference.

BACKGROUND OF THE INVENTION

1. Field of the Invention

The present invention relates to an imaging device and a computer program product saving a program.

2. Description of Related Art

For example, when a still image is captured, it is desirable to perform accurate focus adjustment quickly in order to rapidly videograph a target subject. However, because behavior of the focus adjustment itself is recorded in a moving image and serves as a target of appreciation in moving-image capture, the quality of the moving image changes according to the type of behavior or the like. For example, when focus adjustment is performed too quickly/slowly for a user, when focus adjustment in which motion is felt to be undesirable is performed (for example, the entire speed is appropriate, but starting is too slow, ending is too sudden, or the like), or when unnecessary focus adjustment is performed (for example, a situation in which focus adjustment tends to change), it is recognized that an undesirable adjustment of focus on a target has been performed. In a situation in which the focus adjustment tends to change (when imaged content changes from moment to moment, when an imaging device moves during panning, tilting, and camera shaking, when a subject moves, and when a process within the imaging device such as brightness adjustment or white-balance (WB) adjustment changes), a captured moving image appears to continuously oscillate between states in which it is blurry and states in which it is in focus if the focus adjustment is rapidly performed to be appropriate for all situations.

In the publication of Japanese Unexamined Patent Application, First Publication No. H06-038090, a process of limiting an autofocus (hereinafter referred to as AF) operation according to presence/absence of panning is disclosed. In the publication of Japanese Unexamined Patent Application, First Publication No. S63-197176, a process of lengthening a stop time of AF when a change amount of a subject image is large is disclosed. In the publication of Japanese Unexamined Patent Application, First Publication No. S63-207278, a process in which no AF is performed during brightness adjustment is disclosed. In the publication of Japanese Unexamined Patent Application, First Publication No. 2008-205650, a process of performing AF based on an importance determination result of a detected face is disclosed.

SUMMARY OF THE INVENTION

According to a first aspect of the present invention, an imaging device includes: an imaging unit configured to generate a moving-image signal by capturing an image of a subject formed by an imaging optical system; a focus adjustment information acquisition unit configured to acquire focus adjustment information related to human subjective focus adjustment; and a focus adjustment determination unit configured to determine behavior of the focus adjustment of the imaging unit using the focus adjustment information obtained by the focus adjustment information acquisition unit.

According to a second aspect of the present invention, in the imaging device according to the first aspect, the focus adjustment information may be a focus adjustment characteristic of an eyeball that is a physical focus adjustment characteristic of a human eyeball, or information obtained by approximating the focus adjustment characteristic of the eyeball.

According to a third aspect of the present invention, the imaging device according to the first aspect may include an inter-frame change information acquisition unit configured to acquire inter-frame change information related to a change which is occurred between at least two frames of the moving-image signal; and an intra-frame information acquisition unit configured to acquire intra-frame information which is information within one frame included in the moving-image signal, wherein the focus adjustment information is information using both the inter-frame change information acquired by the inter-frame change information acquisition unit and the intra-frame information acquired by the intra-frame information acquisition unit.

According to a fourth aspect of the present invention, in the imaging device according to the first aspect, the focus adjustment determination unit may determine the behavior of the focus adjustment so that acceleration and a speed in the focus adjustment for setting the subject in a focused state are changed according to the focus adjustment information obtained by the focus adjustment information acquisition unit.

According to a fifth aspect of the present invention, in the imaging device according to the first aspect, the focus adjustment determination unit may determine the behavior of the focus adjustment so that a timing at which deceleration in the focus adjustment for setting the subject in a focused state starts is changed according to the focus adjustment information obtained by the focus adjustment information acquisition unit.

According to a sixth aspect of the present invention, in the imaging device according to the first aspect, the focus adjustment determination unit may determine the behavior of the focus adjustment so that a timing at which focus adjustment in the focus adjustment for setting the subject in a focused state starts is changed according to the focus adjustment information obtained by the focus adjustment information acquisition unit.

According to a seventh aspect of the present invention, in the imaging device according to the first aspect, the focus adjustment determination unit may determine whether to drive the focus adjustment according to the focus adjustment information obtained by the focus adjustment information acquisition unit.

According to an eighth aspect of the present invention, in the imaging device according to the first aspect, the focus adjustment determination unit may determine the behavior of the focus adjustment so that a time required to reach a focused state from a focus adjustment start in the focus adjustment for setting the subject in the focused state is changed according to the focus adjustment information obtained by the focus adjustment information acquisition unit.

According to a ninth aspect of the present invention, in the imaging device according to the second aspect, the information obtained by approximating the focus adjustment characteristic of the eyeball may be information approximated so that deceleration for stopping the focus adjustment is less than acceleration for starting the focus adjustment according to the focus adjustment characteristic of the eyeball.

According to a tenth aspect of the present invention, in the imaging device according to the second aspect, the information obtained by approximating the focus adjustment characteristic of the eyeball may be information approximated so that the deceleration for stopping the focus adjustment is less than the acceleration for starting the focus adjustment according to the focus adjustment characteristic of the eyeball.

According to an eleventh aspect of the present invention, in the imaging device according to the second aspect, the information obtained by approximating the focus adjustment characteristic of the eyeball may be information approximated to start deceleration of the focus adjustment in an interval of 10% to 80% of a process from a focus adjustment state time to a focused state according to the focus adjustment characteristic of the eyeball.

According to a twelfth aspect of the present invention, in the imaging device according to the second aspect, the information obtained by approximating the focus adjustment characteristic of the eyeball may be information approximated to perform monotonous acceleration/deceleration movement in an interval until deceleration of the focus adjustment starts from 10% of a process from a focus adjustment start time to a focused state according to the focus adjustment characteristic of the eyeball.

According to a thirteenth aspect of the present invention, in the imaging device according to the second aspect, the information obtained by approximating the focus adjustment characteristic of the eyeball may be information approximated so that a time from a focus adjustment start time to a focused state is at least 0.7 sec or more according to the focus adjustment characteristic of the eyeball.

According to a fourteenth aspect of the present invention, in the imaging device according to the third aspect, the inter-frame change information may be information related to a change which occurred between frames in the imaging device itself, motion performed by the imaging device itself, or a process performed by the imaging device itself.

According to a fifteenth aspect of the present invention, in the imaging device according to the third aspect, the inter-frame change information may be a signal change of a frame image obtained for every frame from the moving-image signal.

According to a sixteenth aspect of the present invention, in the imaging device according to the third aspect, information related to a subject within the frame may be information related to one of a size of the subject, a color of the subject, a brightness of the subject, the number of subjects, and a position of the subject.

According to a seventeenth aspect of the present invention, in the imaging device according to the third aspect, information related to a subject within the frame may be one of information related to a recognition result of what the subject is, information related to a matching result between a previously videographed subject and a subject of a videographing target, and information related to whether the subject of the videographing target is a subject pre-registered in the imaging device itself.

According to an eighteenth aspect of the present invention, in the imaging device according to the third aspect, the intra-frame information may be information related to the moving-image signal within the frame.

According to a nineteenth aspect of the present invention, the imaging device according to the first aspect includes a focus adjustment amount acquisition unit configured to acquire a focus adjustment amount of the imaging optical system necessary to obtain a focused state for the subject, the imaging optical system being one of fixed to and removable from the imaging device; and a focus adjustment unit configured to perform the focus adjustment based on the behavior of the focus adjustment determined by the focus adjustment determination unit.

According to a twentieth aspect of the present invention, a computer program product saving a program causes an imaging device having an imaging unit for generating a moving-image signal by capturing an image of a subject formed by an imaging optical system to execute: a focus adjustment information acquisition step of acquiring focus adjustment information related to human subjective focus adjustment; and a focus adjustment determination step of determining behavior of the focus adjustment of the imaging unit using the focus adjustment information obtained in the focus adjustment information acquisition step.

BRIEF DESCRIPTION OF THE DRAWINGS

FIG. 5 is an example of a table for determining a speed suppression coefficient α of focus adjustment.

FIG. 8 is an example of a table in which a shutter speed is associated with a focus adjustment suppression coefficient β stored in a memory (not shown).

FIG. 16 is an example of a table in which a speed suppression coefficient α of focus adjustment is associated for every set of a brightness adjustment speed and a matching result of a subject

FIG. 21 is an example of a table in which a driving speed of focus adjustment is associated for every set of the number of subjects and the presence/absence of continuity.

FIG. 42 is an example of a table in which a focus adjustment control coefficient α is associated for every set of a focal distance adjustment speed and a luminance pixel average value.

FIG. 49 is an example of a table in which a start timing of focus adjustment is associated for every set of subject color saturation and a panning speed in a modified example 2 of the example 4.

FIG. 54 is a diagram showing a subjective evaluation result of a moving image.

FIG. 56 is a diagram showing a subjective evaluation result of a moving image in the modified example 5 of the example 4 of the first embodiment.

FIG. 62 is an example of a table for determining a brightness adjustment speed suppression coefficient α.

FIG. 65 is an example of a table in which a shutter speed is associated with a brightness adjustment suppression coefficient 13.

FIG. 69 is an example of a table in which a speed suppression coefficient α is associated for every set of a brightness adjustment speed and a matching result of a subject.

FIG. 73 is an example of a table in which an operation speed of brightness adjustment is associated for every set of the number of subjects and presence/absence of continuity of a WB adjustment operation.

FIG. 91 is an example of a table in which a focus adjustment control coefficient α is associated for every set of a zoom operation speed and a luminance pixel average value.

FIG. 93 is an example of a table for determining a time required for brightness adjustment in a modified example 6 of the example 2 of the second embodiment.

FIG. 95 is an example of a table for determining a correction parameter β in modified the example 7 of the example 2 of the second embodiment.

FIG. 98 is an example of a temporal characteristic from a brightness adjustment start to an optimum brightness state.

FIG. 99 is an example of a table in which subject color saturation is associated with a start timing of brightness adjustment in the modified example 12 of the example 4 of the second embodiment.

FIG. 101 is a diagram showing a subjective evaluation result of a moving image.

FIG. 102 is a diagram showing the subjective evaluation result of the moving image.

DETAILED DESCRIPTION OF THE INVENTION

Before embodiments of the present invention are described, a result of investigating what types of focus adjustment behavior are preferable will be described.

Figure 51:
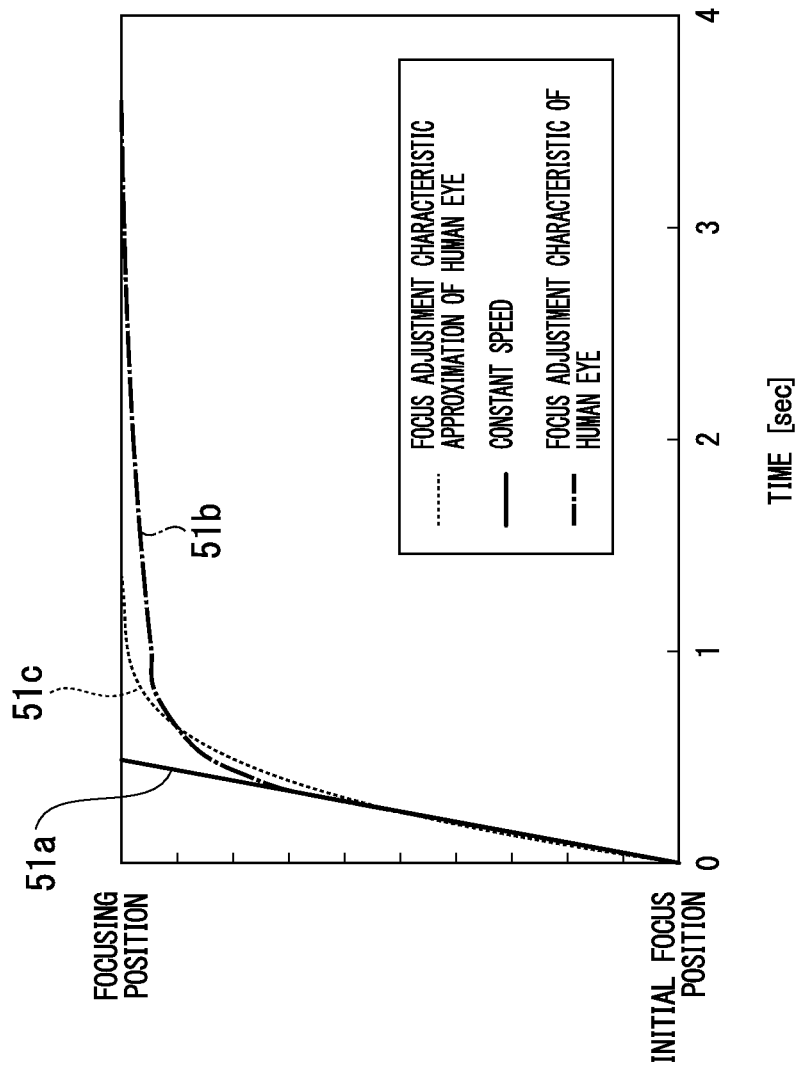
FIG. 51 is an example of a temporal characteristic from a focus adjustment start to a focused state.

FIG. 51 is an example of a temporal characteristic from a focus adjustment start to a focused state. In FIG. 51, the vertical axis represents a focus position and the horizontal axis represents time. A focus adjustment characteristic 51a is a focus adjustment characteristic when focus adjustment is performed at a constant speed. A focus adjustment characteristic 51b is a physical focus adjustment characteristic of a human eyeball. A focus adjustment characteristic 51c is a focus adjustment characteristic obtained by approximating the physical focus adjustment characteristic of the human eyeball.

Figure 52:
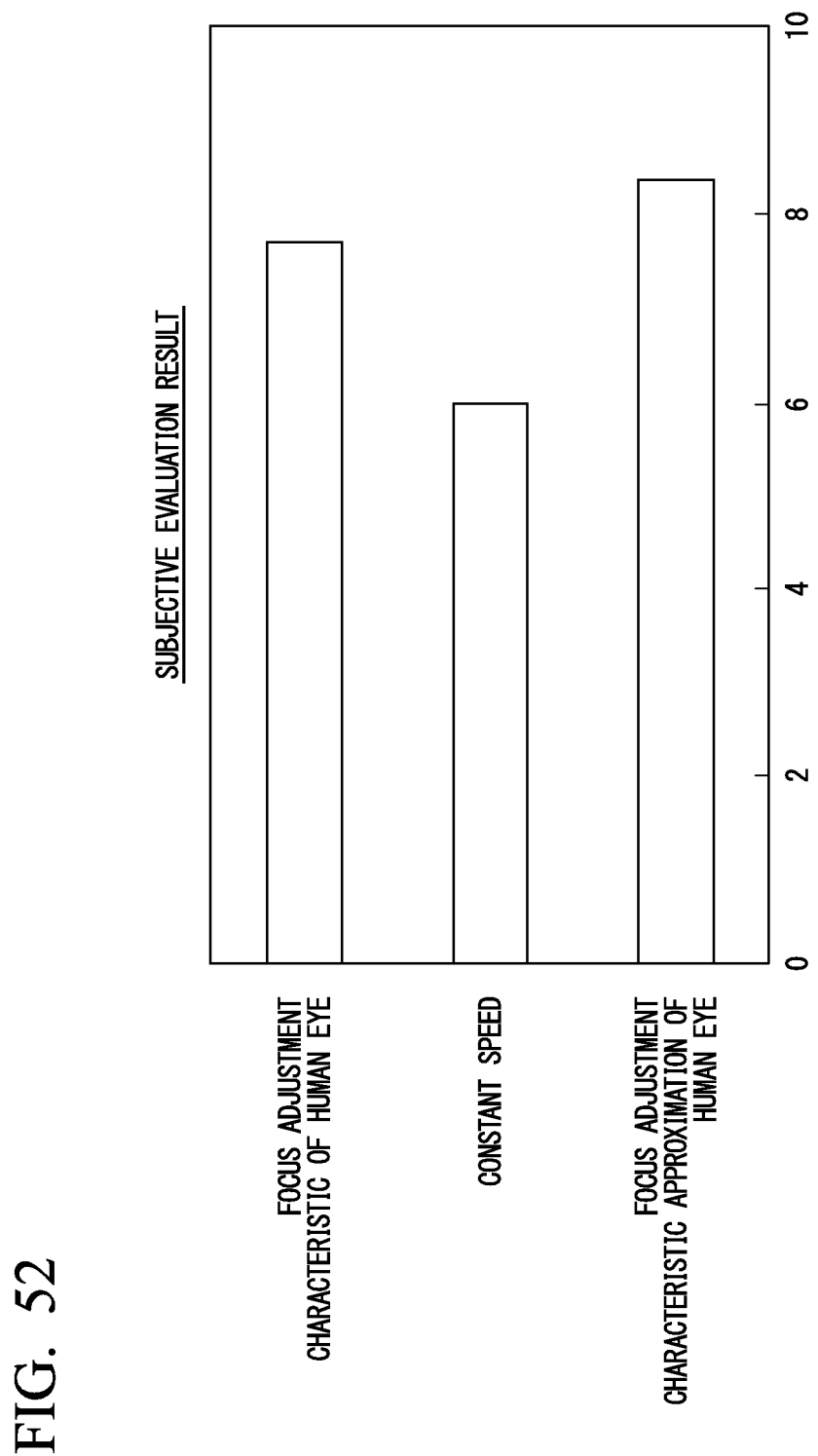
FIG. 52 is a diagram showing a subjective evaluation result of a moving image.

In order to investigate what types of focus adjustment behavior are preferable in a moving image, multiple people were requested to view a moving image in which focus adjustment was performed with various behaviors. Subjective evaluation results of viewers are placed into one of eleven ratings shown in FIG. 52, wherein a moving image which is considered to be likable is rated a 10, a moving image which is considered to be neither likable nor unlikable is rated a 5, and a moving image which is considered to be unlikable is rated a 0. The results shown in FIG. 52 are evaluation results of a moving image on which focus adjustment was performed with behaviors based on three focus adjustment characteristics shown in FIG. 51 as an example.

As a result, it can be seen that focus adjustment to which a physical focus adjustment characteristic of a human eyeball shown in FIG. 51 was applied or focus adjustment to which a focus adjustment characteristic obtained by approximating the physical focus adjustment characteristic of the human eyeball shown in FIG. 51 was applied is preferred during moving-image appreciation and the latter is further preferred. This is considered to be due to the fact that subjective focus adjustment instinctively felt when a human views with his or her eye is not simply the physical focus adjustment characteristic of the eyeball, but is close to the approximated focus adjustment characteristic. In addition, in the human subjective focus adjustment, it is empirically known that the human selects a "subject to which attention is easily directed" or a "subject to which attention is desired to be directed" in the head in consideration of information of both a viewing state and a viewing target without viewing all subjects in an appropriate focused state and focus adjustment is performed according to a degree of attention. (Thus, unnecessary focus adjustment is unfavorable. In addition, images are also considered to become unsightly according to focus adjustment in some cases due to deviation from subjective focus adjustment, because only information of either the viewing state or the viewing target can be considered in the publications of Japanese Unexamined Patent Application, First Publication No. H06-038090, No. S63-197176, No. S63-207278, and No. 2008-205650.) Accordingly, the focus adjustment operation at the time of moving-image appreciation is considered to be improved by performing the focus adjustment of the imaging device so that the focus adjustment based on the human subjective focus adjustment is performed.

<First Embodiment>

Figure 1:
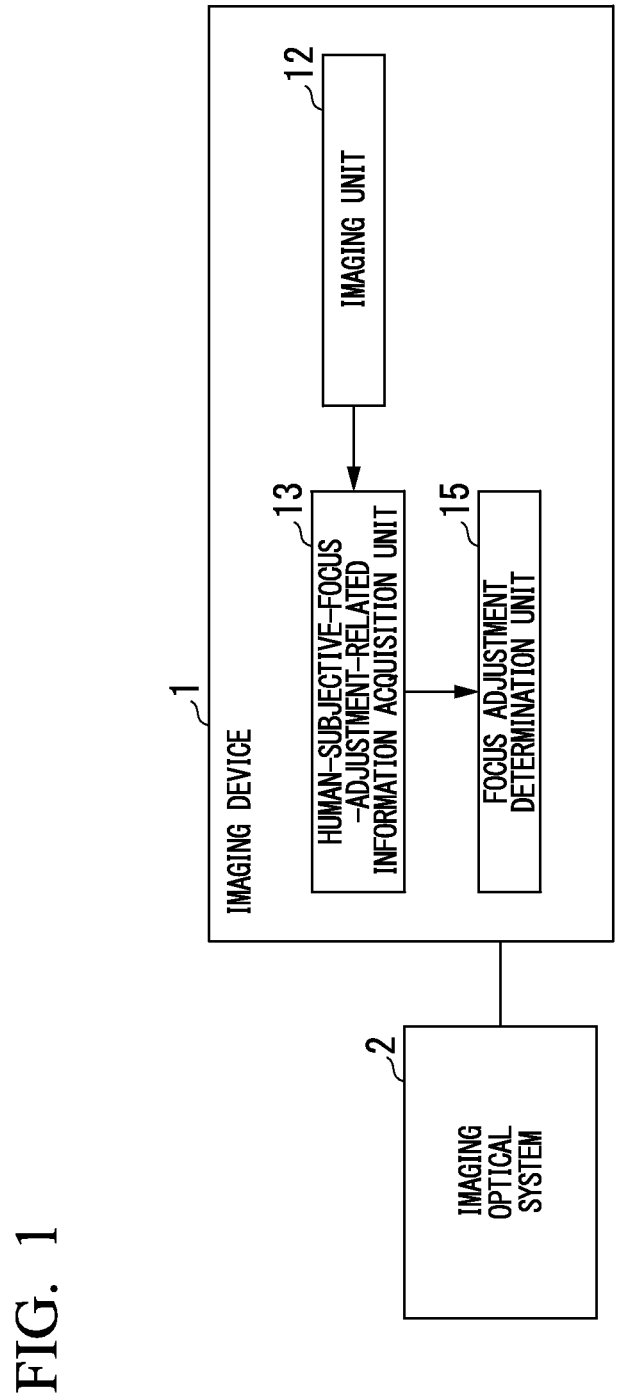
FIG. 1 is a schematic block diagram showing a configuration of an imaging device in a first embodiment of the present invention.

Hereinafter, the first embodiment of the present invention will be described in detail with reference to the drawings. FIG. 1 is a schematic block diagram showing a configuration of an imaging device 1 in the first embodiment of the present invention. The imaging device 1 includes an imaging unit 12, a human-subjective-focus-adjustment-related information acquisition unit 13, and a focus adjustment determination unit 15. The imaging optical system 2 guides light from a subject to the imaging unit 12 and causes an image of the subject to be formed by an imaging element of the imaging unit 12. The imaging optical system 2 is removable from the imaging device 1 as an example. Also, the imaging optical system 2 may be fixed to the imaging device 1.

The imaging unit 12 generates a moving-image signal by capturing an image of a subject formed by the imaging optical system 2, and outputs the generated moving-image signal to the human-subjective-focus-adjustment-related information acquisition unit 13.

The human-subjective-focus-adjustment-related information acquisition unit 13 acquires at least information related to human subjective focus adjustment from the above-described moving-image signal. Here, the information related to the human subjective focus adjustment, for example, is inter-frame change information related to a change which is occurred between two or more frames and information related to a situation (for example, a state, motion, or the like of the imaging device) of videographing determined from intra-frame information which is information within one frame included in the moving-image signal and a situation (for example, motion, color, and the like of the subject) of a viewed subject. In human senses, the degree of attention to a subject of a focus adjustment target changes according to the videographing situation or the situation of the viewed subject. Accordingly, such information is referred to as one piece of the information related to the human subjective focus adjustment.

Figure 57:
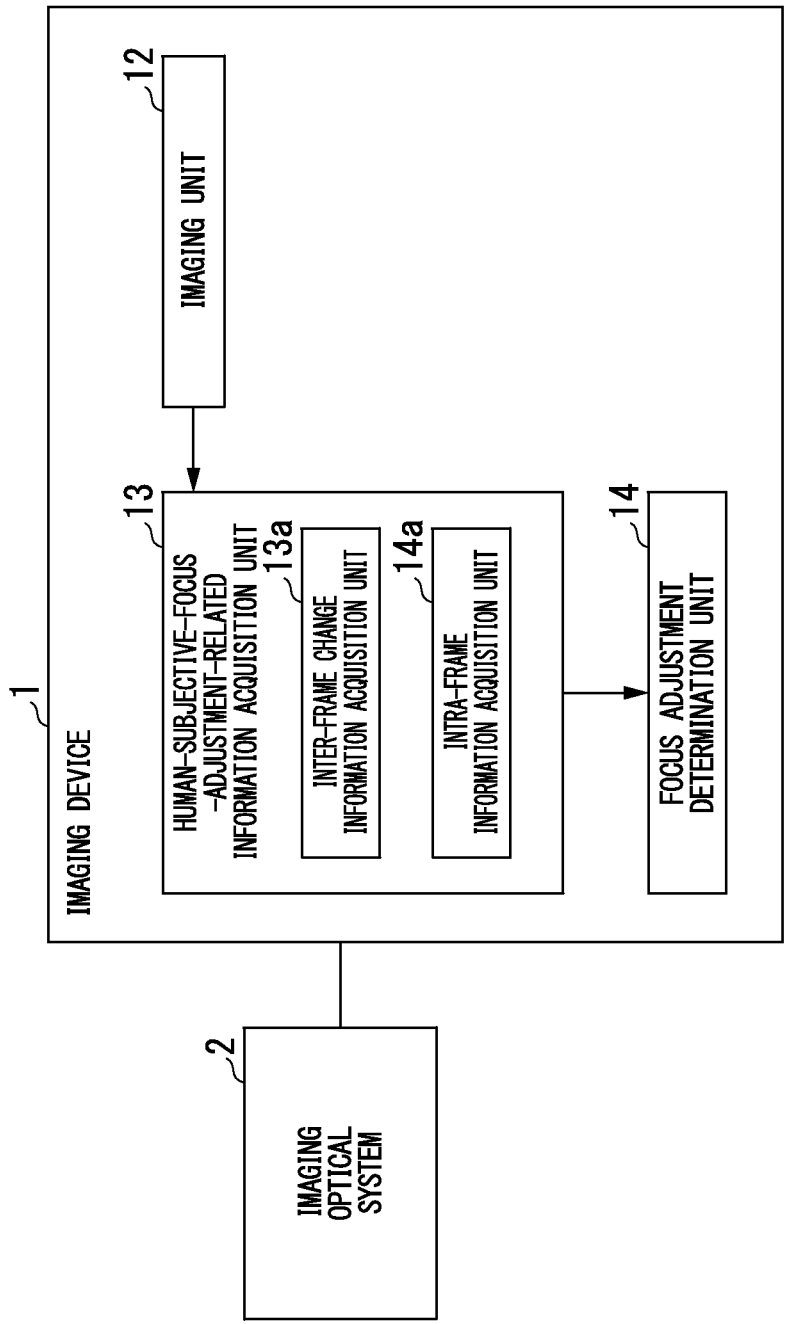
FIG. 57 is a schematic block diagram showing a configuration of an imaging device in the first embodiment of the present invention.

FIG. 57 is a schematic block diagram showing a configuration of the imaging device 1 in this case. The human-subjective-focus-adjustment-related information acquisition unit 13 includes an inter-frame change information acquisition unit 13a configured to acquire the above-described inter-frame change information and an intra-frame information acquisition unit 14a configured to acquire information related to the above-described intra-frame information.

In addition, the information related to the human subjective focus adjustment is not limited to the above-described information, and may be information of the physical focus adjustment characteristic (motion of a lens) of the human eyeball as shown in FIG. 51 or information obtained by approximating the physical focus adjustment characteristic of the human eyeball as shown in FIG. 51. In this case, the information may be pre-stored within a memory (not shown) of the imaging device 1 and the information may be acquired by referring to the memory when necessary.

In the imaging device 1 in this embodiment, the focus adjustment determination unit 15 determines the behavior of the focus adjustment using the information related to the human subjective focus adjustment. Thereby, it is possible to perform the focus adjustment according to ease of catching attention of an appreciator or motion of an eyeball. Thus, the imaging device 1 can improve a degree of satisfaction with an appearance of a moving image of a videographer or an appreciator because it is possible to provide a moving image having a more preferable appearance to the videographer (or appreciator). Furthermore, the focus adjustment determination unit 15 in this embodiment determines the behavior of the focus adjustment as follows according to the information related to the human subjective focus adjustment.

(1) According to the information related to the human subjective focus adjustment, the behavior of the focus adjustment is determined by determining acceleration and the speed in the focus adjustment for setting the subject in a focused state.

(2) According to the information related to the human subjective focus adjustment, the behavior of the focus adjustment is determined by determining the timing at which deceleration starts in the focus adjustment for setting the subject in the focused state.

(3) According to the information related to the human subjective focus adjustment, the behavior of the focus adjustment is determined by determining the timing at which the focus adjustment starts in the focus adjustment for setting the subject in the focused state.

(4) According to the information related to the human subjective focus adjustment, the behavior of the focus adjustment is determined by determining whether to drive the focus adjustment.

Furthermore, the terms "focus adjustment is suppressed" and "focus adjustment is promoted" are used among the following examples and defined as follows.

The term "focus adjustment is suppressed": Focus adjustment is prohibited, prohibition thereof is facilitated, or the focus adjustment is delayed (speed/acceleration of the focus adjustment is decreased).

The term "focus adjustment is promoted": Focus adjustment is executed, execution thereof is facilitated, or the focus adjustment is made faster than when the focus adjustment is suppressed (speed/acceleration of the focus adjustment is increased).

Figure 2:
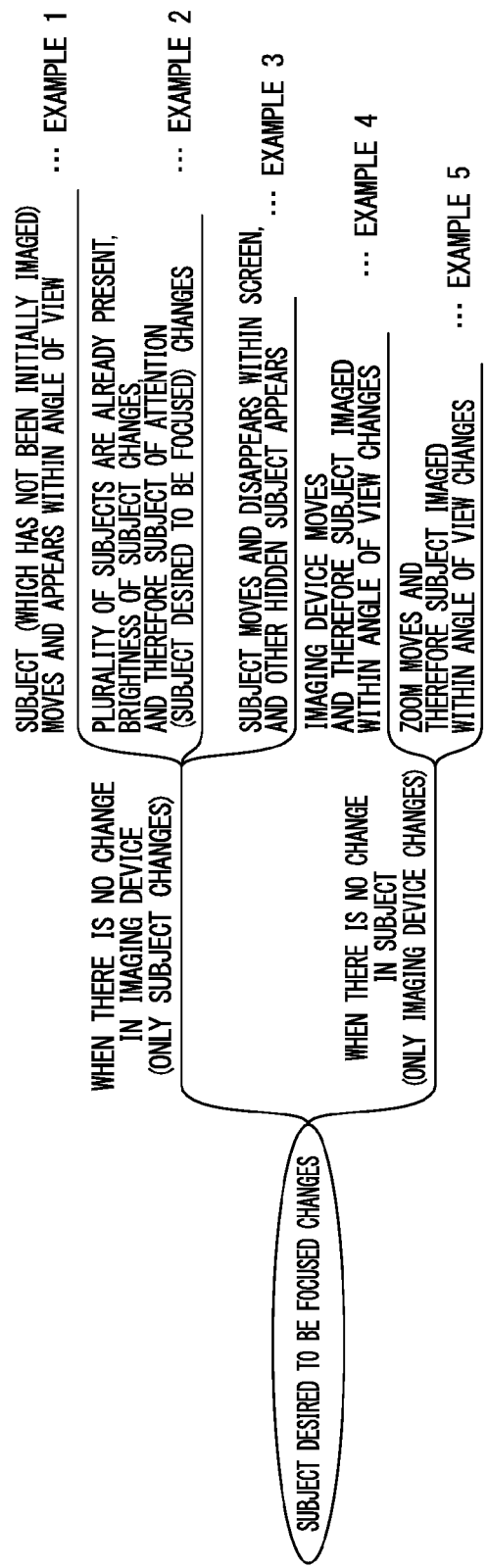
FIG. 2 is a diagram showing videographing conditions and specific scenes of examples of the first embodiment.

Next, videographing conditions and specific scenes of examples of the present embodiment will be described using FIG. 2. FIG. 2 is a diagram showing the videographing conditions and the specific scenes of each example of the present embodiment. In all the examples, the subject desired to be focused on by the videographer changes. In examples 1 to 3, the imaging device does not change (only the subject changes). On the other hand, in examples 4 and 5, the subject does not change (only the imaging device changes).

Next, the examples are examples of the assumed scenes to be videographed, and in example 1, a scene is used in which a subject which is not initially videographed moves and appears within an angle of view of the imaging device 1. In example 2, a plurality of subjects are already displayed on a screen of the imaging device 1, the brightness of the subject changes, and therefore a subject of attention (a subject desired to be focused) changes. In example 3, the subject moves and disappears from the screen of the imaging device 1 and another hidden subject appears in the screen of the imaging device 1. In example 4, the imaging device physically moves and therefore the position of the subject to be imaged changes within the angle of view. In example 5, the imaging device physically moves and therefore the position of subject to be imaged changes within the angle of view.

<Example 1>

Figure 3:
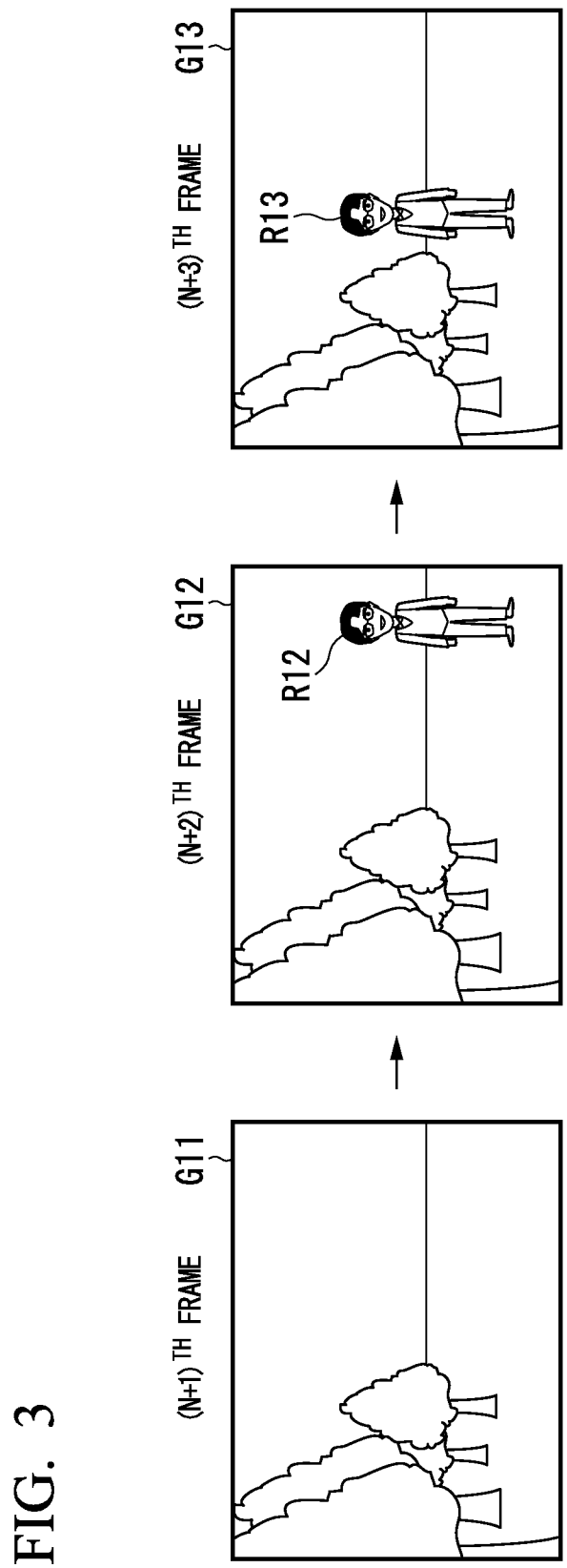
FIG. 3 is a diagram showing an example of a videographed scene in an example 1 of the first embodiment.

Next, example 1 will be described. In this example, inter-frame change information related to a change which is occurred between two or more frames and intra-frame information which is information within one frame included in a moving-image signal are acquired as information related to the human subjective focus adjustment. In this example, a description of the scene in which the subject appears from the right of the screen of the imaging device 1 in a state in which there is no motion and change in the imaging device itself as in FIG. 3 will be given. FIG. 3 is a diagram showing an example of a videographed scene in example 1. FIG. 3 shows a scene in which a certain subject appears from the right of the screen of the imaging device 1 and moves to the center of the screen of the imaging device 1. There is no image region of the subject in an image G11 of an (N+1)$^{th}$ frame (N is a positive integer). In an image G12 of an (N+2)$^{th}$ frame, an image region R12 of the subject is shown on the right of the image G12. In an image G13 of an (N+3)$^{th}$ frame, an image region R13 of the subject is shown at the center of the image G13.

Figure 4:
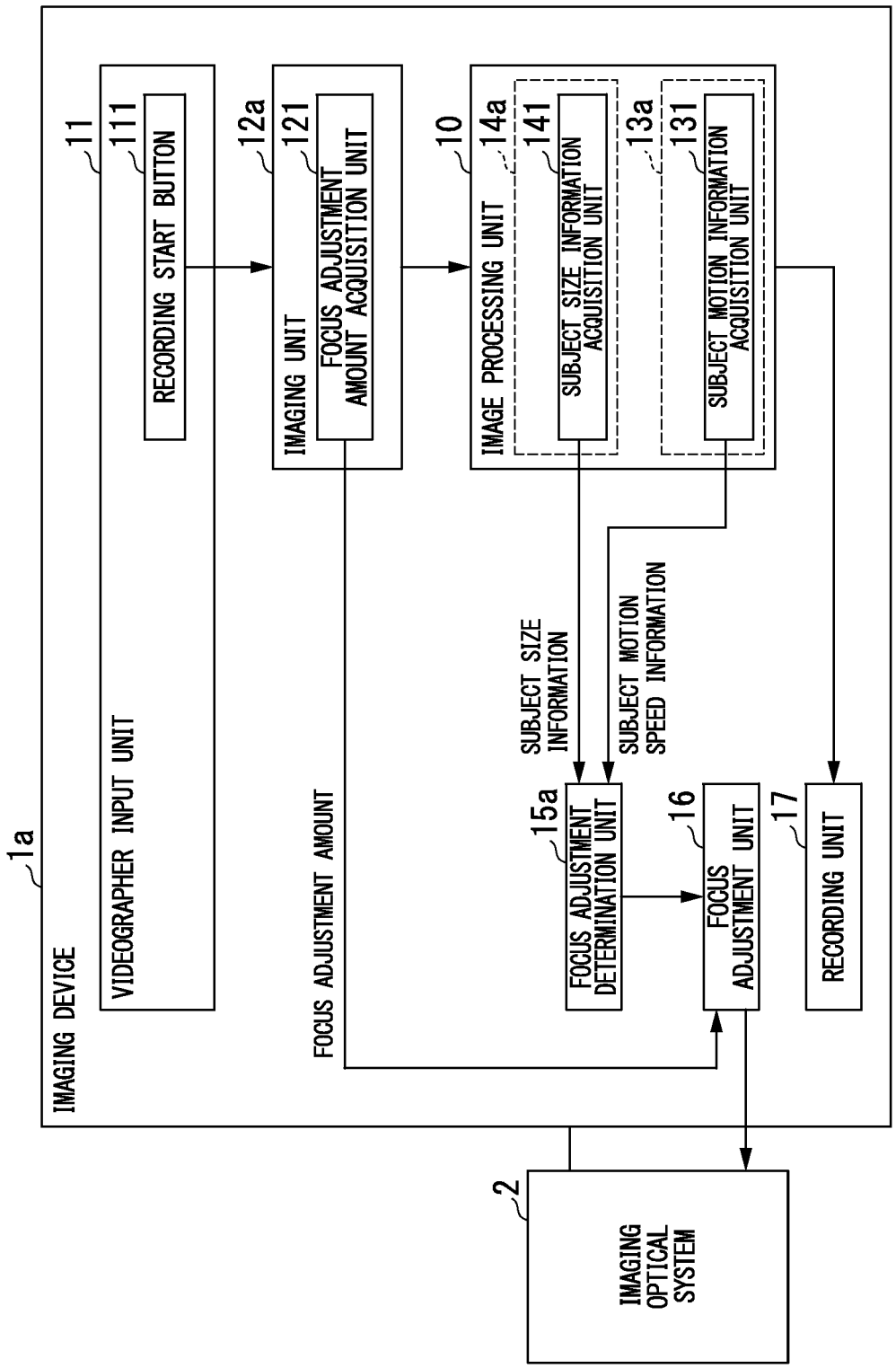
FIG. 4 is a schematic block diagram showing a configuration of an imaging device in the example 1 of the first embodiment.

FIG. 4 is a schematic block diagram showing a configuration of an imaging device 1a in example 1. The imaging device 1a includes an imaging optical system 2, a videographer input unit 11, an imaging unit 12a, an image processing unit 10, a focus adjustment determination unit 15a, a focus adjustment unit 16, and a recording unit 17.

The imaging optical system 2 guides light from the subject to the imaging unit 12a, and the image of the subject is formed by the imaging element provided in the imaging unit 12a. The imaging element generates a moving-image signal of the subject. The imaging optical system 2 is removable from the imaging device 1a as an example. Also, the imaging optical system 2 may be fixed to the imaging device 1a. A configuration of the imaging optical system 2 is also similar in the following examples.

The videographer input unit 11 receives an input of the videographer. Here, the videographer input unit 11 includes a recording start button 111 for receiving a videographing start instruction from the videographer.

The imaging unit 12a generates the moving-image signal by converting light incident from the subject via the imaging optical system 2 into an electrical signal at a predetermined shutter speed. Here, the imaging unit 12a includes a focus adjustment amount acquisition unit 121.

The image processing unit 10 generates image data from the moving-image signal supplied from the imaging unit 12a, and causes the generated image data to be recorded on the recording unit 17. Here, the image processing unit 10 includes an inter-frame change information acquisition unit 13a and an intra-frame information acquisition unit 14a. In addition, the inter-frame change information acquisition unit 13a includes a subject motion information acquisition unit 131, and the intra-frame information acquisition unit 14a includes a subject size information acquisition unit 141.

Next, a process of each part of the imaging device 1a will be described in the order of processing of a moving-image recording time.

<Process 1>

First, the imaging device 1a sets an area in which focus adjustment is performed in advance. In this example, as an example, the imaging device 1a extracts a detected face which is an image region of the face by performing face detection and sets the extracted detected face as the area in which the focus adjustment is performed. For example, the imaging device 1a holds a facial feature database storing an image of a characteristic portion (for example, an eye or a mouth) of the face. Then, the image processing unit 10 extracts an image region of the image obtained by imaging and detects the image region of the face of the subject by matching the extracted image region with the image stored in the facial feature database. Thereby, the focus adjustment unit 16, for example, can perform the focus adjustment on the detected face using the detected image region of the face of the subject as the detected face.

<Process 2>

The recording start button 111 receives a moving-image recording start instruction from the videographer, and outputs start instruction information representing the received start instruction to the imaging unit 12a.

Upon receiving the start instruction information from the videographer input unit 11, the imaging unit 12a generates a moving-image signal by converting light incident from the subject via the imaging optical system 2 into an electrical signal at a predetermined shutter speed. Thereby, the imaging unit 12*a* can start moving-image recording according to an instruction of the videographer. The imaging unit 12*a* outputs the generated moving-image signal to the image processing unit 10. Here, the number of pixels of the imaging element for generating the moving-image signal of the subject in the imaging element of the imaging unit 12*a* exceeds at least the number of pixels of a high-definition television image as an example. In the following examples, the number of pixels of the imaging element are also similar.

The imaging unit 12*a*, for example, includes the imaging element in which some of a plurality of light-receiving elements arranged on an image surface are used as a phase difference element for detecting a phase difference. The imaging unit 12*a* divides the light incident from the subject into a plurality of light fluxes, and causes light flux divisions to be incident on different phase difference elements. Thereby, the phase difference element converts the incident light into an electrical signal.

<Process 3>

Based on information of the set area in which the focus adjustment is performed, the focus adjustment amount acquisition unit 121 acquires a focus adjustment amount for setting a focus adjustment target area in the focused state, and outputs the acquired focus adjustment amount to the focus adjustment unit 16. Here, as an example, the focus adjustment amount is acquired from the phase difference element arranged on the image surface of the imaging element of the imaging unit. For example, the focus adjustment amount acquisition unit 121 acquires the focus adjustment amount by observing the phase differences of the electrical signals obtained by different phase difference elements after conversion. The focus adjustment amount acquisition unit 121 outputs the acquired focus adjustment amount to the focus adjustment unit 16.

<Process 4>

The subject motion information acquisition unit 131 acquires subject change information (here, a motion speed as an example) as the information related to the inter-frame change through image processing (acquires the subject change information as a motion speed on a moving-image surface of the detected face=a motion speed of the subject). The motion speed, for example, is a speed (pixels/frame) of a center of the face. The subject motion information acquisition unit 131, for example, may detect a center position of a detected face in a certain frame and a center position of a detected face in the next frame, and calculate the number of movement pixels of the center position of the detected face as the speed of the center of the face.

Also, the present invention is not limited thereto, and the subject motion information acquisition unit 131 may calculate the horizontal width of an imaging range on a real space from the distance from the imaging device to the subject (this distance is detected from the phase difference element, for example), the angle of view, and the length in the horizontal direction of the imaging element. Then, the subject motion information acquisition unit 131 may convert the number of movement pixels of the center position of the detected face into the speed (m/frame) of the center of the face on the real space by multiplying the calculated horizontal width of the imaging range on the real space by a number obtained by dividing the number of movement pixels of the center position of the detected face by the number of pixels (for example, 1024) of the horizontal direction of the captured image.

Although the size of the subject is similar and the motion speed of the subject is determined to be any one of "considerably fast," "moderately fast," "moderate," and "slow" speeds by comparing the acquired motion speed of the subject to an arbitrary threshold value pre-saved in a memory (not shown) within the imaging device 1*a* in this example, the acquired motion speed (for example, pixels/frame) of the subject may be used without change.

The subject motion information acquisition unit 131 outputs subject motion speed information representing the motion speed of the subject to the focus adjustment determination unit 15*a*.

<Process 5>

The subject size information acquisition unit 141 acquires subject size information representing a size of the subject as information within one frame, and outputs the acquired subject size information to the focus adjustment determination unit 15*a*. An example of this specific process will be described. In the memory (not shown) of the imaging device 1*a*, for example, a first threshold value for classifying an "extra-large (to an extent that the subject protrudes from the screen of the imaging device 1*a*)" size and a "large" size, a second threshold value for classifying the "large" size and a "medium" size, and a third threshold value for classifying the "medium" size and a "small" size are pre-stored as the threshold values for classifying the size of the subject. Here, the "extra-large," "large," "medium," and "small" sizes are subject size classifications.

In this case, the subject size information acquisition unit 141, for example, determines the size of the subject as any one of the "extra-large," "large," "medium," and "small" sizes by acquiring the size of the detected face as the size of the subject and comparing the acquired size of the subject to the first, second, and third threshold values stored in the memory (not shown). Also, the present invention is not limited thereto. For example, information of the number of pixels of the detected face may be used without change. The size of the subject is not limited to the size of the detected face. The subject size information acquisition unit 141, for example, may determine a background region and another subject region according to technology of a known figure-ground determination or the like, and set the size of the subject region in the vicinity of the area in which the focus adjustment is performed as the size of the subject. Here, the vicinity of the area in which the focus adjustment is performed, for example, includes an area in which the focus adjustment is performed, and includes pixels separated from the area by a predetermined number of pixels.

Next, a specific processing example of the subject size information acquisition unit 141 will be described. For example, the subject size information acquisition unit 141 may make a figure-ground determination using a color of each image region or a distance (the distance detected from the phase difference element, for example) from the imaging device of each image region, and may designate the size of the image region closest to the above-described area (here, a detected face as an example) on which the focus adjustment is performed among image regions determined to be the "figure" as the size of the subject.

Also, the subject is arbitrarily selectable. For example, the videographer input unit 11 may receive an input of selection of the subject by the videographer, and the subject size information acquisition unit 141 may acquire the subject size information about the subject represented by the input received by the videographer input unit 11.

In addition, although the subject size information acquisition unit 141 acquires the size of the subject within the frame as subject size information as an example in this example, for example, the physical size information of the subject may be acquired in the following process and used as the subject size information.

(1) Process 1 of acquiring physical size information of the subject

The subject size information acquisition unit 141 may perform triangulation using previous frame information and obtain the physical subject size as an example.

(2) Process 2 of acquiring physical size information of the subject.

The imaging device 1a pre-stores an average size of a general subject in a memory (not shown). The imaging device 1a may perform an object recognition process on the subject to be imaged using well-known technology and specify a type of subject to be imaged. Then, the subject size information acquisition unit 141 may obtain the pre-stored average size information of the subject as the physical size of the subject as an example.

<Process 6>

The focus adjustment determination unit 15a, for example, determines the behavior of brightness adjustment from the subject size information acquired by the subject size information acquisition unit 141 and the subject motion speed information acquired by the subject motion information acquisition unit 131. An example of this specific process will be described. For example, a table as in FIG. 5 in which one brightness adjustment speed suppression coefficient α is associated for a set of the size of the subject and the motion speed of the subject is stored in a memory (not shown) within the imaging device 1a. In this case, the focus adjustment determination unit 15a, for example, reads a speed suppression coefficient α of the focus adjustment corresponding to the set of the acquired subject size information and the acquired subject motion speed information by referring to the table of FIG. 5.

In addition, for example, a reference focus adjustment speed $V_{base}$ at the time of moving-image capturing is pre-stored in a memory (not shown). The focus adjustment determination unit 15a, for example, reads the reference focus adjustment speed $V_{base}$ from the memory, and determines a real focus adjustment speed $V_{control}$ according to the following Equation (1).

$$V_{control} = V_{base} \times \alpha \quad \text{Equation (1)}$$

As seen from Equation (1), because the focus adjustment speed becomes slow when the suppression coefficient is low, the focus adjustment is consequently suppressed. Although the speed of the focus adjustment changes in the focus adjustment determination unit 15a in this example, and for example, the focus adjustment may be suppressed by selecting whether to "operate" or "prohibit" the focus adjustment.

The focus adjustment determination unit 15a outputs the determined behavior of the focus adjustment to the focus adjustment unit 16.

FIG. 5 is an example of a table for determining the speed suppression coefficient α of the focus adjustment. In a table T1 of FIG. 5, the speed suppression coefficient α of the focus adjustment is associated for every set of the motion speed of the subject and the size of the subject. When it is determined that the motion speed of the subject is "considerably fast," the speed suppression coefficient α of the focus adjustment tends to be small. The speed suppression coefficient α of the focus adjustment tends to be small when the motion speed of the subject is low in the case in which the motion speed of the subject is lower than the "considerably fast" speed (the case of the "moderately fast," "moderate," and "slow" speeds within FIG. 5). This is because, although it is difficult to determine that the appreciator desires to perform the focus adjustment when the motion of the moving subject is too fast, gentle focus adjustment tends to be preferred when the motion speed of the subject is slow once it is determined that the focus adjustment is desired to be performed. Accordingly, it is possible to provide a moving image having a more preferable appearance to the videographer (or appreciator) by suppressing the focus adjustment at a fast movement speed of the subject greater than or equal to a certain degree and suppressing the focus adjustment when the speed is slow in the case of a speed of a certain degree or less. In addition, the speed suppression coefficient α of the focus adjustment tends to be large when the size of the subject is "large" and "medium" and tends to be small in the order of the "small" and "extra-large" sizes, and the focus adjustment is suppressed. The imaging device 1a can provide a moving image having a more preferable appearance to the videographer (or appreciator) by suppressing the focus adjustment because a process of directing the awareness of the appreciator to the moving subject tends to be difficult when the size of the subject is too small or large.

<Process 7>

Based on the behavior of the focus adjustment (the speed of the focus adjustment) determined by the focus adjustment determination unit 15a, the focus adjustment unit 16 controls a focus adjustment optical system of the imaging optical system 2 and adjusts a focus. Also, although the focus adjustment optical system of the imaging optical system 2 is controlled to perform the focus adjustment in this example, the present invention is not limited to this process, videographing is performed using the imaging optical system or the like of a structure, for example, as shown in a reference literature ["Light Field Videography with a Hand-Held Plenoptic Camera" Ren Ng et al. Stanford Tech Report CTSR 2005-02], and an image in which a focus is aligned in an area in which the focus adjustment is performed may be generated through image processing after videographing. Here, an optical system for simultaneously recording light rays from a number of directions using a microlens array attached between a main lens of the imaging device and the imaging element in the imaging optical system of the structure of the light field camera is used as the imaging optical system of the structure shown in the above-described reference literature. Thereby, the focus from the background to the foreground is freely changed after videographing.

Until the videographer input unit 11 receives an instruction of a videographing end from the videographer, the imaging device 1a iterates processing of the above-described processes 3 to 7.

Figure 6:
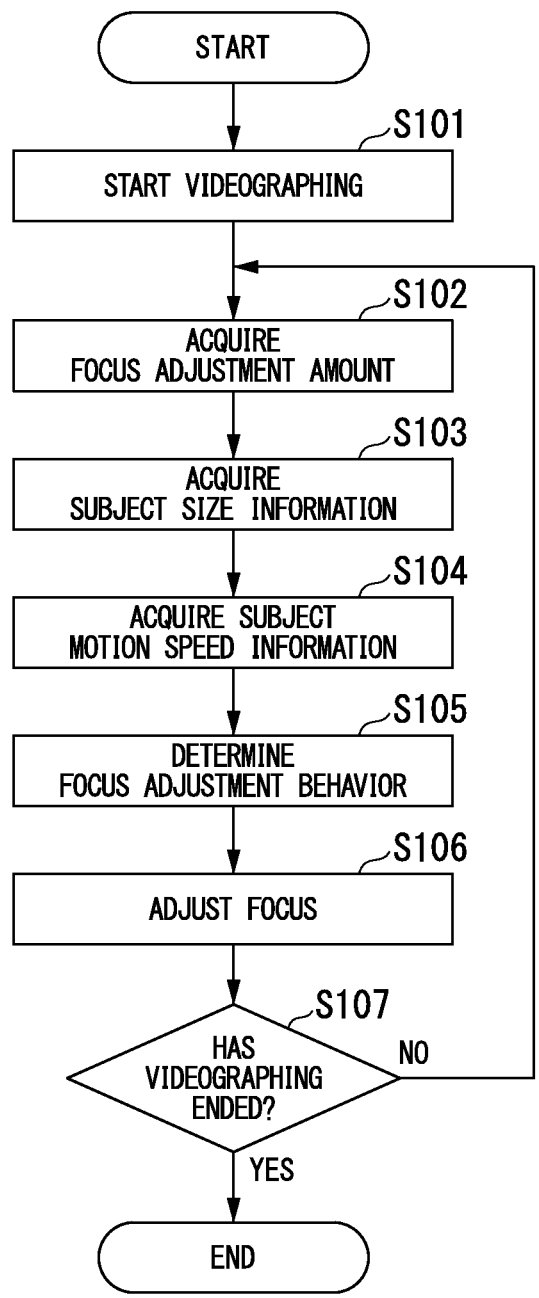
FIG. 6 is a flowchart showing an example of a flow of a process of the imaging device in the example 1 of the first embodiment.

Next, FIG. 6 is a flowchart showing an example of a flow of a process of the imaging device 1a in example 1.

(Step S101) First, the imaging unit 12a starts videographing when the recording start button 111 has been pressed.

(Step S102) Next, the focus adjustment amount acquisition unit 121 acquires a focus adjustment amount.

(Step S103) Next, the subject size information acquisition unit 141 acquires subject size information.

(Step S104) Next, the subject motion information acquisition unit 131 acquires subject motion speed information as an example of the subject motion information.

(Step S105) Next, the focus adjustment determination unit 15a determines the behavior of the focus adjustment using the subject motion speed information and the subject size information.

(Step S106) Next, the focus adjustment unit 16 performs the focus adjustment according to the determined behavior of the focus adjustment.

(Step S107) Next, the imaging unit 12a determines whether the videographing has ended based on information received by the videographer input unit 11. When there is no videographing end (NO), the process returns to step S102. When the videographing has ended (YES), the imaging device 1a ends the process. Accordingly, the process of this flowchart ends.

In the above described example 1, the focus adjustment determination unit 15a, for example, determines the behavior of the focus adjustment using the subject motion speed information and the subject size information. For example, when the motion speed of the moving subject is too fast in the scene in which the subject (a human in the example of FIG. 3) appears from the right of the screen of the imaging device 1a and the focus adjustment is performed in a start in which there is no motion or change in the imaging device 1a, the focus adjustment determination unit 15a determines focus adjustment behavior to suppress the focus adjustment because the videographer (viewer) tends to determine not to set the subject in the focused state. However, once it is determined that the focus adjustment is desired to be performed (when the motion speed of the subject is less than or equal to a certain amount), the focus adjustment determination unit 15a determines the focus adjustment behavior to suppress the focus adjustment when the motion speed is low because gentle focus adjustment tends to be preferred when the motion speed of the subject is slow. Because a process of directing the awareness of the videographer (viewer) to the moving subject tends to be difficult when the size of the moving subject is too small or large, the focus adjustment determination unit 15a determines the focus adjustment behavior to suppress the focus adjustment when the size of the moving subject is less than a predetermined sixth threshold value or greater than a seventh threshold value. Here, the seventh threshold value is greater than the sixth threshold value. In this manner, because it is possible to perform the focus adjustment according to ease of catching human attention, the imaging device 1a can provide a moving image having a more preferable appearance to the videographer (or appreciator).

Also, although the subject motion information acquisition unit 131 acquires the motion speed information of the subject as the motion information of the subject in this example, a motion amount or the like of the subject (to be described below as an example) may be additionally acquired as in example 1 and the behavior of the focus adjustment may be determined <Modified Example 1: Motion Amount of Subject>

The subject motion information acquisition unit 131 within FIG. 4 may acquire the "motion amount of the subject" instead of the "motion speed of the subject."

The subject motion information acquisition unit 131 may acquire the motion amount of the subject through image processing as in the motion speed of the subject. The motion amount described here may be a motion amount from the beginning of motion of an arbitrary subject or a motion amount among an arbitrary number of frames. Because the subject during motion appears at an angle of view in advance in this example, the subject motion information acquisition unit 131 acquires the motion amount from the frame in which the subject has appeared at the angle of view as an example. In this case, it is easy to consider that the videographer (or appreciator) tends to bring the moving subject in the focused state when the motion amount from when the subject has appeared at the angle of view is large (after the subject has moved by a certain degree of distance within the angle of view). Accordingly, the focus adjustment determination unit 15a may determine the behavior of the focus adjustment to suppress the operation of the focus adjustment as the motion amount of the subject decreases.

<Modified Example 2: Difference Information between Motion States of Plurality of Subjects>

The subject motion information acquisition unit 131 within FIG. 4 may acquire a "difference between the movement states of the plurality of subjects" instead of the "motion speed of the subject."

The subject motion information acquisition unit 131, for example, acquires the difference information (for example, a difference between movement directions) of the movement states of the plurality of subjects through image processing in the following processing scheme as in the speed of the subject. The subject motion information acquisition unit 131, for example, performs face detection of the subject and acquires the motion information for all detected faces when a plurality of faces have been detected. At this time, although awareness tends to be directed to the subject when the motion direction of the detected face of a focus adjustment target is different from the motion direction of another detected face, it is difficult to direct the awareness when the motion directions are similar. Accordingly, the subject motion information acquisition unit 131 acquires the difference information (here, the difference between the movement directions) of the movement states of the plurality of subjects, and the focus adjustment determination unit 15a may determine the behavior of the focus adjustment to suppress the operation of the focus adjustment when there is less difference between the movement states (here, the difference between the movement directions) of the plurality of subjects.

In addition, although the difference information of the movement directions is acquired as the difference information of the movement states of the plurality of subjects here, the subject motion information acquisition unit 131 may acquire difference information of movement speeds, a difference between movement amounts, or the like. In this case, the focus adjustment determination unit 15a may determine the behavior of the focus adjustment using the difference information of the movement speeds, the difference between the movement amounts, or the like. For example, when a movement speed difference of a certain subject exceeds a predetermined reference as compared to those of other subjects, the focus adjustment determination unit 15a may promote the focus adjustment. Thereby, when a movement speed difference between the certain subject and another subject is large, it is possible to improve a degree of satisfaction of the appreciator by promoting the focus adjustment because the appreciator is considered to direct attention to the certain subject and to want to quickly view the certain subject. In contrast, when the movement speed difference between the certain subject and the other subject is less than or equal to the predetermined reference, the focus adjustment determination unit 15a may suppress the focus adjustment. When the movement speed of the certain subject does not substantially change compared to that of the other subject, it is considered that the videographer (or appreciator) would not like to view the certain subject early because the attention of the videographer (or appreciator) is not directed to the certain subject. Therefore, the imaging device 1a can provide a moving image having a more preferable appearance to the videographer (or appreciator) by suppressing the focus adjustment to the certain subject.

<Modified Example 3: Motion Type Information of Subject>

The subject motion information acquisition unit 131 within FIG. 4 may acquire the "motion type information of the subject" instead of the "motion speed of the subject." Here, the motion type information of the subject, for example, is information related to motion at the time of "walking," information related to motion at the time of "running," or the like when the subject is a human.

The subject motion information acquisition unit 131, for example, acquires the motion type information of the subject through image processing in the following processing scheme as in the speed of the subject.

Procedure 1: Information related to a pattern of motion on the image of the face region when the human walks and information related to a pattern of motion on the image of the face region when the human runs are pre-stored within the memory of the imaging device 1a as reference information.

Procedure 2: When the videographer starts videographing, the imaging unit 12a generates a moving-image signal of the subject as described above.

Procedure 3: The subject motion information acquisition unit 131 detects a face region by performing a face recognition process on the moving-image signal generated by the imaging unit 12a.

Procedure 4: The subject motion information acquisition unit 131 acquires information related to motion on the image of the face region by tracking the above-described detected face region.

Procedure 5: The subject motion information acquisition unit 131 specifies motion of a pattern most approximate to the motion acquired in procedure 4 among patterns of a plurality of motions stored in procedure 1 as information related to motion of a current subject (motion of a human face) by matching information related to motion on the image of the human face region in the patterns of the plurality of motions (a pattern of the motion at the time of walking, a pattern of the motion at the time of running, etc.) stored as reference information in the memory in the above-described procedure 1 with information related to the motion of the face region detected in the above-described procedure 4. For example, if the motion acquired in procedure 4 is most approximate to the pattern of the motion of the face region when the human runs among the patterns of the motions stored in procedure 1, the subject motion information acquisition unit 131 determines that the motion of the subject is the motion when the human runs.

Also, when the subject is the human, the procedure of determining the motion when the subject is "walking" and the motion when the subject is "running" through image processing is not limited to the above-described procedures 1 to 5.

Because the human tends to desire to perform focus adjustment when the subject is running at a higher speed than when the subject is walking, it is preferable to determine focus adjustment behavior to promote the focus adjustment.

<Modified Example 4: Motion Direction of Subject>

The subject motion information acquisition unit 131 within FIG. 4 may acquire the "motion direction of the subject" instead of the "motion speed of the subject." The subject motion information acquisition unit 131 acquires the motion type information of the subject through image processing as in the speed of the subject. Because there is a tendency according to human senses to consider that faster focus adjustment is desired to be performed when the subject moves in a horizontal/vertical direction than when the subject moves in a diagonal direction, it is preferable to determine the behavior of the focus adjustment so that the focus adjustment is promoted when the subject moves in the horizontal direction.

In addition, although the motion information of the subject is acquired as change information of the subject in this example, the behavior of the focus adjustment may be determined by acquiring the following other information.

<Modified Example 5: Color Change Information of Subject>

The subject motion information acquisition unit 131 within FIG. 4 is changed to a subject deformation information acquisition unit, and the subject deformation information acquisition unit may acquire the "color change information of the subject" instead of the "motion speed of the subject." Here, the color change information of the subject is information representing a color change in the subject.

For example, when the subject has the color change (a background change on a stage, a change in clothes of the subject, or the like), ease of paying attention to the subject is changed by a color change amount or speed or the like. The process of a focus adjustment behavior determination and the effect are similar to those of the case in which the motion information of the subject is acquired. Accordingly, the subject deformation information acquisition unit may acquire the color change information of the subject and the focus adjustment determination unit 15a may determine the behavior of the focus adjustment. Specifically, for example, because the appreciator does not direct attention to the subject when the color change amount or the color change speed is small or low, the focus adjustment determination unit 15a may suppress the focus adjustment as the color change amount or the color change speed of a certain subject decreases. In addition, because the appreciator does not direct attention to the subject when the color change amount or the color change speed of the certain subject is less than or equal to a predetermined reference, the focus adjustment determination unit 15a may suppress the focus adjustment.

<Modified Example 6: Deformation Information of Subject>

The subject motion information acquisition unit 131 within FIG. 4 is changed to a subject deformation information acquisition unit, and the subject deformation information acquisition unit may acquire the "deformation information of the subject" instead of the "motion speed of the subject."

For example, when the subject is deformed (a balloon is inflated or the like), ease of paying attention to the subject is changed by a deformation speed or deformation amount of the subject. The process of a focus adjustment behavior determination and the effect are similar to those of the case in which the motion information of the subject is acquired. Accordingly, the subject deformation information acquisition unit may acquire the deformation information of the subject and the focus adjustment determination unit 15a may determine the behavior of the focus adjustment. Specifically, for example, because the appreciator does not direct attention to the subject when the deformation speed or the deformation amount of the subject is low or small, the focus adjustment determination unit 15a may suppress the focus adjustment as the deformation speed or the deformation amount of a certain subject decreases. In addition, when a color change amount or a color change speed of the certain subject is less than or equal to a predetermined reference, the focus adjustment determination unit 15a may suppress the focus adjustment.

<Modified Example 7: Inter-frame Signal Value Change Amount of Captured Moving-image Signal>

The subject motion information acquisition unit 131 within FIG. 4 is changed to an inter-frame signal value change amount acquisition unit for the captured moving-image signal, and the inter-frame signal value change amount acquisition unit for a captured moving-image signal may acquire an inter-frame signal value change amount for the captured moving-image signal instead of the motion speed of the subject.

Here, the focus adjustment determination unit 15a, for example, may calculate differences between corresponding pixel values for all pixels, and acquire a sum of absolute values of the calculated differences as an inter-frame signal value change amount.

The inter-frame signal value change amount (from which the change speed or the like can also be obtained) within the captured moving-image signal may be acquired. The process of a focus adjustment behavior determination and the effect are similar to those of the case in which the motion information of the subject is acquired.

For example, the case in which the inter-frame signal value change amount is large is the case in which panning is performed, the case in which a large change occurs within the screen of the imaging device 1a, or the like. Because the appearance of the moving image is worse when the focus adjustment is further performed in such a state, it is not preferable for the appreciator to perform the focus adjustment in the state. Consequently, for example, when the inter-frame signal value change amount is large, the focus adjustment determination unit 15a may suppress the focus adjustment. In addition, when the inter-frame signal change amount exceeds a predetermined reference, the focus adjustment determination unit 15a may suppress the focus adjustment.

<Modified Example 8: Tracking Information of Arbitrary Point or Region of Frame Image>

The subject motion information acquisition unit 131 within FIG. 4 is changed to a tracking information acquisition unit, and the tracking information acquisition unit may acquire the tracking information of the arbitrary point or region of the frame image instead of the "motion speed of the subject." Here, the frame image is an image obtained for every frame from the moving-image signal.

The tracking information acquisition unit may acquire the tracking information of an arbitrary characteristic point (corner, edge, or the like) or an arbitrary region within the image which is not limited to a face obtained by well-known technology. The process of a focus adjustment behavior determination and the effect are similar to those of the case in which the motion information of the subject is acquired. The tracking information, for example, is a change amount in a feature amount space according to well-known tracking technology.

Unless tracking is smoother than a predetermined reference, the focus adjustment determination unit 15a may suppress the focus adjustment because the motion of the subject is irregular and further focus alignment occurs even when the focus is aligned. In addition, when the tracking result represents that the tacking target has excessively moved at a high speed or has not excessively moved, the appreciator does not direct attention to the tracking target. Consequently, for example, when the movement speed of the tracking target exceeds a predetermined first threshold value or when the movement amount of the tracking target (or the movement speed) is less than or equal to a predetermined second threshold value, the focus adjustment determination unit 15a may suppress the focus adjustment. Here, the second threshold value is less than the first threshold value.

In addition, when the movement amount of the tracking target or the movement speed of the tracking target is small or low, the appreciator does not direct attention to the tracking target. Consequently, the focus adjustment determination unit 15a may suppress the focus adjustment as the movement amount or the movement speed of the tracking target decreases.

Although the behavior of the focus adjustment is determined using information related to an inter-frame change and information within one frame as information related to human subjective focus adjustment in this example, the focus adjustment determination unit 15a may additionally correct the behavior of the focus adjustment using "setting-related information for videographing" or "information related to a phase difference element to be used" (a specific example will be described below).

Although it is difficult to say that such information is human-subjective-focus-adjustment-related information itself, the information is an element which affects preferable focus adjustment at the time of moving-image appreciation. It is possible to additionally acquire the information and determine the more preferable behavior of the focus adjustment by correcting the determined behavior of the focus adjustment using the acquired information.

Here, the information related to the phase difference element to be used can be acquired in the case in which it is possible to change whether to acquire the focus adjustment using any phase difference element when the focus adjustment is performed using a phase difference signal as in this example.

For example, the focus adjustment determination unit 15a may temporarily determine the behavior of the focus adjustment using the subject motion information acquired as the information related to the inter-frame change and the subject size information acquired as information within one frame, and also determine the behavior of the focus adjustment by correcting the temporarily determined behavior of the focus adjustment further using the following third information.

<Modified Example 9: Setting-related Information for Videographing>

Figure 7:
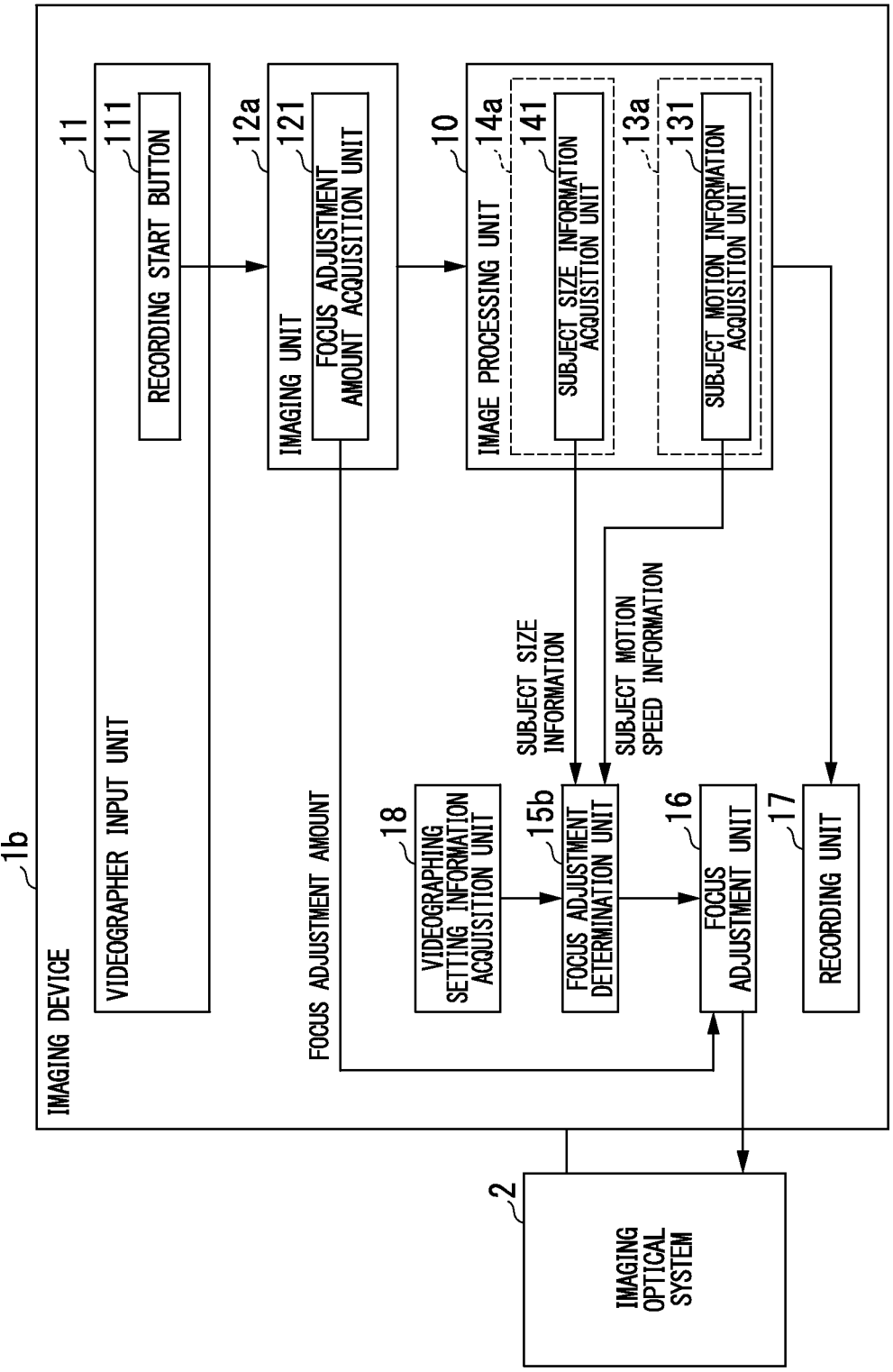
FIG. 7 is a schematic block diagram showing a configuration of an imaging device in a modified example 9 of the first embodiment.

FIG. 7 is a schematic block diagram showing a configuration of an imaging device 1b in modified example 9. Also, elements common with FIG. 4 are assigned the same reference signs and specific a description thereof will be omitted. With respect to the configuration of the imaging device 1a of example 1 of FIG. 4, the configuration of the imaging device 1b in modified example 9 is configured by adding a videographing setting information acquisition unit 18 and changing the focus adjustment determination unit 15a to a focus adjustment determination unit 15b.

The videographing setting information acquisition unit 18 acquires videographing setting information which is the setting-related information for the videographing and outputs the acquired setting-related information for the videographing to the focus adjustment determination unit 15b.

<Example 1 of Modified Example 9>

As the first example, the videographing setting information acquisition unit 18 acquires International Organization for Standardization (ISO) sensitivity setting information of the imaging device 1b as the videographing setting information. When the ISO sensitivity of the imaging device 1b is high, the noise within the screen of the imaging device 1b increases and the appearance of the moving image becomes complex. Because a change within the moving image is more likely to be unfavorable in such a state, it is preferable to suppress the focus adjustment when the sensitivity is high.

For example, a table in which the ISO sensitivity is associated with a focus adjustment suppression coefficient $\beta$ is pre-stored in a memory (not shown). In the table, as an example, the focus adjustment suppression coefficient $\beta$ decreases when the ISO sensitivity is high. As a specific correction example, for example, the focus adjustment determination unit 15b determines the focus adjustment suppression coefficient $\beta$ by referring to the table of the memory (not shown) and reading the focus adjustment suppression coefficient $\beta$ corresponding to the ISO sensitivity of the imaging device 1a. Then, the focus adjustment determination unit 15b, for example, determines the ultimate focus adjustment behavior according to the following Equation (2).

$$V_{control} = V_{base} \times \alpha \times \beta \qquad \text{Equation (2)}$$

Equation (2) is an equation for correcting the behavior of the focus adjustment determined by the above-described Equation (1). As seen from Equation (2), the focus adjustment determination unit 15b corrects the behavior of the focus adjustment to suppress the focus adjustment when the focus adjustment suppression coefficient β is small. That is, the focus adjustment determination unit 15b corrects the behavior of the focus adjustment to suppress the focus adjustment by decreasing the focus adjustment suppression coefficient β within Equation (2) when the ISO sensitivity is high.

<Example 2 of Modified Example 9>

As the second example, the videographing setting information acquisition unit 18 acquires shutter speed setting information of the imaging device 1b as the videographing setting information. When the shutter speed setting of the imaging device 1b is fast with respect to a frame rate of a moving-image capturing time, the smoothness of the motion of the moving image decreases (the moving image looks like a flip book). Consequently, the focus adjustment determination unit 15b, for example, corrects the behavior of the focus adjustment to suppress the focus adjustment when the shutter speed setting of the imaging device 1b is fast with respect to the frame rate of the moving-image capturing time.

For example, the shutter speed is associated with the focus adjustment suppression coefficient β is pre-stored in a memory (not shown). FIG. 8 is an example of the table T2 in which the shutter speed is associated with the focus adjustment suppression coefficient β stored in the memory (not shown). In FIG. 8, the focus adjustment suppression coefficient β decreases when the shutter speed is fast.

As a specific correction example, for example, the focus adjustment determination unit 15b determines the focus adjustment suppression coefficient β by referring to the table T2 (see FIG. 8) stored in the memory (not shown) and reading the focus adjustment suppression coefficient β corresponding to the shutter speed. The focus adjustment determination unit 15b, for example, corrects the focus adjustment behavior according to Equation (2) as in example 1. Thereby, the focus adjustment determination unit 15b corrects the behavior of the focus adjustment to suppress the focus adjustment because the focus adjustment suppression coefficient β within Equation (2) decreases when the shutter speed setting is fast.

<Example 3 of Modified Example 9>

As the third example, the videographing setting information acquisition unit 18 acquires F-number setting information of the imaging optical system 2 attached to the imaging device 1b as videographing setting information. When the F-number setting of the imaging optical system 2 attached to the imaging device 1b decreases, a depth of field becomes shallow. When the depth of field is shallow, it is easy to direct awareness to one subject. Accordingly, the focus adjustment determination unit 15b, for example, corrects the behavior of the focus adjustment to suppress the focus adjustment as the F-number setting of the imaging device 1b increases.

For example, a table in which the F-number is associated with the focus adjustment suppression coefficient β is pre-stored in a memory (not shown). In the table, for example, the focus adjustment suppression coefficient β decreases when the F-number is large. As a specific correction process, for example, the focus adjustment determination unit 15b determines the focus adjustment suppression coefficient β by referring to the table stored in the memory (not shown) and reading the focus adjustment suppression coefficient β corresponding to the F-number. The focus adjustment determination unit 15b, for example, corrects the focus adjustment behavior according to Equation (2) as in example 1. Thereby, the focus adjustment determination unit 15b corrects the behavior of the focus adjustment to suppress the focus adjustment because the focus adjustment suppression coefficient β within Equation (2) decreases when the F-number is large.

<Example 4 of Modified Example 9>

As the fourth example, the videographing setting information acquisition unit 18 acquires focal distance setting information of the imaging optical system 2 attached to the imaging device 1b as videographing setting information. When the focal distance of the imaging device 1b is short, it is difficult to direct awareness to one subject because the appreciator looks over a wide range. Accordingly, the focus adjustment determination unit 15b, for example, determines the behavior of the focus adjustment to suppress the focus adjustment when the focal distance setting of the imaging optical system 2 attached to the imaging device 1b is short.

For example, a table in which the focal distance is associated with the focus adjustment suppression coefficient β is pre-stored in a memory (not shown). In the table, for example, the focus adjustment suppression coefficient β decreases when the focal distance is short. As a specific correction process, for example, the focus adjustment determination unit 15b determines the focus adjustment suppression coefficient β by referring to the table stored in the memory (not shown) and reading the focus adjustment suppression coefficient β corresponding to the focal distance. The focus adjustment determination unit 15b, for example, corrects the behavior of the focus adjustment according to Equation (2) as in example 1. Thereby, the focus adjustment determination unit 15b corrects the behavior of the focus adjustment to suppress the focus adjustment because the focus adjustment suppression coefficient β within Equation (2) decreases when the focal distance is short.

<Example 5 Of Modified Example 9>

As the fifth example, the videographing setting information acquisition unit 18 acquires setting information of image processing of the imaging device 1b as videographing setting information. Noise reduction (NR) strength is acquired as the image processing setting information of the imaging device 1b. When NR is weakened, the screen of the moving image tends to be internally complex. Accordingly, the focus adjustment determination unit 15a, for example, may determine the behavior of the focus adjustment to suppress the operation of the focus adjustment when the NR strength is low.

For example, a table in which the NR strength is associated with a focus adjustment suppression coefficient β is pre-stored in a memory (not shown). In the table, for example, the focus adjustment suppression coefficient β decreases when the NR strength is low.

As a specific correction process, for example, the focus adjustment determination unit 15b determines the focus adjustment suppression coefficient β by referring to the table of the memory (not shown) and reading the focus adjustment suppression coefficient β corresponding to the NR strength. The focus adjustment determination unit 15b, for example, corrects the behavior of the focus adjustment according to Equation (2) as in example 1. Thereby, the focus adjustment determination unit 15b corrects the behavior of the focus adjustment to suppress the focus adjustment because the focus adjustment suppression coefficient β within Equation (2) decreases when the NR strength is low.

<Example 6 of Modified Example 9>

As the sixth example, the videographing setting information acquisition unit 18 acquires the presence/absence or strength of a representation enhancement process as setting information of image processing of the imaging device 1b which is an example of the videographing setting information. Here, the representation enhancement process, for example, is a process of enhancing the color saturation of the entire image and colorfully impressively enhancing the captured image. When the representation enhancement process is applied, it is preferable to suppress the focus adjustment because visual stimulus within the screen of the imaging device 1b becomes strong. Accordingly, the focus adjustment determination unit 15b, for example, determines the behavior of the focus adjustment to suppress the focus adjustment as a degree to which the representation enhancement process is applied increases. Specifically, the focus adjustment determination unit 15b, for example, determines the behavior of the focus adjustment to suppress the focus adjustment when the strength of the representation enhancement process is high. In addition, the focus adjustment determination unit 15b, for example, determines the behavior of the focus adjustment to suppress the focus adjustment when the representation enhancement process is applied more than when representation enhancement process is not applied.

For example, a table in which the strength of the representation enhancement process is associated with a focus adjustment suppression coefficient β is pre-stored in a memory (not shown). In the table, for example, the focus adjustment suppression coefficient β decreases when the strength of the representation enhancement process is high. In addition, when the representation enhancement process is not applied, the strength of the representation enhancement process is 0.

As a specific correction process, for example, the focus adjustment determination unit 15b determines the focus adjustment suppression coefficient β by referring to the table of the memory (not shown) and reading the focus adjustment suppression coefficient β corresponding to the strength of the representation enhancement process. The focus adjustment determination unit 15b, for example, corrects the behavior of the focus adjustment according to Equation (2) as in example 1. Thereby, the focus adjustment determination unit 15b corrects the behavior of the focus adjustment to suppress the focus adjustment because the focus adjustment suppression coefficient β within Equation (2) decreases when the strength of the representation enhancement process is high.

Figure 9:
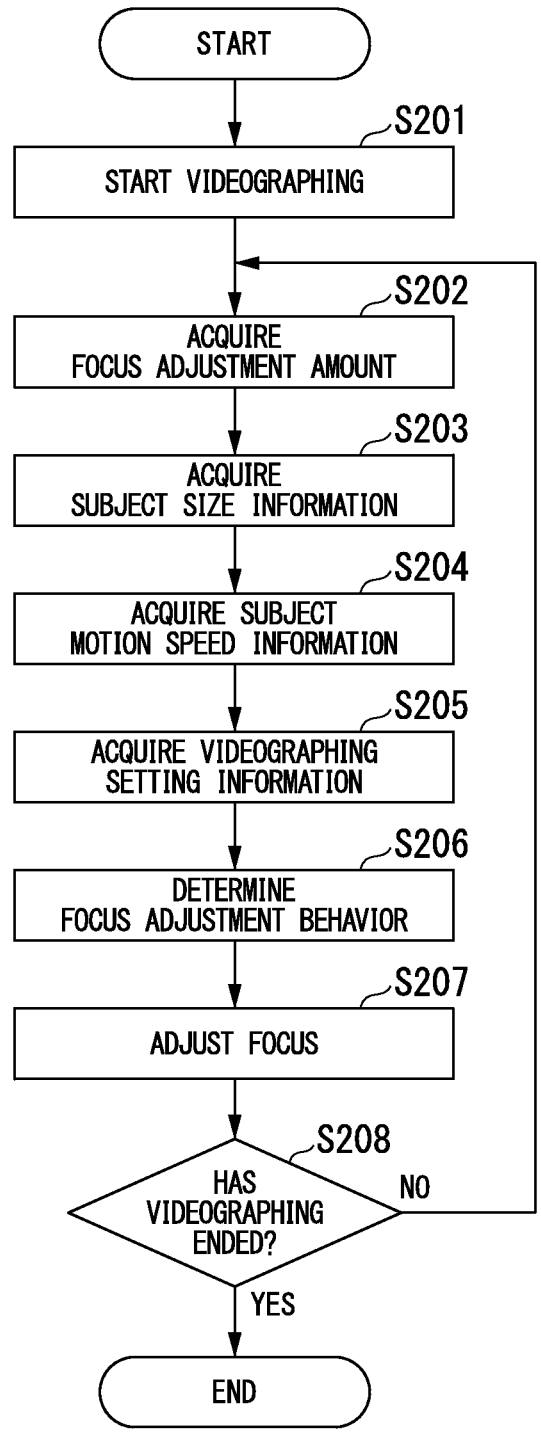
FIG. 9 is a flowchart showing an example of a flow of a process of an imaging device in the modified example 9 of the first embodiment.

FIG. 9 is a flowchart showing an example of a flow of a process of the imaging device in modified example 9.

(Step S201) First, the imaging unit 12a starts videographing when the recording start button 111 has been pressed.

(Step S202) Next, the focus adjustment amount acquisition unit 121 acquires a focus adjustment amount.

(Step S203) Next, the subject size information acquisition unit 141 acquires subject size information.

(Step S204) Next, the subject motion information acquisition unit 131 acquires subject motion speed information as an example of the subject motion information.

(Step S205) Next, the videographing setting information acquisition unit 18 acquires videographing setting information.

(Step S206) Next, the focus adjustment determination unit 15b determines the behavior of the focus adjustment using the subject motion speed information, the subject size information, and the videographing setting information.

(Step S207) Next, the focus adjustment unit 16 performs the focus adjustment according to the determined behavior of the focus adjustment.

(Step S208) Next, the imaging unit 12a determines whether the videographing has ended. When there is no videographing end (NO), the process returns to step S202. When the videographing has ended (YES), the imaging device 1b ends the process. Accordingly, the process of this flowchart ends.

In the above modified example 9, the focus adjustment determination unit 15b, for example, determines the behavior of the focus adjustment using the videographing setting information in addition to the subject motion information and the subject size information. At this time, the imaging device 1b, for example, determines the focus adjustment behavior to suppress the focus adjustment when the state is that in which the phase difference elements are used at sparse intervals. Thereby, because the focus adjustment behavior can be corrected using the videographing setting information, the imaging device 1b can further perform the focus adjustment according to ease of catching attention of the appreciator. Because of this, the imaging device 1b can provide a moving image having a more preferable appearance to the videographer (or appreciator).

<Modified Example 10: Phase Difference Element Use Situation Based on Manual Input by User>

Figure 10:
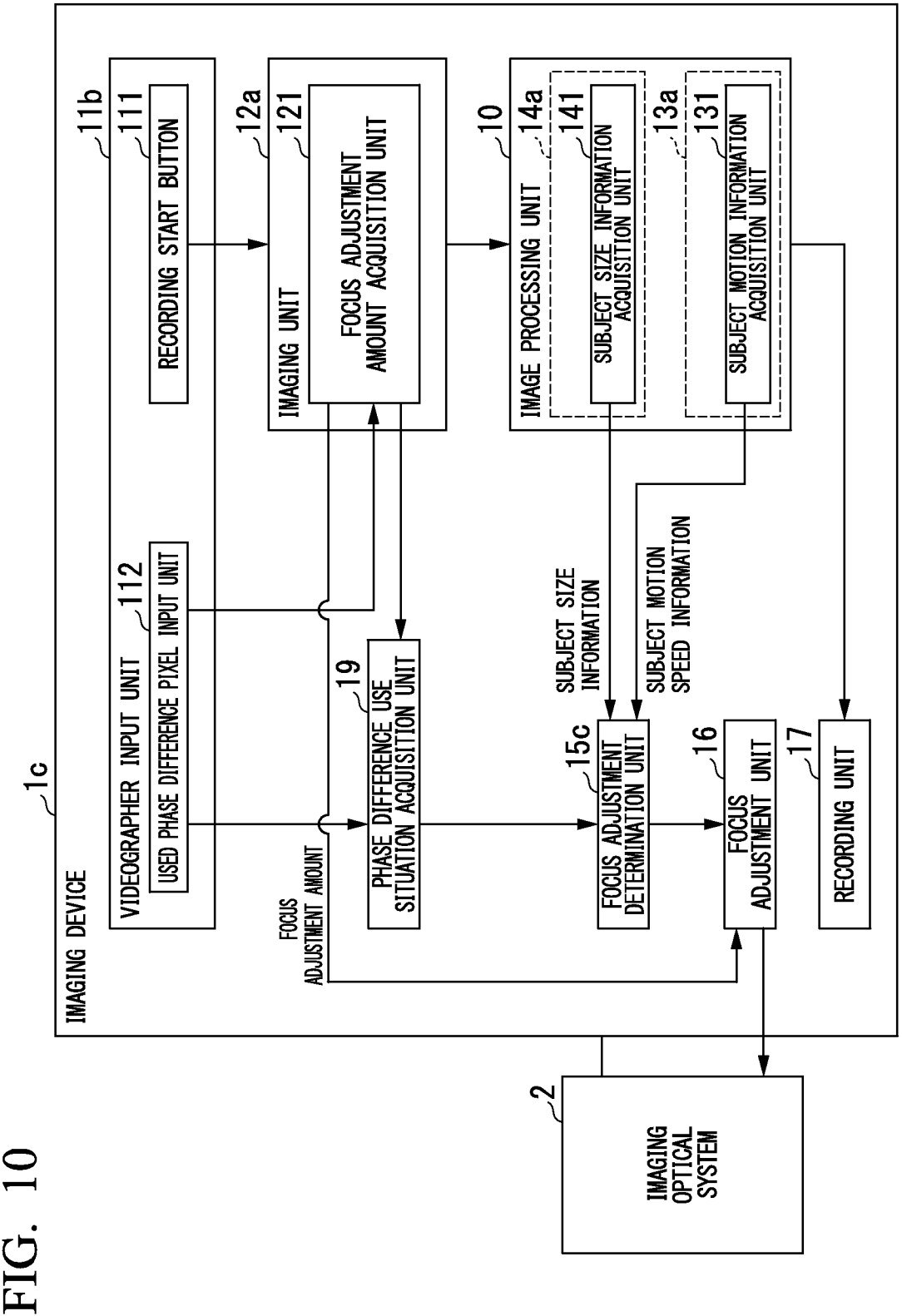
FIG. 10 is a schematic block diagram showing a configuration of an imaging device in modified example 10.

FIG. 10 is a schematic block diagram showing a configuration of an imaging device 1c in modified example 10. Also, elements common with FIG. 4 are assigned the same reference signs and specific description thereof will be omitted. With respect to the configuration of the imaging device 1a of example 1 of FIG. 4, the configuration of the imaging device 1c in modified example 10 is configured by adding a phase difference use situation acquisition unit 19 and changing the videographer input unit 11 to a videographer input unit 11b. Compared to the videographer input unit 11 of example 1 of FIG. 4, the videographer input unit 11b additionally includes a used phase difference pixel input unit 112.

When the focus adjustment is performed using a phase difference signal in modified example 10, it is possible to change whether to acquire the focus adjustment using any phase difference element. For example, the user inputs a used phase difference pixel which is a pixel of a used phase difference element.

The used phase difference pixel input unit 112 receives an input of the used phase difference pixel by its user, and outputs received input information to the phase difference use situation acquisition unit 19 and the focus adjustment amount acquisition unit 121.

The phase difference use situation acquisition unit 19 acquires phase difference element use situation information related to a phase difference element to be used from the input information input from the used phase difference pixel input unit 112. Here, the phase difference element use situation information, for example, represents whether to use the phase difference elements at sparse intervals (reading speed priority) or dense intervals (tracking priority).

The focus adjustment amount acquisition unit 121 determines the phase difference element to be used to calculate the focus adjustment amount from the input information input from the used phase difference pixel input unit 112, and acquires the focus adjustment amount using the phase difference element.

In this case, the ease of tracking for the motion of the subject is changed according to whether to use the phase difference elements at comparatively dense intervals or whether to use the phase difference elements at sparse intervals. Because it is easy to smoothly perform the tracking when the intervals are dense but it is difficult to smoothly perform the tracking when the intervals are sparse, it is easy to generate an excessive focus adjustment operation (a change in a blur amount). Accordingly, the focus adjustment determination unit 15c, for example, acquires the phase difference element use situation information, and determines the behavior of the focus adjustment to suppress the focus adjustment when the state is that in which the phase difference elements of the sparse intervals are used.

For example, a table in which the phase difference element use situation is associated with a focus adjustment suppression coefficient β is pre-stored in a memory (not shown). In the table, for example, the focus adjustment suppression coefficient β decreases when the state is that in which the phase difference elements of the sparse intervals are used.

As a specific correction process, for example, the focus adjustment determination unit 15c determines the focus adjustment suppression coefficient β by referring to the table of the memory (not shown) and reading the focus adjustment suppression coefficient β corresponding to the phase difference element use situation. The focus adjustment determination unit 15c, for example, corrects the behavior of the focus adjustment according to Equation (2) as in example 1. Thereby, the focus adjustment determination unit 15c corrects the behavior of the focus adjustment to suppress the focus adjustment because the focus adjustment suppression coefficient β within Equation (2) decreases when the state is that in which the phase difference elements of the sparse intervals are used.

Figure 11:
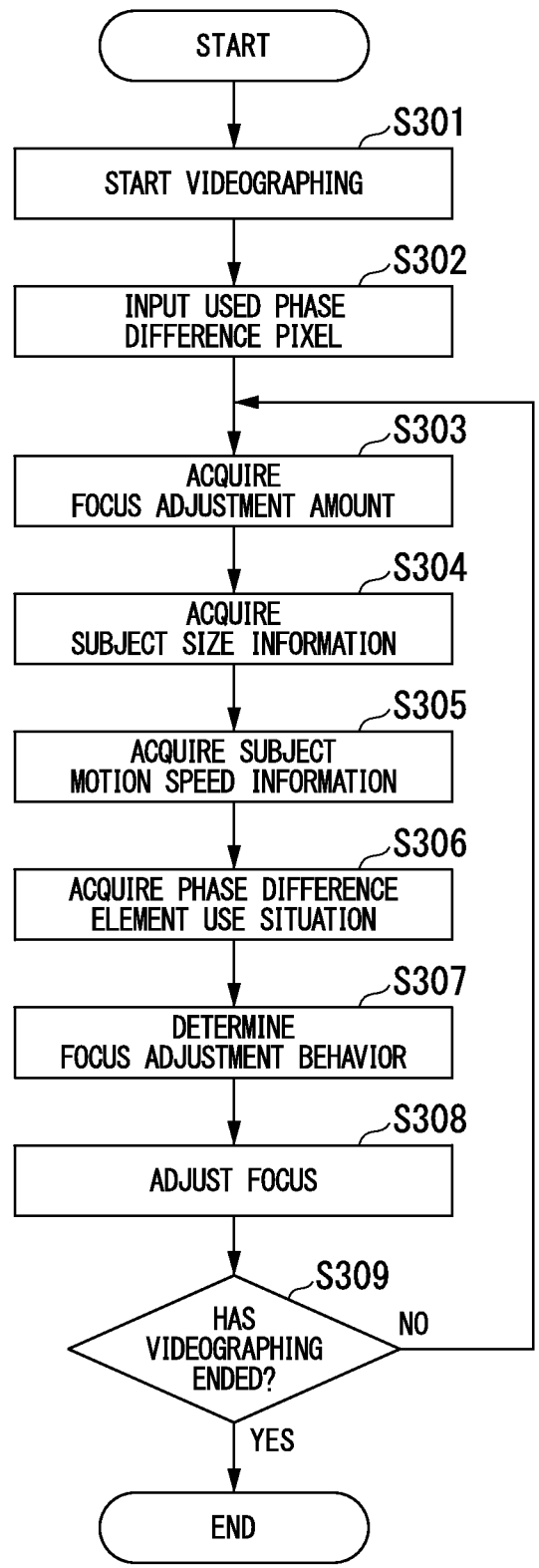
FIG. 11 is a flowchart showing an example of a flow of a process of the imaging device in a modified example 10 of the first embodiment.

FIG. 11 is a flowchart showing an example of a flow of a process of the imaging device 1c in modified example 10.

(Step S301) First, the imaging unit 12a starts videographing when the recording start button 111 has been pressed.

(Step S302) Next, the used phase difference pixel input unit 112 receives an input of the used phase difference pixel by its user.

(Step S303) Next, the focus adjustment amount acquisition unit 121 acquires a focus adjustment amount.

(Step S304) Next, the subject size information acquisition unit 141 acquires subject size information.

(Step S305) Next, the subject motion information acquisition unit 131 acquires subject motion speed information as an example of the subject motion information.

(Step S306) Next, the phase difference use situation acquisition unit 19 acquires a phase difference element use situation based on the input received by the used phase difference pixel input unit 112.

(Step S307) Next, the focus adjustment determination unit 15c determines the behavior of the focus adjustment using the subject motion information, the subject size information, and the phase difference element use situation.

(Step S308) Next, the focus adjustment unit 16 performs the focus adjustment according to the determined focus adjustment behavior.

(Step S309) Next, the imaging unit 12a determines whether the videographing has ended. When there is no videographing end (NO), the process returns to step S303. When the videographing has ended (YES), the imaging device 1c ends the process. Accordingly, the process of this flowchart ends.

In the imaging device 1c in the above modified example 10, the focus adjustment determination unit 15c, for example, determines the behavior of the focus adjustment using the phase difference element use situation in addition to the subject motion information and the subject size information. At this time, the imaging device 1c, for example, determines the behavior of the focus adjustment to suppress the focus adjustment when the state is that in which the phase difference elements are used at sparse intervals. Thereby, the imaging device 1c can suppress an excessive change in the blur amount by suppressing the focus adjustment operation even when it is difficult to smoothly track the focus adjustment when the phase difference elements are sparse. Because of this, the imaging device 1c can provide a moving image having a more preferable appearance to the videographer (or appreciator).

<Modified Example 11: Phase Difference Element Use Situation Based on Motion Information of Imaging Device>

Figure 12:
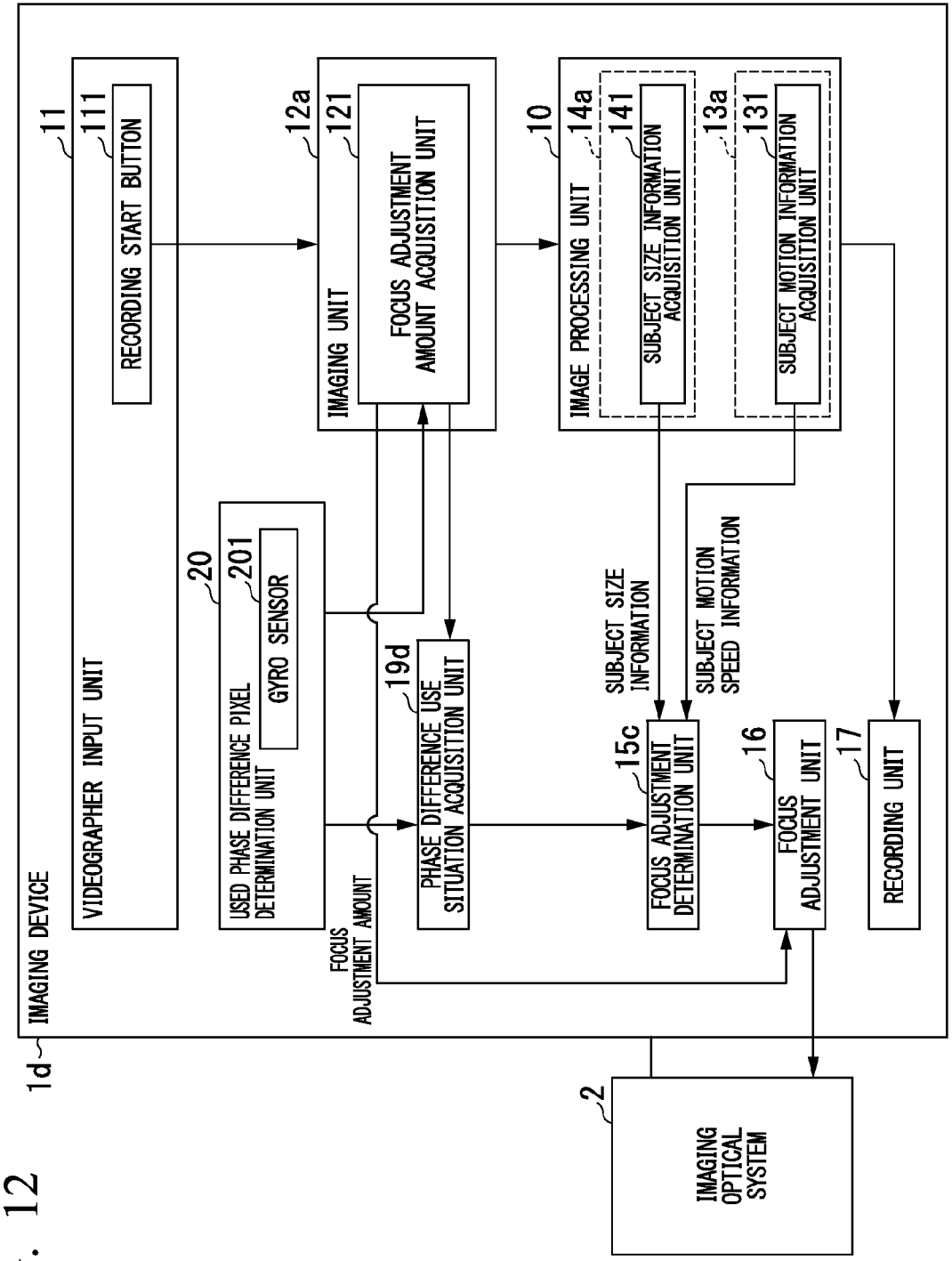
FIG. 12 is a schematic block diagram showing a configuration of an imaging device in a modified example 11 of the first embodiment.

FIG. 12 is a schematic block diagram showing a configuration of an imaging device 1d in modified example 11. Also, elements common with FIG. 10 are assigned the same reference signs and specific description thereof will be omitted. With respect to the configuration of the imaging device 1c of example 10 of FIG. 10, the configuration of the imaging device 1d in modified example 11 is configured by adding a used phase difference pixel determination unit 20 and changing the phase difference use situation acquisition unit 19 to a phase difference use situation acquisition unit 19d. A used phase difference pixel determination unit 20 includes a gyro sensor 201. Because the process of the focus adjustment determination unit 15c is the same as the focus adjustment determination unit 15c of modified example 10 of FIG. 10, a description thereof will be omitted.

The gyro sensor 201, for example, is a three-axis gyro sensor and detects an angular velocity around each axis.

The used phase difference pixel determination unit 20 determines how the imaging device 1d has moved based on the angular velocity around each axis detected by the gyro sensor 201, and determines the used phase difference pixel used when calculating a focus adjustment amount based on a determination result. The used phase difference pixel determination unit 20 outputs the determined used phase difference pixel to the phase difference use situation acquisition unit 19d and the focus adjustment amount acquisition unit 121.

When the used phase difference pixel determination unit 20 determines that the imaging device 1d performs panning, it is preferable for the used phase difference pixel determination unit 20 to perform setting for thinning out the reading of a pixel in which the phase difference element is arranged in the vertical direction because phase difference elements of the vertical direction need not be so dense. Because of this, the used phase difference pixel determination unit 20, for example, determines the used phase difference pixel as a pixel in which the phase difference element of a certain row (for example, a center row) is arranged when the imaging device 1d determines to perform the panning.

In addition, for example, when the imaging device 1d moves fast and the used phase difference pixel determination unit 20 determines that the imaging device 1d moves fast, setting may be performed to thin out the reading of a pixel in which the phase difference pixel is arranged to a predetermined degree because it is preferable to increase the speed of the focus adjustment (it is preferable to place importance on the response of the focus adjustment). Thereby, it is possible to immediately align a focus for a changed subject even when the subject is changed in succession by rapidly moving the focus adjustment according to fast motion of the imaging device.

The phase difference use situation acquisition unit 19d acquires the phase difference element use situation information related to a phase difference element to be used based on the used phase difference pixel input from the used phase difference pixel determination unit 20. Here, the phase difference element use situation information, for example, represents whether to use the phase difference elements at sparse intervals (reading speed priority) or dense intervals (tracking priority).

The focus adjustment amount acquisition unit 121 acquires the focus adjustment amount using the phase difference element of the used phase difference pixel input from the used phase difference pixel determination unit 20.

Figure 13:
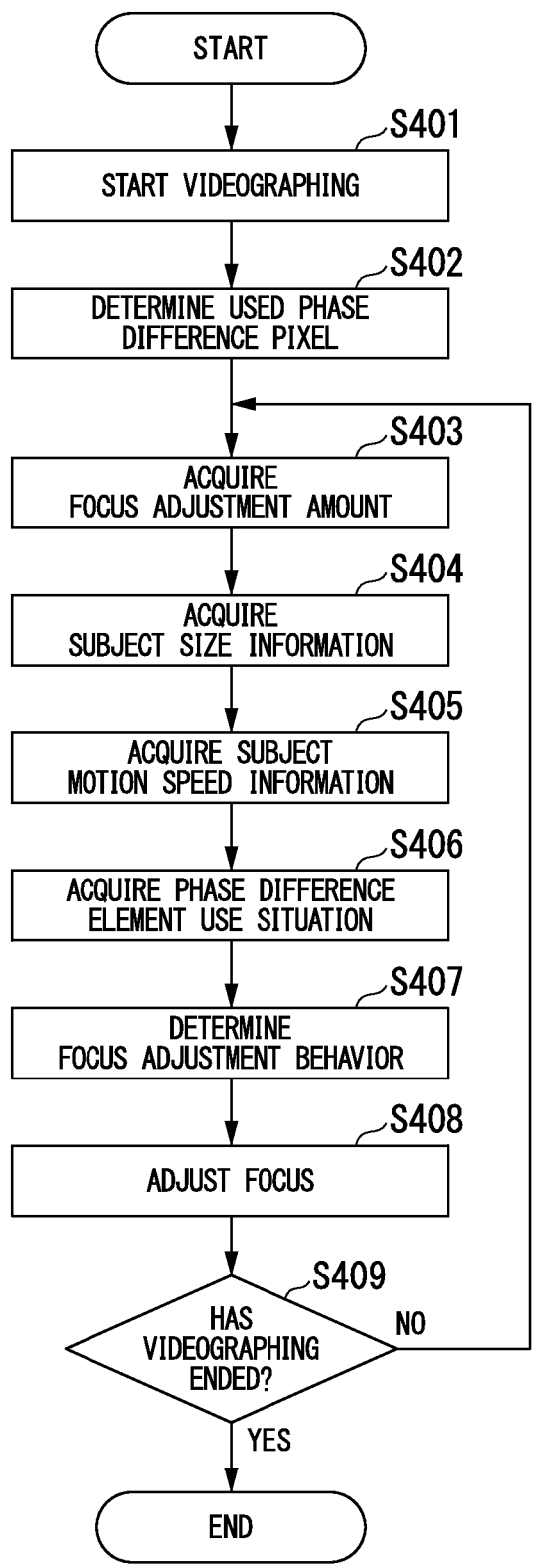
FIG. 13 is a flowchart showing an example of a flow of a process of the imaging device in the modified example 11 of the first embodiment.

FIG. 13 is a flowchart showing an example of a flow of a process of the imaging device 1d in modified example 11.

Because the process of step S401 is the same as step S301 of FIG. 11, description thereof will be omitted.

(Step S402) Next, the used phase difference pixel determination unit 20 determines how the imaging device 1d has moved based on the angular velocity around each axis detected by the gyro sensor 201, and determines the used phase difference pixel to be used when calculating a focus adjustment amount based on a determination result.

Because the processes of steps S403 to S405 are the same as steps S303 to S305 of FIG. 11, description thereof will be omitted.

(Step S406) Next, the phase difference use situation acquisition unit 19d acquires the phase difference element use situation information related to a phase difference element to be used based on the used phase difference pixel input from the used phase difference pixel determination unit 20.

Because the processes of steps S407 to S409 are the same as steps S307 to S309 of FIG. 11, description thereof will be omitted.

In the imaging device 1d in the above example 11, the focus adjustment determination unit 15c, for example, determines the focus adjustment behavior further using the phase difference element use situation in addition to the subject motion information and the subject size information. At this time, the imaging device 1d, for example, determines the behavior of the focus adjustment to suppress the focus adjustment when the state is that in which the phase difference elements are used at sparse intervals. Thereby, the imaging device 1d can suppress an excessive change in the blur amount by suppressing the focus adjustment operation even when it is difficult to smoothly track the focus adjustment when the phase difference elements are sparse. Because of this, the imaging device 1d can provide a moving image having a more preferable appearance to the videographer (or appreciator).

<Modified Example 12: Behavior of Focus Adjustment is Determined Using Result of Measuring Human Physical Focus Adjustment Characteristic as Information Related to Human Subjective Focus Adjustment>

Although the behavior of the focus adjustment is determined using the information (here, a motion speed of the subject) related to an inter-frame change and information (here, size information of the subject) within one frame as the information related to the human subjective focus adjustment in this example, the present invention is not limited thereto. For example, the behavior of the focus adjustment may be determined using a result of measuring the human physical focus adjustment characteristic as the information related to the human subjective focus adjustment.

Figure 44:
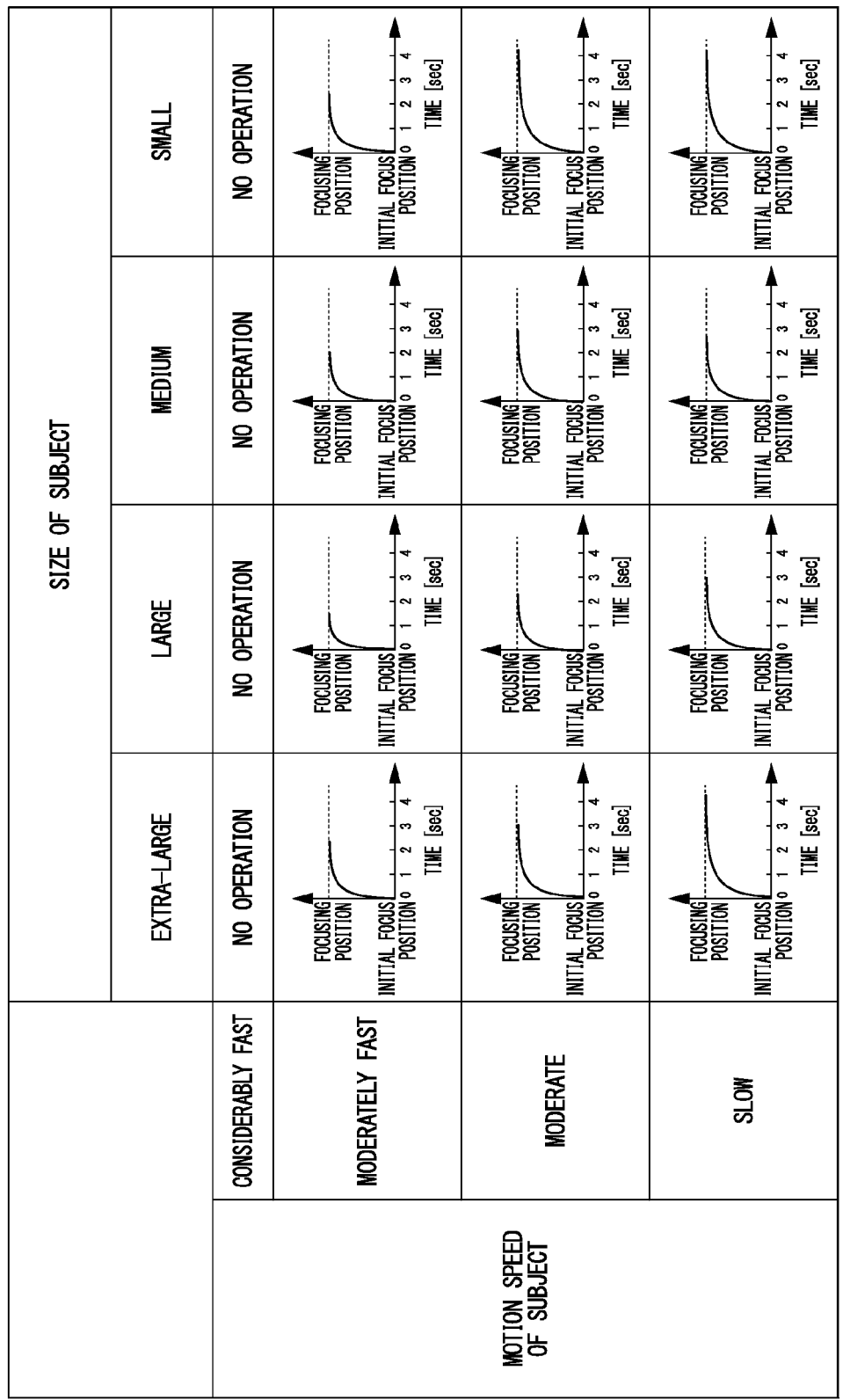
FIG. 44 is an example of a human physical focus adjustment characteristic according to a size of the subject and a motion speed of the subject.

FIG. 44 is an example of a human physical focus adjustment characteristic according to a size of the subject and a motion speed of the subject. In FIG. 44, the result of measuring the human physical focus adjustment characteristic is associated for every set of the size of the subject and the motion speed of the subject. When the motion speed of the subject is "considerably fast," the focus adjustment is not performed. The speed of the focus adjustment tends to be slow when the motion speed of the subject is slow in the case in which the motion speed of the subject is lower than the "considerably fast" speed (the case of the "moderately fast," "moderate," and "slow" speeds within FIG. 44).

Hereinafter, modified example 12 will be described using the imaging device 1a shown in FIG. 4. The imaging device 1a saves the result of measuring the human physical focus adjustment characteristic (this corresponds to information related to the human subjective focus adjustment) when a human views a state in which subjects having different sizes as shown in FIG. 44 move at various motion speeds in a memory (not shown) within the imaging device 1a in advance. The human physical focus adjustment characteristic is acquired by a well-known method. Furthermore, the human subjective focus adjustment characteristic may be an individual measurement result or an average of results of measuring characteristics of a plurality of people.

At the time of videographing, the imaging device 1a acquires information of the motion speed of the subject and the size of the subject in a method similar to that of this example, and determines the behavior of the focus adjustment to perform the same focus adjustment as that of the human physical focus adjustment characteristic in a similar situation by referring to the table of FIG. 44. The human physical focus adjustment characteristic is also related to a human subjective focus adjustment characteristic, and a moving image is mostly preferred even when the focus adjustment characteristic of the imaging device is controlled according to the human physical focus adjustment characteristic.

In the imaging device 1a of the above modified example 12, the focus adjustment determination unit 15a determines the behavior of the focus adjustment using the result of measuring the human physical focus adjustment characteristic when a human views a state in which subjects of different sizes move at various motion speeds. Thereby, the imaging device 1a can perform the focus adjustment based on a situation of the subject and a state of subjective focus adjustment of a human viewing the situation. Because of this, the imaging device 1a can provide a moving image having a more preferable appearance to the videographer (or appreciator).

<Example 2>

Next, example 2 will be described. In this example, the behavior of the focus adjustment is determined using information related to an inter-frame change and information of a videographing situation and a subject situation determined from the information within one frame as the information related to the human subjective focus adjustment. This example will be described using a scene in which brightness of the subject changes and therefore a subject of attention (a subject desired to be focused) changes in a state in which there is no motion or change in the imaging device itself as in FIG. 14 and a plurality of subjects of attention are already present.

Figure 14:
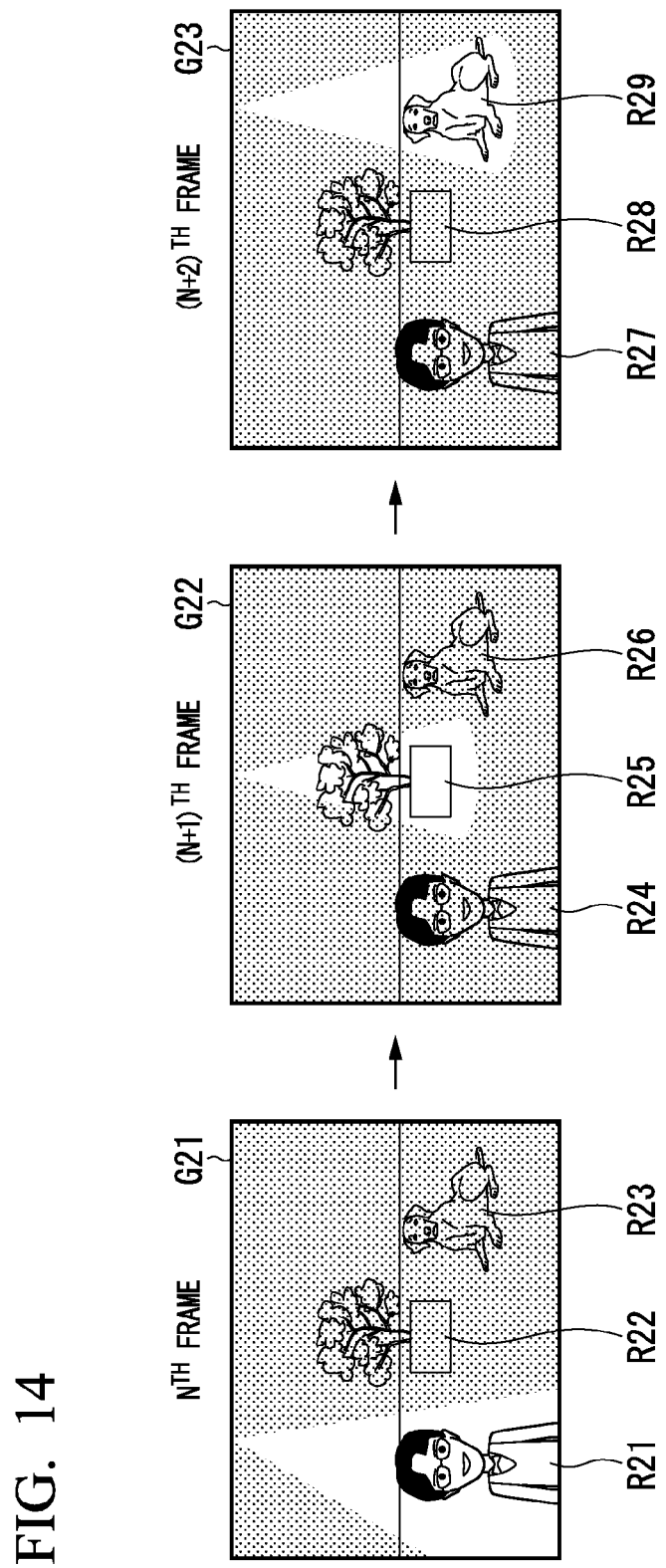
FIG. 14 is a diagram showing an example of a videographed scene in an example 2 of the first embodiment.

FIG. 14 is a diagram showing an example of a videographed scene in example 2. FIG. 14 shows a scene in which the position of a spotlight changes and the subject to which the appreciator pays attention changes. In an $N^{th}$ frame (N is a positive integer), the spotlight is on the videographer's daughter (registered in the imaging device) and no spotlight is on a white flower (which has not been registered in the imaging device) or the videographer's pet (registered in the imaging device). Because of this, in an image G21, an image region R21 of the videographer's daughter becomes white and an image region R22 of the white flower and an image region R23 of the videographer's pet become black.

In an $(N+1)^{th}$ frame, the spotlight is on the white flower and no spotlight is on the videographer's daughter or the videographer's pet. Because of this, in an image G22 of the $(N+1)^{th}$ frame, an image region R25 of a white flower becomes white, but an image region R24 of the videographer's daughter and an image region R26 of the videographer's pet become black.

In an (N+2)$^{th}$ frame, the spotlight is on the videographer's pet and no spotlight is on the videographer's daughter or the white flower. Because of this, in an image G23 of the (N+2)$^{th}$ frame, an image region R29 of the videographer's pet becomes white, but an image region R27 of the videographer's daughter and an image region R28 of the white flower become black.

Figure 15:
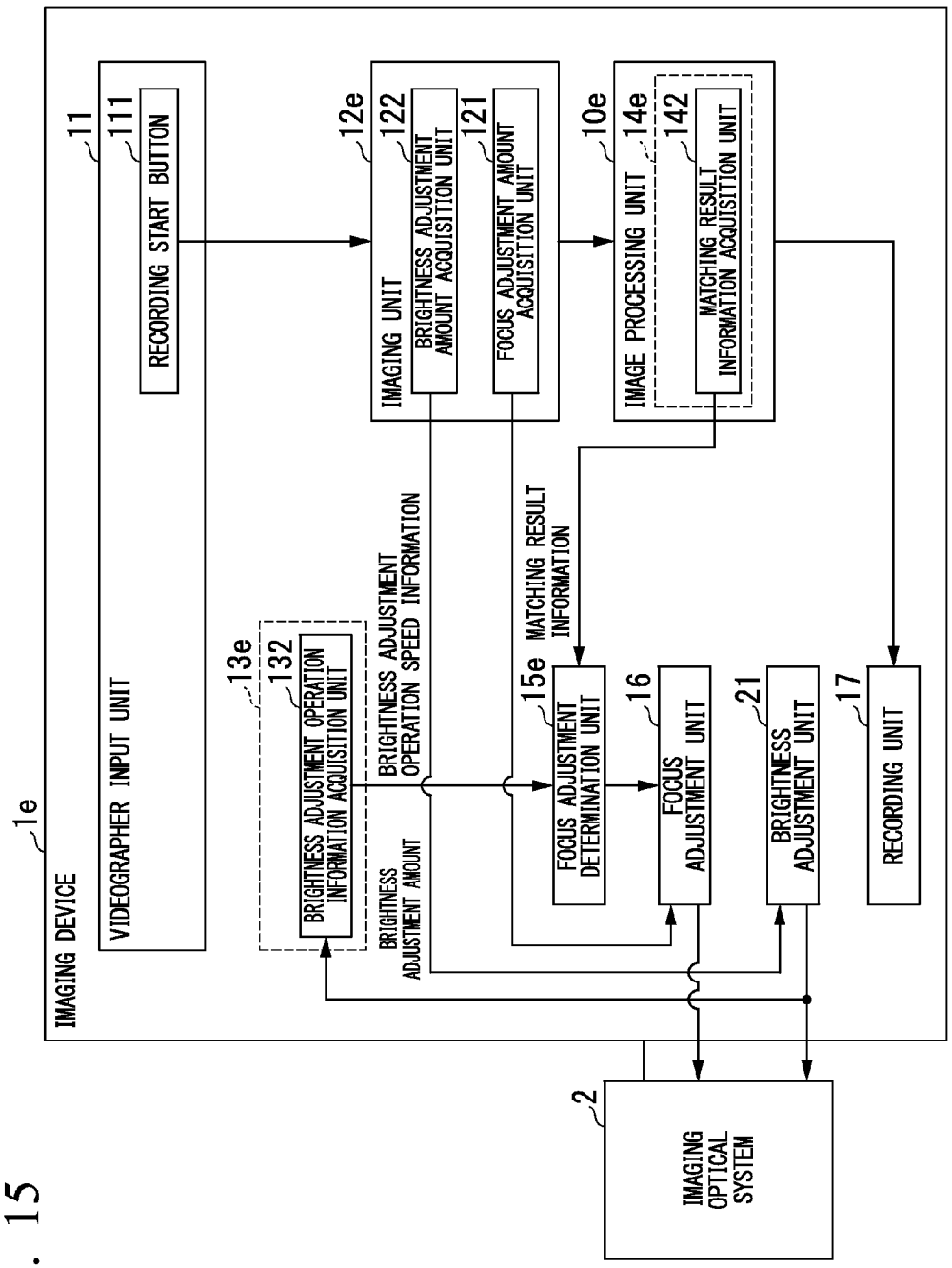
FIG. 15 is a schematic block diagram showing a configuration of an imaging device in the example 2 of the first embodiment.

FIG. 15 is a schematic block diagram showing a configuration of an imaging device 1e in example 2. Also, elements common with FIG. 4 are assigned the same reference signs and specific description thereof will be omitted. With respect to the configuration of the imaging device 1a of example 1 of FIG. 4, the configuration of the imaging device 1e in example 2 is configured by adding a brightness adjustment unit 21, changing the image processing unit 10 to an image processing unit 10e, changing the imaging unit 12a to an imaging unit 12e, changing the inter-frame change information acquisition unit 13a to an inter-frame change information acquisition unit 13e, and changing the focus adjustment determination unit 15a to a focus adjustment determination unit 15e. The image processing unit 10e includes an intra-frame information acquisition unit 14e, and the intra-frame information acquisition unit 14e includes a matching result information acquisition unit 142. With respect to the imaging unit 12a of example 1 of FIG. 4, the imaging unit 12e additionally includes a brightness adjustment amount acquisition unit 122 in addition to the focus adjustment amount acquisition unit 121. The inter-frame change information acquisition unit 13e includes a brightness adjustment operation information acquisition unit 132.

Next, a process of each part of the imaging device 1e will be described in the order of processing at the time of moving-image recording.

<Process 1>

First, the imaging device 1e sets an area in which focus adjustment is performed in advance. Here, as an example, the imaging unit 12e of the imaging device 1e sets a brightest region as a focus adjustment target region in an image obtained according to imaging.

<Process 2>

The recording start button 111 receives a videographing start instruction of the videographer and outputs the received videographing start instruction to the imaging unit 12e.

Upon receiving the videographing start instruction input from the recording start button 111, the imaging unit 12e generates a moving-image signal by converting light incident from the subject via the imaging optical system 2 into an electrical signal at a predetermined shutter speed. Thereby, the moving-image recording starts according to the instruction of the videographer.

<Process 3>

Based on information of the area of the focus adjustment target set by the imaging unit 12e, the focus adjustment amount acquisition unit 121 acquires a focus adjustment amount for setting the focus adjustment target area in the focused state, and outputs the acquired focus adjustment amount to the focus adjustment unit 16. Here, as an example, the focus adjustment amount is acquired from the phase difference element arranged on the image surface of the imaging element of the imaging unit 12e.

<Process 4>

Image data (for example, image data of a face) of a "subject (for example, a family or the like) (hereinafter referred to as a registered subject) to which the videographer is likely to pay attention" imaged by the imaging device 1e, for example, is pre-stored in the recording unit 17. The matching result information acquisition unit 142, for example, extracts the feature amount of the registered subject from the image information and pre-stores the extracted feature amount of the registered subject in a memory (not shown). The matching result information acquisition unit 142, for example, extracts the feature amount of the subject within the focus adjustment target region (within the brightest region as an example) as information within one fame, matches the extracted feature amount with the feature amount of the registered subject stored in the memory (not shown), and acquires a matching result. At this time, the matching result information acquisition unit 142, for example, obtains the matching result representing that a current subject is the registered subject if the extracted feature amount and the feature amount of the registered subject match at a matching rate of a predetermined reference or more.

The matching result information acquisition unit 142 outputs matching result information representing the obtained matching result to the focus adjustment determination unit 15e.

<Process 5>

The brightness adjustment operation information acquisition unit 132 acquires brightness adjustment operation information related to a brightness adjustment operation (here, brightness adjustment operation speed information representing a brightness adjustment operation speed as an example) as information related to the inter-frame change. For example, the brightness adjustment operation information acquisition unit 132 determines the operation speed of the brightness adjustment as any one of "fast," "moderate," and "slow" speeds by comparing the operation speed of the brightness adjustment to an arbitrary threshold value pre-saved in the memory (not shown). Also, the present invention is not limited thereto. The brightness adjustment operation information acquisition unit 132, for example, may use the brightness adjustment operation speed without change.

The brightness adjustment operation information acquisition unit 132 outputs the acquired brightness adjustment operation information (here, the brightness adjustment operation speed information as an example) to the focus adjustment determination unit 15e.

<Process 6>

The focus adjustment determination unit 15e determines the behavior of the focus adjustment based on matching result information of a videographed subject acquired by the matching result information acquisition unit 142 and a subject pre-registered by the videographer and the brightness adjustment operation information (brightness adjustment operation speed information as an example) acquired by the brightness adjustment operation information acquisition unit 132.

For example, a table in which a reference focus adjustment speed $V_{base}$ of a moving-image videographing time is stored and a speed suppression coefficient α of the focus adjustment is associated for every set of a brightness adjustment speed and a subject matching result is pre-stored in a memory (not shown) of the imaging device 1e. As the specific process of the focus adjustment determination unit 15e, for example, the focus adjustment determination unit 15e reads the reference focus adjustment speed $V_{base}$ of the moving-image videographing time from the memory (not shown). The focus adjustment determination unit 15e determines the speed suppression coefficient α of the focus adjustment by referring to a table T3 of FIG. 16 and reading the speed suppression coefficient α of the focus adjustment corresponding to a set of the acquired brightness adjustment operation speed information and the acquired matching result information. For example, the focus adjustment determination unit 15e determines a real focus adjustment speed $V_{control}$ by substituting the reference focus adjustment speed $V_{base}$ and the speed suppression coefficient α of the focus adjustment into Equation (1) of example 1. The focus adjustment determination unit 15e outputs the determined focus adjustment speed $V_{control}$ to the focus adjustment unit 16.

Furthermore, although the behavior of the focus adjustment according to a situation (a situation of an imaging device of videographing, a situation of a subject, or the like) is implemented by changing the speed of the focus adjustment in this example, the present invention is not limited thereto. The behavior of the focus adjustment according to a situation may be implemented as follows.

(1) Acceleration in the focus adjustment is determined according to a situation of a subject and a situation of videographing.

(2) The timing at which deceleration starts in the focus adjustment is determined according to the situation of the subject and the situation of the videographing.

(3) A required time from a point adjustment start to a focusing point state is determined according to the situation of the subject and the situation of the videographing.

(4) The timing at which the focus adjustment starts is determined according to the situation of the subject and the situation of the videographing.

FIG. 16 is an example of a table in which the speed suppression coefficient α of focus adjustment is associated for every set of a brightness adjustment speed and a matching result of a subject. In the table T3 of FIG. 16, when the brightness adjustment speed is fast, the speed suppression coefficient α of the focus adjustment tends to increase and the focus adjustment is further promoted. Thereby, when the brightness adjustment is fast (for example, when brightness has increased through lighting by the spotlight from a dark state), the focus adjustment is further promoted. Thereby, it is possible to view the subject to which the awareness of the appreciator is easily directed and on which brightness adjustment is rapidly performed in a more focused state, and the appearance of the moving image becomes preferable to the appreciator. This is because, for example, when the brightness of the subject within the screen of the imaging device is changed and the focus adjustment (and brightness adjustment) is performed in the scene in which there is no motion or change in the imaging device as in FIG. 14, it is easy for the awareness of the appreciator to be directed to the subject when the brightness adjustment is rapidly performed.

In addition, when there is no registration of the matching result of the subject, the speed suppression coefficient α of the focus adjustment tends to decrease and the focus adjustment is suppressed more than when there is registration of the matching result of the subject. Thereby, the focus adjustment on the registered subject is further promoted and the focus adjustment on the unregistered subject is further suppressed. Because the appreciator can view the registered subject to which the appreciator tends to pay attention in a more focused state and the appreciator views the unregistered subject to which the appreciator tends not to pay attention in a less focused state, the appearance of the moving image becomes more preferable to the appreciator. This is because, for example, when the brightness of the subject within the screen of the imaging device is changed and the focus adjustment (and brightness adjustment) is performed in the scene in which there is no motion or change in the imaging device as in FIG. 14, the appreciator tends to determine that there is a desire for the focused state when the subject to be videographed is easily detected by the videographer.

<Process 7>

Returning to FIG. 15, the focus adjustment unit 16 controls a focus adjustment optical system of the imaging optical system 2 based on the behavior of the focus adjustment (here, a focus adjustment speed as an example) determined by the focus adjustment determination unit 15e, and adjusts a focus.

<Process 8>

Until the videographer input unit 11 receives a videographing end instruction from the videographer, the imaging device 1e iterates processing of the above-described processes 3 to 7.

Figure 17:
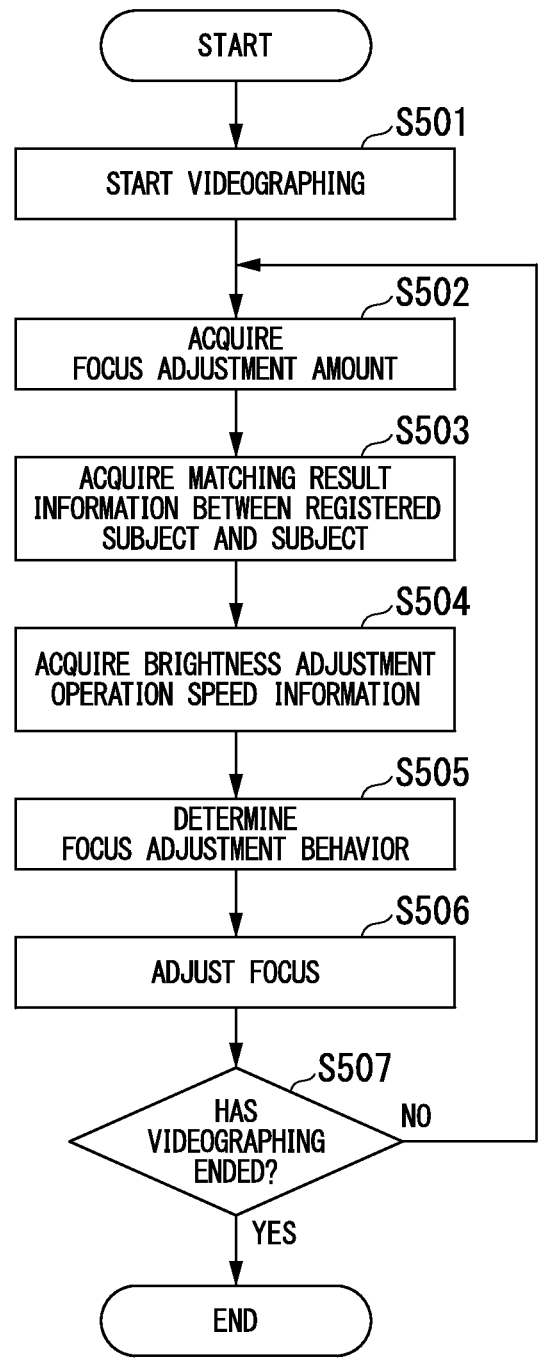
FIG. 17 is a flowchart showing an example of a flow of a process of the imaging device in the example 2 of the first embodiment.

FIG. 17 is a flowchart showing an example of a flow of a process of the imaging device 1e in example 2. Because the processes of steps S501 and S502 are the same as the processes of steps S101 and S102 of FIG. 6, a description thereof will be omitted.

(Step S503) Next, the matching result information acquisition unit 142 matches the subject within the focus adjustment target region (within the brightest region as an example) as information within one fame with the feature amount of the registered subject stored in the memory (not shown), and acquires matching result information.

(Step S504) Next, the brightness adjustment operation information acquisition unit 132 acquires brightness adjustment operation speed information as an example of brightness adjustment operation information serving as information related to an inter-frame change.

(Step S505) Next, the focus adjustment determination unit 15e determines the behavior of the focus adjustment using the matching result information and the brightness adjustment operation speed information.

Because the processes of steps S506 and S507 are the same as the processes of steps S106 and S107 of FIG. 6, a description thereof will be omitted.

In the above example 2, the focus adjustment determination unit 15e, for example, promotes the focus adjustment when the matching result of the videographed subject and the registered subject represents that the videographed subject and the registered subject match more than in the case of mismatch. In addition to this, the focus adjustment determination unit 15e further promotes the focus adjustment when the brightness adjustment operation speed information represents a faster speed. Thereby, the appreciator can view the registered subject to which the appreciator tends to pay attention in a more focused state and view the subject on which brightness adjustment is performed fast in a more focused state. Because of this, the imaging device 1e can provide a moving image having a more preferable appearance to the videographer (or appreciator).

Also, although the intra-frame information acquisition unit 14e acquires matching result information of the videographed subject and the registered subject as the information within one frame in this example, the behavior of the focus adjustment may be additionally determined by acquiring other information as follows.

<Modified Example 1: Recognition Result Information of Subject>

The matching result information acquisition unit 142 within FIG. 15 is changed to a subject recognition result information acquisition unit, and the subject recognition result information acquisition unit may acquire a recognition result of the subject instead of the matching result information. For example, the imaging device 1e saves the feature amount for every registered subject in the memory (not shown). The feature amount, for example, is a combination of the color, the texture, the frequency state of an image region of a registered subject, and the shape of an image region extracted by a figure-ground determination. According to a type of subject of a focus adjustment target, the ease of catching the awareness of the videographer (viewer) is changed. For example, a human, an animal, a flower, or the like catches awareness easily, but a stone, a weed, or the like does not easily catch awareness.

Consequently, the focus adjustment determination unit 15e may acquire the subject recognition result information, promote the focus adjustment when the subject of the focus adjustment target is a human, an animal, or a flower, and suppress the focus adjustment when the subject of the focus adjustment target is a stone or a weed. Thereby, it is possible to perform the focus adjustment according to the ease of catching the awareness of the human. Because of this, the imaging device 1e can provide a moving image having a more preferable appearance to the videographer (or appreciator).

<Modified Example 2: Matching Result Information of Previously Videographed Subject and Subject of Focus Adjustment Target>

The matching result information acquisition unit 142 within FIG. 15 may acquire the matching result of the previously videographed subject and the subject of the focus adjustment target instead of the matching result information.

For example, previous moving-image data is stored in the recording unit 17 of the imaging device 1e. A memory (not shown) of the imaging device 1e may save information of an initially videographed subject (for example, a feature amount of the subject). Then, at a subsequent videographing time, the matching result information acquisition unit 142 may determine whether to videograph the previously videographed subject again by comparing information of the currently videographed subject to the held subject information.

A memory (not shown) of the imaging device 1e may hold information obtained by counting the number of times of videographing and a videographing time for every previously videographed subject.

Even in the same type of subject, the ease of catching awareness of the videographer (viewer) is changed according to whether it is a previously frequently videographed subject. Here, the term "frequently" refers to a state in which whether the subject was previously videographed a certain number of times or more or whether the subject previously appeared in captured moving images for a certain time or more is satisfied.

The videographer (viewer) tends to direct awareness to a previously frequently videographed subject more than other subjects. Accordingly, the focus adjustment determination unit 15e may determine the behavior of the focus adjustment based on matching result information of the previously videographed subject and the subject of the focus adjustment target and the brightness adjustment operation information.

For example, the recording unit 17 of the imaging device 1e accumulates previous image data, the matching result information acquisition unit 142 extracts a feature amount (hereinafter referred to as a previous subject feature amount) of the subject shown in a previous moving image from the previous moving-image data, and causes the previous subject feature amount to be recorded on a memory (not shown). Then, the matching result information acquisition unit 142 extracts the feature amount of the subject of the focus adjustment target, performs a matching process by comparing the extracted feature amount to the previous subject feature amount, and sets a matching result as matching result information.

For example, when the subject was previously videographed a certain number of times or more or for a certain time or more, the focus adjustment determination unit 15e may determine the behavior of the focus adjustment to promote the focus adjustment because the appreciator tends to direct awareness to the subject. On the other hand, for example, when the previous number of times of videographing is less than the certain number of times or the previous videographing time is less than a certain time, the focus adjustment determination unit 15e may determine the behavior of the focus adjustment to suppress the focus adjustment.

In addition, although the operation speed information of the brightness adjustment operation is acquired as the information related to the inter-frame change in this example, the behavior of the focus adjustment may be determined by acquiring the following other information.

<Modified Example 3: Brightness Adjustment Operation Amount Information>

The brightness adjustment operation information acquisition unit 132 of FIG. 15 may acquire a "brightness adjustment operation amount" instead of an "operation speed of brightness adjustment." Here, assuming that the brightness adjustment is performed, a focus adjustment start timing after brightness adjustment is performed by a certain amount is preferred to that of the beginning of the brightness adjustment when the brightness adjustment is performed.

When the brightness adjustment is performed, the videographer (viewer) tends to determine to set the next subject in the focused state after the brightness adjustment is performed by a certain amount. For example, the focus adjustment determination unit 15e determines the behavior of the focus adjustment so that the focus adjustment starts after the brightness adjustment is performed by a predetermined amount. Thereby, because the focus adjustment starts when the appreciator tends to determine to set the subject in the focused state, the imaging device 1e can perform more preferable focus adjustment for the appreciator.

<Modified Example 4: Continuity Information of Brightness Adjustment>

The brightness adjustment operation information acquisition unit 132 of FIG. 15 may acquire "continuity of the brightness adjustment" instead of the "operation speed of the brightness adjustment." The brightness adjustment operation acquisition unit 132, for example, may determine the continuity of the brightness adjustment operation from change acceleration of a brightness variation value in several previous frames. Specifically, for example, the brightness adjustment operation information acquisition unit 132 determines that there is no continuity when positive and negative change accelerations are mixed (motion is not constantly performed), and determines that there is continuity when the change acceleration is constant. When there is continuity in the brightness adjustment operation, the videographer or appreciator tends to determine to set the next subject in the focused state. Accordingly, the focus adjustment determination unit 15e may determine the behavior of the focus adjustment to rapidly perform the focus adjustment when there is continuity in the brightness adjustment operation. Thereby, because it is possible to rapidly set the next subject in the focused state when there is continuity in the brightness adjustment operation, the imaging device 1e can perform more preferable focus adjustment for the videographer or appreciator.

<Modified Example 5: Direction Information of Brightness Adjustment>

The brightness adjustment operation information acquisition unit 132 of FIG. 15 may acquire "direction information of the brightness adjustment" instead of the "operation speed of the brightness adjustment."

Figure 18:
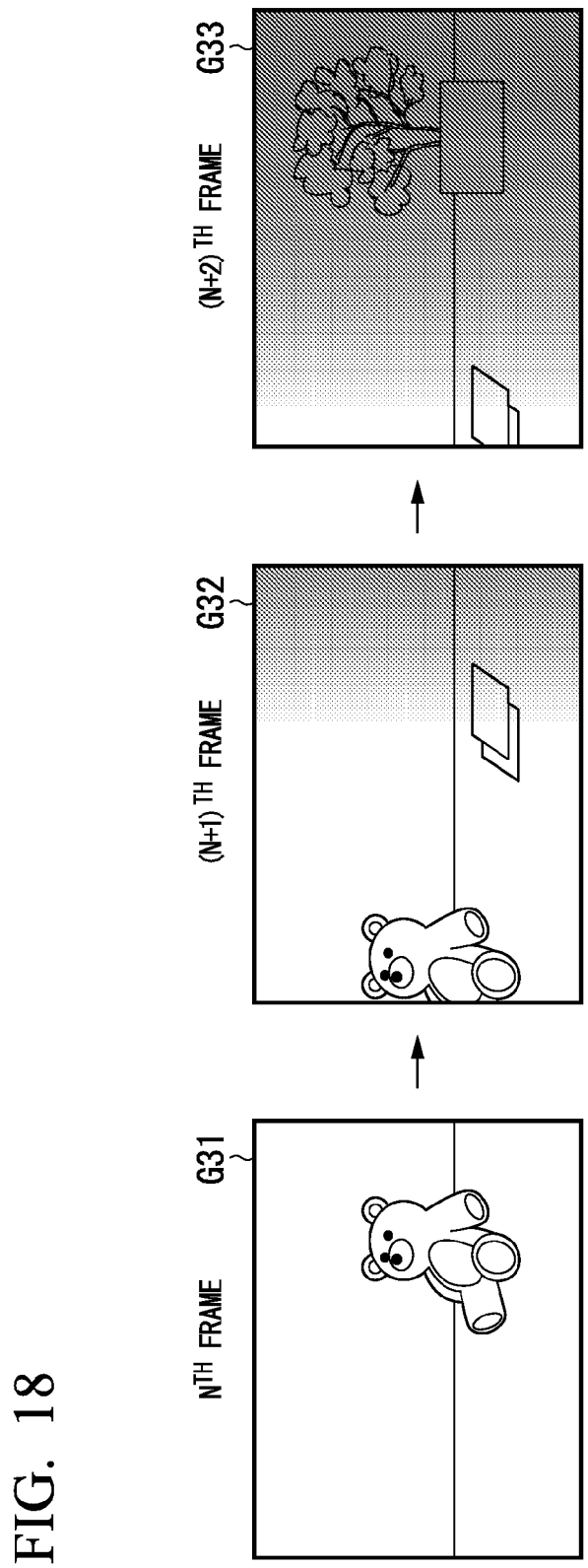
FIG. 18 is a diagram showing an example of a videographed scene in a modified example 5 of the example 2 of the first embodiment.

For example, when the transition to a different brightness state occurs while panning is performed as shown in FIG. 18, the videographer or appreciator tends to determine to set the next subject in the focused state when there is a change from a bright state to a dark state as compared to when the brightness adjustment changes from the dark state to the bright state. This is because the videographer or appreciator tends to dislike a state in which a subject is in the dark state for a long time and not visible.

FIG. 18 is a diagram showing an example of a videographed scene in modified example 5 of example 2. FIG. 18 is a scene in which the transition to a different brightness state occurs while panning is performed to the right in the imaging direction. In FIG. 18, an image G31 of an $N^{th}$ frame, an image G32 of an $(N+1)^{th}$ frame, and an image G33 of an $(N+2)^{th}$ frame are shown. In the image G32 of the $(N+1)^{th}$ frame, a right region is darker than a left region. In the image G33 of the $(N+2)^{th}$ frame, a right region is darker than a left region.

For example, the focus adjustment determination unit 15e may determine the behavior of the focus adjustment to advance the start timing of the focus adjustment when there is a change from the bright state to the dark state as compared to when the brightness adjustment changes from the dark state to the bright state. Thereby, because the videographer or appreciator can view the subject by more rapidly setting the subject in the dark state in a focused state, the imaging device 1e can perform more preferable focus adjustment for the videographer or appreciator.

Also, even in this case, a focus adjustment start timing after brightness adjustment is performed by a certain degree is preferable to that at the beginning of the brightness adjustment.

<Modified Example 6: Behavior of Focus Adjustment is Determined Using Brightness Adjustment Operation Information, WB Operation Information, and Subject Registration Information>

Although the behavior of the focus adjustment is determined using the operation information of the brightness adjustment and the matching result information of the videographed subject and the registered subject in this example, the present invention is not limited thereto. For example, the behavior of the focus adjustment may be determined by the following method.

Figure 45:
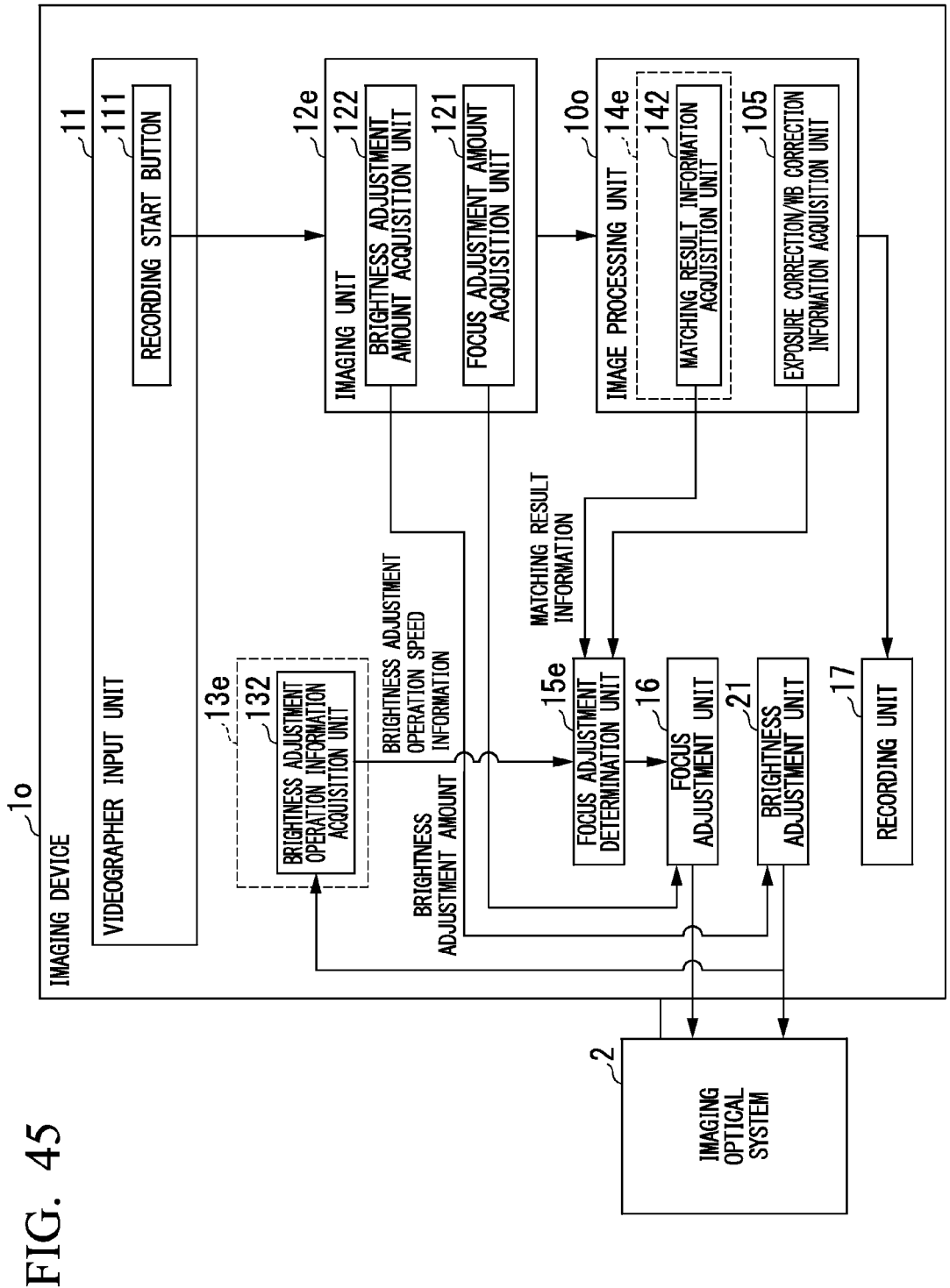
FIG. 45 is a schematic block diagram showing a configuration of an imaging device in a modified example 6 of the example 2 of the first embodiment.

FIG. 45 is a schematic block diagram showing a configuration of an imaging device 1o in modified example 6. Also, elements common with FIG. 15 are assigned the same reference signs and specific description thereof will be omitted. With respect to the configuration of the imaging device 1e of FIG. 15, the configuration of the imaging device 1o in modified example 6 is configured by changing the image processing unit 10e to the image processing unit 10o. Compared to the image processing unit 10e of FIG. 15, the image processing unit 10o additionally includes an exposure correction/WB correction information acquisition unit 105.

Figure 46:
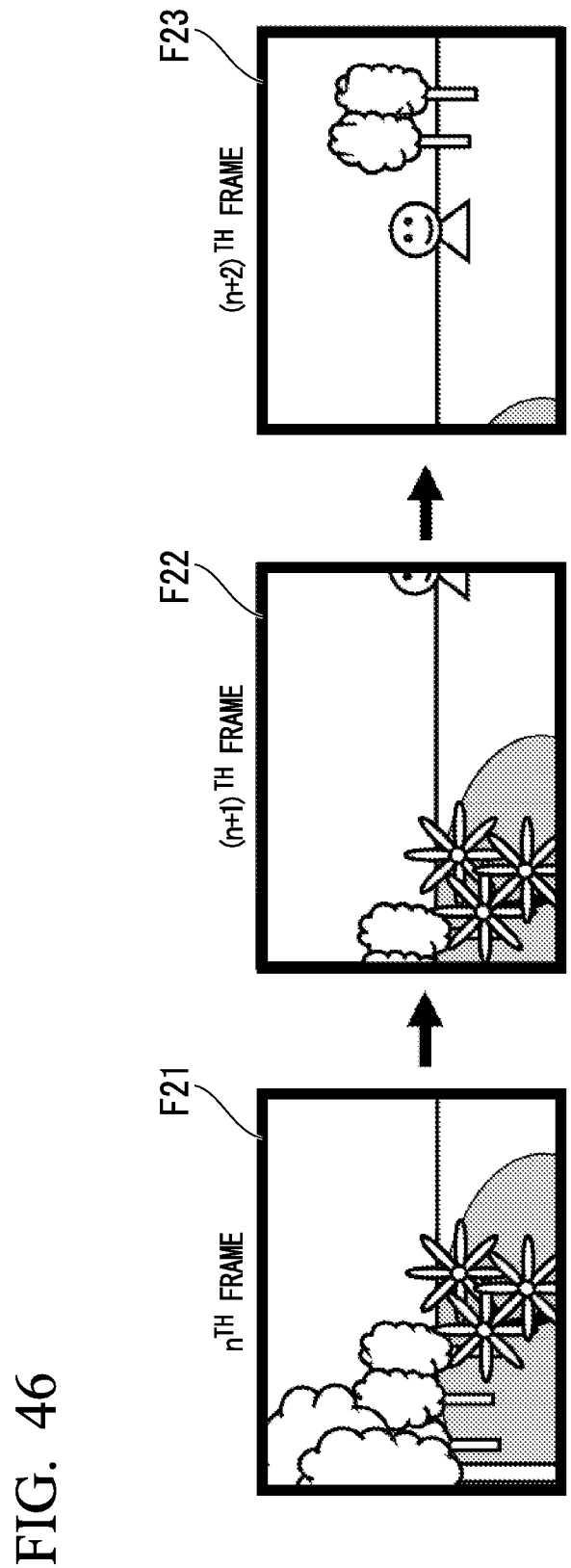
FIG. 46 is a diagram showing an example of a videographed scene in the modified example 6 of the example 2 of the first embodiment.

FIG. 46 is a diagram showing an example of a videographed scene in this modified example, and shows an example of a frame image obtained through videographing by the imaging device 1o. An $n^{th}$ frame image (n: natural number), an $(n+1)^{th}$ frame image, and an $(n+2)^{th}$ frame image shown in FIG. 46 are temporally continuous. In the $n^{th}$ initial frame image, trees and a part of a shade thereof are shown. In the next $(n+1)^{th}$ frame image, part of the character is shown on the right of the screen of the imaging device 1o according to panning. In the next $(n+2)^{th}$ frame image, the trees and the part of the shade thereof move to the left of the screen of the imaging device 1o according to panning and the character and other trees are shown in the sunny place in place thereof. In this manner, an example in which exposure correction changes when the brightness of the subject is changed in a process of changing the videographing direction of the imaging device according to panning will be described in this example.

First, before starting videographing, the videographer inputs a region (subject) of a screen in which focus adjustment is performed to the imaging device through the focus adjustment target region input unit. That is, the videographer sets the focus adjustment target region in the imaging device. In this example, a region from the screen center to a right-hand side of the imaging device 1o is set as a region of a focus adjustment target in the screen of the imaging device 1o shown in FIG. 46. Also, there is no input related to the above-described focus adjustment target region from the videographer, for example, approximately the center of the screen of the imaging device 1o may be automatically set as the focus adjustment target region (subject).

Next, the imaging device starts videographing by the videographer operating the recording start button 111 of the videographer input unit 11 shown in FIG. 45. That is, when the videographer instructs the imaging device to start the videographing, the imaging unit 12e which is the image sensor of the imaging device receives this instruction, starts to record a moving image, and photoelectrically converts an image of the subject obtained by the imaging optical system 2. In addition, the imaging unit 12e generates moving-image signals corresponding to an $n^{th}$ frame image, an $(n+1)^{th}$ frame image, and an $(n+2)^{th}$ frame image shown in FIG. 46, and outputs the moving-image signals to the image processing unit 10o.

Subsequently, the exposure correction/WB correction information acquisition unit 105 of the image processing unit 10o acquires correction change information as state information of the imaging device 1o. Specifically, the exposure correction/WB correction information acquisition unit 105 acquires information related to a change in an exposure correction amount, WB correction, or the like as the correction change information. In this modified example, as shown in FIG. 46 described above, for example, correction for reducing the exposure amount is executed according to an increase in a light amount when the screen of the imaging device 1o moves from the shade to the sunny place in the panning process. At this time, the exposure correction/WB correction information acquisition unit 105 acquires a change amount of the exposure correction, a change direction (decrease/increase) of the exposure correction, and a change speed of exposure correction as correction change information.

Subsequently, the focus adjustment amount acquisition unit 121 acquires a focus adjustment amount necessary for setting the imaging optical system 2 in the focused state for the subject of the focus adjustment target region indicated by the videographer before videographing as described above. Subsequently, the focus adjustment determination unit 15e determines a temporal characteristic of the focus adjustment of the imaging optical system 2 up to the focused state using the acquired focus adjustment amount acquired in the above-described step and the correction change information obtained in the above-described step. In this modified example, the focus adjustment determination unit 15e determines the temporal characteristic of the focus adjustment so that the acceleration and the speed in the focus adjustment of the imaging optical system 2 change until the focused state for the subject is obtained according to the above-described correction change information.

Here, a flow of a process of determining the temporal characteristic of the focus adjustment described above will be described.

First, the focus adjustment determination unit 15e determines the temporal characteristic $f_{AF}(t)$ of focus adjustment of the imaging optical system 2 up to the focused state as follows from the above-described acquired focus adjustment amount and the above-described acquired correction change information.

The above-described temporal characteristic $f_{AF}(t)$ is obtained by correcting a basic equation $f_{base}(t)$ shown in the following Equation (3) with coefficients α and β to be described later. Here, the coefficient $\alpha_{focus}$ is a coefficient for performing scaling in a horizontal axis (time axis) direction of the temporal characteristics $f_{AF}(t)$, and the coefficient β is a coefficient for performing scaling in a vertical axis (focus position) direction of the temporal characteristics $f_{AF}(t)$. Also, the basic equation may be recorded on the recording unit 17 or may be stored in a basic equation recording unit by providing the basic equation recording unit within the focus adjustment determination unit 15e.

$$f_{base}(t) = At^4 + Bt^3 + Ct^2 + Dt + E \quad \text{Equation (3)}$$

Figure 48A:
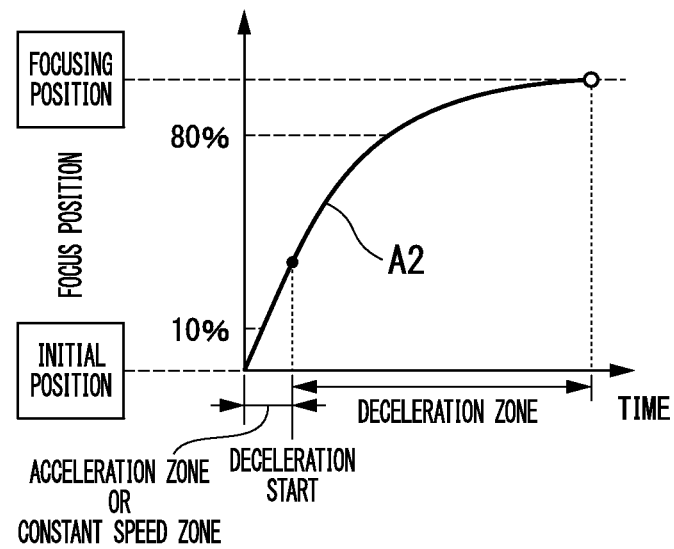
FIG. 48A is a diagram showing an example of a temporal characteristic of focus adjustment used in a subjective evaluation experiment of a moving image in the modified example 6 of the example 2 of the first embodiment.
Figure 48B:
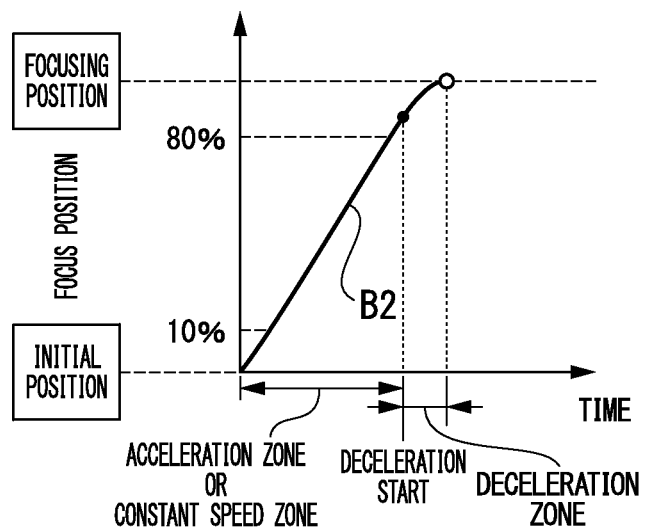
FIG. 48B is a diagram showing an example of the temporal characteristic of the focus adjustment used in the subjective evaluation experiment of a moving image in the modified example 6 of the example 2 of the first embodiment.
Figure 48C:
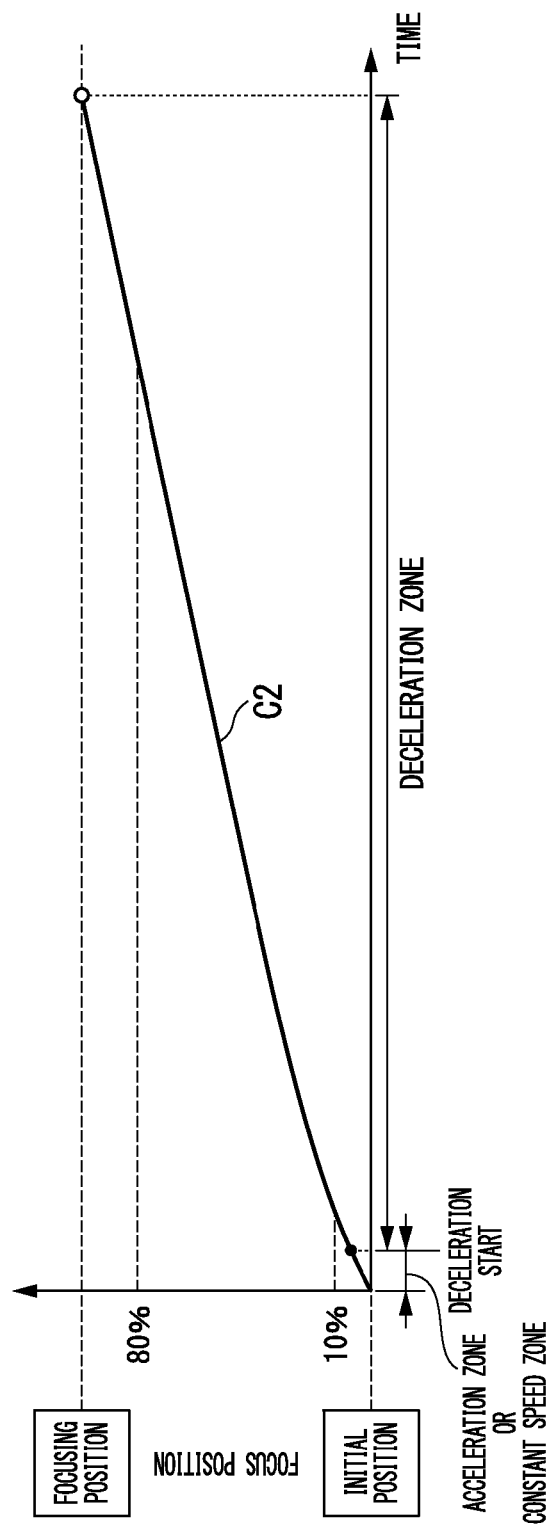
FIG. 48C is a diagram showing an example of the temporal characteristic of the focus adjustment used in the subjective evaluation experiment of a moving image in the modified example 6 of the example 2 of the first embodiment.

A curve represented by this basic equation, for example, is as shown in FIGS. 48A to 48C, and a general shape is obtained by approximating a human subjective focus adjustment characteristic shown in FIG. 51. It is possible to implement focus adjustment based on the human subjective focus adjustment by employing a characteristic of such a curve.

Figure 47:
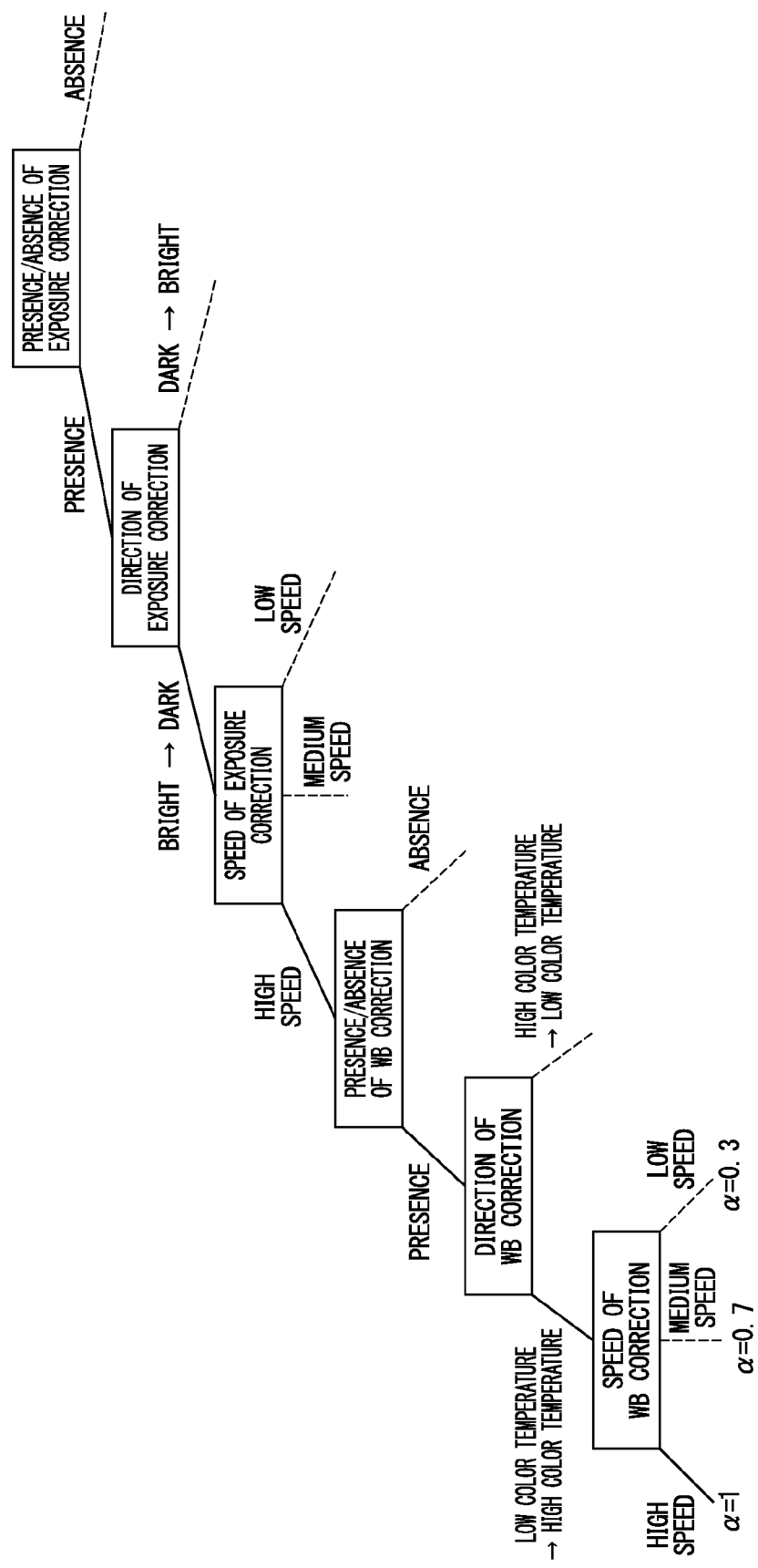
FIG. 47 is a diagram showing an example of an operation (of setting a determination of a coefficient α) of the imaging device in the modified example 6 of the example 2 of the first embodiment.

In this example, the coefficient $\alpha_{focus}$ is determined by the following step in two stages. First, the coefficient α is determined by a conditional branch as shown in FIG. 47 to be described later. FIG. 47 is a diagram showing an example (conditional branch) of a determination technique of the coefficient α.

As described above, the coefficient α is determined according to the conditional branch shown in FIG. 47. According to this conditional branch, basically, the coefficient α is determined according to the presence/absence of exposure correction, a direction (a direction of a change from a bright state to a dark state/direction of a change from a dark state to a bright state) of exposure correction, a speed (high/medium/low speed) of exposure correction, presence/absence of WB, a direction (low color temperature→high color temperature/high color temperature→low color temperature) of WB, and a speed (high/medium/low speed) of WB correction. In this example, when, from the upstream of the conditional branch, for example, the exposure correction is "present," the direction of the exposure correction is "bright→dark," the speed of the exposure correction is the "high speed," the WB correction is "present," the direction of the WB correction is "low color temperature→high color temperature," and the speed of the WB correction is the "high speed," the coefficient α is set to 1. However, the present invention is not limited to this example. It is only necessary to determine the coefficient α so that a desired temporal characteristic is obtained according to a change in optical information of the imaging device or imaging optical system.

Next, a focus adjustment correction parameter γ is determined as follows based on matching result information of the subject obtained from the matching result information acquisition unit 142.

Subject matching result: presence of registration→correction parameter γ: 1.2
Subject matching result: absence of registration→correction parameter γ: 1

$\alpha_{focus}$ for determining ultimate focus adjustment is determined using the following Equation (4) based on α and γ obtained as described above.

$$\alpha_{focus} = \alpha \times \gamma \quad \text{Equation (4)}$$

Further, the function $f_{AF}'(t)$ representing the temporal characteristic considering a required time of the focus adjustment of the imaging optical system 2 up to the focused state is determined by the following Equation (5).

$$f_{AF}'(t) = f_{base}(\alpha_{focus} t) \quad \text{Equation (5)}$$

As the coefficient $\alpha_{focus}$ decreases as shown in FIGS. 48A to 48C, a characteristic curve represented by $f_{AF}'(t)$ is expanded with respect to the horizontal axis (t), and a gentle curve is drawn. On the other hand, as the coefficient α increases, the characteristic curve represented by $f_{AF}'(t)$ is reduced with respect to the horizontal axis (t) as shown in FIG. 48B to be described later and a steep curve is drawn. In this manner, the focus adjustment determination unit 15e adjusts the speed of the focus adjustment of the imaging optical system 2 until the state reaches the focused state, that is, adjusts the required time until the state reaches the focused state, by setting the coefficient $\alpha_{focus}$.

In this manner, the focus adjustment determination unit 15e determines the temporal characteristic of the focus adjustment so that the required time until the focus position of the imaging optical system 2 reaches a focus position in the focused state from an initial focus position of a focus adjustment start time is changed according to the correction change information obtained by the exposure correction/WB correction information acquisition unit 105. In this modified example, when the speed of the change in the exposure correction or the like is fast, the coefficient $\alpha_{focus}$ is set to a large value, the curve of the temporal characteristic becomes steep, and the behavior of the focus adjustment of the imaging optical system 2 becomes fast. Thereby, the behavior of the image for the change in the optical characteristic of the imaging optical system 2 approximates the human subjective focus adjustment characteristic and incompatibility given to the appreciator is reduced.

In addition, because the human is considered to want to rapidly perform the focus adjustment when the subject is easily detected, the focus adjustment in the moving image is preferred by setting $\alpha_{focus}$ to a large value.

<Example 3>

Next, example 3 will be described. In this example, the behavior of the focus adjustment is determined using information related to an inter-frame change and information of a situation of videographing and a situation of a subject determined from information within one frame according to information related to human subjective focus adjustment. In this example, description of a scene in which the curtain on the stage rises from the dark state as in FIG. 19 and WB adjustment is performed and focus adjustment is performed when an illumination state changes will be given. Also, the imaging device of this example is in a fixed state.

Figure 19:
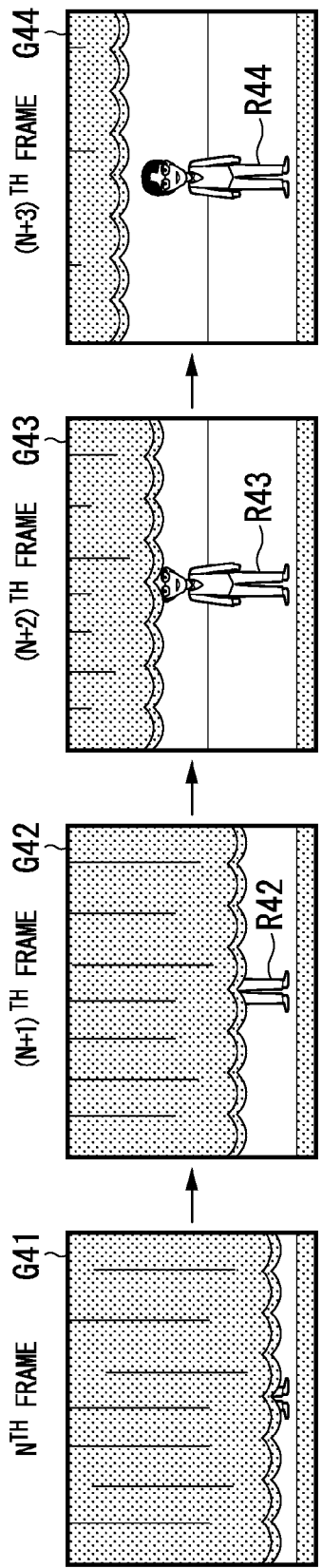
FIG. 19 is a diagram showing an example of a videographed scene in an example 3 of the first embodiment.

FIG. 19 is a diagram showing an example of a videographed scene in example 3. FIG. 19 shows the scene in which the curtain on the stage is raised from the dark state and the illumination state changes. The curtain on the stage is closed in an image G41 of an $N^{th}$ frame. In an image G42 of an $(N+1)^{th}$ frame, the curtain on the stage is raised more than in the image G41 of the $N^{th}$ frame, and part of the subject is displayed like an image region R42 of the subject which is shown. In an image G43 of an $(N+2)^{th}$ frame, the curtain on the stage is raised more than in the image G42 of the $(N+1)^{th}$ frame, and the entire subject is displayed like an image region R43 of the subject which is shown. In an image G44 of an $(N+3)^{th}$ frame, the curtain on the stage is raised more than in the image G43 of the $(N+2)^{th}$ frame, and the entire subject is displayed like an image region R44 of the subject which is shown. Also, in FIG. 19, the change in the brightness by WB adjustment and brightness adjustment is not shown.

Figure 20:
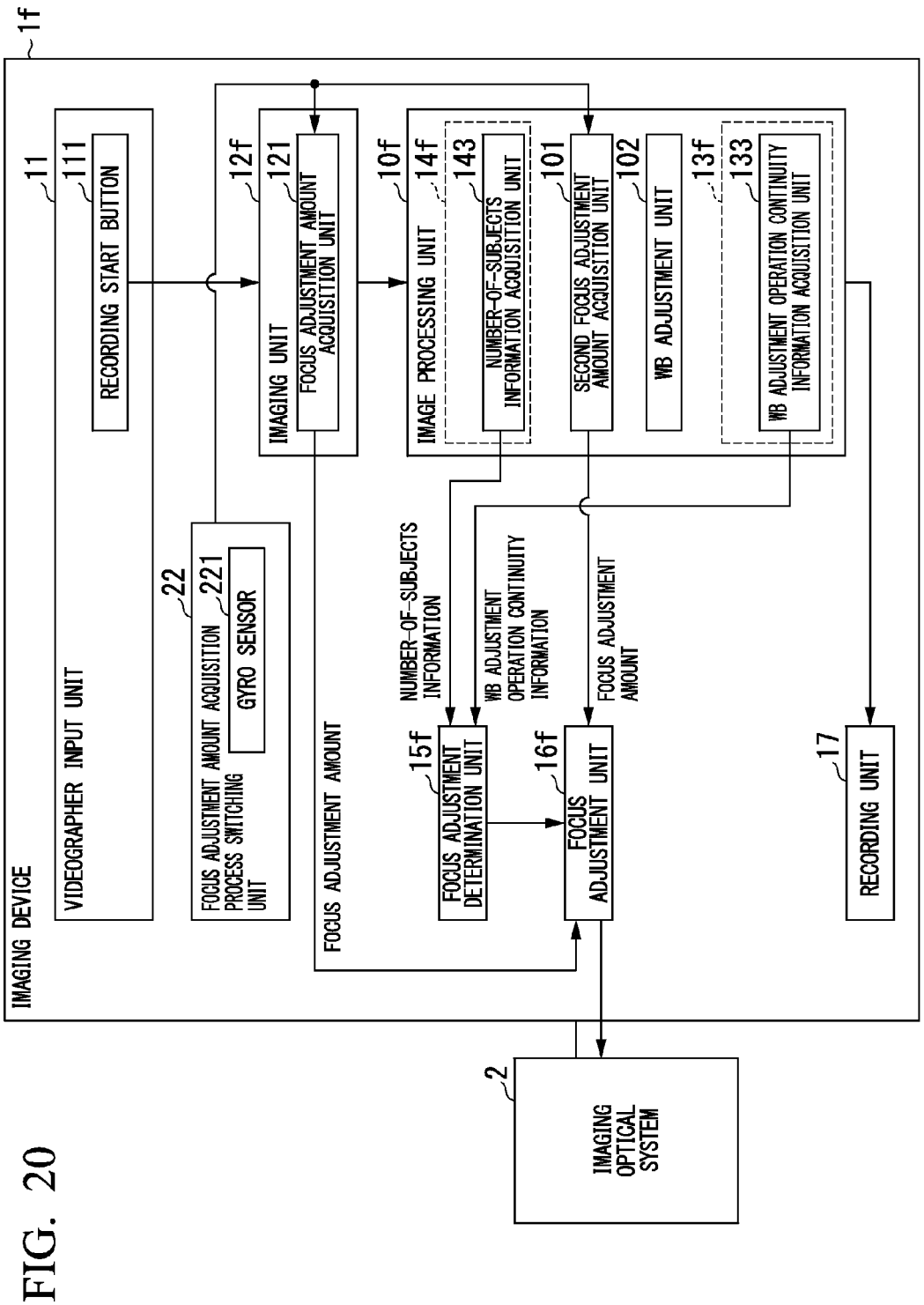
FIG. 20 is a schematic block diagram showing a configuration of the imaging device in the example 3 of the first embodiment.

FIG. 20 is a schematic block diagram showing a configuration of the imaging device 1f in example 3. Also, elements common with FIG. 4 are assigned the same reference signs and specific description thereof will be omitted. With respect to the configuration of the imaging device 1a of example 1 of FIG. 4, the configuration of the imaging device 1f in example 3 is configured by adding a focus adjustment amount acquisition process switching unit 22, changing the image processing unit 10 to an image processing unit 10f, changing the imaging unit 12a to an imaging unit 12f, changing the focus adjustment determination unit 15a to a focus adjustment determination unit 15f, and changing the focus adjustment unit 16 to a focus adjustment unit 16f.

Compared to the image processing unit 10 of example 1 of FIG. 4, the image processing unit 10f is configured by changing the inter-frame change information acquisition unit 13a to an inter-frame change information acquisition unit 13f, changing the intra-frame information acquisition unit 14a to an intra-frame information acquisition unit 14f, and adding a second focus adjustment amount acquisition unit 101 and a WB adjustment unit 102. The imaging unit 12f includes a focus adjustment amount acquisition unit 121f.

Next, a process of each part of the imaging device 1f will be described in the order of processing at the time of moving-image recording.

<Process 1>

The videographer sets an adjustment target area in which focus adjustment and WB adjustment are performed. Here, as an example, the videographer performs an input for designating an adjustment target area for the subject around approximately the center of the screen for the imaging device 1f. The videographer input unit 11, for example, receives the input from the videographer and causes input information representing the received input to be stored in a memory (not shown). Thereby, information representing an area in which focus adjustment and WB adjustment are performed is stored in the memory.

<Process 2>

The recording start button 111 receives a videographing start instruction of the videographer, and outputs the received videographing start instruction to the imaging unit 12f.

Upon receiving the videographing start instruction input from the recording start button 111, the imaging unit 12f generates a moving-image signal by converting light incident from the subject via the imaging optical system 2 into an electrical signal at a predetermined shutter speed. Thereby, the imaging unit 12f starts moving-image recording according to the instruction of the videographer.

<Process 3>

The WB adjustment unit 102 acquires a WB adjustment amount for setting a WB adjustment target area in an optimum WB state based on the information of the adjustment target area received by the videographer input unit 11. Specifically, for example, the WB adjustment unit 102 extracts an uncolored white or gray region within each frame of the captured moving-image signal, and acquires a color conversion amount in which the extracted region becomes purely white as a WB adjustment amount. Also, the WB adjustment unit 102 may acquire the WB adjustment amount by extracting a region in which a specular reflection from each frame of the captured moving-image signal and estimating a reflected region color as a color of a light source.

<Process 4>

The focus adjustment amount acquisition process switching unit 22 selects a process of acquiring the focus adjustment amount and performs switching to the selected process. In this example, the imaging device 1f includes a focus adjustment amount acquisition unit 121f and a second focus adjustment amount acquisition unit 101. Then, the focus adjustment amount acquisition process switching unit 22 can switch the focus adjustment amount acquisition process in the above-described two members and determines the focus adjustment amount acquisition process to be used from the motion information of the imaging device output from the gyro sensor 221. The focus adjustment amount acquisition unit 121f acquires the focus adjustment amount from the phase difference element arranged in the imaging element of the imaging unit 12f as the first focus adjustment amount acquisition process. The second focus adjustment amount acquisition unit 101 detects a contrast value from the moving-image signal output from the imaging unit 12f and acquires a focus adjustment amount as the second focus adjustment amount acquisition process.

Because the phase difference elements are sparsely arranged in the imaging elements and the phase difference AF is more vulnerable to physical motion than the contrast AF in this example, the first focus adjustment amount acquisition process is used when the imaging device 1f does not physically move and the second focus adjustment amount acquisition process is used when the imaging device 1f physically moves. Here, because the case in which the imaging device 1f does not move is used as an example, the focus adjustment amount acquisition process switching unit 22 selects the first focus adjustment amount acquisition process. In this case, the focus adjustment amount acquisition process switching unit 22, for example, causes the focus adjustment amount acquisition unit 121f to acquire the focus adjustment amount without causing the second focus adjustment amount acquisition unit 101 to acquire the focus adjustment amount.

<Process 5>

Between the focus adjustment amount acquisition unit 121f and the second focus adjustment amount acquisition unit 101, the unit selected by the focus adjustment amount acquisition process switching unit 22 acquires the focus adjustment amount. Here, because the focus adjustment amount acquisition process switching unit 22 selects the focus adjustment amount acquisition unit 121f as an example, the focus adjustment amount acquisition unit 121f acquires the focus adjustment amount for setting the adjustment target area in the focused state.

<Process 6>

The intra-frame information acquisition unit 14f includes a number-of-subjects information acquisition unit 143.

The number-of-subjects information acquisition unit 143 acquires number-of-subjects information representing the number of subjects as an example of the subject information. The number-of-subjects information acquisition unit 143, for example, acquires the number of subjects by performing a figure-ground determination and extraction of a subject region using a well-known technique from an image through image processing. Also, the videographer input unit 11 pre-receives an input of the number of subjects from the videographer and outputs the input information representing the received input to the number-of-subjects information acquisition unit 143, so that the number-of-subjects information acquisition unit 143 may acquire the number of subjects.

<Process 7>

The WB adjustment unit 102 executes WB adjustment. Specifically, for example, the WB adjustment unit 102 executes WB adjustment by performing color conversion of pixel colors of the entire image in the acquired WB adjustment amount.

<Process 8>

The WB adjustment operation continuity information acquisition unit 133 acquires the operation information of the WB adjustment related to the operation of the WB adjustment (here, WB adjustment operation continuity information representing continuity of a WB adjustment operation as an example) as the information related to the inter-frame change. At this time, the WB adjustment operation continuity information acquisition unit 133, for example, determines the continuity of the WB operation from change acceleration of a variation value (a variation value of a color temperature) in several previous frames. For example, the WB adjustment operation continuity information acquisition unit 133 determines that there is no continuity when positive and negative change accelerations are mixed (motion is not constantly performed), and determines that there is continuity when the change acceleration is constant.

<Process 9>

The focus adjustment determination unit 15f determines the behavior of the focus adjustment (here, a driving speed of the focus adjustment as an example) based on the number-of-subjects information acquired by the number-of-subjects information acquisition unit 143 and the WB adjustment operation continuity information acquired by the WB adjustment operation continuity information acquisition unit 133. For example, a table (see FIG. 21) in which the driving speed of the focus adjustment is associated for every set of the number of subjects and the presence/absence of continuity is stored in a memory (not shown). In this case, for example, the focus adjustment unit 16f determines the driving speed of the focus adjustment by reading the driving speed of the focus adjustment corresponding to a set of the acquired number-of-subjects information and the acquired WB adjustment operation continuity information.

FIG. 21 is an example of a table in which a driving speed of focus adjustment is associated for every set of the number of subjects and the presence/absence of continuity. In the table T4 of FIG. 21, the driving speed of the focus adjustment is represented in units of μm/sec. In the table of FIG. 21, the driving speed of the focus adjustment becomes slow when the number of subjects is large. In addition, in the case of the same number of subjects, the driving speed of the focus adjustment becomes faster when there is continuity than when there is no continuity. This is, for example, because the videographer (or appreciator) tends to determine to set the next subject in the focused state when there is continuity in the WB adjustment operation when content imaged as in FIG. 19 changes and focus adjustment and WB adjustment are simultaneously performed. In addition, it is because the videographer (or appreciator) tends to direct awareness to one subject as the number of subjects decreases.

By referring to the table of FIG. 21, the focus adjustment determination unit 15f, for example, increases the driving speed of the focus adjustment when there is continuity in the WB adjustment operation, and increases the driving speed of the focus adjustment as the number of subjects decreases. Thereby, because it is possible to perform focus adjustment according to the ease of catching the awareness of the videographer (or appreciator), a change in the appearance of the moving image by the focus adjustment is more preferable for the videographer (or appreciator).

<Process 10>

Returning to FIG. 20, the focus adjustment unit 16f controls the focus adjustment optical system of the imaging optical system 2 to adjust a focus based on the behavior of the focus adjustment (the driving speed of the focus adjustment) determined by the focus adjustment determination unit 15f.

Figure 22:
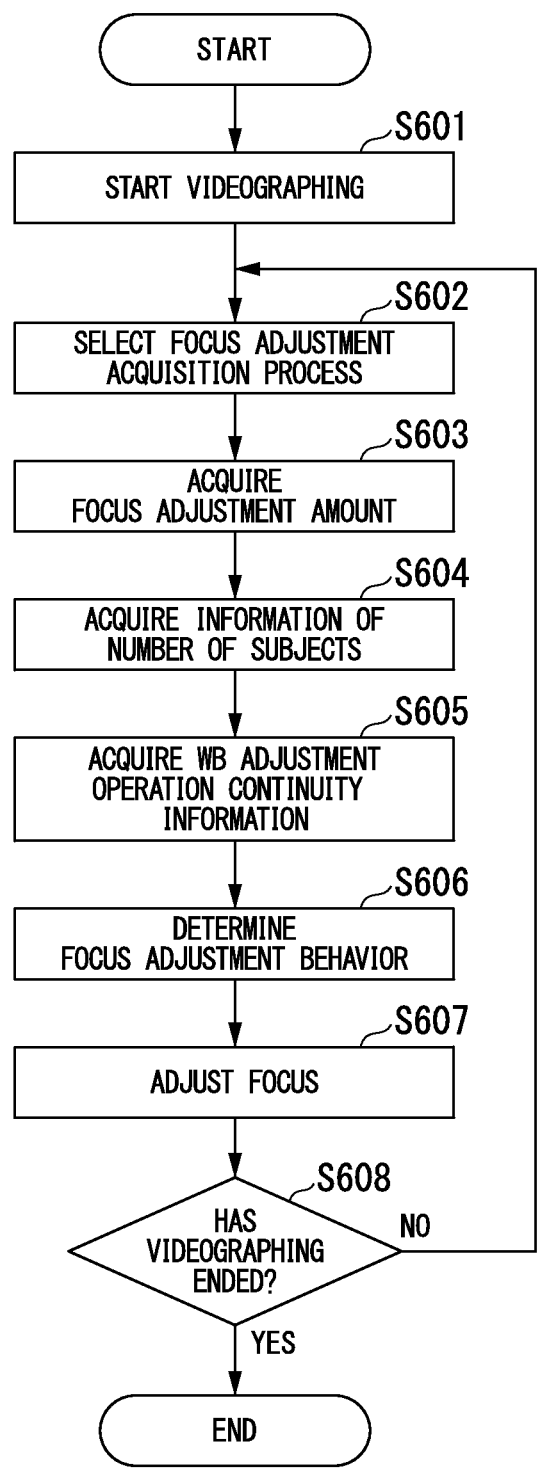
FIG. 22 is a flowchart showing an example of a flow of a process of the imaging device in the example 3 of the first embodiment.

FIG. 22 is a flowchart showing an example of a flow of a process of the imaging device 1f in example 3.

Because the process of step S601 is the same as the process of step S101 of FIG. 6, a description thereof will be omitted.

(Step S602) Next, the focus adjustment amount acquisition process switching unit 22 selects a process of acquiring the focus adjustment amount.

(Step S603) Next, between the focus adjustment amount acquisition unit 121f and the second focus adjustment amount acquisition unit 101, the unit selected by the focus adjustment amount acquisition process switching unit 22 acquires the focus adjustment amount.

(Step S604) Next, the number-of-subjects information acquisition unit 143 acquires number-of-subjects information representing the number of subjects as an example of the subject information.

(Step S605) Next, the WB adjustment operation continuity information acquisition unit 133 acquires the WB adjustment operation continuity information as an example of WB adjustment operation information serving as the information related to the inter-frame change.

(Step S606) Next, the focus adjustment determination unit 15f determines the behavior of the focus adjustment (here, a driving speed of the focus adjustment as an example) based on the number-of-subjects information acquired by the number-of-subjects information acquisition unit 143 and the WB adjustment operation continuity information acquired by the WB adjustment operation continuity information acquisition unit 133.

Because the processes of steps S607 and S608 are the same as steps S106 and S107 of FIG. 6, description thereof will be omitted. Accordingly, the process of this flowchart ends.

In the above example 3, the focus adjustment determination unit 15f determines the behavior of the focus adjustment (here, a driving speed of the focus adjustment as an example) based on the number-of-subjects information acquired by the number-of-subjects information acquisition unit 143 and the WB adjustment operation continuity information acquired by the WB adjustment operation continuity information acquisition unit 133. At this time, the focus adjustment determination unit 15f, for example, increases the driving speed of the focus adjustment when there is continuity in the WB adjustment operation, and increases the driving speed of the focus adjustment as the number of subjects decreases. Thereby, because it is possible to perform focus adjustment according to the ease of catching the awareness of the videographer (or appreciator), a change in the appearance of the moving image by the focus adjustment can be more preferable for the videographer (or appreciator).

Also, although the WB adjustment operation continuity information acquisition unit 133 acquires the WB adjustment operation continuity information representing the continuity of the WB adjustment operation as the operation information of the WB adjustment in this example, the operation speed or operation amount of the WB adjustment may be acquired as in the above-described example 2. The specific example is shown in the following.

<Modified Example 1: Operation Speed of WB Adjustment>

The WB adjustment operation continuity information acquisition unit 133 of FIG. 20 may be changed to a WB adjustment operation speed acquisition unit, and the WB adjustment speed acquisition unit may acquire the operation speed of the WB adjustment instead of the WB adjustment operation information.

When the operation speed of the WB adjustment is fast, it tends to be difficult for the appreciator to direct awareness to another subject during the WB adjustment. Accordingly, the focus adjustment determination unit 15f, for example, may determine the behavior of the focus adjustment to suppress the focus adjustment when the WB adjustment speed is fast.

<Modified Example 2: Operation Amount of WB Adjustment>

The WB adjustment operation continuity information acquisition unit 133 of FIG. 20 may be changed to a WB adjustment operation amount acquisition unit, and the WB adjustment operation amount acquisition unit may acquire the operation amount of the WB adjustment instead of the WB adjustment operation continuity information. When the WB adjustment is performed, the videographer (or appreciator) is more likely to direct awareness to the next subject in a state in which the WB has been changed to a certain degree than at the early stage of the WB adjustment start. Accordingly, the focus adjustment determination unit 15f, for example, may determine the behavior of the focus adjustment to suppress the focus adjustment as the operation amount of the WB adjustment decreases.

In addition, although the number-of-subjects information acquisition unit 143 acquires number-of-subjects information as information within one frame in this example, the present invention is not limited thereto. The number-of-subjects information acquisition unit 143 may acquire subject layout information and the focus adjustment determination unit 15f may determine the behavior of the focus adjustment as follows.

<Modified Example 3: Physical Position of Subject as Example of Subject Layout Information>

The number-of-subjects information acquisition unit 143 may acquire physical subject position information representing a physical position of the subject as an example of the subject layout information instead of the number-of-subjects information.

The number-of-subjects information acquisition unit 143, for example, acquires the physical position of the subject through image processing by well-known technology. Also, the videographer input unit 11 receives an input of the physical position of the subject by the videographer, and the number-of-subjects information acquisition unit 143 may acquire the physical subject position information from the videographer input unit 11. When the physical position of the subject is close to the imaging device, the videographer (or appreciator) tends to direct awareness to the subject. Accordingly, the focus adjustment determination unit 115f, for example, may determine the behavior of the focus adjustment to suppress the focus adjustment when the physical position of the subject is away from the imaging device 1f. Thereby, because the behavior of the focus adjustment according to the ease of catching the awareness of the videographer (or appreciator) is shown, it is possible to provide a moving image having a more preferable appearance to the videographer (or appreciator).

<Modified Example 4: Distribution State Information of Subjects as Example of Subject Layout Information>

The number-of-subjects information acquisition unit 143 may acquire subject distribution state information representing a subject distribution state as an example of the subject layout information instead of the number-of-subjects information.

When there are a plurality of subjects within the screen of the imaging device 1f, the videographer (or appreciator) tends to direct awareness to the subjects when the subjects are fixed in one place, that is, when subject positions are not distributed. Accordingly, the focus adjustment determination unit 15f, for example, may determine the behavior of the focus adjustment to promote the focus adjustment when the subject positions are not distributed. Thereby, because the behavior of the focus adjustment according to the ease of catching the awareness of the videographer (or appreciator) is shown, it is possible to provide a moving image having a more preferable appearance to the videographer (or appreciator).

<Modified Example 5>

In addition, although the focus adjustment determination unit 15f determines the behavior of the focus adjustment using WB adjustment operation continuity information acquired as information related to an inter-frame change and number-of-subjects information acquired as information within one frame in this example, the behavior of the focus adjustment may be corrected further using other optical-imaging-system-specific information which is specific information of the imaging optical system 2 attached to the imaging device 1f. In this case, a configuration of the imaging device 1g is shown in FIG. 23 and a flowchart is shown in FIG. 24.

Figure 23:
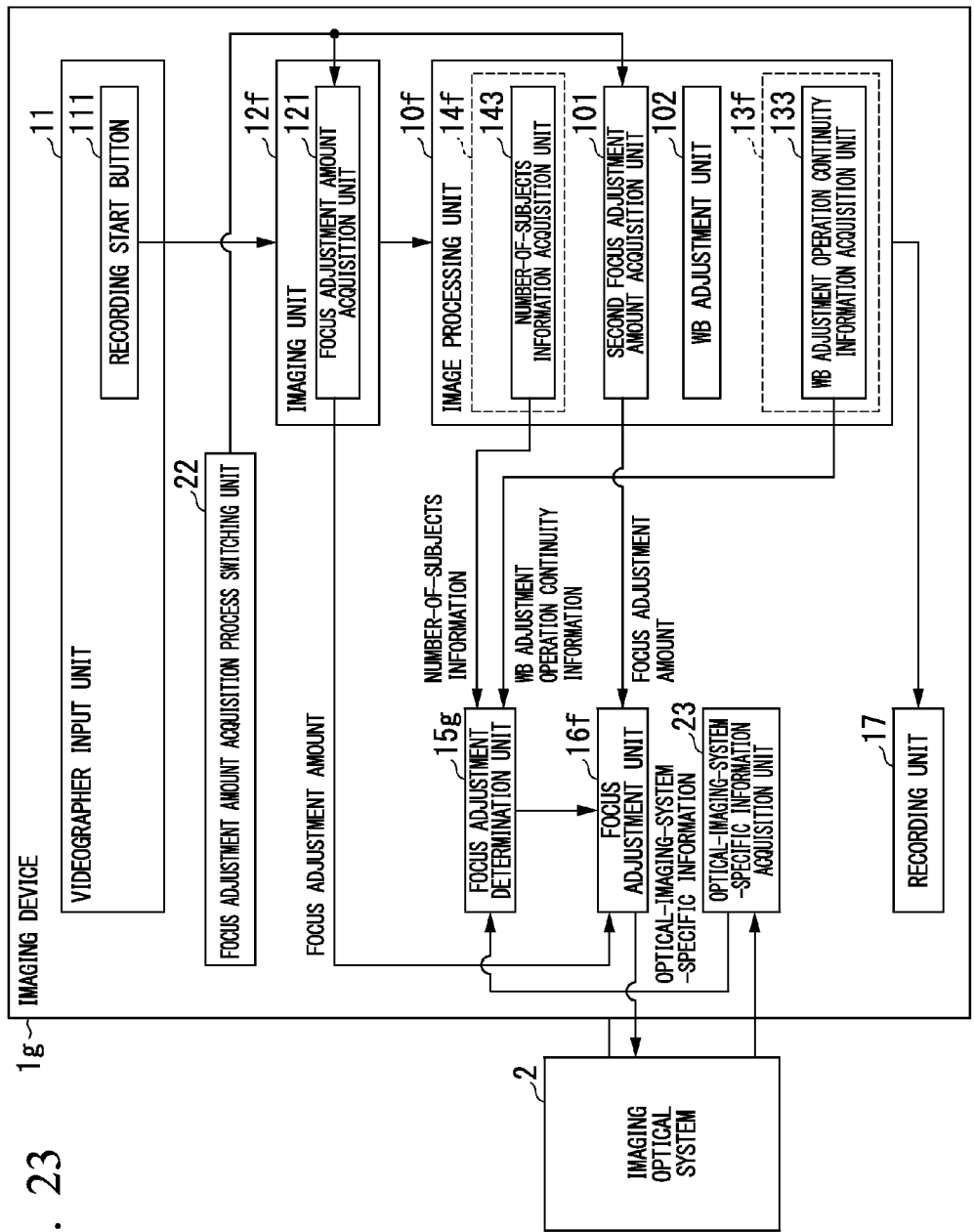
FIG. 23 is a schematic block diagram showing a configuration of the imaging device in a modified example 5 of the example 3 of the first embodiment.
Figure 24:
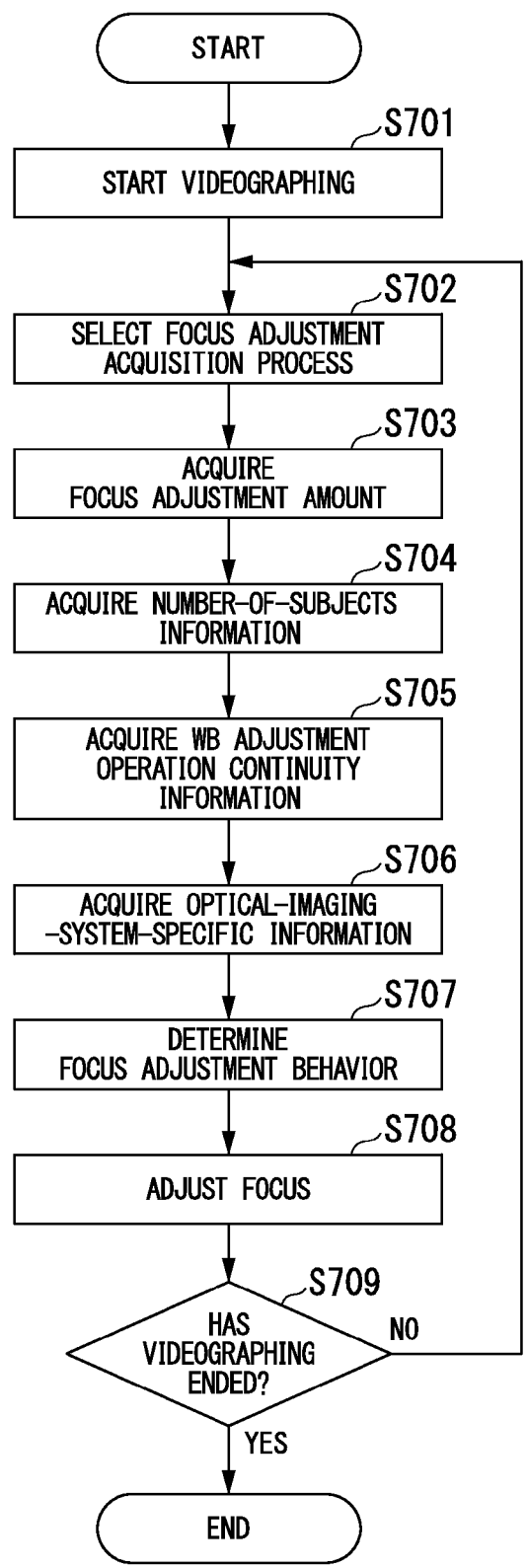
FIG. 24 is a flowchart showing an example of a flow of a process of an imaging device in the modified example 5 of the example 3 of the first embodiment.

FIG. 23 is a schematic block diagram showing a configuration of the imaging device 1g in the modified example 5 of the example 3 of the first embodiment. Also, elements common with FIG. 20 are assigned the same reference signs and a specific description thereof will be omitted. With respect to the configuration of the imaging device 1f of example 3 of FIG. 20, the configuration of the imaging device 1g in the modified example 5 of the example 3 of the first embodiment is configured by adding an optical-imaging-system-specific information acquisition unit 23 and changing the focus adjustment determination unit 15f to a focus adjustment determination unit 15g.

The optical-imaging-system-specific information acquisition unit 23 acquires optical-imaging-system-specific information from the imaging optical system 2. The optical-imaging-system-specific information acquisition unit 23 outputs the acquired optical-imaging-system-specific information to the focus adjustment determination unit 15g.

<Example 1: Resolving Power Information>

As the first example, the optical-imaging-system-specific information acquisition unit 23 acquires the resolving power information as the optical-imaging-system-specific information. For example, the imaging unit 12f images a resolution test chart prescribed in International Organization for Standardization (ISO) 12233, and the optical-imaging-system-specific information acquisition unit 23 may acquire a spatial frequency obtained by changing the number of wedge lines of a visual resolution evaluation pattern included in the resolution test chart from an image obtained by imaging as the resolving power. When the resolving power of the imaging optical system attached to the imaging device is high, it is possible to image a fine change. In order to avoid the iteration of the fine change in the moving image, the focus adjustment determination unit 15g may determine the behavior of the focus adjustment to suppress the focus adjustment when the resolving power of the attached imaging optical system 2 is high.

An example of a specific process of the focus adjustment determination unit 15g will be described.

First, the focus adjustment determination unit 15g temporally determines a temporal focus adjustment speed $V_{control}$ using WB adjustment operation continuity information acquired as information related to an inter-frame change and number-of-subjects information acquired as information within one frame.

Then, the focus adjustment determination unit 15g determines a focus adjustment suppression coefficient $\gamma$ to decrease the focus adjustment suppression coefficient $\gamma$ when the resolving power of the imaging optical system 2 is high. Then, the focus adjustment determination unit 15g determines an ultimate focus adjustment speed $V_{correction}$ by correcting the temporal focus adjustment speed $V_{control}$ using the determined focus adjustment suppression coefficient γ. Specifically, for example, the focus adjustment determination unit 15g calculates the ultimate focus adjustment speed $V_{correction}$ according to the following Equation (6).

$$V_{correction} = V_{control} \times \gamma \quad \quad \text{Equation (6)}$$

The focus adjustment determination unit 15g can avoid the iteration of the fine change in the moving image by determining the focus adjustment suppression coefficient γ to decrease the focus adjustment suppression coefficient γ when the resolving power of the imaging optical system 2 is high and decreasing the focus adjustment speed when the resolving power of the imaging optical system 2 is high. Because of this, it is possible to provide a moving image having a more preferable appearance to the videographer (or appreciator).

<Example 2: Presence/Absence of Optical System for Camera Shake Correction or Driving Width of Optical System for Camera Shake Correction>

As the second example, the optical-imaging-system-specific information acquisition unit 23 acquires the presence/absence of the optical system for the camera shake correction or the driving width of the optical system for the camera shake correction as the optical-imaging-system-specific information when there is an optical system of the camera shake correction in the imaging optical system 2. When the optical system of the camera shake correction is present, for example, the following phenomenon appears during the camera shake correction.

(1) Change in Attitude of Peripheral Darkening

When the optical system of the camera shake correction is driven for the camera shake correction, an optical-axis center and an image center are shifted. Although peripheral darkening normally appears vertically and horizontally symmetrically from the image center when there is no camera shake correction, the peripheral darkening appears asymmetrically with respect to the image center when the optical-axis center and the image center have been shifted. In addition, the attitude of peripheral darkening changes in chronological order. In this situation, incompatibility due to an unnatural change in peripheral darkening is easily noticeable when the focus adjustment is performed.

(2) Change in State of the Resolving Power

Although the resolving power normally deteriorates vertically and horizontally symmetrically from the image center according to the height of the image when there is no camera shake correction, the resolving power seems to deteriorate asymmetrically from the image center when the optical-axis center and the image center are shifted. In addition to this, the type of deterioration changes chronologically. In this situation, incompatibility due to an unnatural change of peripheral darkening is easily noticeable when the focus adjustment is performed.

Accordingly, when the attached imaging optical system 2 is the optical system for the camera shake correction, the focus adjustment determination unit 15g may determine the behavior of the focus adjustment to suppress the focus adjustment when the camera shake correction is being driven. In addition, when the driving width of the optical system of the camera shake correction is large, the behavior of the focus adjustment may be determined to suppress the focus adjustment.

As this specific correction process, the focus adjustment suppression coefficient γ is determined from the optical-imaging-system-specific information and the behavior of the focus adjustment is corrected using an equation similar to Equation (6). At this time, the focus adjustment determination unit 15g may set the focus adjustment suppression coefficient γ as follows. When the camera shake correction is being driven, the focus adjustment determination unit 15g may suppress the focus adjustment by setting the focus adjustment suppression coefficient γ to a small value. For example, when the driving width of the camera shake correction is large, the focus adjustment determination unit 15g may suppress the focus adjustment by setting the focus adjustment suppression coefficient γ to the small value.

FIG. 24 is a flowchart showing an example of a flow of a process of the imaging device 1g in the modified example 5 of the example 3 of the first embodiment.

Because the processes of steps S701 to S705 are the same as the processes of steps S601 to S605 of FIG. 22, description thereof will be omitted.

(Step S706) Next, the optical-imaging-system-specific information acquisition unit 23 acquires optical-imaging-system-specific information from the imaging optical system 2.

(Step S707) Next, the focus adjustment determination unit 15g determines the behavior of the focus adjustment based on the number-of-subjects information, the WB adjustment operation continuity information, and the optical-imaging-system-specific information.

Because the processes of steps S708 and S709 are the same as the processes of steps S607 and S608 of FIG. 22, a description thereof will be omitted.

<Modified Example 6>

Figure 25:
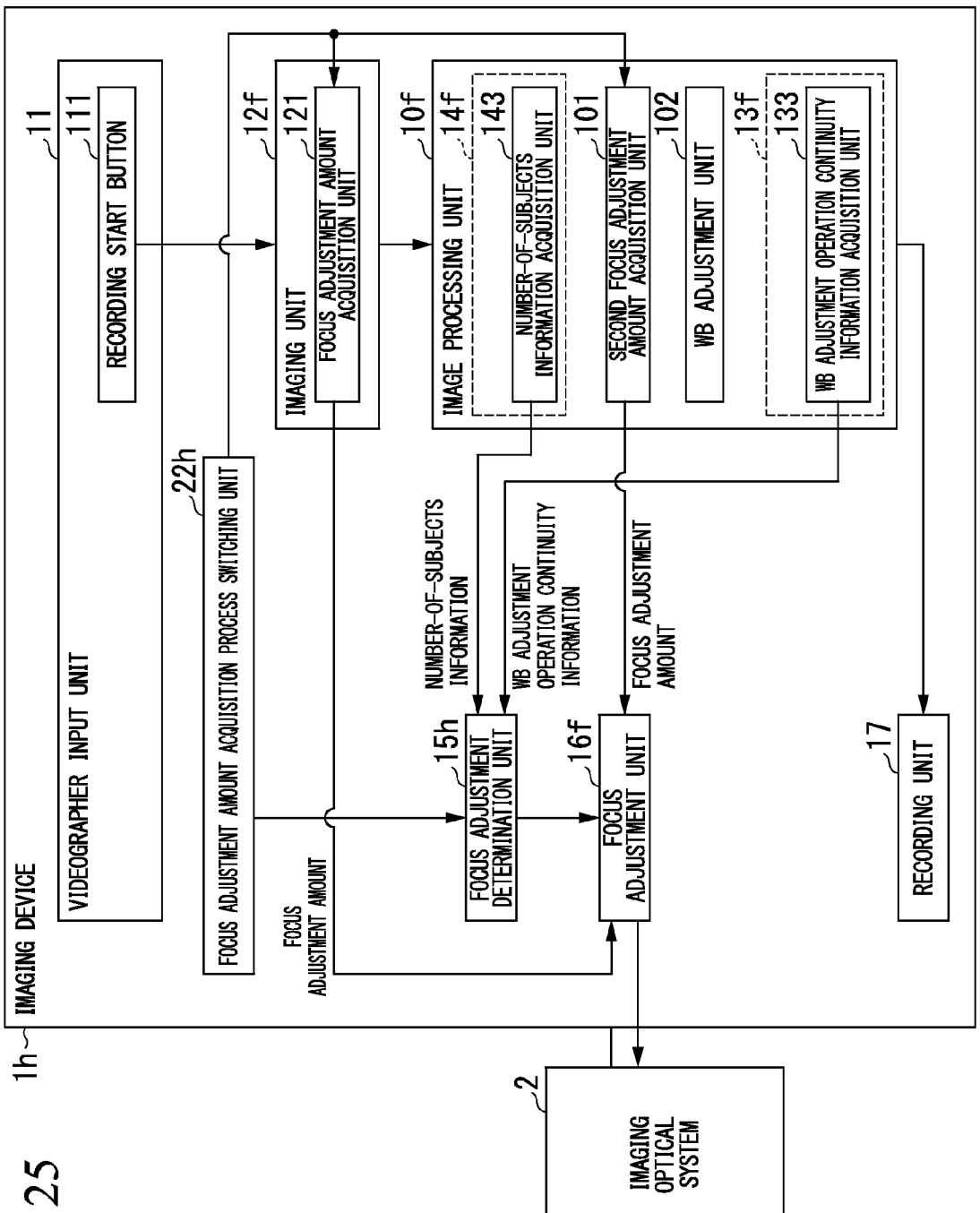
FIG. 25 is a schematic block diagram showing a configuration of an imaging device in a modified example 6 of the example 3 of the first embodiment.
Figure 26:
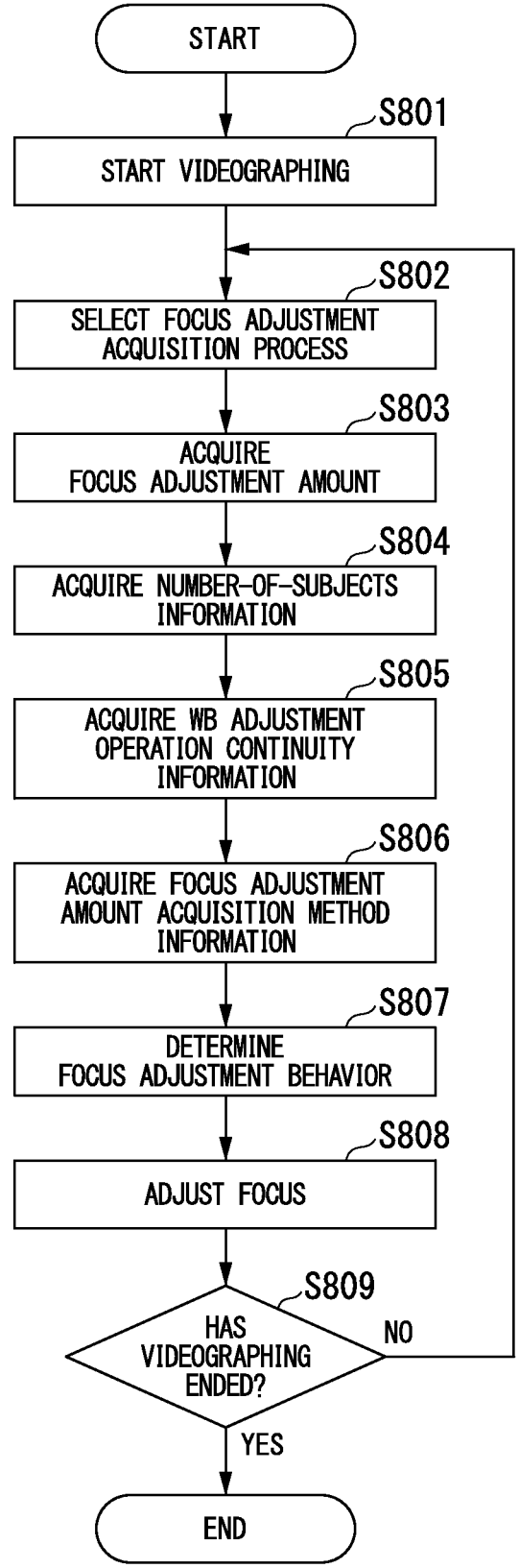
FIG. 26 is a flowchart showing an example of a flow of a process of the imaging device in the modified example 6 of the example 3 of the first embodiment.

In addition, when the imaging device 1f has another member capable of acquiring a plurality of focus adjustment amounts as in this example, the focus adjustment amount acquisition process switching unit 22h may acquire focus adjustment amount acquisition process information representing a focus adjustment amount acquisition method to be used as a focus adjustment amount acquisition method acquisition unit. In this case, the behavior of the focus adjustment may be determined further using the focus adjustment amount acquisition method information. In this case, the configuration of the imaging device is shown in FIG. 25 and a flowchart is shown in FIG. 26. Here, as an example, the imaging device or the subject physically moves.

FIG. 25 is a schematic block diagram showing a configuration of an imaging device 1h in the modified example 6 of the example 3 of the first embodiment. Also, elements common with FIG. 20 are assigned the same reference signs and specific description thereof will be omitted. With respect to the configuration of the imaging device 1f of example 3 of FIG. 20, the configuration of the imaging device 1h in the modified example 6 of the example 3 of the first embodiment is configured by omitting the optical-imaging-system-specific information acquisition unit 23, changing the focus adjustment determination unit 15f to a focus adjustment determination unit 15h, and changing the focus adjustment amount acquisition process switching unit 22 to a focus adjustment amount acquisition process switching unit 22h.

Although the focus adjustment amount acquisition process switching unit 22h has a similar function to the focus adjustment amount acquisition process switching unit 22, the focus adjustment amount acquisition process switching unit 22h also generates focus adjustment amount acquisition method information representing a focus adjustment amount acquisition method to be used from the selected focus adjustment acquisition process, and outputs the generated focus adjustment amount acquisition method information to the focus adjustment determination unit 15.

According to a focus adjustment acquisition process scheme, a characteristic of the focus adjustment changes. When the focus adjustment amount has been acquired according to contrast detection, the acquisition of the focus adjustment amount is comparatively slow, but smooth tracking is possible. On the other hand, when the focus adjustment amount has been acquired using the phase difference element, the early acquisition of the focus adjustment amount is possible, but smooth tracking is difficult because it is also easy to react to a fine focus adjustment amount change.

Accordingly, the focus adjustment determination unit 15h also determines the behavior of the focus adjustment based on the focus adjustment amount acquisition process information acquired from the focus adjustment amount acquisition process switching unit 22h.

As a specific correction process, the focus adjustment determination unit 15h, for example, determines the focus adjustment suppression coefficient γ and corrects the behavior of the focus adjustment using an equation similar to Equation (6). At this time, the focus adjustment determination unit 15h may set the focus adjustment suppression coefficient γ as follows. When the focus adjustment amount acquisition is performed according to contrast detection, the focus adjustment determination unit 15h, for example, may set the focus adjustment suppression coefficient γ to a value greater than a predetermined reference and determine the speed of the focus adjustment. Thereby, because the focus adjustment is smoothly performed even when the focus adjustment suppression coefficient γ is increased and the speed of the focus adjustment becomes fast, it is possible to provide a moving image having a more preferable appearance to the videographer (or appreciator).

On the other hand, when the focus adjustment amount acquisition using the phase difference element is performed, the focus adjustment determination unit 15h, for example, may set the focus adjustment suppression coefficient γ to a value less than or equal to a predetermined reference and determine the speed of the focus adjustment. Thereby, because the iteration of a fine change in the moving image is reduced by decreasing the focus adjustment suppression coefficient γ and reducing the speed of the focus adjustment, the imaging device 1h can provide a moving image having a more preferable appearance to the videographer (or appreciator).

FIG. 26 is a flowchart showing an example of a flow of a process of the imaging device 1h in the modified example 6 of the example 3 of the first embodiment.

Because the processes of steps S801 to S805 are the same as the processes of steps S601 to S605 of FIG. 22, description thereof will be omitted.

(Step S806) Next, the focus adjustment amount acquisition process switching unit 22h acquires focus adjustment amount acquisition method information based on the selected focus adjustment acquisition process.

(Step S807) Next, the focus adjustment determination unit 15h determines the behavior of the focus adjustment based on the number-of-subjects information, the operation information of the WB adjustment (here, WB adjustment operation continuity information as an example), and focus adjustment amount acquisition method information.

Because the processes of steps S808 and S809 are the same as the processes of steps S607 and S608 of FIG. 22, a description thereof will be omitted.

<Example 4>

Next, example 4 will be described. In this example, a scene in which panning is performed indoors as in FIG. 27 will be described.

Figure 27:
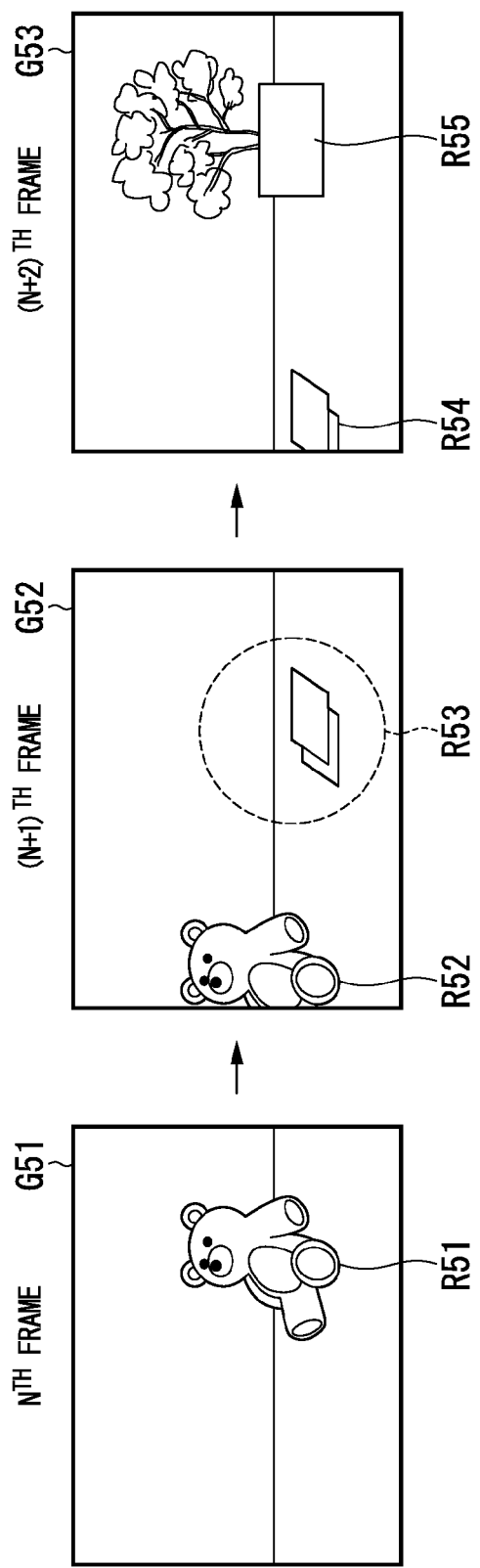
FIG. 27 is a diagram showing an example of a videographed scene in an example 4 of the first embodiment.

FIG. 27 is a diagram showing an example of a videographed scene in example 4. In FIG. 27, frame images of a videographed scene in which a subject videographed by panning changes from a state in which a teddy bear is viewed and an achromatic memorandum and a bright red flower appear in this order are shown. Also, in FIG. 27, a focus adjustment operation and a state in which a focus is shifted are not shown.

In FIG. 27, an image G51 of an $N^{th}$ frame, an image G52 of an $(N+1)^{th}$ frame, and an image G53 of an $(N+2)^{th}$ frame are shown. In the image G51 of the $N^{th}$ frame, an image region R51 of the teddy bear is shown. In the image G52 of the $(N+1)^{th}$ frame, an image region R52 of the teddy bear and an achromatic image region R53 are shown. In the image G53 of the $(N+2)^{th}$ frame, an achromatic image region R54 and a red flower image region R55 are shown.

Figure 28:
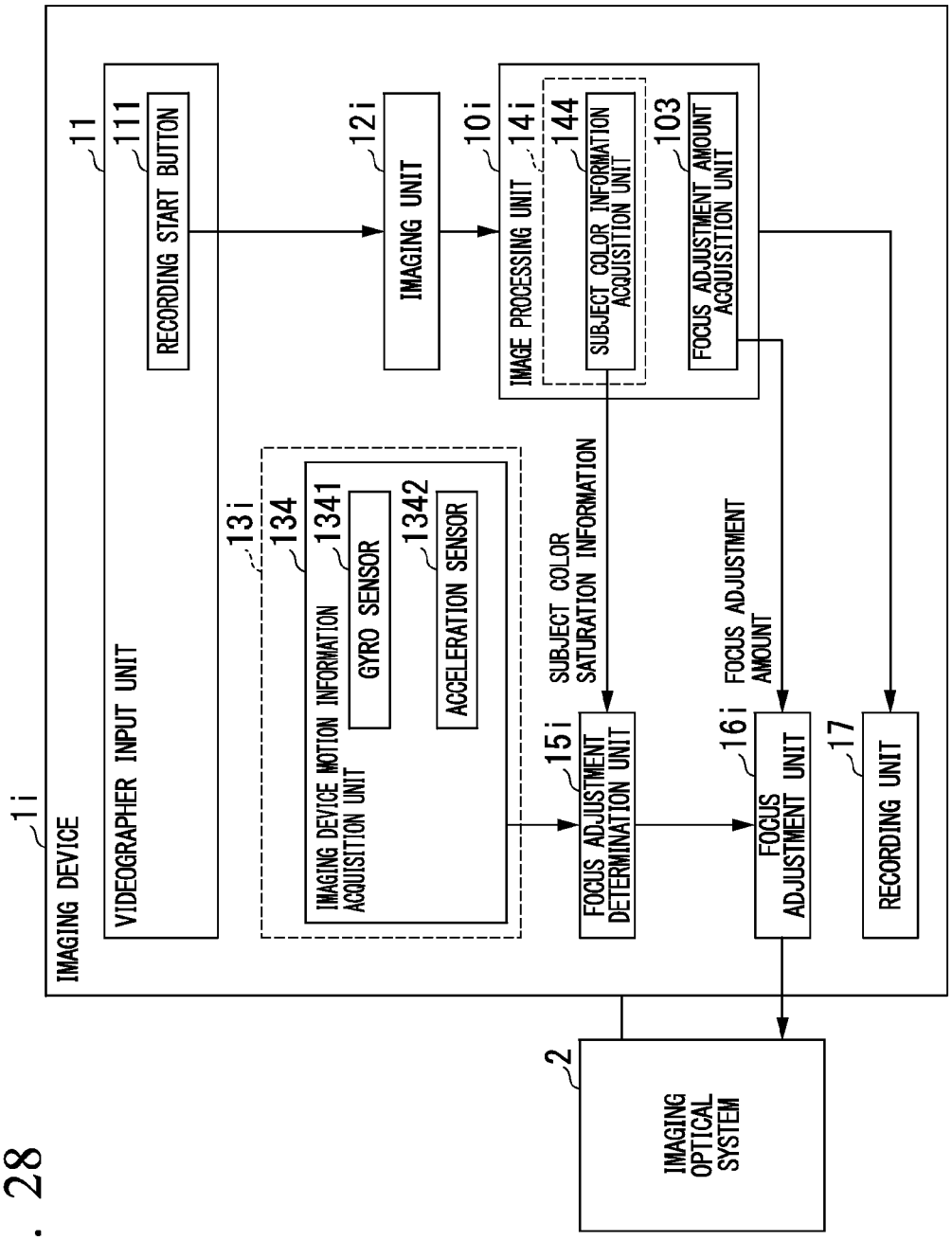
FIG. 28 is a schematic block diagram showing a configuration of an imaging device in the example 4 of the first embodiment.

FIG. 28 is a schematic block diagram showing a configuration of the imaging device 1i in example 4. With respect to the configuration of the imaging device 1a of example 1 of FIG. 4, the configuration of the imaging device 1i in example 4 is configured by changing the image processing unit 10 to an image processing unit 10i, changing the imaging unit 12a to an imaging unit 12i, changing the inter-frame change information acquisition unit 13a to an inter-frame change information acquisition unit 13i, changing the focus adjustment determination unit 15a to a focus adjustment determination unit 15i, and changing the focus adjustment unit 16 to a focus adjustment unit 16i. The image processing unit 10i includes an intra-frame information acquisition unit 14i and a focus adjustment amount acquisition unit 103. Here, the intra-frame information acquisition unit 14i includes a subject color information acquisition unit 144. The inter-frame change information acquisition unit 13i includes an imaging device motion information acquisition unit 134. Here, the imaging device motion information acquisition unit 134 includes a gyro sensor 1341 and an acceleration sensor 1342.

Next, a process of each part of the imaging device 1i will be described in the order of processing at the time of moving-image recording.

<Process 1>

An area in which the videographer performs focus adjustment is set. As an example, the videographer designates a right area of the screen of the imaging device 1i so as to perform focus adjustment for the subject around approximately the right of the screen of the imaging device 1i after panning. At this time, the videographer input unit 11 receives an input of an area in which the focus adjustment is performed by the videographer and causes information of the area in which the focus adjustment by the videographer is performed as indicated by the received input to be stored in a memory (not shown).

Also, although the videographer designates the area in which the focus adjustment is performed as an example in this example, the imaging device motion information acquisition unit 134 may automatically select the area in which the focus adjustment is performed through the following process.

The imaging device motion information acquisition unit 134, for example, acquires the sensor output of the gyro sensor 1341 as an example of motion information representing the motion of the imaging device 1i. The imaging device motion information acquisition unit 134, for example, analyzes the motion of the imaging device 1i from the sensor output of the gyro sensor 1341. In a videographed scene of FIG. 27, the imaging device motion information acquisition unit 134 analyzes that panning directed to the right of the screen of the imaging device 1i is performed as an example. Because the next subject can be expected to appear in a direction in which panning is performed when the panning is performed, the imaging device motion information acquisition unit 134 may select the right of the screen of the imaging device 1*i* as the area in which the focus adjustment is performed.

<Process 2>

The recording start button 111 receives a videographing start instruction of the videographer, and outputs the received videographing start instruction to the imaging unit 12*i*.

Upon receiving the videographing start instruction input through the recording start button 111, the imaging unit 12*i* generates a moving-image signal by converting light incident from the subject via the imaging optical system 2 into an electrical signal at a predetermined shutter speed. Thereby, the imaging unit 12*i* starts the moving-image recording according to the instruction of the videographer. The imaging unit 12*i* outputs the generated moving-image signal to the image processing unit 10*i*. In addition, the videographer starts the panning to the right in an imaging direction.

Also, when the videographer input unit 11 includes a touch panel, the videographer input unit 11 may receive an instruction of the videographer through an operation of the touch panel. In addition, when the videographer input unit 11 includes a microphone, the videographer input unit 11 may receive an instruction of the videographer by applying voice recognition to a voice signal input from the microphone.

<Process 3>

The focus adjustment amount acquisition unit 103 reads information of the area in which the focus adjustment is performed from the memory (not shown) received by the videographer input unit 11. The focus adjustment amount acquisition unit 103 acquires a contrast value from the moving-image signal obtained from the imaging unit 12*i*, and acquires a focus adjustment amount for setting the read focus adjustment target area in the focused state using the acquired contrast value. Then, the focus adjustment amount acquisition unit 103 outputs the acquired focus adjustment amount to the focus adjustment unit 16*i*.

Also, the focus adjustment amount acquisition process is not limited thereto, and the imaging unit 12*i* may acquire the focus adjustment amount using the phase difference element arranged on an image surface of the imaging element of the imaging unit 12*i*. In addition, the imaging device 1*i* may further include a translucent mirror for outputting approximately half of light passing through the imaging optical system 2 to the imaging element and outputting approximately half of light to a dedicated phase difference element, and acquire the focus adjustment amount from a signal detected by the phase difference element.

<Process 4>

The subject color information acquisition unit 144 acquires color information of the subject (here, subject color saturation information representing color saturation of the subject as an example) as information within one frame. Specifically, for example, the subject color information acquisition unit 144 acquires an average value of color saturation within the area in which the focus adjustment is performed as the subject color saturation information. Also, the present invention is not limited thereto. The subject color information acquisition unit 144 may extract a subject region from a frame image, for example, in a figure-ground determination, and acquire an average value of color saturation within the subject region in the vicinity of the area in which the focus adjustment is performed. Here, the vicinity of the area in which the focus adjustment is performed, for example, includes the area in which the focus adjustment is performed and also includes pixels separated from the area by a predetermined number of pixels. The subject color information acquisition unit 144 outputs the acquired subject color saturation information to the focus adjustment determination unit 15*i*.

Also, although the subject color information acquisition unit 144 acquires subject color information from an arbitrary area in this example, the subject color information acquisition unit 144 may acquire color information of the entire captured screen of the imaging device 1*i*.

<Process 5>

The imaging device motion information acquisition unit 134 acquires imaging device motion information (here, a motion amount of the imaging device 1*i* as an example) representing motion of the imaging device 1*i* as the information related to the inter-frame change, and outputs the acquired motion information to the focus adjustment determination unit 15*i*.

The gyro sensor 1341 is a sensor for detecting an angular velocity of a rotation direction, and can detect rotation of a pitch direction (also referred to as a tilt direction) around an axis (x axis) of the horizontal direction toward the subject, rotation of a yaw direction (also referred to as a pan direction) around an axis (y axis) of the horizontal direction toward the subject, and an angular velocity of a roll direction around a z axis. It is possible to acquire one direction for one gyro sensor and it is only necessary to prepare three gyro sensors when it is desired to detect the rotational angular velocities of all three axes.

The imaging device motion information acquisition unit 134, for example, calculates each of movement amounts of pitch, yaw, and roll rotation directions as one motion amount by integrating each of angular velocities of the pitch, yaw, and roll rotation directions detected by the gyro sensor 1341

The acceleration sensor 1342, for example, is a three-axis acceleration sensor, and detects accelerations of the x-axis direction, the y-axis direction, and the z-axis direction.

The imaging device motion information acquisition unit 134, for example, calculates each of the movement amounts of the x-axis direction, the y-axis direction, and the z-axis direction as one motion amount by performing double integration on each of the accelerations of the x-axis direction, the y-axis direction, and the z-axis direction detected by the acceleration sensor 1342. The imaging device motion information acquisition unit 134 outputs information representing the calculated motion amount as the imaging device motion amount information to the focus adjustment determination unit 15*i*.

Also, the imaging device motion information acquisition unit 134, for example, may obtain the motion information through image processing from the captured moving image as well as from the use of the gyro sensor or the acceleration sensor.

Also, although the imaging device motion information acquisition unit 134 treats the motion amount as the motion amount from a panning start time point in this example, the motion amount may be a movement amount for arbitrary frames going back from a current time point.

<Process 6>

The focus adjustment determination unit 15*i* determines the behavior of the focus adjustment based on the subject color saturation information acquired by the subject color information acquisition unit 144 and the imaging device motion amount information acquired by the imaging device motion information acquisition unit 134. Specifically, for example, here, information representing a quadratic function in which the color saturation of the subject is set as an objective variable and the motion amount of the imaging device is set as an independent variable is pre-stored in a memory (not shown). In this case, the focus adjustment determination unit 15i reads the quadratic function from the memory and determines whether to operate or prohibit the focus adjustment using the read quadratic function.

Figure 29:
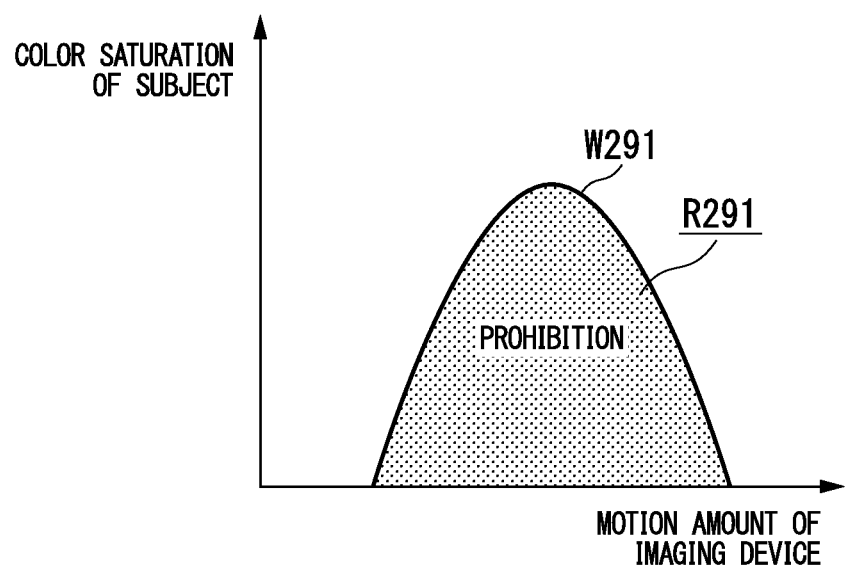
FIG. 29 is a diagram showing a focus adjustment prohibition region in which focus adjustment is prohibited.

FIG. 29 is a diagram showing a focus adjustment prohibition region in which focus adjustment is prohibited. In FIG. 29, the vertical axis (y axis) is the color saturation of the subject, and the horizontal axis (x axis) is the motion amount of the imaging device. The focus adjustment prohibition region R291 is a region surrounded by a curve W291 represented by the read quadratic function and the x axis. In the example of FIG. 29, the focus adjustment determination unit 15i, for example, prohibits the focus adjustment if the xy coordinates are included in the focus adjustment prohibition region 8291 when the acquired color saturation of the subject is set as a y coordinate and the acquired motion amount of the imaging device 1i is set as an x coordinate.

Also, although the focus adjustment determination unit 15i determines a condition (region) which determines "prohibition of focus adjustment" or "execution of focus adjustment" using the quadratic function, the present invention is not limited thereto. The condition (region) may be determined using other polynomials or function formulas.

<Process 7>

The focus adjustment unit 16i controls an optical system for the focus adjustment in the imaging optical system 2 to adjust the focus based on the behavior of the focus adjustment (whether to operate or prohibit the focus adjustment) determined by the focus adjustment determination unit 15i.

<Process 8>

The imaging device 1i iterates the processing of processes 3 to 7 until the videographer input unit 11 receives an input of a videographing end instruction from the videographer.

For example, because the state is not yet determined to be a panning state and is determined to be a still state as the state is close to a panning start state in the case of a scene in which content of the subject imaged from moment to moment according to panning changes as in FIG. 27, the videographer (or appreciator) tends to change the subject desired to be focused on (or operates the focus adjustment). In addition, because the state is that in which the subject desired to be focused on by sufficiently performing panning is determined to have changed as the motion amount of the imaging device 1i from a panning start time increases to be greater than a fixed value, the videographer (or appreciator) tends to change the subject desired to be focused (or desire to operate the focus adjustment). In addition, because the state is that in which the subject is determined to be noticeable when the color saturation of the subject is high, the videographer (or appreciator) tends to change the subject desired to be focused on (operates the focus adjustment).

Because of this, the focus adjustment determination unit 15i, for example, determines the behavior of the focus adjustment as follows.

In an $N^{th}$ frame, the focus adjustment determination unit 15i determines the behavior of the focus adjustment to perform the focus adjustment for a "teddy bear" imaged in a panning start state. Although panning is performed to a certain degree in an $(N+1)^{th}$ frame, the focus adjustment determination unit 15i determines the behavior of the focus adjustment so that no focus adjustment is performed for a subject having color saturation lower than a predetermined threshold value when the color saturation is lower than the predetermined threshold value as in the achromatic memorandum shown in the region R53 of FIG. 27. When the panning in the $(n+2)^{th}$ frame is performed more than in a previous frame and the color saturation is higher than a predetermined threshold value as in a red flower represented by a region R55 of FIG. 27, the focus adjustment determination unit 15i determines the behavior of the focus adjustment so that focus adjustment is performed on a subject having color saturation higher than the predetermined threshold value.

Figure 30:
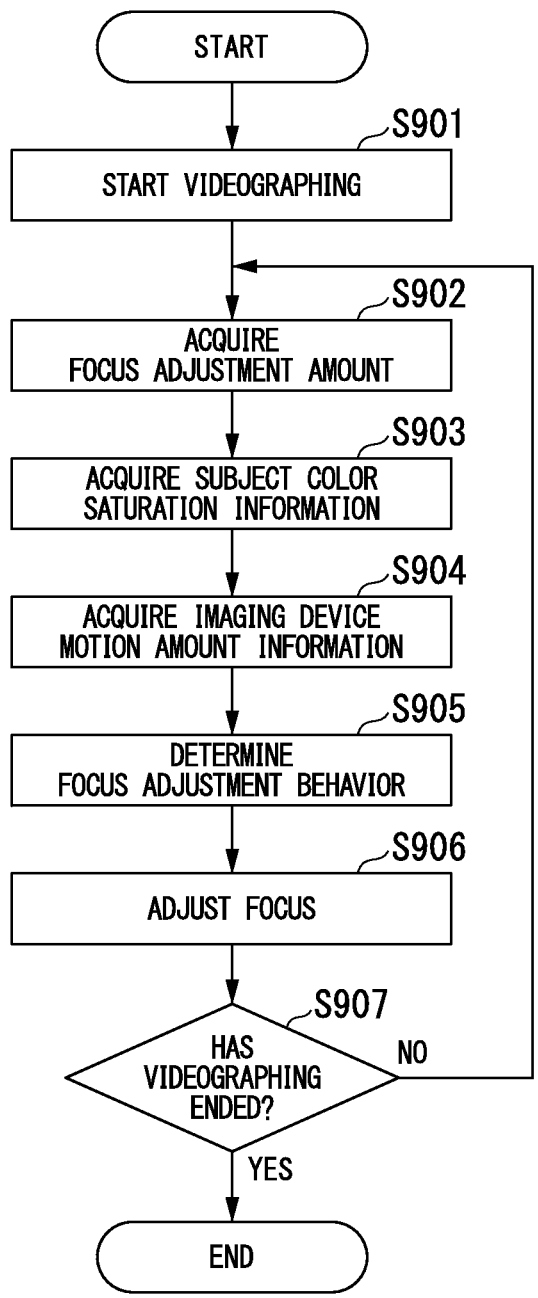
FIG. 30 is a flowchart showing an example of a flow of a process of an imaging device in the example 4 of the first embodiment.

FIG. 30 is a flowchart showing an example of a flow of a process of an imaging device in example 4.

(Step S901) First, when the recording start button 111 has been pressed, the imaging unit 12i starts videographing.

(Step S902) Next, the focus adjustment amount acquisition unit 103 acquires a focus adjustment amount.

(Step S903) Next, the subject color information acquisition unit 144 acquires subject color saturation information as an example of color information of the subject as information within one frame.

(Step S904) Next, the imaging device motion information acquisition unit 134 acquires imaging device motion amount information as an example of the imaging device motion information as information related to an inter-frame change.

(Step S905) Next, the focus adjustment determination unit 15i determines the behavior of the focus adjustment using the imaging device motion amount information and the subject color saturation information.

(Step S906) Next, the focus adjustment unit 16 performs the focus adjustment according to the determined behavior of the focus adjustment.

(Step S907) Next, the imaging unit 12i determines whether the videographing has ended. When there is no videographing end (NO), the process returns to step S902. When the videographing has ended (YES), the imaging device 1i ends the process. Accordingly, the process of this flowchart ends.

Although the imaging device motion information acquisition unit 134 acquires a motion amount as imaging device motion information in this example, a motion speed, motion continuity information, or camera shake information may be acquired instead of a motion amount. Then, the focus adjustment determination unit 15i may determine the behavior of the focus adjustment using the acquired motion speed, motion continuity information, or camera shake information. Hereinafter, a specific example will be described.

<Modified Example 1: Case in which Motion Speed of Imaging Device 1i is Acquired as Imaging Device Motion Information>

The imaging device motion information acquisition unit 134 may acquire the motion speed of the imaging device 1i as the imaging device motion information. At this time, the imaging device motion information acquisition unit 134 may acquire the motion speed of the imaging device 1i using a dedicated sensor (the gyro sensor 1341 or the acceleration sensor 1342) or image processing as in the above-described motion amount. Although the videographer (or appreciator) tends to change the determined subject desired to be focused when the imaging device 1i moves at a low speed, changing the determined subject desired to be focused tends to be difficult when the imaging device 1i moves at a high speed. Accordingly, when the motion speed of the imaging device 1i is fast, the focus adjustment determination unit 15i may determine the behavior of the focus adjustment so that the focus adjustment is easily prohibited.

In addition, when it is temporarily determined that it is preferable to perform focus adjustment, a process of performing the focus adjustment in a fast operation becomes focus adjustment of a natural appearance when the motion speed of the imaging device 1i is fast compared to when the motion of the imaging device 1i is slow. Accordingly, after determining whether to "operate" or "prohibit" the focus adjustment according to the motion speed of the imaging device 1i, the focus adjustment determination unit 15i, for example, may determine a temporal characteristic of the focus adjustment from the initial state to the focused state in the following process.

As an example of the process of determining the temporal characteristic of the focus adjustment from the initial state to the focused state, the motion speed of the imaging device 1*i* is acquired from the imaging device motion information acquired by the imaging device motion information acquisition unit 134. Here, as an example, the imaging device motion information acquisition unit 134 classifies the motion speed of the imaging device as a "high speed," a "medium speed," or a "low speed" using a threshold value pre-stored in a memory (not shown) within the imaging device 1*i*. Also, the imaging device motion information acquisition unit 134 may use the motion speed (for example, an output [degrees/sec] obtained from the gyro sensor 1341) of the imaging device as the imaging device motion information without change.

For example, a table in which information representing the motion speed of the imaging device is associated with the temporal characteristic of the behavior of the focus adjustment from the initial state to the focused state is stored in the memory (not shown) within the imaging device 1*i*. For example, the focus adjustment determination unit 15*i* determines the temporal characteristic of the focus adjustment from the initial state to the focused state by referring to the above-described table stored in the memory (not shown) and reading the temporal characteristic corresponding to the acquired motion speed of the imaging device 1*i*.

Figure 31:
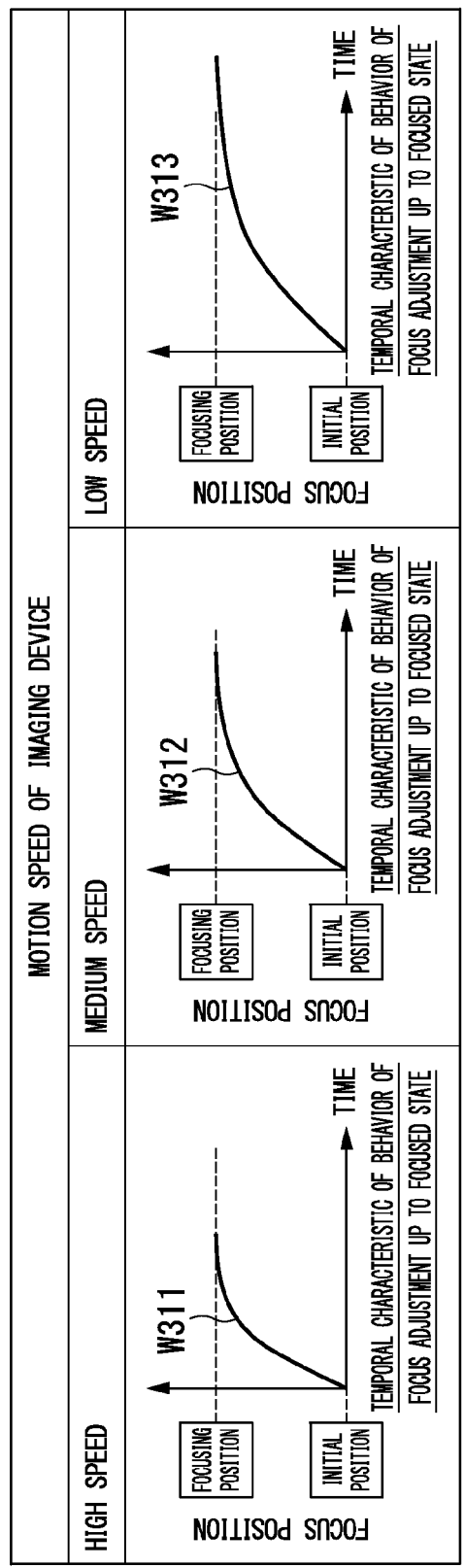
FIG. 31 is a conceptual diagram of a table in which information representing a motion speed of the imaging device is associated with a temporal characteristic of focus adjustment from an initial state to a focused state.

Next, the table in which the information representing the motion speed of the imaging device is associated with the temporal characteristic of the behavior of the focus adjustment from the initial state to the focused state will be described using FIG. 31. FIG. 31 is a conceptual diagram of the table in which the information representing the motion speed of the imaging device is associated with the temporal characteristic of the behavior of the focus adjustment from the initial state to the focused state. In FIG. 31, the motion speed of the imaging device is classified as one of three types of the high speed, the medium speed, and the low speed, and the temporal characteristic of the behavior of the focus adjustment from the initial state to the focused state is associated with each speed. Specifically, the temporal characteristic of the behavior of the focus adjustment shown in a curve W311 is associated in the case of the high speed, the temporal characteristic of the behavior of the focus adjustment shown in a curve W312 is associated in the case of the medium speed, and the temporal characteristic of the behavior of the focus adjustment shown in a curve W313 is associated in the case of the low speed. As seen from FIG. 31, the focus adjustment is performed in the fast operation when the motion of the imaging device 1*i* is fast. Consequently, the focus adjustment determination unit 51*i* determines the behavior of the focus adjustment to perform the focus adjustment in the fast operation when the motion of the imaging device 1*i* is fast by referring to the table as shown in the conceptual diagram of FIG. 31.

<Modified Example 2>

Although the behavior of the focus adjustment is determined so that it is easy to prohibit the focus adjustment when the motion speed of the imaging device is fast in modified example 1, for example, it may be determined when the focus adjustment starts (the timing of the start of the focus adjustment) from the motion speed information of the imaging device and the color information of the subject.

According to human senses, it is easy to recognize the subject appearing while panning is performed as the next subject when the motion speed of the imaging device (for example, a panning speed) is slow. Accordingly, a time at which the subject is recognized is advanced and therefore it is preferable to advance the start timing of the focus adjustment. On the other hand, when the motion speed (for example, a panning speed) of the imaging device is fast, it is difficult to recognize the subject appearing while the panning is performed as the next subject. Accordingly, a time at which the subject is recognized is delayed and therefore it is preferable to delay the start timing of the focus adjustment. In addition, because it is easy to recognize the subject appearing while panning is performed as the next subject when the color saturation of the subject is high, it is preferable to advance the start timing of the focus adjustment. On the other hand, because it is difficult to recognize the subject appearing while panning is performed as the next subject when the color saturation of the subject is low, it is preferable to delay the start timing of the focus adjustment. In consideration thereof, it is preferable to determine the start timing of the focus adjustment using the table as in FIG. 49.

FIG. 49 is an example of a table in which a start timing of focus adjustment is associated for every set of subject color saturation and a panning speed. In the table T6 of FIG. 49, the start timing of the focus adjustment tends to be delayed when the panning speed is fast. In addition, when the subject color saturation is high, the start timing of the focus adjustment tends to be advanced. The focus adjustment determination unit 15*i* determines the behavior of the focus adjustment to start the focus adjustment at an early timing when the panning speed is slow or the subject color saturation is high by referring to the table as shown in FIG. 49.

<Modified Example 3: Case in which Information Related to Continuity of Motion of Imaging Device 1*i* is Acquired as Imaging Device Motion Information>

In addition, the imaging device motion information acquisition unit 134 may acquire the information related to the continuity of the motion of the imaging device 1*i* as the imaging device motion information. At this time, the imaging device motion information acquisition unit 134 may acquire the information related to the continuity of the motion of the imaging device 1*i*, for example, in the following process, using a dedicated sensor (the gyro sensor 1341 or the acceleration sensor 1342) or image processing as in the above-described motion amount.

The imaging device motion information acquisition unit 134, for example, may determine continuity from variation of the acceleration of the imaging device 1*i* in an arbitrary number of previous frames. Specifically, the imaging device motion information acquisition unit 134, for example, may determine that there is no continuity when both positive and negative accelerations are detected among the above-described arbitrary number of previous frames. On the other hand, the imaging device motion information acquisition unit 134, for example, may determine that there is continuity when only either of the positive and negative accelerations is detected among the above-described arbitrary number of previous frames.

While the videographer (or appreciator) tends to change the determined subject desired to be focused when there is continuity in the motion of the imaging device 1*i*, it is difficult to change the determined subject desired to be focused when there is no continuity in the motion of the imaging device 1*i*. Accordingly, the focus adjustment determination unit 15*i* may determine the behavior of the focus adjustment to suppress the focus adjustment when it is determined that there is no continuity in the motion of the imaging device 1*i*.

<Modified Example 4: Case in which Camera Shake Information is Acquired as Imaging Device Motion Information>

In addition, the imaging device motion information acquisition unit 134 may acquire the camera shake information as the imaging device motion information. At this time, the imaging device motion information acquisition unit 134 may acquire the camera shake information using a dedicated sensor (the gyro sensor 1341 or the acceleration sensor 1342) or image processing as in the above-described motion amount. Specifically, for example, the imaging device motion information acquisition unit 134 may set a high-frequency component of an angular velocity detected by the gyro sensor 1341 or a high-frequency component of acceleration detected by the acceleration sensor 1342 as the camera shake information.

For example, when it is determined that the camera shake amount is greater than a predetermined threshold value, that is, when a change in a screen of the imaging device 1i due to camera shake is severe, the case in which an additional focus change (a change in blurring or a focused state) is not excessively caused appears natural to the videographer (or appreciator). Accordingly, the focus adjustment determination unit 15i may determine the behavior of the focus adjustment to suppress the focus adjustment when the camera shake is strong. Specifically, for example, the focus adjustment determination unit 15i may determine the behavior of the focus adjustment to suppress the focus adjustment when the detected high-frequency component of the angular velocity or the detected high-frequency component of the acceleration is large.

<Modified Example 5: Case in which Presence/Absence Information of Motion (Camera Work) of Imaging Device is Acquired as Motion Information of Imaging Device>

The imaging device motion information acquisition unit 134 may acquire the presence/absence information of the motion of the imaging device as the imaging device motion information. At this time, the imaging device motion information acquisition unit 134 may acquire the presence/absence information of the motion (camera work) of the imaging device using a dedicated sensor (the gyro sensor 1341 or the acceleration sensor 1342) or image processing as in the above-described motion amount.

For example, when there is motion (camera work) of the imaging device such as panning, a subject which is a focus adjustment target newly appears according to the panning. However, when there is no panning, the videographer (appreciator) pre-recognizes that the subject is already displayed on a screen of the imaging device within an angle of view and "the next subject therein" is present even when the state is not the focused state before the focus adjustment. Thereby, when a desire for the focus adjustment changes and the videographer (appreciator) does not pre-recognize the subject, it is preferable to slowly perform the focus adjustment. This is obvious from a result of subjective evaluation shown below.

Figure 55A:
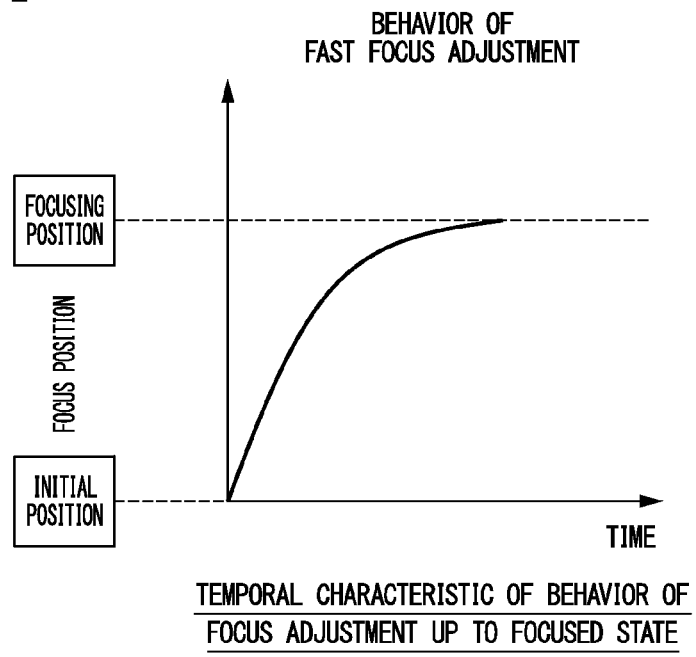
FIG. 55A is an example of a temporal characteristic from the focus adjustment start to the focused state in a modified example 5 of the example 4 of the first embodiment.
Figure 55B:
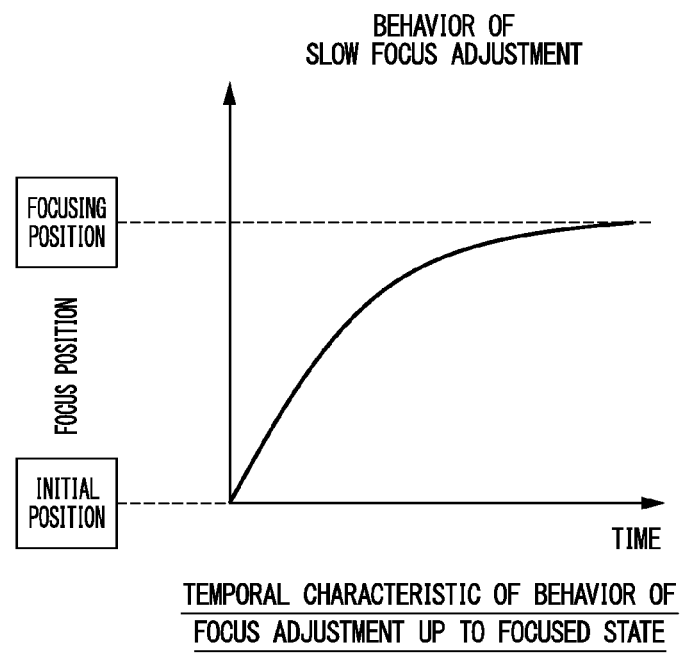
FIG. 55B is an example of the temporal characteristic from the focus adjustment start to the focused state in the modified example 5 of the example 4 of the first embodiment.

Each of FIGS. 55A and 55B is an example of a temporal characteristic from the focus adjustment start to the focused state. In FIGS. 55A and 55B, the vertical axis is a focusing position and the horizontal axis is time. FIG. 55A is a temporal characteristic of the behavior of relatively fast focus adjustment, and FIG. 55B is a temporal characteristic of the behavior of relatively slow focus adjustment. In the videographing with panning and the videographing without panning, a group of a plurality of examinees viewed a moving image to which the behavior of the focus adjustment as shown in FIGS. 55A and 55B was applied and results of subjectively evaluating the likability of the video (Unlikable: 0 points, Neither unlikable nor likable: 5 points, and Likable: 10 points) in eleven steps are shown in FIG. 56.

As a specific method of determining the behavior of the focus adjustment, the imaging device pre-saves the behavior of each of fast focus adjustment and slow focus adjustment as shown in FIGS. 55A and 55B in the memory (not shown) within the imaging device. The focus adjustment determination unit 15i may determine the behavior of the focus adjustment to execute the behavior of the fast focus adjustment when there is motion of the imaging device and execute the behavior of the slow focus adjustment when there is no motion of the imaging device.

In addition, although color information of the subject (color saturation information of the subject as an example) is acquired as information within one frame, the present invention is not limited thereto. Other color information shown below may be acquired instead of the color information of the subject. At this time, for example, the imaging device 1i may arbitrarily extract a main subject as an arbitrary subject through a well-known main subject detection process as in technology disclosed in Japanese Unexamined Patent Application, First Publication No. 2008-205650.

<Modified Example 6: Information Related to Color Saturation Difference between Arbitrary Subject and other Subject (Including Background) within Frame>

The subject color information acquisition unit 144 may acquire information related to the color saturation difference between the arbitrary subject and the other subject (including background) within the frame. The arbitrary subject within the frame is a subject of an area in which the focus adjustment is performed as an example. Although the awareness of the videographer (or appreciator) tends to be directed to a subject having high color saturation when there is one subject having high color saturation among subjects having low color saturation, awareness is less likely to be directed to a specific subject when both the background and the subject have high color saturation. Accordingly, the focus adjustment determination unit 15i, for example, may be configured to suppress the focus adjustment when the color saturation difference between the arbitrary subject and the other subject (including the background) within the frame is less than a predetermined threshold value.

<Modified Example 7: Hue Information of Arbitrary Subject within Frame>

In addition, the subject color information acquisition unit 144 may acquire the hue information of the arbitrary subject within the frame. Here, the arbitrary subject within the frame is a subject of an area in which the focus adjustment is performed as an example. In a human eye, sensitivity is high for a green object (a medium-wavelength object) and is sequentially lower for red (a long-wavelength object) and blue (a short-wavelength object). The videographer (or appreciator) tends to direct awareness to a subject which is easily perceived by his or her eye. Accordingly, the focus adjustment determination unit 15i, for example, may be configured to suppress the focus adjustment when the color of the arbitrary subject within the frame is blue (when the color has a short wavelength).

<Modified Example 8: Information Related to Hue Difference between Arbitrary Subject and other Subject (Including Background) within Frame>

In addition, the subject color information acquisition unit 144 may acquire the information related to the hue difference between the arbitrary subject and the other subject (including the background) within the frame. Here, the arbitrary subject within the frame is a subject of an area in which the focus adjustment is performed as an example. When there is only one subject having a different hue among subjects of similar hues, the videographer (or appreciator) tends to direct awareness to the subject of the different hue. Accordingly, the focus adjustment determination unit 15i, for example, may be configured to acquire information related to the hue difference between the arbitrary subject and the other subject (including the background) within the frame and suppress the focus adjustment when the hue difference is less than a predetermined threshold value.

<Modified Example 9: Brightness Information of Arbitrary Subject within Frame>

In addition, the subject color information acquisition unit 144 may acquire subject brightness information representing brightness of the arbitrary subject within the frame. Here, the arbitrary subject within the frame is a subject of an area in which the focus adjustment is performed as an example. The videographer (or appreciator) tends to direct awareness to a bright (but unsaturated) subject. Accordingly, the focus adjustment determination unit 15i, for example, may acquire the subject brightness information, and determine the behavior of the focus adjustment so that the focus adjustment is easily operated when the brightness is not too low or high.

<Modified Example 10: Information Related to Brightness Difference between Arbitrary Subject and other Subject (Including Background) within Frame>

In addition, the subject color information acquisition unit 144 may acquire the information related to the brightness difference between the arbitrary subject and the other subject (including background) within the frame. Here, the arbitrary subject within the frame is a subject of an area in which the focus adjustment is performed as an example. When there is only one subject having different brightness among subjects of similar brightness, the videographer (or appreciator) particularly tends to direct awareness to the subject of the different brightness. Accordingly, the focus adjustment determination unit 15i, for example, may acquire information related to the brightness difference between the arbitrary subject and the other subject (including the background) within the frame and determine the behavior of the focus adjustment to suppress the focus adjustment when the brightness difference is less than a predetermined threshold value.

Furthermore, although the focus adjustment determination unit 15i has determined the behavior of the focus adjustment based on the imaging device motion information acquired as inter-frame change information and the subject color information acquired as information within one frame in this example, the behavior of the focus adjustment may be determined (corrected) by further acquiring other information related to a moving-image recording image of the imaging device 1i, information specific to an imaging element configured to output an image formed by the imaging optical system 2 within the imaging unit 12i as a moving-image signal, information related to setting of a target for detecting a contrast signal, direction information of focus adjustment, and presence/absence information of a focus adjustment target indication by the videographer (a specific example is shown below).

Furthermore, the above-described contrast signal is a signal representing a contrast obtained when a focus adjustment amount is acquired from a contrast value as in this example.

<Modified Example 11: Information Related to Moving-image Recording Image is Acquired>

Figure 32:
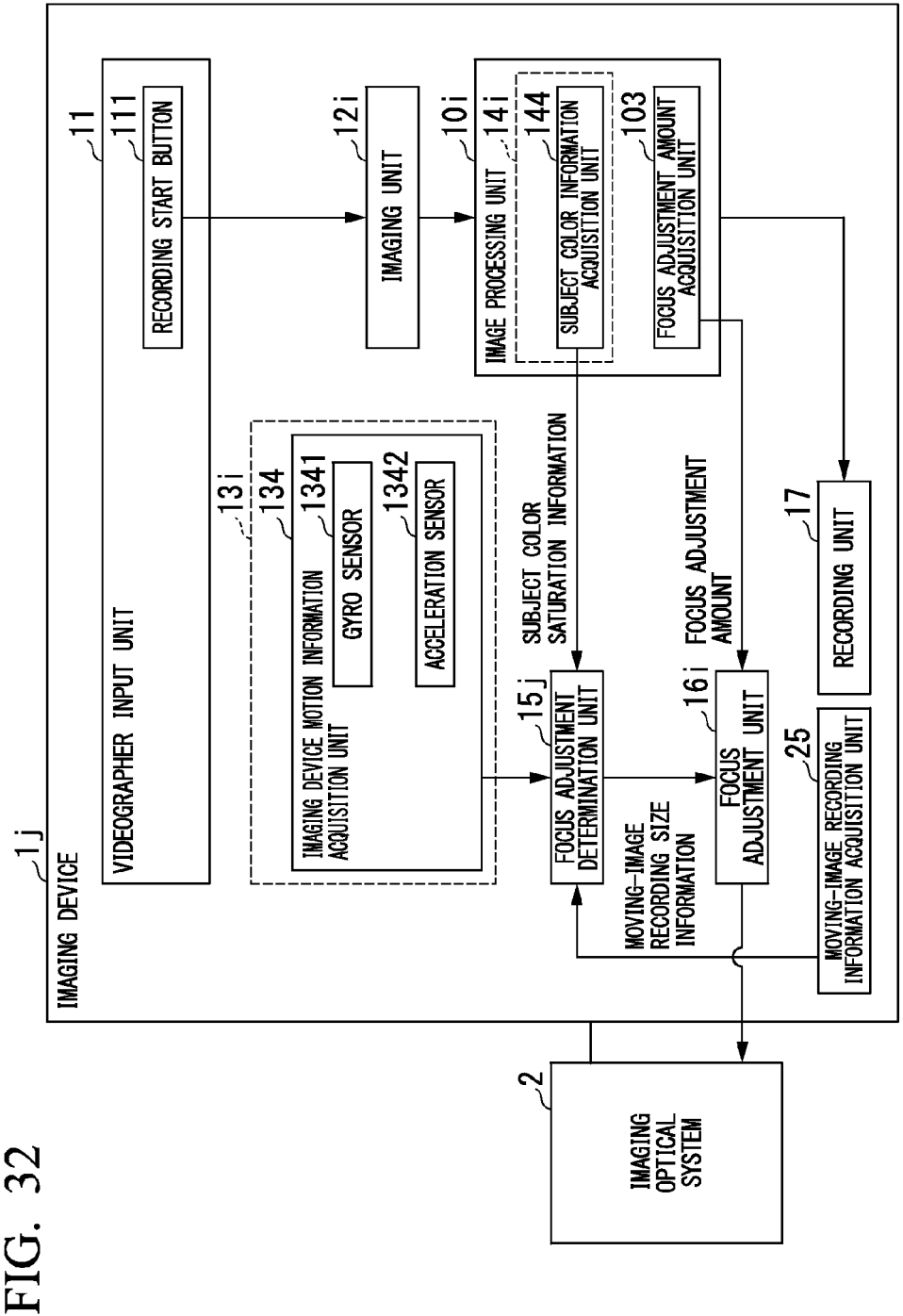
FIG. 32 is a schematic block diagram showing a configuration of an imaging device in a modified example 11 of the example 4 of the first embodiment.

FIG. 32 is a schematic block diagram showing a configuration of an imaging device 1j in the modified example 11 of the example 4 of the first embodiment. Also, elements common with FIG. 28 are assigned the same reference signs and a specific description thereof will be omitted. With respect to the configuration of the imaging device 1i of example 4 of FIG. 28, the configuration of the imaging device 1j in the modified example 11 of the example 4 of the first embodiment is configured by adding a moving-image recording information acquisition unit 25 and changing the focus adjustment determination unit 15i to a focus adjustment determination unit 15j.

Specifically, for example, the focus adjustment determination unit 15j may correct a range of a prohibition region shown in FIG. 29. Specifically, when a convex circumference on the prohibition region is represented by a function (for example, a quadratic function) and the prohibition region is a region bounded by the function and a straight line of y=0, the focus adjustment determination unit 15j, for example, may correct the range of the prohibition region by correcting the quadratic function.

<Modified Example 11-1: Recording Size Information of Moving Image is Acquired as Information Related to Moving-image Recording of Imaging Device>

The moving-image recording information acquisition unit 25, for example, acquires moving-image recording size information representing a recording size of the moving image as an example of information related to the moving-image recording of the imaging device. Because the appreciator tends to be sensitive to a change within a moving-image screen of the imaging device 1j when the recording size of the moving image is large (particularly remarkable when the number of pixels exceeds five million), there is a tendency for a change due to unnecessary focus adjustment to be less favorable than when the recording size of the moving image is small. Accordingly, the focus adjustment determination unit 15j, for example, corrects the behavior of the focus adjustment to suppress the focus adjustment operation as the recording size of the moving image increases.

Figure 33:
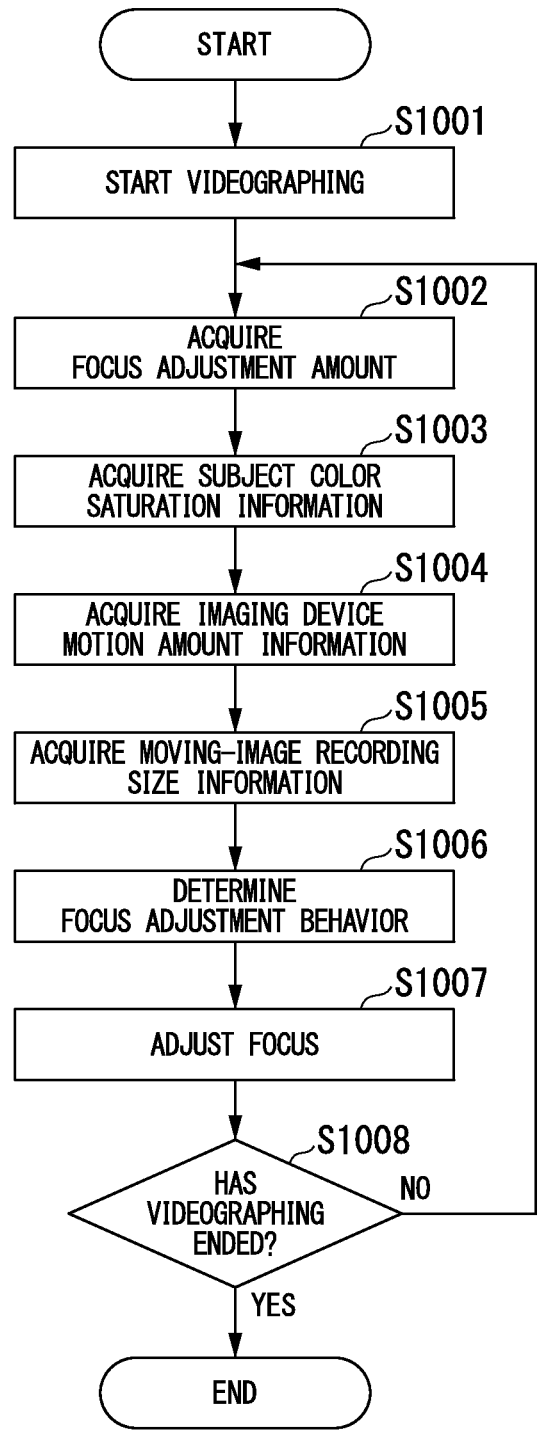
FIG. 33 is a flowchart showing an example of a flow of a process of the imaging device in the modified example 11 of the example 4 of the first embodiment.

FIG. 33 is a flowchart showing an example of a flow of a process of the imaging device 1j in the modified example 11 of the example 4 of the first embodiment.

Because the processes of steps S1001 to S1004 are the same as the processes of steps S901 to S904 of FIG. 30, a description thereof will be omitted.

(Step S1005) Next, the moving-image recording information acquisition unit 25 acquires moving-image recording size information as an example of information related to moving-image recording of an imaging device.

(Step S1006) Next, the focus adjustment determination unit 15j determines the behavior of the focus adjustment using the imaging device motion information acquired as inter-frame change information, subject color information acquired as information within one frame, and moving-image recording size information.

Because the processes of steps S1007 and S1008 are the same as the processes of steps S906 and S907 of FIG. 30, description thereof will be omitted. Accordingly, the process of this flowchart ends.

Accordingly, the focus adjustment determination unit 15j, for example, corrects the behavior of the focus adjustment to suppress the focus adjustment operation as the recording size of the moving image increases. Thereby, the imaging device 1j can be configured to prohibit the focus adjustment when the recording size of the moving image is large. Because of this, the imaging device 1j can provide a preferable moving image for the appreciator who tends to dislike a change due to unnecessary focus adjustment when the recording size of the moving image is large.

<Modified Example 11-2: Recording Codec Information is Acquired as Information Related to Moving-image Recording of Imaging Device>

In addition, the focus adjustment determination unit 15j may acquire the recording codec information as the information related to the moving-image recording of the imaging device. The attitude of compression noise is changed according to the recording codec of the moving image and the variation amount within the moving-image screen of the imaging device 1*j* changes (for example, block noise tends to appear when compression such as compression of H.264 is performed). Because the appreciator tends to dislike the occurrence of another change within the moving-image screen of the imaging device 1*j* according to focus adjustment more when the variation amount within the moving-image screen of the imaging device 1*j* is large, it is preferable to suppress the focus adjustment operation. Accordingly, the focus adjustment determination unit 15*j*, for example, may determine the behavior of the focus adjustment so that the focus adjustment easily operates in the following order according to the recording codec of the moving image. As an example, the ease of the operation of the focus adjustment is in the order of RAW, MPEG2, and H.264.

<Modified Example 11-3: Recording Frame Rate Information is Acquired as Information Related to Moving-image Recording of Imaging Device>

In addition, the focus adjustment determination unit 15*j*, for example, may acquire information of the recording frame rate as the information related to the moving-image recording of the imaging device. The smoothness of physical appearance of the moving image is changed according to the recording frame rate of the moving image. When it is not smooth, suppressing an unnecessary focus adjustment operation is seen as natural by the appreciator. Accordingly, the focus adjustment determination unit 15*j*, for example, may determine the behavior of the focus adjustment to suppress the focus adjustment when the moving-image recording frame rate is low.

Figure 34:
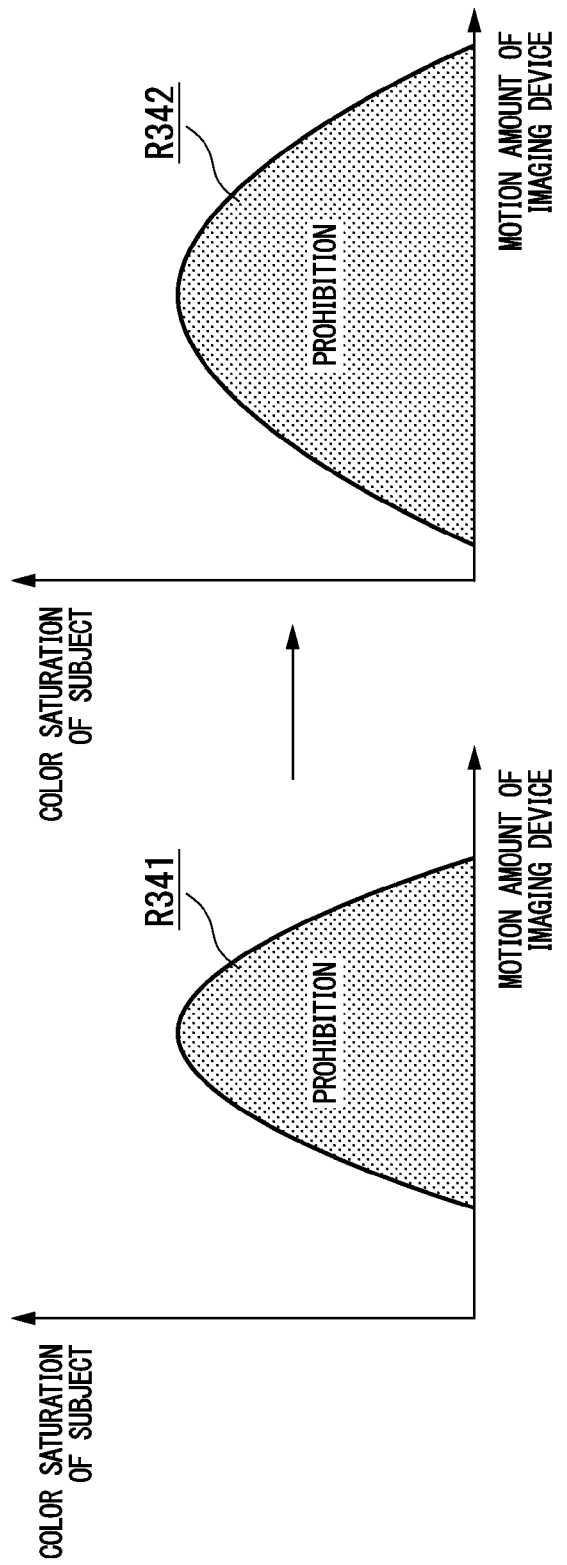
FIG. 34 is an example of a change in a prohibition region.

In this example, whether to prohibit or execute focus adjustment is determined using a quadratic function as shown in FIG. 29. In this modified example 11-3, the focus adjustment is not prohibited in a prohibition region R341, but the focus adjustment can be prohibited in a prohibition region R342 by extending the prohibition region R341 to the prohibition region R342 as shown in FIG. 34 in some cases. Accordingly, the focus adjustment determination unit 15*j* may correct the behavior of the focus adjustment by correcting the quadratic function for determining the behavior of the focus adjustment in addition to the above-described acquired information.

FIG. 34 is an example of a change in a prohibition region. In FIG. 34, the vertical axis is subject color saturation and the horizontal axis is a motion amount of the imaging device. In FIG. 34, the left prohibition region R341 is before correction and the right prohibition region R342 is after the correction. According to the correction, the prohibition region R341 is extended to the prohibition region R342. In this example, the focus adjustment determination unit 15*j* extends the prohibition region R341 to the prohibition region R342 by correcting a predetermined quadratic function. Then, the focus adjustment determination unit 15*j* determines whether the xy coordinates obtained by setting the acquired color saturation of the subject as a y-coordinate value and setting the motion amount of the imaging device 1*j* as an x-coordinate value are included in the prohibition region R342. Then, when the xy coordinates are included in the prohibition region R342, the focus adjustment determination unit 15*j* determines the behavior of the focus adjustment to prohibit the focus adjustment. On the other hand, when the xy coordinates are not included in the prohibition region R342, the focus adjustment determination unit 15*j* determines the behavior of the focus adjustment so that the focus adjustment is not prohibited.

<Modified Example 12: Information Specific to Imaging Element>

Figure 35:
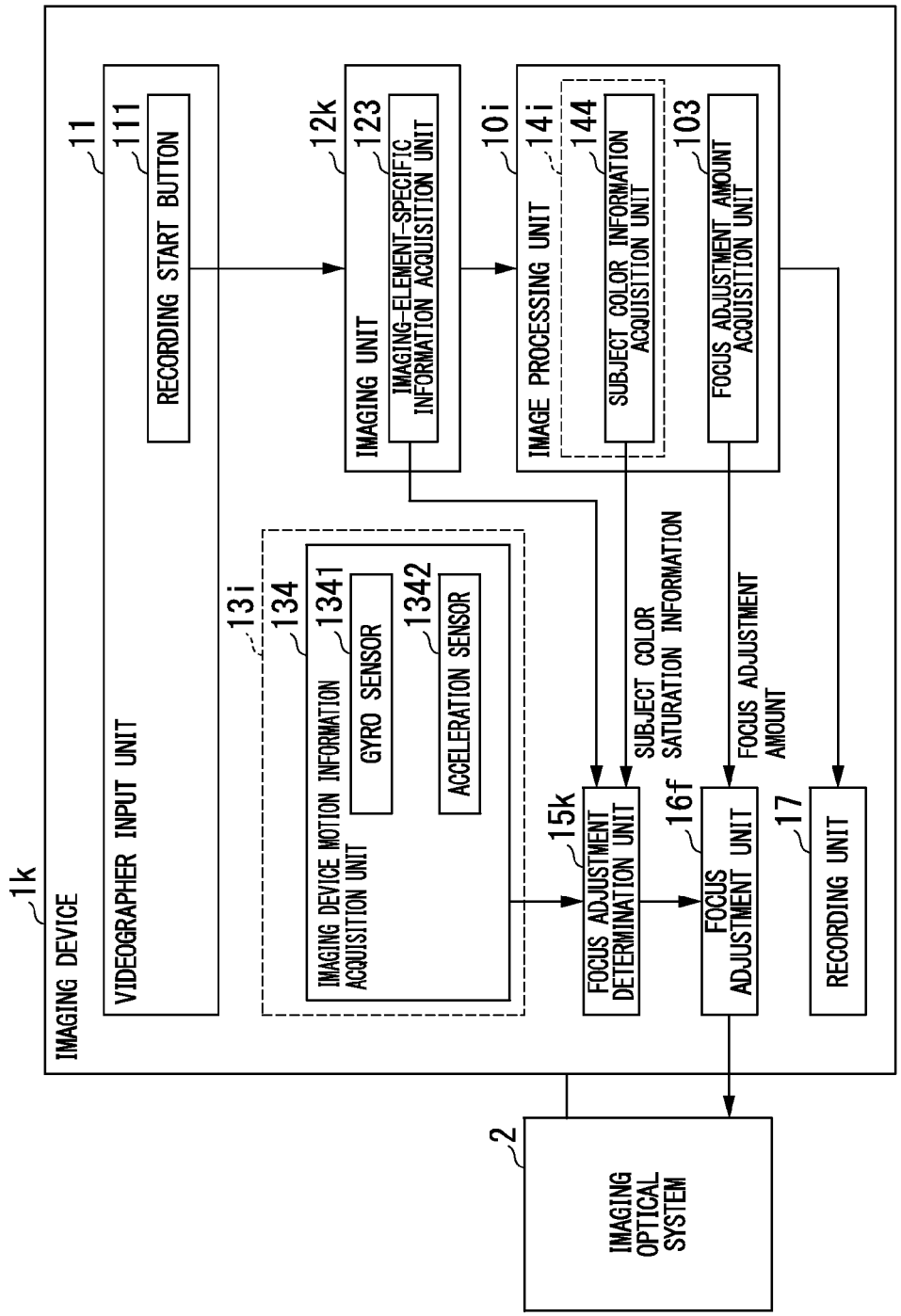
FIG. 35 is a schematic block diagram showing a configuration of an imaging device in a modified example 12 of the example 4 of the first embodiment.

Next, modified example 12 will be described. FIG. 35 is a schematic block diagram showing a configuration of an imaging device 1*k* in the modified example 12 of the example 4 of the first embodiment. Also, elements common with FIG. 28 are assigned the same reference signs and specific description thereof will be omitted. With respect to the configuration of the imaging device 1*i* of example 4 of FIG. 28, the configuration of the imaging device 1*k* in the modified example 12 of the example 4 of the first embodiment is configured by changing the imaging unit 12*i* to an imaging unit 12*k* and changing the focus adjustment determination unit 15*i* to a focus adjustment determination unit 15*k*. The imaging unit 12*k* includes an imaging-element-specific information acquisition unit 123.

The imaging-element-specific information acquisition unit 123 acquires imaging-element-specific information which is information specific to the imaging element, and outputs the acquired imaging-element-specific information to the focus adjustment determination unit 15*k*.

<Modified Example 12-1: Size Information of Imaging Element>

For example, the imaging-element-specific information acquisition unit 123 acquires imaging element size information representing a size of the imaging element as an example of the imaging-element-specific information. When imaging is performed at the same angle of view, the depth of field of an image to be captured is changed according to the size of the imaging element. Although the degree of attention to one subject becomes high when the depth of field is shallow, it is undesirable for a subject of attention to be in a blurred state. Accordingly, the focus adjustment determination unit 15*k* may determine the behavior of the focus adjustment so that the focus adjustment tends to operate when the imaging element is large. Although the focal distance becomes long and the field depth becomes shallow when the imaging element is large if imaging is performed at the same angle of view, it is possible to rapidly change the subject from a blurred state to a focused state by promoting the focus adjustment.

Figure 36:
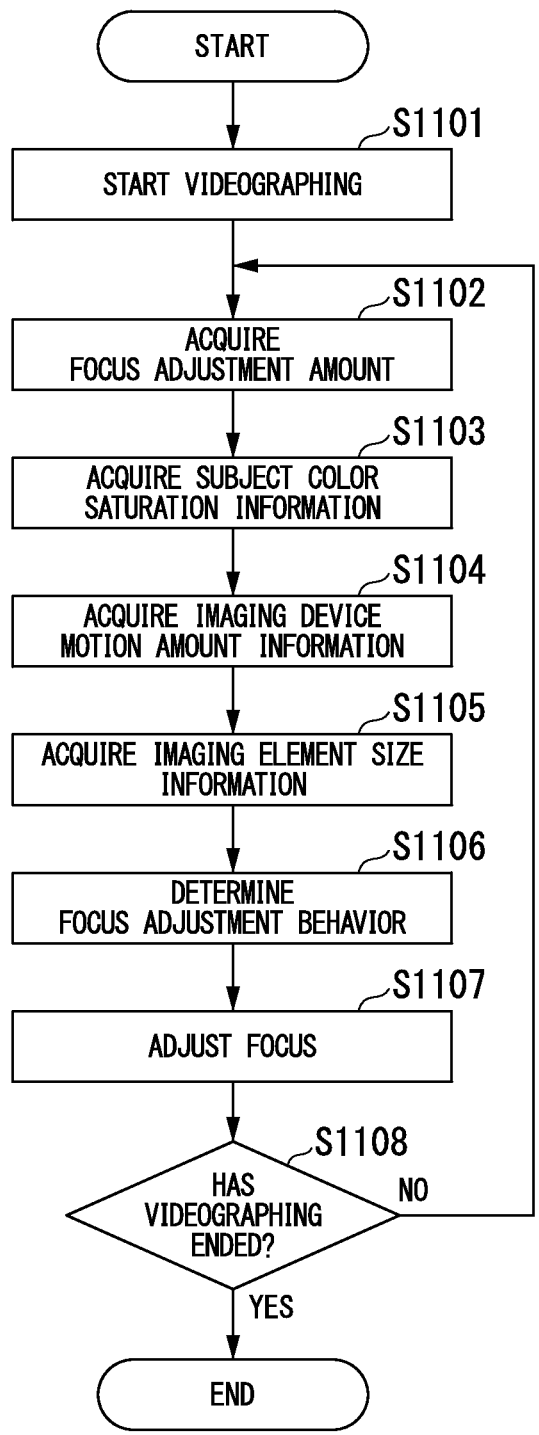
FIG. 36 is a flowchart showing an example of a flow of a process of the imaging device in a modified example 12 of the example 4 of the first embodiment.

FIG. 36 is a flowchart showing an example of a flow of a process of the imaging device in the modified example 12 of the example 4 of the first embodiment.

Because the processes of steps S1101 to S1104 are the same as the processes of steps S901 to S904 of FIG. 30, a description thereof will be omitted.

(Step S1105) Next, the imaging-element-specific information acquisition unit 123 acquires imaging element size information as an example of imaging-element-specific information.

(Step S1106) Next, the focus adjustment determination unit 15*k* determines the behavior of the focus adjustment using the imaging device motion amount information acquired as inter-frame change information, subject color saturation information acquired as information within one frame, and imaging element size information.

Because the processes of steps S1107 and S1108 are the same as the processes of steps S906 and S907 of FIG. 30, description thereof will be omitted. Accordingly, the process of this flowchart ends.

<Modified Example 12-2: Color Filter Array of Imaging Element>

Also, the imaging-element-specific information acquisition unit 123 may acquire the color filter array of the imaging element as an example of information specific to the imaging element. When Bayer arrangement and Bayer interpolation for color filters of an imaging element are performed, jaggies tend to occur within a moving image. When line arrangement and interpolation for the color filter are absent, the jaggies do not occur as easily. Accordingly, the focus adjustment determination unit 15k may determine the behavior of the focus adjustment to suppress the focus adjustment operation when the Bayer arrangement for the color filters of the imaging element is made.

As a specific correction process, as in the "case in which the information related to the moving-image recording of the imaging device is acquired," the focus adjustment determination unit 15k, for example, may correct the quadratic function so that the focus adjustment tends to be prohibited when the color filter arrangement of the imaging element is the Bayer arrangement.

<Modified Example 13: Information Related to Setting of Target for Detecting Contrast Signal>

Figure 37:
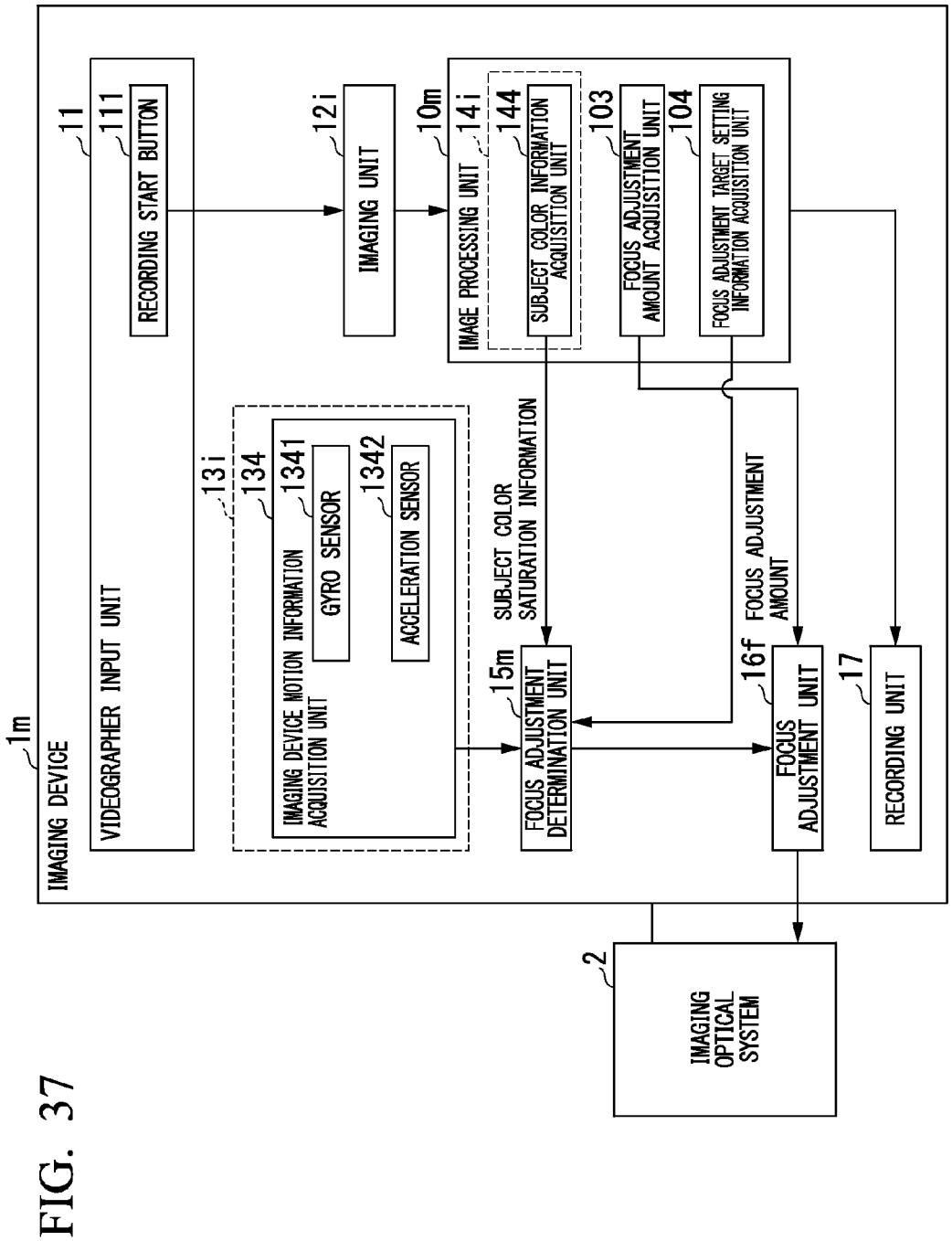
FIG. 37 is a schematic block diagram showing a configuration of an imaging device in the modified example 13 of the example 4 of the first embodiment.

Next, modified example 13 will be described. FIG. 37 is a schematic block diagram showing a configuration of an imaging device 1m in the modified example 13 of the example 4 of the first embodiment. Also, elements common with FIG. 28 are assigned the same reference signs and specific description thereof will be omitted. With respect to the configuration of the imaging device 1i of example 4 of FIG. 28, the configuration of the imaging device 1m in the modified example 13 of the example 4 of the first embodiment is configured by changing the image processing unit 10i to an image processing unit 10m and changing the focus adjustment determination unit 15i to a focus adjustment determination unit 15m. The configuration of the image processing unit 10m in modified example 13 is configured by adding a focus adjustment target setting information acquisition unit 104 with respect to the configuration of the image processing unit 10i of FIG. 28.

The focus adjustment target setting information acquisition unit 104 acquires the focus adjustment target setting information related to setting of a focus adjustment target. Specifically, for example, the focus adjustment target setting information acquisition unit 104 acquires contrast signal setting information related to setting of a target for detecting a contrast signal as an example of focus adjust target setting information.

When the focus adjustment amount is acquired from the contrast value as in this example, whether the detected contrast value tends to change is changed according to setting (for example, a size or the like) of a target for detecting the contrast signal. For example, when a target for detecting the contrast signal is small, the detected contrast value tends to be changed and an excessive focus adjustment operation tends to occur. Accordingly, the focus adjustment determination unit 15m, for example, determines the behavior of the focus adjustment to suppress the focus adjustment operation when a target for detecting the contrast signal is small. As a specific correction process, as in the "case in which the information related to the moving-image recording of the imaging device is acquired," the focus adjustment determination unit 15m, for example, may correct the quadratic function so that the focus adjustment tends to be prohibited when the target for detecting the contrast signal is small.

Figure 38:
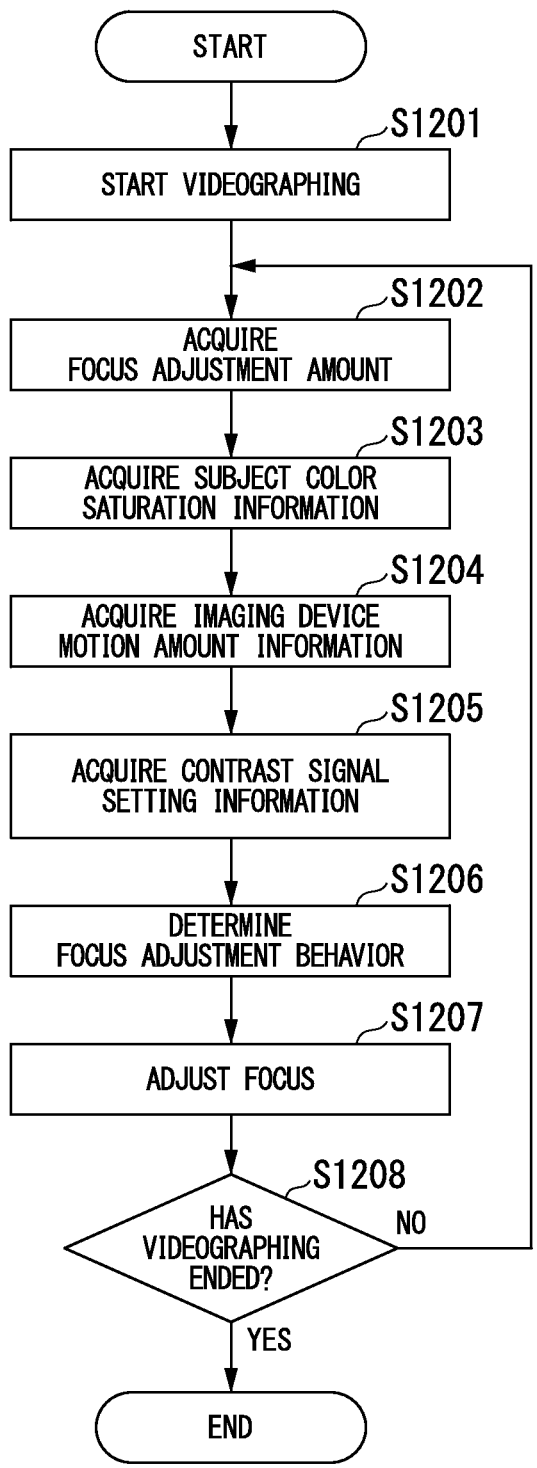
FIG. 38 is a flowchart showing an example of a flow of a process of an imaging device in a modified example 13 of the example 4.

FIG. 38 is a flowchart showing an example of a flow of a process of the imaging device 1m in the modified example 13 of the example 4 of the first embodiment.

Because the processes of steps S1201 to S1204 are the same as the processes of steps S901 to S904 of FIG. 30, a description thereof will be omitted.

(Step S1205) Next, the focus adjustment target setting information acquisition unit 104 acquires contrast signal setting information as an example of focus adjustment target setting information.

(Step S1206) Next, the focus adjustment determination unit 15k determines the behavior of the focus adjustment using the imaging device motion amount information acquired as inter-frame change information, subject color saturation information acquired as information within one frame, and contrast signal setting information.

Because the processes of steps S1207 and S1208 are the same as the processes of steps S906 and S907 of FIG. 30, description thereof will be omitted. Accordingly, the process of this flowchart ends.

<Modified Example 14: Direction Information of Focus Adjustment is Acquired>

Figure 50:
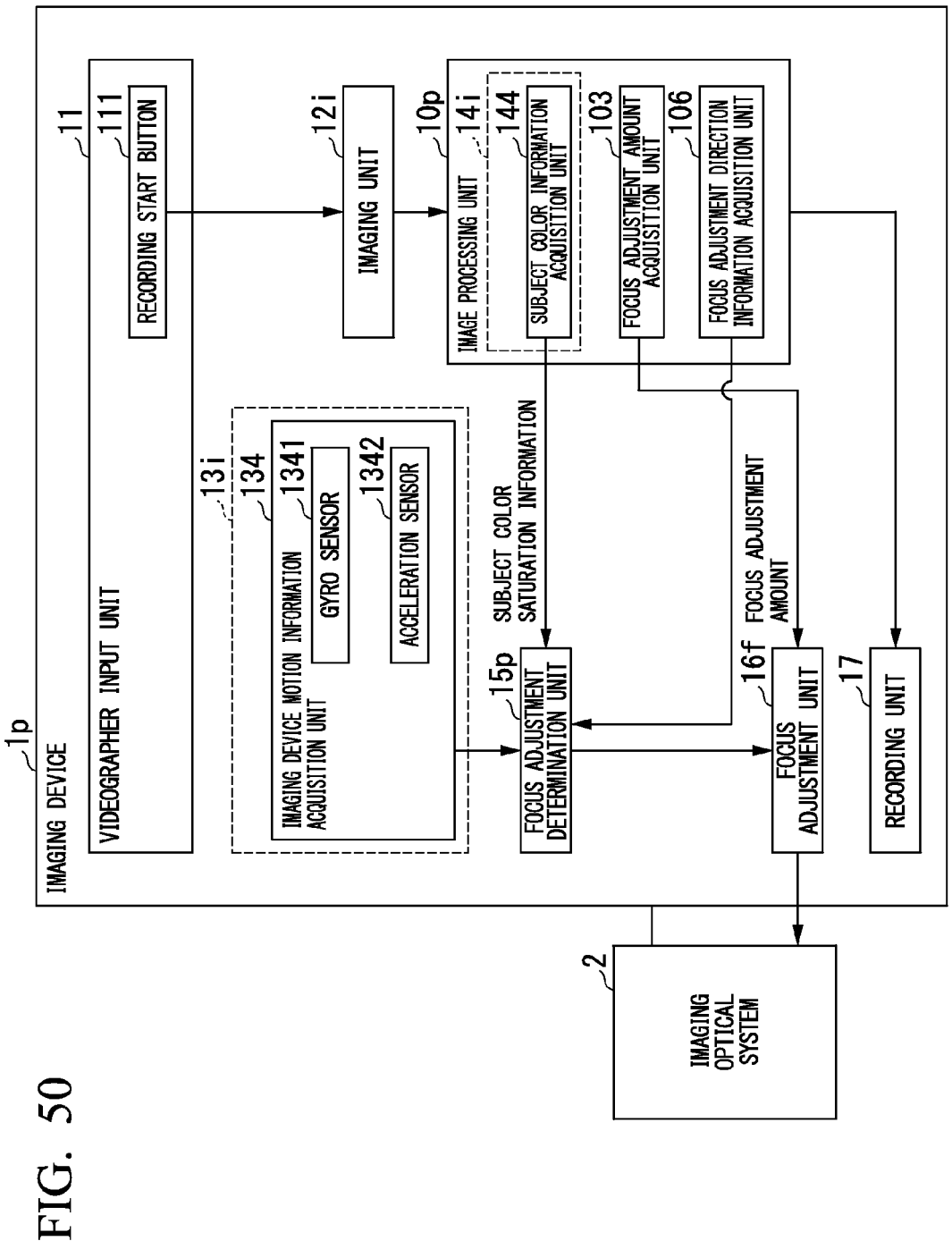
FIG. 50 is a schematic block diagram showing a configuration of an imaging device in a modified example 14 of the example 4.

FIG. 50 is a schematic block diagram showing a configuration of an imaging device 1p in the modified example 14 of the example 4 of the first embodiment. Also, elements common with FIG. 28 are assigned the same reference signs and specific description thereof will be omitted. With respect to the configuration of the imaging device 1i of example 4 of FIG. 28, the configuration of the imaging device 1p in the modified example 13 of the example 4 of the first embodiment is configured by changing the image processing unit 10i to an image processing unit 10p and changing the focus adjustment determination unit 15i to a focus adjustment determination unit 15p. The configuration of the image processing unit 10p in modified example 14 is configured by adding a focus adjustment direction information acquisition unit 106 with respect to the configuration of the image processing unit 10i of FIG. 28.

According to human senses, there is a tendency to pay attention to a front object. Accordingly, when the focus adjustment moves from the rear to the front, it is preferable to rapidly perform the focus adjustment because humans are considered to want to front objects sooner. On the other hand, when the focus adjustment moves from the front to the rear, it is preferable to slowly perform the focus adjustment because humans are considered not to want to direct a line of sight away from the front object. The focus adjustment is possible without incompatibility because the behavior of the focus adjustment is determined according to this tendency. Specifically, it is preferable to correct the behavior of the focus adjustment determined in this example as in modified examples 11 to 13.

<Modified Example 15: Presence/Absence Information of Focus Adjustment Target Indication by Videographer is Acquired>

In this example, the videographer indicates the focus adjustment target. In this case, the videographer pays a higher degree of attention to the focus adjustment target than when the imaging device has automatically determined the focus adjustment target. Accordingly, it is preferable to promote the focus adjustment when there is a focus adjustment target indication from the videographer.

<Example 5>

Next, example 5 will be described. In this example, the behavior of the focus adjustment is determined using information related to an inter-frame change, information of a videographing situation and a subject situation determined from information within one frame, and information obtained by approximating a human physical focus adjustment characteristic as information related to human subjective focus adjustment. In this example, description will be given using a scene in which a zoom-out operation is performed from a telephoto side to a wide angle side indoors as in FIG. 39.

Figure 39:
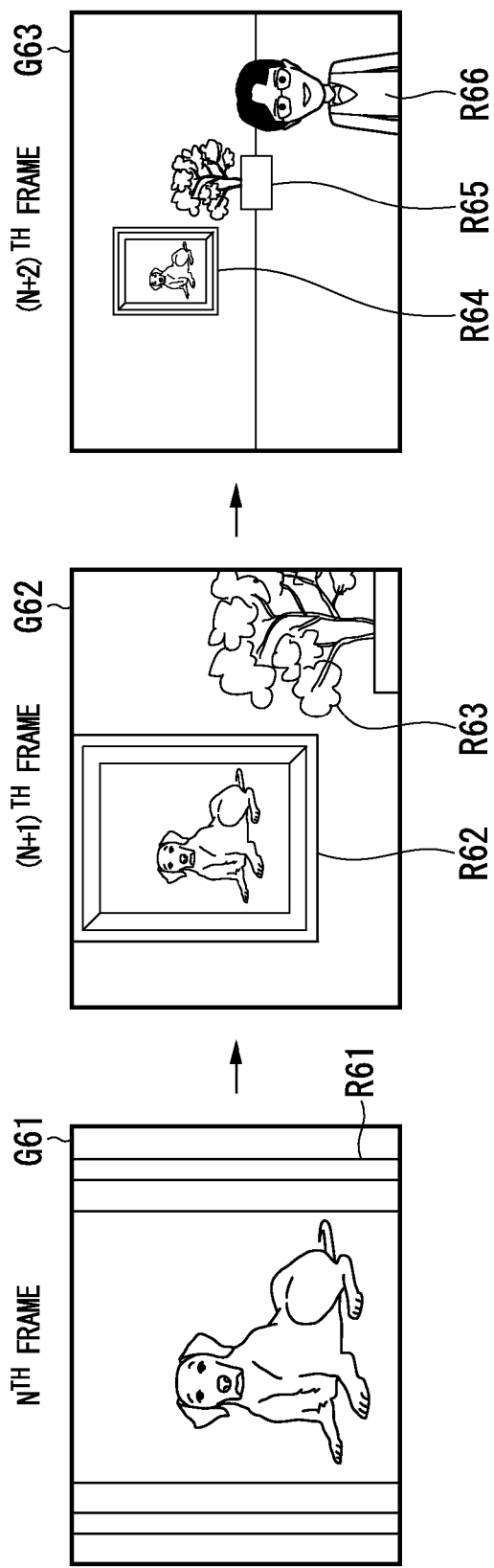
FIG. 39 is a diagram showing an example of a videographed scene in an example 5 of the first embodiment.

FIG. 39 is a diagram showing an example of a videographed scene in example 5. In FIG. 39, first, a zoom-out operation is performed from a state in which a picture of a comparatively brightly colored dog and frame images of videographing scenes appearing in the order of a darkly colored flower and a brightly colored human are shown. In FIG. 39, an image region R61 of the picture of the brightly colored dog imaged in a large size by an imaging operation in a telephoto mode is shown in an image G61 of an $N^{th}$ frame. In an image G62 of an $(N+1)^{th}$ frame, an image region R62 of picture of the brightly colored dog and an image region R63 of the darkly colored flower are shown in an image captured after zooming out to a wider angle side than in the $N^{th}$ frame. In an image G63 of an $(N+2)^{th}$ frame, an image region R64 of the picture of the brightly colored dog, an image region R65 of the darkly colored flower, and an image region R66 of the brightly colored human are shown in an image captured after zooming out to a wider angle side than in the $(N+1)^{th}$ frame.

Figure 40:
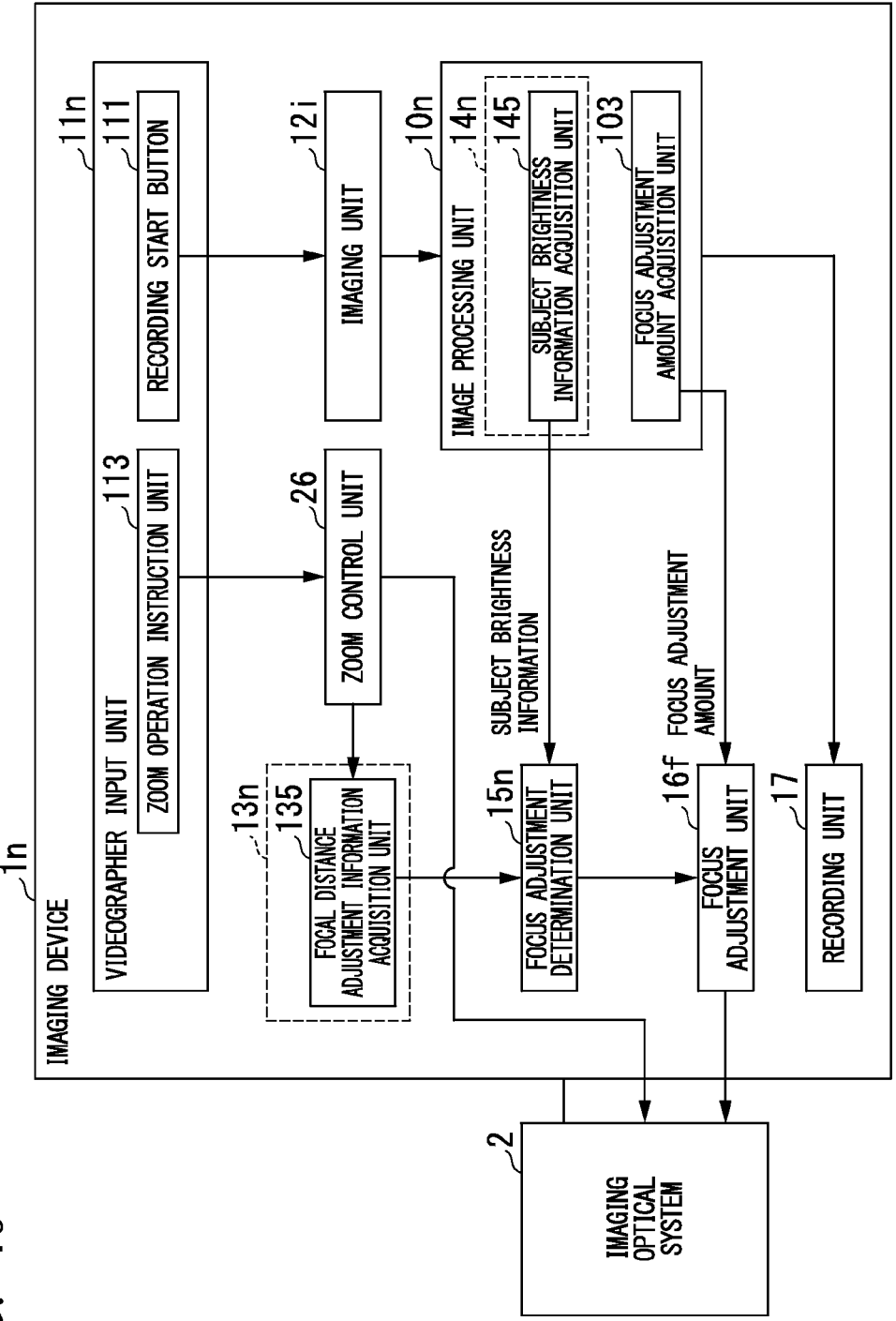
FIG. 40 is a schematic block diagram showing a configuration of an imaging device in the example 5 of the first embodiment.

FIG. 40 is a schematic block diagram showing a configuration of an imaging device 1n in example 5. Also, elements common with FIG. 4 are assigned the same reference signs and specific description thereof will be omitted. With respect to the configuration of the imaging device 1a of example 1 of FIG. 4, the configuration of the imaging device 1n in example 5 is configured by adding a zoom control unit 26, changing the image processing unit 10 to an image processing unit 10n, changing the videographer input unit 11 to a videographer input unit 11n, changing the imaging unit 12a to an imaging unit 12i, changing the inter-frame change information acquisition unit 13a to an inter-frame change information acquisition unit 13n, changing the focus adjustment determination unit 15a to a focus adjustment determination unit 15n, and changing the focus adjustment unit 16 to a focus adjustment unit 16n. The image processing unit 10n includes an intra-frame information acquisition unit 14n and a focus adjustment amount acquisition unit 103. The intra-frame information acquisition unit 14n includes a subject brightness information acquisition unit 145. The inter-frame change information acquisition unit 13n includes a focal distance adjustment information acquisition unit 135.

Next, a process of each part of the imaging device 1n will be described in the order of processing at the time of moving-image recording.

<Process 1>

The videographer sets an area in which focus adjustment is performed. Here, an approximately lower-right area is designated to perform focus adjustment for an approximately lower-right subject of the screen of the imaging device 1n after zoom-out. At this time, the videographer input unit 11 receives an input of an area in which the focus adjustment is performed by the videographer and causes information of the area in which the focus adjustment is performed by the videographer representing the received input to be stored in a memory (not shown).

<Process 2>

The recording start button 111 receives a videographing start instruction of the videographer and outputs the received videographing start instruction to the imaging unit 12i. Upon receiving the videographing start instruction input from the recording start button 111, the imaging unit 12i generates a moving-image signal by converting light incident from the subject via the imaging optical system 2 into an electrical signal at a predetermined shutter speed. Thereby, the imaging unit 12i starts the moving-image recording according to the instruction of the videographer.

Also, when the videographer input unit 11 includes a touch panel, the videographer input unit 11 may receive the videographer's instruction according to an operation of the touch panel. In addition, when the videographer input unit 11 includes a microphone, the videographer input unit 11 may receive the videographer's instruction using voice recognition.

In addition, the videographer operates the zoom operation instruction unit 113 to start a zoom operation. The zoom operation instruction unit 113 outputs operation information representing the received operation to the zoom control unit 26.

The zoom control unit 26 executes a zoom-in or zoom-out operation by controlling the imaging optical system 2 based on the operation information input from the zoom operation instruction unit 113. Here, the zoom control unit 26 holds focal distance adjustment information (for example, zoom operation speed information representing a zoom operation speed).

<Process 3>

The focus adjustment amount acquisition unit 103 acquires a focus adjustment amount for setting a focus adjustment target area in a focused state based on information of an area in which the focus adjustment is performed received by the videographer input unit 11, and outputs the acquired focus adjustment amount to the focus adjustment unit 16f. As an example in this example, the focus adjustment amount acquisition unit 103 acquires a contrast value from a moving-image signal obtained from the imaging unit 12i, and obtains the focus adjustment amount.

<Process 4>

The subject brightness information acquisition unit 145 acquires subject brightness information as information within one frame, and outputs the acquired subject brightness information to the focus adjustment determination unit 15n. At this time, the subject brightness information acquisition unit 145 acquires an average value of luminance pixel values within the area in which the focus adjustment is performed as the subject brightness information as an example. Also, the present invention is not limited thereto. The subject brightness information acquisition unit 145 may extract a subject region from a frame image, and acquire an average value of luminance pixel values within a subject region in the vicinity of the area in which the focus adjustment is performed as the subject brightness information. Here, the vicinity of the area in which the focus adjustment is performed, for example, includes an area in which the focus adjustment is performed, and also includes pixels separated from the area by a predetermined number of pixels.

<Process 5>

The focal distance adjustment information acquisition unit 135 acquires focal distance adjustment information (for example, zoom operation speed information representing a zoom operation speed) as the information related to an inter-frame change, and outputs the acquired focal distance adjustment information to the focus adjustment determination unit 15n. Also, here, although the focal distance adjustment information acquisition unit 135 may classify a zoom speed as one of three types of "fast," "moderate," and "slow" speeds by comparing the zoom speed to a predetermined threshold value registered in the imaging device 1n and use a classification result as the focal distance adjustment information thereafter as an example, the acquired zoom speed may be used without change.

<Process 6>

The focus adjustment determination unit 15n, for example, determines the behavior of the focus adjustment in the following process from the subject brightness information acquired by the subject brightness information acquisition unit 145 and the focal distance adjustment information (for example, zoom operation speed information) acquired by the focal distance adjustment information acquisition unit 135.

An equation $f_{base}(t)$ of a temporal characteristic from a focus adjustment start to a focused state serving as motion of reference focus adjustment is pre-stored in a memory (not shown) within the imaging device 1n. The equation $f_{base}(t)$ of the temporal characteristic from the focus adjustment start to the focused state, for example, is represented by a polynomial of the following Equation (7).

$$f_{base}(t)=C_1t^4+C_2t^3+C_3t^2+C_4t+C_5 \quad \text{Equation (7)}$$

Here, t is the number of frames, and $C_1$, $C_2$, $C_3$, $C_4$, and $C_5$ are predetermined constants.

Figure 41:
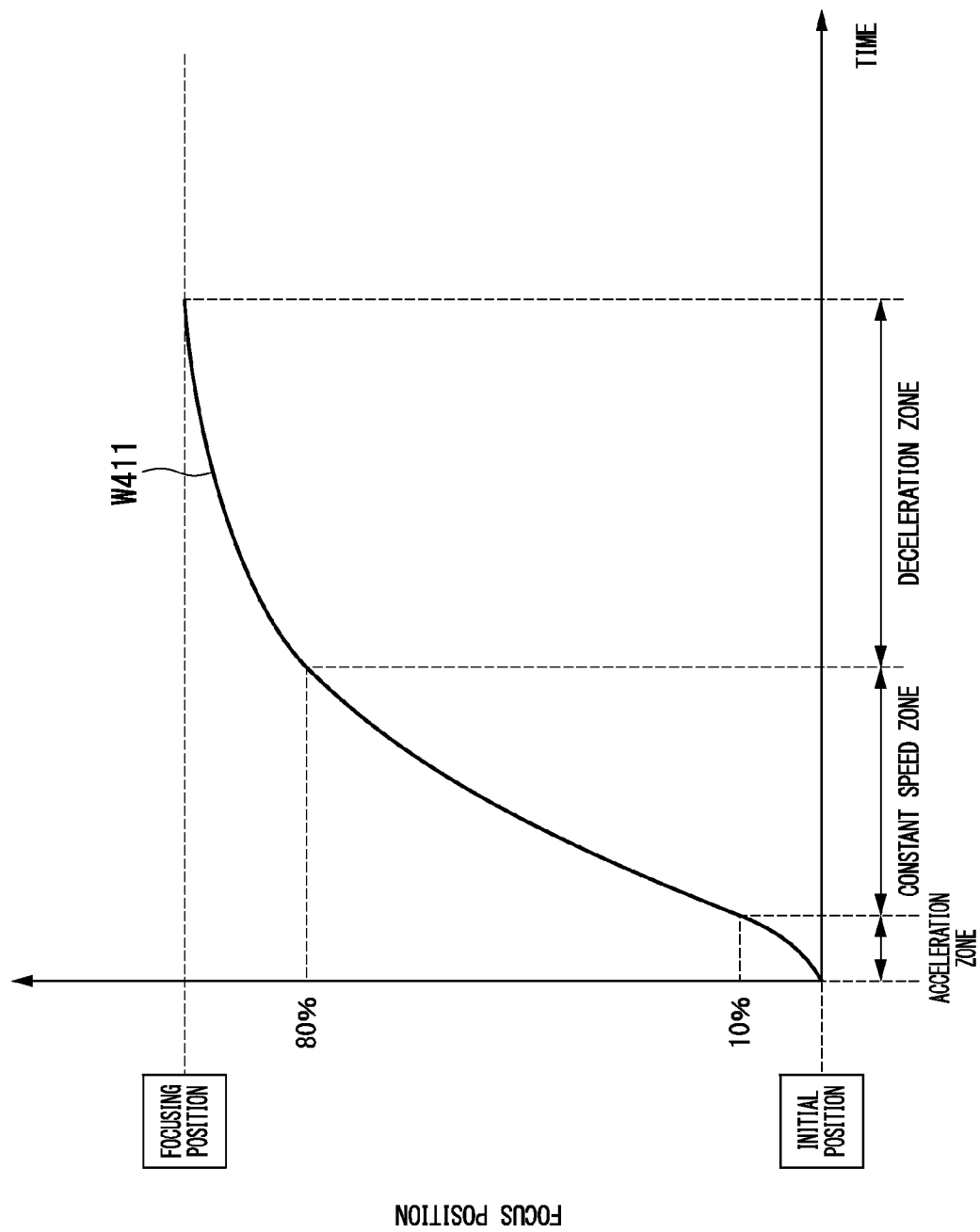
FIG. 41 is an example of a temporal characteristic from a focus adjustment start to a focused state.

Also, although the polynomial of Equation (7) is a quartic polynomial, the present invention is not limited thereto. The polynomial of Equation (7) may be a polynomial of another degree. In addition, at this time, it is preferable that the temporal characteristic from the focusing adjustment start to the focused state prepared as in $f_{base}(t)$ satisfy the following four conditions as shown in FIG. 41. This is a condition for satisfying a result obtained by approximating a human physical focus adjustment characteristic shown in FIG. 51 (≈human subjective focus adjustment characteristic).

The first condition is that deceleration of focus adjustment until the state reaches the focused state start in an interval of 10% to 80% until the position reaches a focus position of a focused state from a focus position of a focus adjustment start time.

The second condition is that deceleration for stopping the behavior of the focus adjustment be gentler than acceleration for starting the behavior of the focus adjustment.

The third condition is that acceleration movement for starting the behavior of the focus adjustment be performed for a time of up to approximately 10% until the position reaches the focus position of the focused state from the focus position of the focus adjustment start time.

The fourth condition is that 0.7 sec or more is required for the focus adjustment to be ultimately performed.

Figure 53:
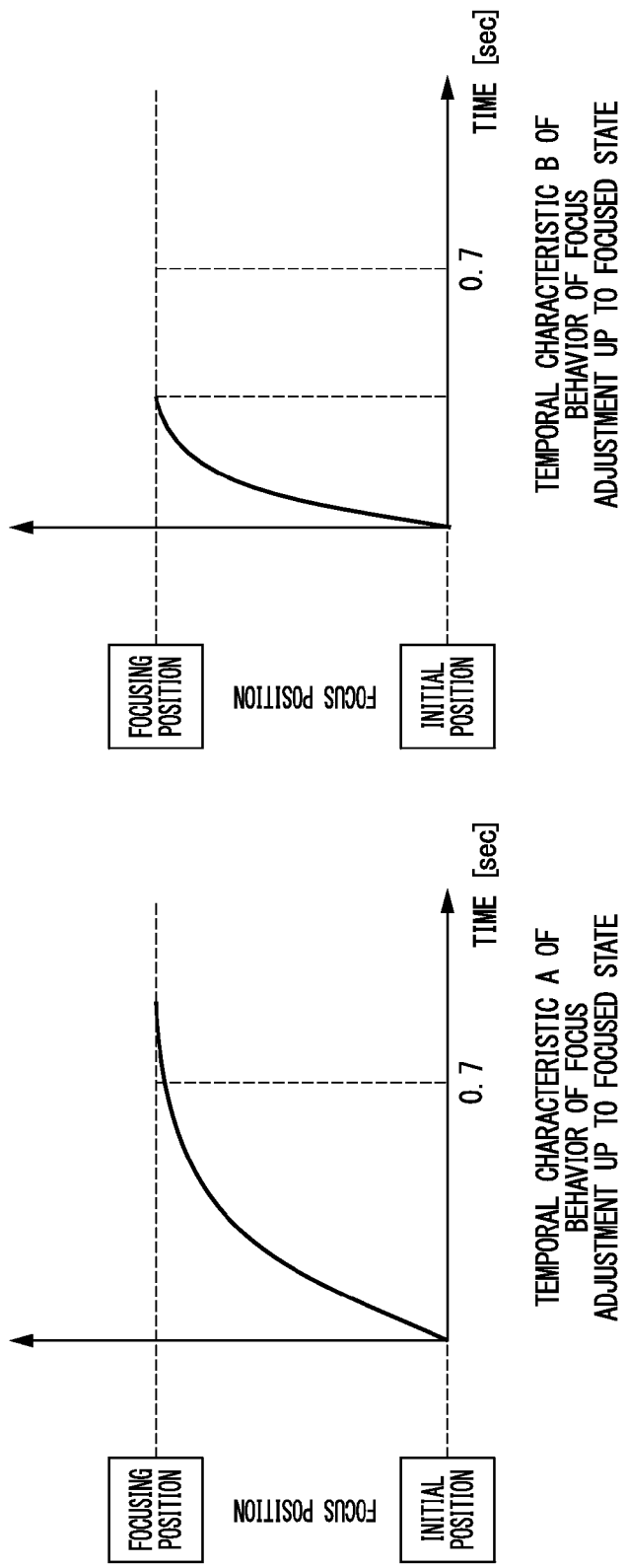
FIG. 53 is an example of a temporal characteristic from a focus adjustment start to a focused state in an example 5 of the first embodiment.

The fourth condition is derived from the fact that the majority of examinees required 0.7 sec or more for focus adjustment after measurement for obtaining a physical focus adjustment characteristic of a human eye disclosed in FIG. 51 was performed for a plurality of people. Actually, a result as in FIG. 54 was obtained after a subjective evaluation experiment of eleven-step evaluation (10 points: likable, 5 points: both fine, and 0 points: unlikable) related to "likability of the video" in a certain examinee group was performed using a video on which focus adjustment was performed by applying temporal characteristics A and B of the focus adjustment until the focused state reached that shown in FIG. 53, and providing support for the effectiveness of this. Although this likability changes to a certain extent according to a videographing situation or the like, there is a strong tendency not to dislike a moving image in which a required time until the position reaches the focus position of the focused state from the focus position of the focus adjustment start time exceeds at least 0.7 sec.

FIG. 41 is an example of the temporal characteristic from the focus adjustment start to the focused state. In FIG. 41, the vertical axis represents a focus position, the horizontal axis represents time, and a curve W411 representing the temporal characteristic from the focus adjustment start to the focused state is shown. When the initial position is set to 0% and the focusing position is set to 100%, an interval from the initial position to a position of 10% represents an acceleration zone in which the focus position changes at an accelerated rate. A zone from a position of 10% to a position of 80% represents a constant speed zone in which the focus position changes at a constant speed. A zone from the position of 80% to the focusing position is a deceleration zone in which the focus position changes at a reduced speed.

When the focus adjustment is performed using a hill-climbing AF scheme as in this embodiment, it is necessary to perform a wobbling operation. Here, monotonous motion is performed in a zone from 10% of a process from the focusing position of the initial state to the focus position of the focused state to the start of deceleration of the behavior of the focus adjustment in the human physical/subjective focus adjustment as in FIG. 51, and it is preferable to perform focus adjustment in this manner even in the imaging device. Accordingly, it is preferable to perform wobbling (an operation of determining a focus adjustment direction and focus adjustment completion) outside such a zone. In addition, reducing the accuracy of focus adjustment is also considered by determining the above-described temporal characteristic so that monotonous acceleration movement is performed in a zone from 10% of a process until the focus position of the imaging optical system 2 reaches the focus position (focusing position) in the focused state from the focus position (initial position) of the focus adjustment start time to the start of the deceleration of the focus adjustment. However, there may be less incompatibility for the videographer in a method in which the direction of the focus adjustment does not seem to be changed than in a method of increasing strict accuracy of focus adjustment.

As the next process, the focus adjustment determination unit 15n determines a focus adjustment control coefficient α, for example, by referring to a table T5 of FIG. 42, from the subject brightness information acquired by the subject brightness information acquisition unit 145 and the zoom operation speed information acquired by the focal distance adjustment information acquisition unit 135. Here, as α decreases, the speed of the focus adjustment becomes slow and consequently the focus adjustment is suppressed. Here, the table T5 in which the focus adjustment control coefficient α is associated for every set of a zoom operation speed and a luminance pixel average value is stored in a memory (not shown). For example, the focus adjustment determination unit 15n determines the focus adjustment control coefficient α by reading the focus adjustment control coefficient α corresponding to the set of the acquired subject brightness information and the acquired focal distance adjustment information from the table T5 of the memory.

FIG. 42 is an example of the table T5 in which the focus adjustment control coefficient α is associated for every set of a zoom operation speed and a luminance pixel average value (a numerical value within the table corresponds to α). Because the appreciator does not want to pay attention to details of an overexposed subject which has excessively high luminance and appears whitened in an example of FIG. 42, the focus adjustment control coefficient α is smaller when the luminance is 240 or more than when the luminance is greater than or equal to 200 and less than or equal to 239. Consequently, the focus adjustment determination unit 15n, for example, further decreases the focus adjustment control coefficient α when the luminance is 240 or more than when the luminance is greater than or equal to 200 and less than or equal to 239 by referring to the table T5 of FIG. 42. In addition, when the luminance is less than or equal to 239, the focus adjustment control coefficient α is large when the luminance is large. Consequently, the focus adjustment determination unit 15n, for example, increases the focus adjustment control coefficient α when the luminance is high if the luminance is less than or equal to 239 by referring to the table T5 of FIG. 42.

As the next process, the focus adjustment determination unit 15n, for example, determines the temporal characteristic $f_{AF}(t)$ of the focus adjustment up to the ultimate focused state according to the following Equation (8).

$$f_{AF}(t) = f_{base}(\alpha t) \qquad \text{Equation (8)}$$

Here, t is the number of frames, and $f_{base}(\alpha t)$ is below a focusing position <Process 7>

Based on the behavior (for example, $f_{AF}(t)$) of the focus adjustment determined by the focus adjustment determination unit 15n, the focus adjustment unit 16f controls a focus adjustment optical system of the imaging optical system 2 and adjusts the focus.

<Process 8>

Processes 3 to 7 are iterated until the videographer input unit 11n receives a videographing end instruction by the videographer.

When the subject for which the focused state is desired to be obtained is changed while the zoom-out operation is performed as in FIG. 39, the videographer (or appreciator) tends to determine to set the subject in the focused state when the bright subject appears. Consequently, the focus adjustment determination unit 15n, for example, may determine the behavior of the focus adjustment to shorten a time required to reach the focused state by increasing the focus adjustment control coefficient α when the subject is bright. Thereby, because a time until the focused state is reached is shortened when the subject is bright, the imaging device 1n can rapidly satisfy a desire for setting the state to the focused state of the videographer (or appreciator) and provide a better moving image for the videographer (or appreciator).

Because the subject to be in focus successively changes when the focal distance adjustment speed (zoom speed) is fast, it tends to be difficult for the videographer (or appreciator) to direct awareness to the next subject. In contrast, when the zoom speed is slow, the videographer (or appreciator) tends to direct awareness to the next subject. Consequently, the focus adjustment determination unit 15n, for example, may determine the behavior of the focus adjustment to shorten a time required to reach the focused state by increasing the focus adjustment control coefficient α when the zoom speed is slow. Thereby, because a time until the focused state is reached is shortened when the zoom speed is slow, the imaging device 1n can rapidly satisfy a desire for setting the state to the focused state of the videographer (or appreciator) and provide a better moving image for the videographer (or appreciator).

Figure 43:
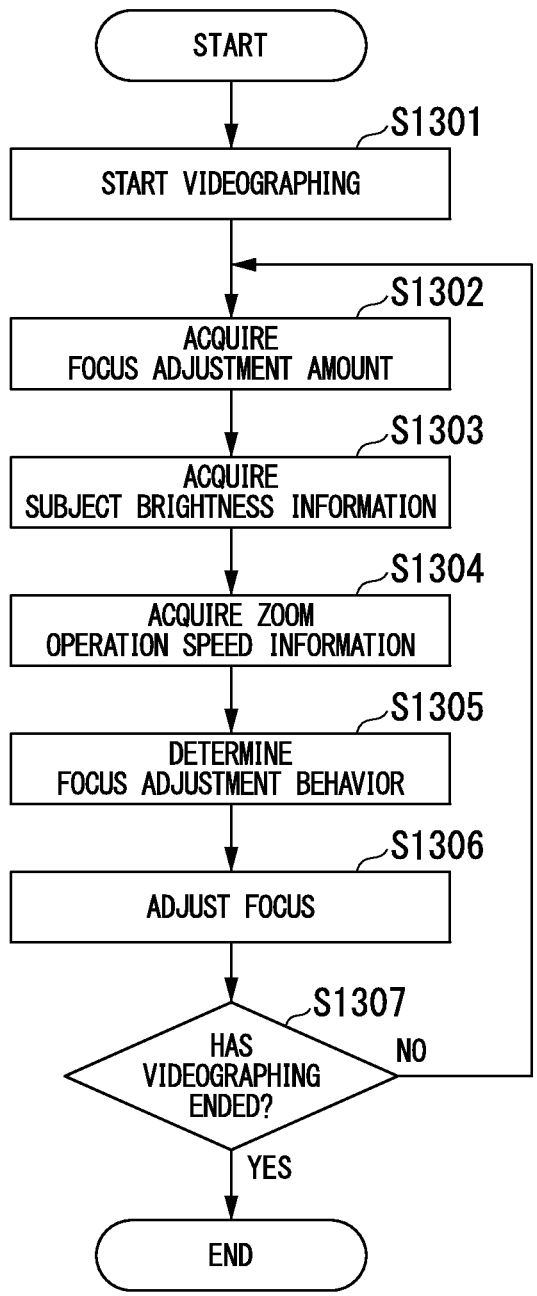
FIG. 43 is a flowchart showing an example of a flow of a process of the imaging device in the example 5 of the first embodiment.

FIG. 43 is a flowchart showing an example of a flow of a process of the imaging device 1n in example 5.

Because the processes of steps S1301 and S1302 are the same as the processes of steps S901 and S902 of FIG. 30, a description thereof will be omitted.

(Step S1303) Next, the subject brightness information acquisition unit 145 acquires subject brightness information as information within one frame.

(Step S1304) Next, the focal distance adjustment information acquisition unit 135 acquires zoom operation speed information which is an example of the focal distance adjustment information as information related to an inter-frame change from the zoom control unit 26.

(Step S1305) Next, the focus adjustment determination unit 15n determines the behavior of the focus adjustment using the zoom operation speed information acquired as the inter-frame change information and the subject brightness information acquired as information within one frame.

Because the processes of steps S1306 and S1307 are the same as the processes of steps S906 and S907 of FIG. 30, a description thereof will be omitted. Accordingly, the process of this flowchart ends.

In the above example 5, the focus adjustment determination unit 15n determines the behavior of the focus adjustment using the focal distance adjustment information acquired as the inter-frame change information and the subject brightness information acquired as the information within one frame. Specifically, for example, the focus adjustment determination unit 15n may determine the behavior of the focus adjustment to shorten a time required to reach the focused state by increasing the focus adjustment control coefficient α when the subject is bright. Thereby, because a time until the focused state is reached is shortened when the subject is bright, the imaging device 1n can rapidly satisfy the videographer's (or appreciator's) desire for setting the state to the focused state and provide a better moving image for the videographer (or appreciator). In addition, for example, the focus adjustment determination unit 15n may determine the behavior of the focus adjustment to shorten a time required to reach the focused state by increasing the focus adjustment control coefficient α when the zoom speed is slow. Thereby, because a time until the focused state is reached is shortened when the zoom speed is slow, the imaging device 1n can rapidly satisfy the videographer's (or appreciator's) desire for setting the state to the focused state and provide a better moving image for the videographer (or appreciator).

Also, although the focal distance adjustment information acquisition unit 135 has acquired a focal distance adjustment speed (zoom speed) as focal distance adjustment information, adjustment direction information of the focal distance adjustment may be acquired. In this case, the focus adjustment determination unit 15n, for example, may determine the behavior of the focus adjustment using the adjustment direction information of the focal distance adjustment and subject brightness information. For example, when the zoom-in operation is performed, the videographer (or appreciator) shows a stronger tendency to direct awareness to the next subject than when the zoom-out operation is performed. Accordingly, the focus adjustment determination unit 15n, for example, may determine the behavior of the focus adjustment to suppress the focus adjustment when the zoom-out operation is performed.

Although the preferred focus adjustment behavior in the moving image is implemented in this embodiment by performing focus adjustment of the imaging device based on the human subjective focus adjustment characteristic, for example, it is possible to achieve a preferred brightness adjustment function/WB adjustment function in the moving image by performing adjustment/correction based on the human subjective characteristic even for another function of the imaging device, specifically, the brightness adjustment function or the WB correction function.

<Second Embodiment>

Hereinafter, an embodiment for implementing the brightness adjustment function based on the human subjective brightness adjustment will be described.

Figure 58:
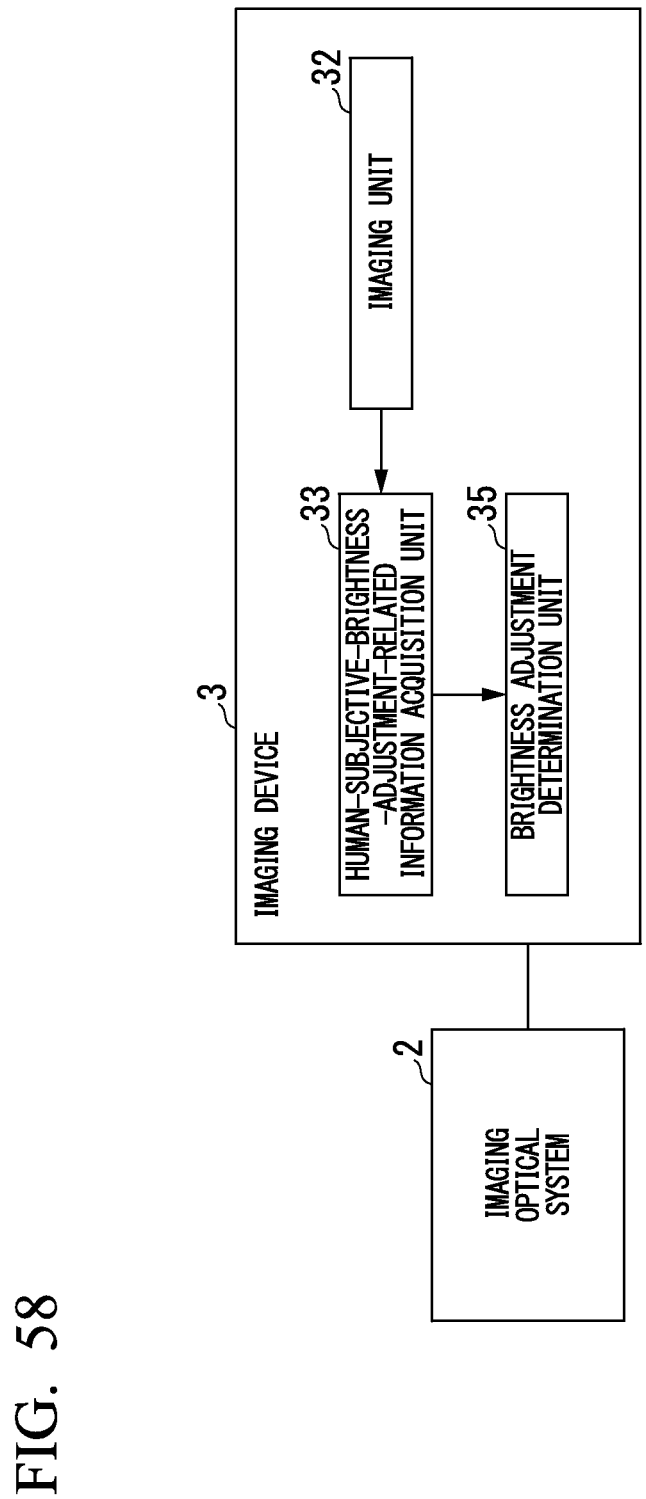
FIG. 58 is a schematic block diagram showing a configuration of an imaging device in a second embodiment of the present invention.

Hereinafter, a second embodiment of the present invention will be described in detail with reference to the drawings. FIG. 58 is a schematic block diagram showing a configuration of an imaging device 3 in a second embodiment of the present invention. The imaging device 3 includes an imaging unit 32, a human subjective brightness adjustment information acquisition unit 33, and a brightness adjustment determination unit 35. The imaging optical system 2 guides light from a subject to the imaging unit 32 and causes an image of the subject to be formed by an imaging element of the imaging unit 32. The imaging optical system 2 is removable from the imaging device 3 as an example. Also, the imaging optical system 2 may be fixed to the imaging device 3.

The imaging unit 32 generates a moving-image signal by capturing an image of a subject formed by the imaging optical system 2, and outputs the generated moving-image signal to the human subjective brightness adjustment information acquisition unit 33.

The human subjective brightness adjustment information acquisition unit 33 acquires at least information related to human subjective brightness adjustment from the above-described moving-image signal. Here, the information related to human subjective brightness adjustment, for example, is inter-frame change information related to a change which is occurred between two or more frames and information related to a situation (for example, a state, motion, or the like of the imaging device) of videographing determined from intra-frame information and a situation (for example, motion, color, and the like of the subject) of a viewed subject which is information within one frame included in the moving-image signal. According to human senses, a degree of attention to a subject of a brightness adjustment target changes according to the videographing situation or the situation of the viewed subject. Accordingly, such information is referred to as one piece of the information related to the human subjective brightness adjustment.

Figure 103:
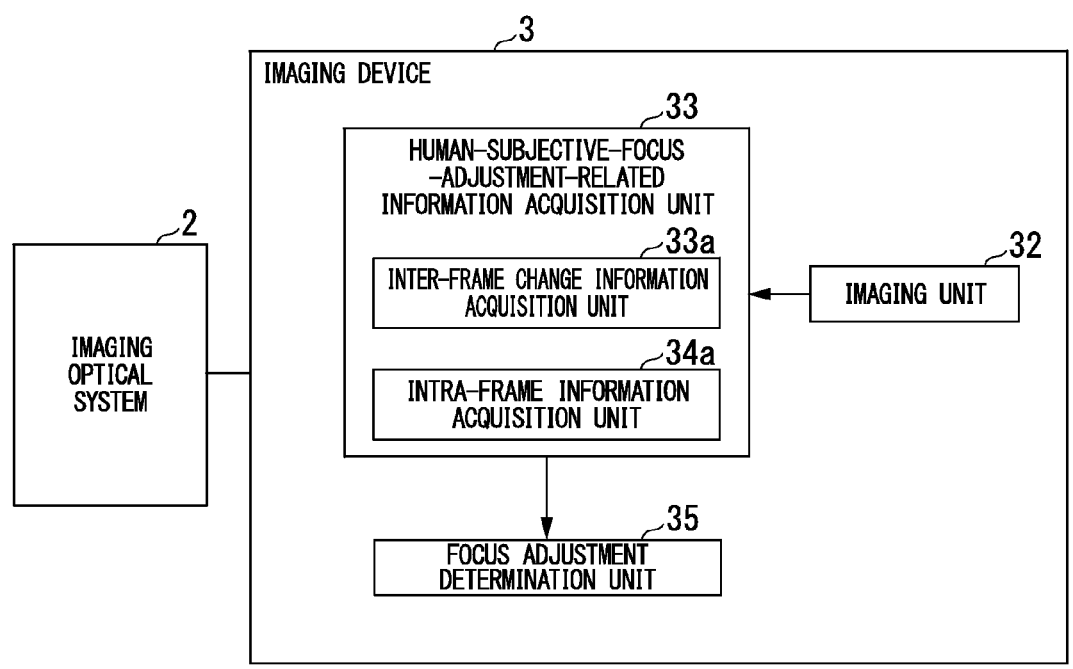
FIG. 103 is a schematic block diagram showing a configuration of an imaging device in the second embodiment of the present invention.

FIG. 103 is a schematic block diagram showing a configuration of the imaging device 3 in this embodiment. The human subjective brightness adjustment information acquisition unit 33 includes an inter-frame change information acquisition unit 33a configured to acquire the above-described inter-frame change information and an intra-frame information acquisition unit 34a configured to acquire information related to the above-described intra-frame information.

In addition, the information related to the human subjective brightness adjustment is not limited to the above-described information, and may be information of a generally known physical brightness adjustment characteristic (motion of brightness adjustment referred to as light adaptation/dark adaptation by cones and rods of a human eye) of the human eyeball or information obtained by approximating the physical brightness adjustment characteristic of the human eyeball. In this case, the information may be pre-stored within a memory (not shown) of the imaging device 3 and the information may be acquired by referring to the memory when necessary.

In the imaging device 3 in this embodiment, the brightness adjustment determination unit 35 determines the behavior of the brightness adjustment using the information related to the human subjective brightness adjustment. Thereby, it is possible to perform the brightness adjustment based on ease of catching attention of an appreciator or physical brightness adjustment of the human eyeball. Thus, the imaging device 3 can improve a videographer's or appreciator's degree of satisfaction with an appearance of a moving image because it is possible to provide a moving image having a more preferable appearance to the videographer (or appreciator). Furthermore, the brightness adjustment determination unit 35 in this embodiment determines the behavior of the brightness adjustment as follows according to the information related to the human subjective brightness adjustment.

(1) According to the information related to the human subjective brightness adjustment, the behavior of the brightness adjustment is determined by determining acceleration and a speed in the brightness adjustment for setting the subject in an optimum brightness state.

(2) According to the information related to the human subjective brightness adjustment, the behavior of the brightness adjustment is determined by determining the timing at which deceleration starts in the brightness adjustment for setting the subject in the optimum brightness state.

(3) According to the information related to the human subjective brightness adjustment, the behavior of the brightness adjustment is determined by determining the timing at which the brightness adjustment starts in the brightness adjustment for setting the subject to be videographed in the optimum brightness state.

(4) According to the information related to the human subjective brightness adjustment, the behavior of the brightness adjustment is determined by determining whether to drive the brightness adjustment.

Furthermore, the terms "brightness adjustment is suppressed" and "brightness adjustment is promoted" are used among the following examples and defined as follows.

The term "brightness adjustment is suppressed": Brightness adjustment is prohibited, prohibition thereof is facilitated, or the brightness adjustment is delayed (speed/acceleration of the brightness adjustment is decreased).

The term "brightness adjustment is promoted": Brightness adjustment is executed, execution thereof is facilitated, or the brightness adjustment is made faster than when the brightness adjustment is suppressed (speed/acceleration of the brightness adjustment is increased).

Figure 59:
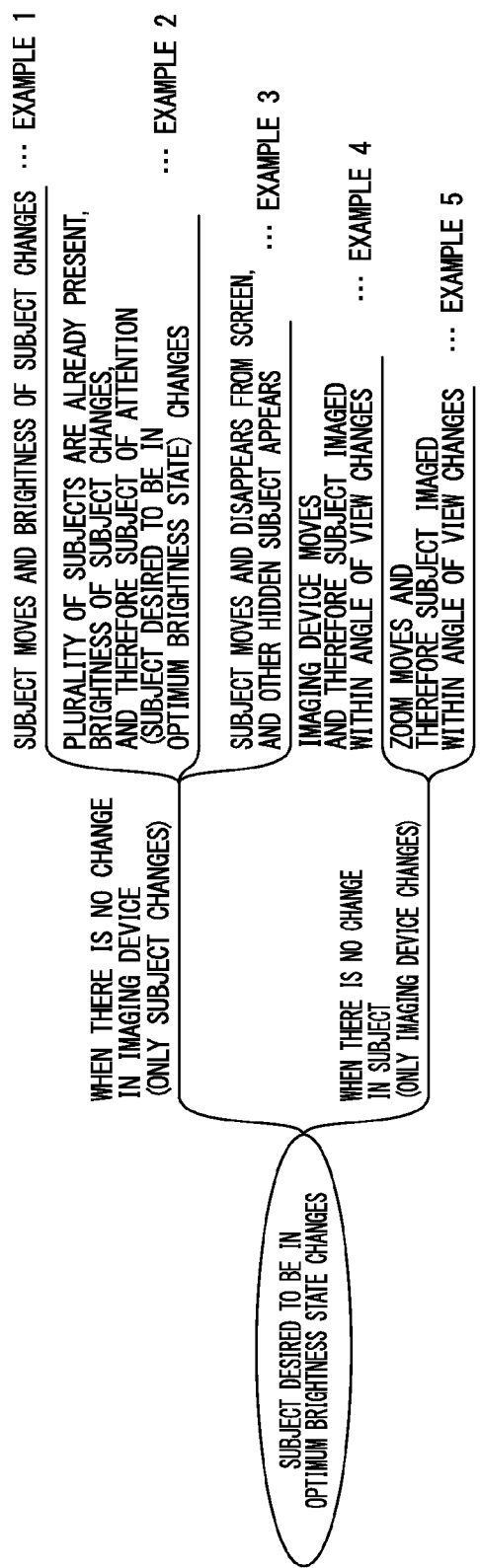
FIG. 59 shows a scene assumed to be videographed and the videographing conditions thereof for each example.

Next, videographing conditions and specific scenes of examples of the present embodiment will be described using FIG. 59. FIG. 59 is a diagram showing the videographing conditions and the specific scenes of each example of the present embodiment. In all the examples, the subject desired to be in the optimum brightness state by the videographer changes. In examples 1 to 3, the imaging device does not change (only the subject changes). On the other hand, in examples 4 and 5, the subject does not change (only the imaging device changes).

Next, the examples are examples of the assumed scenes to be videographed, and in example 1, a scene is used in which a subject moves and the brightness of the subject changes. In example 2, a scene is used in which a plurality of subjects are already displayed on a screen of the imaging device 3c, the brightness of the subjects changes, and therefore a subject of attention (a subject desired to be in the optimum brightness state) changes. In example 3, a scene is used in which the subject moves and disappears from the screen of the imaging device 3d and another hidden subject appears. In example 4, a scene is used in which the imaging device moves and therefore the subject to be imaged changes within the angle of view. In example 5, a scene is used in which the zoom moves and therefore the subject to be imaged changes within the angle of view.

<Example 1>

Figure 60:
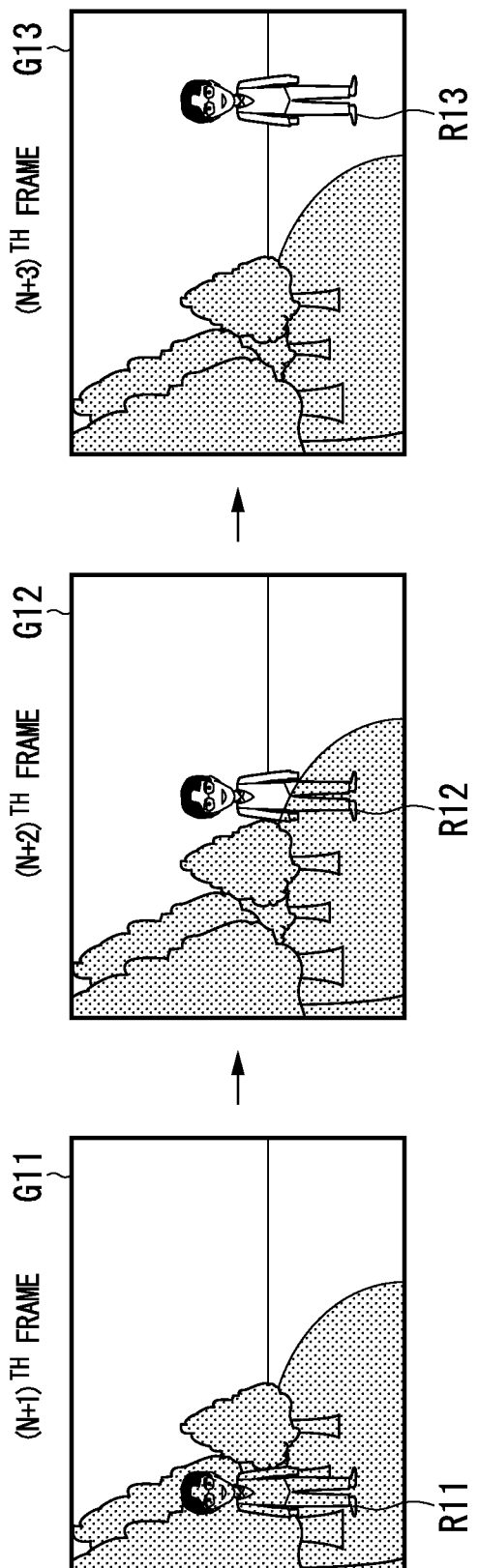
FIG. 60 is a diagram showing an example of a videographed scene in an example 1 of the second embodiment.

Next, example 1 will be described. In this example, a case is used in which inter-frame change information related to a change which is occurred between two or more frames and intra-frame information which is information within one frame included in a moving-image signal are acquired as information related to the human subjective brightness adjustment. In this example, a description of the scene in which the subject moves from the shade within the screen of an imaging device 3a to the sunny place and the brightness adjustment is performed in a state in which there is no motion or change in the imaging device itself as in FIG. 60 will be given. FIG. 60 is a diagram showing an example of a videographed scene in example 1. FIG. 60 is a scene in which the subject moves from the shade to the sunny place within the screen of the imaging device 3a. In an image G11 of an $(N+1)^{th}$ frame (N is a positive integer), an image region R11 of the subject of attention is shown to be included in the image region of the shade. In an image G12 of an $(N+2)^{th}$ frame, an image region R12 of the subject of attention is in a boundary between the image region of the shade and the image region of the sunny place. In an image G13 of an $(N+3)^{th}$ frame, an image region R13 of the subject of attention is shown to be included in the image region of the sunny place.

Figure 61:
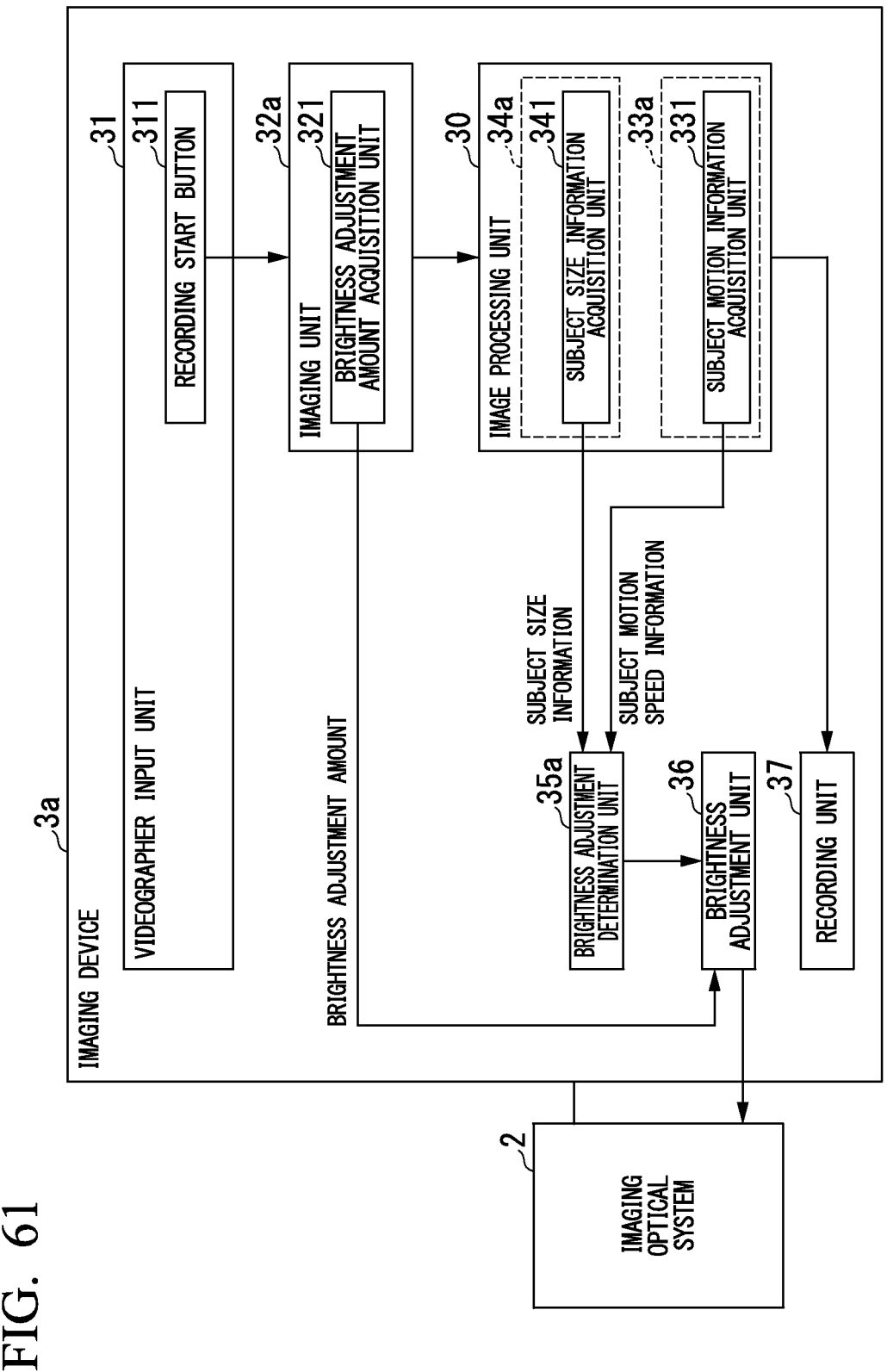
FIG. 61 is a schematic block diagram showing a configuration of an imaging device in the example 1 of the second embodiment.

FIG. 61 is a schematic block diagram showing a configuration of an imaging device 3a in example 1. The imaging device 3a includes an imaging optical system 2, a videographer input unit 31, an imaging unit 32a, an image processing unit 30, a brightness adjustment determination unit 35a, a brightness adjustment unit 36, and a recording unit 37.

The imaging optical system 2 guides light from the subject to the imaging unit 32a, and the image of the subject is formed by the imaging element provided in the imaging unit 32a. The imaging element generates a moving-image signal of the subject. The imaging optical system 2 is removable from the imaging device 3a as an example. Also, the imaging optical system 2 may be fixed to the imaging device 3a. A configuration of the imaging optical system 2 is also similar to those of the following examples.

The videographer input unit 31 receives an input of the videographer. Here, the videographer input unit 31 includes a recording start button 311 for receiving a videographing start instruction by the videographer.

The imaging unit 32a generates the moving-image signal by converting light incident from the subject via the imaging optical system 2 into an electrical signal at a predetermined shutter speed. Here, the imaging unit 32a includes a brightness adjustment amount acquisition unit 321.

The image processing unit 30 generates image data from the moving-image signal supplied from the imaging unit 32a and causes the generated image data to be recorded on the recording unit 37. Here, the image processing unit 30 includes an inter-frame change information acquisition unit 33a and an intra-frame information acquisition unit 34a. In addition, the inter-frame change information acquisition unit 33a includes a subject motion information acquisition unit 331, and the intra-frame information acquisition unit 34a includes a subject size information acquisition unit 341.

Next, a process of each part of the imaging device 3a will be described in the order of processing of a moving-image recording time.

<Process 1>

The imaging device 3a sets a brightness adjustment target region of a target for performing brightness adjustment. In this example, as an example, the imaging device 3a extracts a detected face which is an image region of the face by performing face detection, and sets the extracted detected face as the area in which the brightness adjustment is performed. For example, the imaging device 3a holds a facial feature database storing a characteristic portion (for example, an eye or a mouth) of the face. Then, the image processing unit 30, for example, extracts an image region of the image obtained by imaging, and detects the image region of the face of the subject by matching the extracted image region with the image stored in the facial feature database. Thereby, the brightness adjustment unit 36, for example, can perform the brightness adjustment on the detected face using the detected image region of the face of the detected subject as the detected face.

<Process 2>

The recording start button 311 receives a moving-image recording start instruction from the videographer, and outputs start instruction information representing the received start instruction to the imaging unit 32a. Also, when the videographer input unit 31 includes a touch panel, the videographer input unit 31 may receive an instruction of the videographer through an operation of a touch panel. In addition, when the videographer input unit 31 includes a microphone, the imaging device 3a may receive an instruction of the videographer by applying voice recognition to a voice signal input from the microphone.

Upon receiving the start instruction information from the videographer input unit 31, the imaging unit 32a generates a moving-image signal by converting light incident from the subject via the imaging optical system 2 into an electrical signal at a predetermined shutter speed. Thereby, the imaging unit 32a can start moving-image recording according to an instruction of the videographer. The imaging unit 32a outputs the generated moving-image signal to the image processing unit 30. Here, the number of pixels of the imaging element of the imaging unit 32a exceeds at least the number of pixels of a high-definition television image as an example. In the following examples, the number of pixels of the imaging element is also similar.

<Process 3>

The brightness adjustment amount acquisition unit 321 acquires a brightness adjustment amount for setting the brightness adjustment target area in the optimum brightness state based on information of the set brightness adjustment target region, and outputs the acquired brightness adjustment amount to the brightness adjustment unit 36. Specifically, for example, the brightness adjustment amount acquisition unit 321 acquires the brightness adjustment amount so that the pixel value of the detected face region which is the brightness adjustment target region is included in a predetermined range. Thereby, it is possible to prevent the detected face from being excessively darkened or becoming pure white.

<Process 4>

The subject size information acquisition unit 341 acquires subject size information representing a size of the subject as intra-frame information and outputs the acquired subject size information to the brightness adjustment determination unit 35a. An example of its specific process will be described. In the memory (not shown) of the imaging device 3a, for example, a first threshold value for classifying an "extra-large (to an extent that the subject protrudes from the screen of the imaging device 3a)" size and a "large" size, a second threshold value for classifying the "large" size and a "medium" size, and a third threshold value for classifying the "medium" size and a "small" size are pre-stored as the threshold values for classifying the size of the subject. Here, each of the "extra-large" size, the "large" size, the "medium" size, and the "small" size is a classification of the size of the subject.

In this case, the subject size information acquisition unit 341, for example, determines the size of the subject as any one of the "extra-large," "large," "medium," and "small" sizes by acquiring the size of the detected face as the size of the subject and comparing the acquired size of the subject to the first, second, and third threshold values stored in the memory (not shown). Also, the present invention is not limited thereto. The subject size information acquisition unit 341, for example, may use information of the number of pixels of the detected face without change.

The size of the subject is not limited to the size of the detected face. The subject size information acquisition unit 341, for example, may determine a background region and a subject region which is a non-background region according to technology of a known figure-ground determination or the like, and set the size of the subject region in the vicinity of the brightness adjustment target area as the size of the subject. Here, the vicinity of the brightness adjustment target region, for example, includes the brightness adjustment target region, and also includes pixels separated from a pixel outside the brightness adjustment target region by a predetermined number of pixels in a direction away from the brightness adjustment target region.

Also, although the size of the subject within the frame is acquired as subject size information as an example in this example, the subject size information acquisition unit 341, for example, may acquire the physical size information of the subject in the following process and use the acquired information as the subject size information.

The subject size information acquisition unit 341 may perform triangulation using previous frame information and obtain the physical size of the subject as a first example of a process of acquiring the physical size information of the subject.

As a second example of the process of acquiring the physical size information of the subject, for example, the type of subject and subject average size information representing an average of a physical size are associated and stored in the memory (not shown) of the imaging device in advance. The subject size information acquisition unit 341 may perform an object recognition process of a subject to be imaged using well-known technology, specify a type of subject to be imaged, and read and acquire subject average size information corresponding to the specified type of subject as physical size information of the subject.

<Process 5>

The subject motion information acquisition unit 331 acquires subject change information (here, subject motion speed information representing the motion speed of the subject as an example) as inter-frame change information through image processing. Specifically, for example, the subject motion information acquisition unit 331 acquires the motion speed in the moving-image surface of the detected face as the motion speed of the subject. Also, the present invention is not limited thereto. The subject motion information acquisition unit 331 may acquire the motion speed of the subject on a real space using motion information of the imaging device 3a or information of the imaging optical system 2.

In addition, for example, a fourth threshold value for classifying "considerably fast" and "moderately fast" speeds, a fifth threshold value for classifying "moderately fast" and "moderate" speeds, and a sixth threshold value for classifying "moderate" and "slow" speeds are pre-stored in the memory (not shown) within the imaging device 3a.

As an example in this example, the subject motion information acquisition unit 331 determines the acquired operation speed of the subject as any one of the "considerably fast," "moderately fast," "moderate," and "slow" speeds by comparing the acquired motion speed of the subject to the fourth to sixth threshold values stored in the memory (not shown) as in the size of the subject, and sets a determination result as subject motion speed information. Also, the present invention is not limited thereto, and the subject motion information acquisition unit 331 may use the acquired motion speed (for example, pixels/frame) of the subject as the subject motion speed information without change. The subject motion information acquisition unit 331 outputs the acquired subject motion speed information to the brightness adjustment determination unit 35a.

<Process 6>

The brightness adjustment determination unit 35a, for example, determines the behavior of the brightness adjustment based on the subject size information acquired by the subject size information acquisition unit 341 and the subject motion speed information acquired by the subject motion information acquisition unit 131. An example of its specific process will be described. For example, a table in which one brightness adjustment speed suppression coefficient $\alpha$ is associated for a set of the size of the subject and the motion speed of the subject is stored in a memory (not shown) as in FIG. 62. In this case, the brightness adjustment determination unit 35a, for example, reads the brightness adjustment speed suppression coefficient $\alpha$ of the brightness adjustment corresponding to the set of the acquired subject size information and the acquired subject motion speed information by referring to the table of FIG. 62.

In addition, for example, a reference focus adjustment speed $V_{base}$ of a moving-image capturing time is pre-stored in a memory (not shown). The brightness adjustment determination unit 35a, for example, reads the reference brightness adjustment speed $V_{base}$ from the memory, and determines a real brightness adjustment speed $V_{control}$ according to the following Equation (9).

$$V_{control} = V_{base} \times \alpha \quad \text{Equation (9)}$$

As seen from Equation (9), because the brightness adjustment speed becomes slow when the suppression coefficient is low, the brightness adjustment is consequently suppressed. Although the speed of the brightness adjustment changes in the brightness adjustment determination unit 35a in this example, for example, whether to "operate" or "prohibit" the brightness adjustment may be selected FIG. 62 is an example of a table for determining the brightness adjustment speed suppression coefficient $\alpha$. In a table T11 of FIG. 62, the brightness adjustment speed suppression coefficient $\alpha$ is associated for every set of the motion speed of the subject and the size of the subject. When it is determined that the motion speed of the subject is "considerably fast," the speed suppression coefficient $\alpha$ of the brightness adjustment tends to be small. The speed suppression coefficient $\alpha$ of the brightness adjustment tends to be small when the motion speed of the subject is low in the case in which the motion speed of the subject is lower than the "considerably fast" speed (the case of the "moderately fast," "moderate," and "slow" speeds within FIG. 62). This is because, although it is difficult for the appreciator to determine to perform the brightness adjustment when the motion of the moving subject is too fast, gentle brightness adjustment tends to be preferred when the motion speed of the subject is slow once it is determined that the brightness adjustment is desired to be performed. In addition, the brightness adjustment suppression coefficient $\alpha$ tends to be large when the size of the subject is "large" and "medium" than when the size of the subject is "small" and "extra-large," and tends to be small in the order of the "small" and "extra-large" sizes. The imaging device 3a can provide a moving image having a more preferable appearance to the videographer (or appreciator) by suppressing the brightness adjustment because a process of directing the awareness of the appreciator to the moving subject tends to be difficult when the size of the subject is too small or large.

For example, in the case in which brightness adjustment is performed when the subject (a human in FIG. 60) moves from the shade to the sunny place in a state in which there is no motion or change in the imaging device 3a as in FIG. 60, it is difficult for the videographer (or appreciator) to determine to set the subject in the optimum brightness state when the movement speed of the moving subject is too fast. However, once it is determined that the brightness adjustment is desired to be performed, the fast brightness adjustment is desired to be performed when the movement speed of the subject is fast (a fast subject is desired to be accurately known). Accordingly, it is possible to implement brightness adjustment without incompatibility by determining the behavior of the brightness adjustment according to such a sense.

In addition, a process of directing awareness to the moving subject tends to be difficult when the size of the moving subject is too small or large. The brightness adjustment determination unit 35a, for example, determines the brightness adjustment behavior to suppress the brightness adjustment by decreasing the brightness adjustment speed suppression coefficient α when the size of the moving subject is less than a predetermined sixth threshold value or greater than a seventh threshold value. Here, the seventh threshold value is greater than the sixth threshold value. Thereby, it is possible to suppress the brightness adjustment for the subject which does not catch the awareness of the videographer (or appreciator) by suppressing the brightness adjustment when the size of the moving subject is too small or large.

<Process 7>

The brightness adjustment unit 36, for example, controls an aperture of the imaging optical system 2 and adjusts the brightness of the frame image included in the moving-image signal so that the brightness is changed by the brightness adjustment amount input from the brightness adjustment amount acquisition unit 321 according to the behavior of the brightness adjustment determined by the brightness adjustment determination unit 35a (here, a real brightness adjustment speed $V_{control}$ as an example). Also, although the brightness adjustment is performed by opening/closing the aperture of the imaging optical system 2 as an example in this example, the present invention is not limited thereto. The brightness adjustment may be performed using any process similar to the following examples.

(1) Process of changing a shutter speed.
(2) Process of changing ISO sensitivity of an image sensor.
(3) Process of controlling a neutral density (ND) filter (for example, in which light reduction amount changes step by step) in the imaging device and changing the strength of light incident on the image sensor.
(4) Process of capturing and recording a moving image in a wider state than a dynamic range of the moving image to be ultimately recorded in a high dynamic range (HDR) or RAW format and adjusting the brightness state in a post-processing process by the image processing unit 30. Here, the moving-image videographing in the HDR format, for example, is a process of combing images captured in different brightness states between frames and recording a moving image (for example, 32 bits) having a dynamic range which is wider than that of a moving image (for example, 8 bits) to be normally recorded. A process using moving-image capturing in the RAW format, for example, is a process of saving an output of an imaging element provided in the imaging unit 32 without change without performing a process of conversion into a normal moving-image recording format (8 bits). In this case, the dynamic range becomes wider according to an output of the imaging element.

<Process 8>

Until the videographer input unit 31 receives a videographing end instruction from the videographer, the imaging device 3a iterates the above-described processes 3 to 7.

Figure 63:
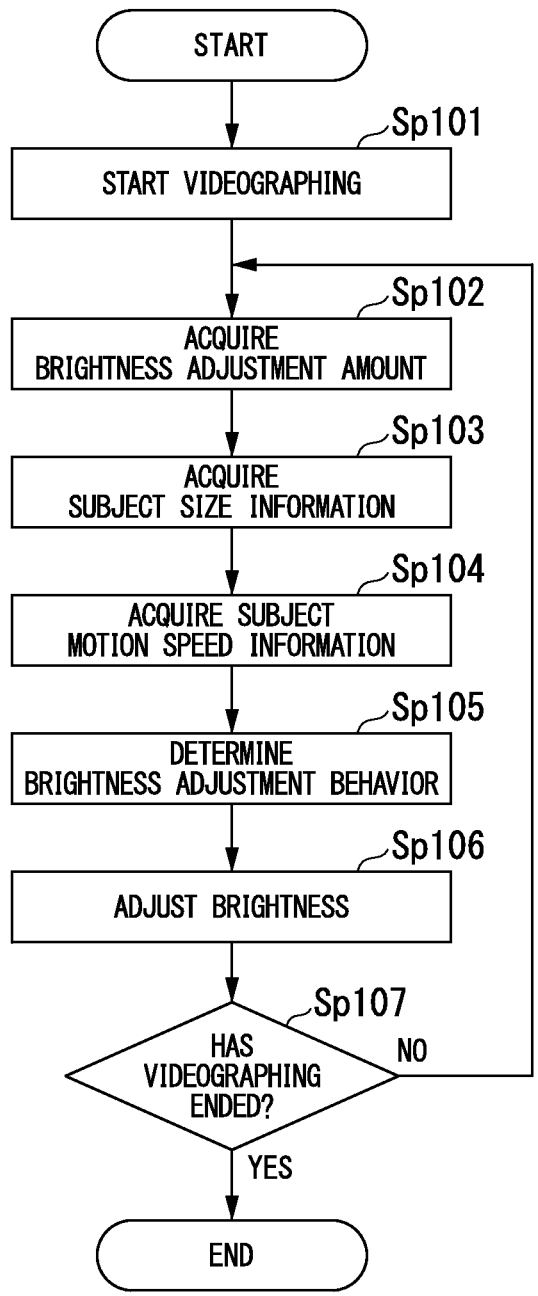
FIG. 63 is a flowchart showing an example of a flow of a process of the imaging device in the example 1 of the second embodiment.

Next, FIG. 63 is a flowchart showing an example of a flow of a process of the imaging device 3a in example 1.

(Step Sp101) First, the imaging unit 32a starts videographing when the recording start button 311 has been pressed.

(Step Sp102) Next, the brightness adjustment amount acquisition unit 321 acquires a brightness adjustment amount.

(Step Sp103) Next, the subject size information acquisition unit 341 acquires subject size information.

(Step Sp104) Next, the subject motion information acquisition unit 331 acquires subject motion speed information as an example of the subject motion information.

(Step Sp105) Next, the brightness adjustment determination unit 35a determines the behavior of the brightness adjustment using the subject motion speed information and the subject size information.

(Step Sp106) Next, the brightness adjustment unit 36 adjusts the brightness of the frame image to be included in the moving-image signal so that the brightness is changed by the brightness adjustment amount input from the brightness adjustment amount acquisition unit 321 according to the determined behavior of the brightness adjustment.

(Step Sp107) Next, the imaging unit 32a determines whether the videographing has ended based on information received by the videographer input unit 31. When there is no videographing end (NO), the process returns to step Sp102. When the videographing has ended (YES), the imaging device 3a ends the process. Accordingly, the process of this flowchart ends.

In the above example 1, the brightness adjustment determination unit 35a, for example, determines the behavior of the brightness adjustment using the subject motion speed information and the subject size information. For example, because it is difficult for the videographer (or appreciator) to determine to set the subject in the optimum brightness state when the motion speed of the subject is fast, the brightness adjustment determination unit 35a determines the behavior of the brightness adjustment to suppress the brightness adjustment. In addition, because a process in which the videographer (or appreciator) directs the awareness to the moving subject tends to be difficult when the size of the moving subject is too small or large, the brightness adjustment determination unit 35a determines the behavior of the brightness adjustment to suppress the brightness adjustment when the size of the moving subject is less than a predetermined sixth threshold value or greater than a seventh threshold value. Here, the seventh threshold value is greater than the sixth threshold value. In this manner, because it is possible to perform the brightness adjustment according to ease of catching human attention, the imaging device 3a can provide a moving image having a more preferable appearance to the videographer (or appreciator).

Although the subject motion information acquisition unit 331 acquires the subject motion speed information as an example of the subject motion information in this example, the motion amount of the subject, the motion continuity of the subject, or a movement state difference among a plurality of subjects may be acquired instead of subject motion speed information and the brightness adjustment determination unit 35a may determine the behavior of the brightness adjustment using the motion amount of the subject or the like.

<Modified Example 1: Motion Amount of Subject>

The subject motion information acquisition unit 331 may acquire the "motion amount of the subject" instead of the subject motion speed information. At this time, the subject motion information acquisition unit 331 may acquire the motion amount of the subject through image processing as in the motion speed of the subject. Here, the motion amount of the subject may be a motion amount from the beginning of motion of a certain subject or a motion amount among an arbitrary number of frames. Because the subject starts to move from the still state in which the subject does not move, the subject motion information acquisition unit 331 acquires the motion amount from the start of motion of the subject as an example. In this case, when the motion amount from the movement start is large, that is, after the subject is moved a certain distance within the angle of view, the videographer (or appreciator) tends to determine to set the moving subject in the optimum brightness state. Accordingly, the brightness adjustment determination unit 35a may determine the behavior of the brightness adjustment to suppress the brightness adjustment as the motion amount of the subject decreases.

<Modified Example 2: Motion Continuity Information of Subject>

The subject motion information acquisition unit 331 may acquire subject motion continuity information representing continuity of motion of the subject instead of subject motion speed information. The subject motion information acquisition unit 331, for example, may acquire the subject motion continuity information through image processing as in the movement speed of the subject. As the specific acquisition process, for example, the subject motion information acquisition unit 331 determines that there is no continuity if the motion speed distribution of each frame is greater than or equal to a fixed distribution and determines that there is continuity if the motion speed distribution of each frame is less than or equal to the fixed distribution.

When there is continuity in the motion of the subject, the videographer (appreciator) tends to determine to set the subject in the optimum brightness state. Accordingly, when there is no continuity in the motion of the subject, the brightness adjustment determination unit 35a may determine the behavior of the brightness adjustment to suppress the brightness adjustment.

<Modified Example 3: Difference between Motion States of Plurality of Subjects>

The subject motion information acquisition unit 331 may acquire movement state difference information among the plurality of subjects representing the movement state difference among the plurality of subjects. At this time, the subject motion information acquisition unit 331 may acquire the movement state difference (for example, a difference between movement directions) of the plurality of subjects, for example, through image processing in the next process, as in the speed of the subject. The subject motion information acquisition unit 331 may detect a face of the subject, acquire motion information for all faces when a plurality of faces have been detected, and acquire the movement state difference information (here, a difference between movement directions) of the plurality of subjects from the acquired motion information.

At this time, although it is easy to direct awareness to the subject when the motion direction of the detected face of a brightness adjustment target is different from the motion direction of another detected face, it is difficult to direct the awareness when the motion directions are similar. Accordingly, when there is no difference between the movement directions of the plurality of subjects, the brightness adjustment determination unit 35a may determine the behavior of the brightness adjustment to suppress a brightness adjustment operation. In addition, although the subject motion information acquisition unit 331 acquires a difference between movement directions as an example of the movement state difference information of the plurality of subjects here, a difference between movement speeds or a movement amount difference between the movement speeds may be acquired. In this case, the brightness adjustment determination unit 35a may determine the behavior of the brightness adjustment using a movement speed difference or a movement amount difference between movement speeds as subject motion information.

<Modified Example 4: Motion Type Information of Subject is Acquired>

The subject motion information acquisition unit 331 within FIG. 61 may acquire the "motion type information of the subject" instead of the "motion speed of the subject." Here, the motion type information of the subject, for example, is information related to motion at the time of "walking," information related to motion at the time of "running," or the like when the subject is a human.

The subject motion information acquisition unit 331, for example, acquires motion type information of the subject through image processing in the next processing scheme, as in the speed of the subject.

Procedure 1: Information related to a pattern of motion on the image of the face region when the human walks and information related to a pattern of motion on the image of the face region when the human runs are pre-stored within the memory of the imaging device 3a as reference information.

Procedure 2: When the videographer starts videographing, the imaging unit 32a generates a moving-image signal of the subject as described above.

Procedure 3: The subject motion information acquisition unit 331 detects a face region by performing a face recognition process on the moving-image signal generated by the imaging unit 32a.

Procedure 4: The subject motion information acquisition unit 331 acquires information related to motion on the image of the face region by tracking the above-described detected face region.

Procedure 5: The subject motion information acquisition unit 331 specifies motion of a pattern most approximate to the motion acquired in procedure 4 among patterns of a plurality of motions stored in procedure 1 as information related to motion of a current subject (motion of a human face) by matching information related to motion on the image of the human face region in the patterns of the plurality of motions (a pattern of the motion at the time of walking, a pattern of the motion at the time of running, etc.) stored as reference information in the memory in the above-described procedure 1 with information related to the motion of the face region detected in the above-described procedure 4. For example, if the motion acquired in procedure 4 is most approximate to the pattern of the motion of the face region when the human runs among the patterns of the motions stored in procedure 1, the subject motion information acquisition unit 331 determines that the motion of the subject is the motion when the human runs.

Also, when the subject is the human, the procedure of determining the motion when the subject is "walking" and the motion when the subject is "running" through image processing is not limited to the above-described procedures 1 to 5.

Because the human tends to desire to perform brightness adjustment at a higher speed when the subject is running than when the subject is walking, it is preferable to determine brightness adjustment behavior to promote the brightness adjustment.

In addition, although the inter-frame change information acquisition unit 13a acquires the subject motion information as information related to a change in the subject, color change information of the subject, deformation information of the subject, an inter-frame signal value change amount of a captured moving-image signal, or tracking information of an arbitrary point or region of the captured moving-image signal may be acquired instead of the subject motion information. Then, the brightness adjustment determination unit 35a may determine the behavior of the brightness adjustment based on the information acquired by the inter-frame change information acquisition unit 33a.

<Modified Example 5: Color Change in Subject>

For example, the inter-frame change information acquisition unit 33a includes a subject color change information acquisition unit instead of the subject motion information acquisition unit 331. The subject color change information acquisition unit may acquire subject color change information related to a color change of the subject (for example, a color change speed or a color change amount). For example, when the subject has the color change (for example, a background change on a stage, a change in clothes of the subject, or the like), a degree of attention to the subject is changed based on a color change speed or amount or the like.

For example, it is difficult for the videographer (or appreciator) to determine to set the subject in the optimum brightness state tends to be difficult when the color change speed of the subject is too fast. Consequently, the brightness adjustment determination unit 35a, for example, may determine the behavior of the brightness adjustment to suppress the brightness adjustment when the color change speed of the subject is fast. Thereby, it is possible to provide a more preferable moving image for the videographer (or appreciator) because it is possible to perform brightness adjustment after a color change ends, or when the color change has become gentle, if the color change speed is fast.

In addition, for example, because a larger color change amount from the color change start of the subject attracts the awareness of the videographer (or appreciator), the videographer (or appreciator) tends to determine to set a subject in which a color changes in the optimum brightness state. Consequently, the brightness adjustment determination unit 35a, for example, may determine the behavior of the brightness adjustment to promote the brightness adjustment as the color change amount of the subject increases. Thereby, because it is possible to rapidly set the subject in the optimum brightness state, it is possible to provide a more preferable moving image for the videographer (or appreciator).

<Modified Example 6: Deformation of Subject>

For example, the inter-frame change information acquisition unit 33a includes a subject deformation information acquisition unit instead of the subject motion information acquisition unit 331. The subject deformation information acquisition unit may acquire the subject deformation information (for example, a deformation speed or a deformation amount) related to the deformation of the subject. For example, when the subject is deformed (for example, a balloon is inflated), the ease of paying attention to the subject is changed by the deformation speed or deformation amount of the subject.

For example, it is difficult for the videographer (or appreciator) to determine to set the subject in the optimum brightness state when the movement speed of the moving subject is too fast. Consequently, the brightness adjustment determination unit 35a, for example, may determine the behavior of the brightness adjustment to suppress the brightness adjustment when the deformation speed of the subject is fast. Thereby, it is possible to provide a more preferable moving image for the videographer (or appreciator) because it is possible to perform brightness adjustment after the deformation of the subject ends, or when the deformation of the subject has become gentle, if the deformation speed of the subject is fast.

In addition, for example, because a larger deformation amount from the deformation start of the subject attracts the awareness of the videographer (or appreciator), the videographer (or appreciator) tends to determine to set the deformed subject in the optimum brightness state. Consequently, the brightness adjustment determination unit 35a, for example, may determine the behavior of the brightness adjustment to promote the brightness adjustment when the deformation amount of the subject is large. Thereby, it is possible to provide a more preferable moving image for the videographer (or appreciator) because it is possible to rapidly set the subject in the optimum brightness state.

<Modified Example 7: Inter-frame Signal Value Change Amount of Captured Moving-image Signal>

For example, the inter-frame change information acquisition unit 33a includes an inter-frame signal change amount acquisition unit instead of the subject motion information acquisition unit 331. The inter-frame signal change amount acquisition unit may acquire a change amount of the inter-frame signal value of the captured moving-image signal. Here, the change amount of the inter-frame signal value, for example, is a sum of absolute values of differences when the differences between pixel values of pixels of a corresponding position between two frames have been calculated in all pixels.

Because a larger inter-frame signal change amount of a moving image attracts the awareness of the videographer (or appreciator), the videographer (or appreciator) tends to determine to set the subject in the optimum brightness state. Consequently, the brightness adjustment determination unit 35a, for example, may determine the behavior of the brightness adjustment to promote the brightness adjustment when the inter-frame signal change amount is large. Thereby, it is possible to provide a more preferable moving image for the videographer (or appreciator) because it is possible to rapidly set the subject in the optimum brightness state.

Also, the inter-frame signal change amount acquisition unit may obtain a change speed of an inter-frame signal value from the change amount of the inter-frame signal value. In this case, the brightness adjustment determination unit 35a, for example, may determine the behavior of the brightness adjustment to suppress the brightness adjustment when the change speed of the inter-frame signal value is fast. Thereby, it is possible to provide a more preferable moving image for the videographer (or appreciator) because it is possible to perform brightness adjustment once the change in the inter-frame signal value is gone, or when the change of the inter-frame signal value has become gentle, if the change speed of the inter-frame signal value is fast.

<Modified Example 8: Tracking Information of Arbitrary Point or Region of Captured Moving-image Signal>

Also, the inter-frame change information acquisition unit 33a may include a tracking information acquisition unit instead of the subject motion information acquisition unit. In this case, the tracking information acquisition unit may acquire tracking information of an arbitrary point or region of the captured moving-image signal. Specifically, for example, the tracking information acquisition unit may extract an arbitrary characteristic point (corner, edge, or the like) or an arbitrary region within the image which is not limited to a face obtained by well-known technology, and acquire tracking information (for example, a tracking amount, a tracking speed, or smoothness (continuity) of tracking) of a motion amount of the extracted point or region. Here, the tracking amount is the motion amount of the extracted point or region, and the tracking speed is the motion speed of the extracted point or region.

<Tracking Amount>

Because a larger tracking amount attracts the awareness of the videographer (or appreciator), the videographer (or appreciator) tends to determine to set the point or region in the optimum brightness state. Consequently, the brightness adjustment determination unit 35a, for example, may determine the behavior of the brightness adjustment to promote the brightness adjustment as the tracking amount increases. Thereby, it is possible to provide a more preferable moving image for the videographer (or appreciator) because it is possible to rapidly set the point or region in the optimum brightness state.

<Tracking Speed>

It is difficult for the videographer (or appreciator) to determine to set the point or region in the optimum brightness state tends to be difficult when the motion speed of the point or region is too fast. Consequently, the brightness adjustment determination unit 35a, for example, may determine the behavior of the brightness adjustment so that it is difficult to operate the brightness adjustment when the tracking speed is fast. Thereby, because it is possible to perform brightness adjustment after the motion of the point or region stops, or when the motion of the point or region has become slow, if the motion speed of the point or region is fast, it is possible to provide a more preferable moving image for the videographer (or appreciator).

<Smoothness (Continuity) of Tracking>

For the smoothness (continuity) of the tracking of the point or region, the tracking information acquisition unit, for example, may determine that the tracking is smooth if the tracking is successful (there is continuity) for a fixed time and determine that the tracking is not smooth if the tracking is unsuccessful (there is no continuity). The videographer (appreciator) tends to pay attention to the subject for which tracking is smooth. Accordingly, the brightness adjustment determination unit 35a, for example, may determine the behavior of the brightness adjustment to promote the brightness adjustment when the tracking is smooth (there is continuity). Thereby, it is possible to provide a more preferable moving image for the videographer (or appreciator) because it is possible to rapidly set the point or region in the optimum brightness state.

<Modified Example 9: Case in which Information Related to Setting for Videographing is Acquired>

Figure 64:
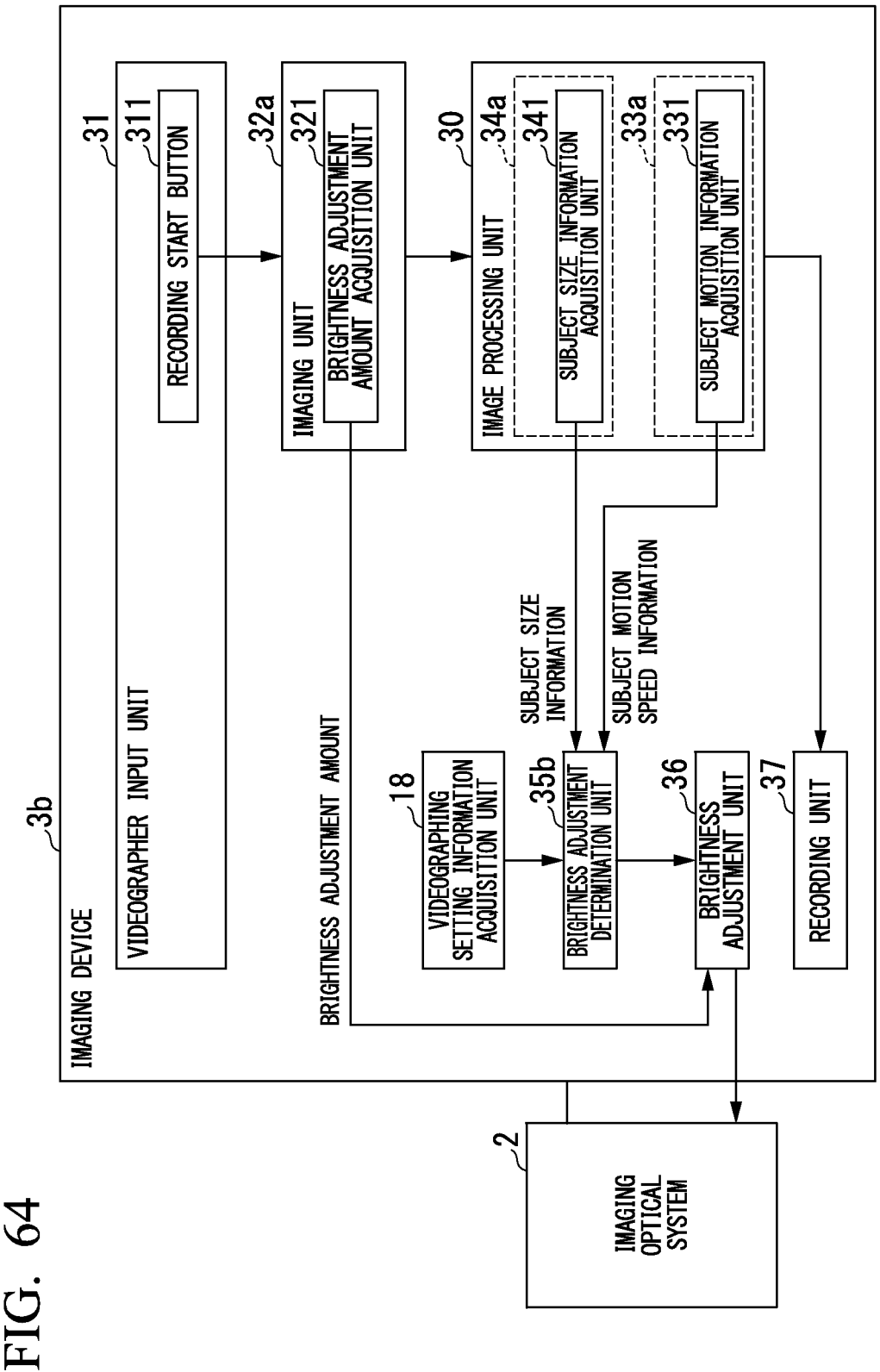
FIG. 64 is a schematic block diagram showing a configuration of an imaging device in a modified example 9 of the example 1 of the second embodiment.

FIG. 64 is a schematic block diagram showing a configuration of the imaging device 3b in a modified example 9 of the example 1 of the second embodiment. Also, elements common with FIG. 61 are assigned the same reference signs and a specific description thereof will be omitted. With respect to the configuration of the imaging device 3a of example 1 of FIG. 61, the configuration of the imaging device 3b in modified example 9 is configured by adding a videographing setting information acquisition unit 18 and changing the brightness adjustment determination unit 35a to the brightness adjustment determination unit 35b.

The videographing setting information acquisition unit 18 acquires videographing setting information related to setting for the videographing, and outputs the acquired videographing setting information to the brightness adjustment determination unit 35b.

In this modified example, the brightness adjustment determination unit 35b also corrects the behavior of the brightness adjustment using the videographing setting information in addition to the motion information of the subject acquired as inter-frame change information and the size information of the subject acquired as the intra-frame information. Hereinafter, a specific example of this will be described.

Although it is difficult to say that videographing setting information is human-subjective-brightness-adjustment-related information itself, the information is an element which affects preferable brightness adjustment at the time of moving-image appreciation. It is possible to additionally acquire the information and determine the more preferable behavior of the brightness adjustment by correcting the determined behavior of the brightness adjustment using the acquired information.

<Example 1: ISO Sensitivity Setting Information>

As the first example, the videographing setting information acquisition unit 18 acquires ISO sensitivity setting information representing ISO sensitivity set in the imaging device 3b as an example of videographing setting information, and outputs the acquired ISO sensitivity setting information to the brightness adjustment determination unit 35b. Then, the brightness adjustment determination unit 35b, for example, determines the behavior of the brightness adjustment using the motion information of the subject acquired as the inter-frame change information, the subject size information acquired as the inter-frame information, and the ISO sensitivity setting information.

When the ISO sensitivity of the imaging device 3b is high, the noise within the screen of the imaging device 3b increases and the appearance of the moving image becomes complex. Because a further change within the moving image is likely to be unfavorable in such a state, the brightness adjustment determination unit 35a, for example, may determine the behavior of the brightness adjustment to suppress the brightness adjustment when the sensitivity is higher than the predetermined reference.

As a specific correction process in this example, for example, a table in which the ISO sensitivity is associated with a brightness adjustment suppression coefficient β is stored in a memory (not shown). In this case, for example, the brightness adjustment determination unit 35b reads the brightness adjustment suppression coefficient β corresponding to the ISO sensitivity of the imaging device 3b from the memory. Then, the brightness adjustment determination unit 35b, for example, determines the ultimate behavior of the brightness adjustment according to the following Equation (10).

$$V_{control} = V_{base} \times \alpha \times \beta \qquad \text{Equation (10)}$$

Equation (10) is an equation for correcting the behavior of the brightness adjustment determined by the above-described Equation (9). As seen from Equation (10), the behavior of the brightness adjustment is corrected to suppress the brightness adjustment when the brightness adjustment suppression coefficient β is small.

<Example 2: Shutter Speed Setting Information of Imaging Device>

As the second example, the videographing setting information acquisition unit 18 may acquire shutter speed setting information representing a shutter speed set by the imaging device 3b as an example of the videographing setting information. Then, the brightness adjustment determination unit 35b, for example, may determine the behavior of the brightness adjustment using the motion information of the subject acquired as the inter-frame change information, the size information of the subject acquired as the intra-frame information, and the shutter speed setting information.

If the shutter speed setting of the imaging device 3b is fast with respect to a frame rate of a moving-image capturing time, there is no smoothness of the motion of the moving image and the moving image looks like a flip book. Because a further change within the moving image in this state is likely to be unfavorable, the brightness adjustment determination unit 35a, for example, may determine the behavior of the brightness adjustment to suppress the brightness adjustment when the shutter speed setting is fast. Specifically, for example, the brightness adjustment suppression coefficient β within Equation (10) may be configured to be small when the set shutter speed is fast.

As a specific determination process of the brightness adjustment suppression coefficient β, as shown in FIG. 65, for example, a table in which the shutter speed is associated with the brightness adjustment suppression coefficient β is stored in the memory (not shown). In this case, for example, the brightness adjustment determination unit 35b reads the brightness adjustment suppression coefficient β corresponding to the shutter speed of the imaging device 3b from the memory. Then, the brightness adjustment determination unit 35b, for example, determines the behavior of the ultimate brightness adjustment according to the above-described Equation (10).

FIG. 65 is an example of the table in which the shutter speed is associated with the brightness adjustment suppression coefficient β. In the table T12 of FIG. 65, the brightness adjustment suppression coefficient β decreases as the shutter speed is fast. In this example, the brightness adjustment determination unit 35b can decrease the brightness adjustment suppression coefficient β when the shutter speed is fast by reading the brightness adjustment suppression coefficient β corresponding to the shutter speed of the imaging device 3b.

<Example 3: F-number Setting Information of Imaging Optical System 2>

As the third example, the videographing setting information acquisition unit 18, for example, may acquire F-number setting information representing an F-number set by the imaging optical system 2 attached to the imaging device 3b as an example of videographing setting information. Then, the brightness adjustment determination unit 35b, for example, may determine the behavior of the brightness adjustment using the motion information of the subject acquired as the inter-frame change information, the size information of the subject acquired as the intra-frame information, and the F-number setting information.

When the F-number setting of the imaging optical system 2 decreases, a depth of field becomes shallow. When the depth of field is shallow, the videographer (or appreciator) tends to direct awareness to one subject in focus. Accordingly, the brightness adjustment determination unit 35b, for example, may be configured to suppress the brightness adjustment when the F-number setting of the imaging device 3b is large. As the specific correction process, as in the first example, the brightness adjustment determination unit 35b, for example, may correct the behavior of the brightness adjustment according to Equation (10). At this time, the brightness adjustment determination unit 35b, for example, may be configured to decrease the brightness adjustment suppression coefficient β within Equation (10) when the F-number setting is large.

<Example 4: Focal Distance Setting Information of Imaging Optical System 2>

As the fourth example, the videographing setting information acquisition unit 18, for example, may acquire focal distance setting information representing a focal distance set by the imaging optical system 2 attached to the imaging device 3b as an example of videographing setting information. Then, the brightness adjustment determination unit 35b, for example, may determine the behavior of the brightness adjustment using the motion information of the subject acquired as the inter-frame change information, the size information of the subject acquired as the intra-frame information, and the focal distance setting information.

When the focal distance of the imaging device 3b is short, it is difficult to direct awareness to one subject because the videographer (or appreciator) looks over a wide range. Accordingly, the brightness adjustment determination unit 35b, for example, may determine the behavior of the brightness adjustment to suppress the brightness adjustment when the focal distance setting of the imaging optical system 2 is short. As a specific correction process, as in example 1, the brightness adjustment determination unit 35b, for example, may correct the behavior of the brightness adjustment according to Equation (10) as in example 1. At this time, the brightness adjustment determination unit 35b, for example, may be configured to decrease the brightness adjustment suppression coefficient β within Equation (10) when the focal distance is short.

<Example 5: Setting Information of Image Processing of Imaging Device 3b>

As the fifth example, the videographing setting information acquisition unit 18, for example, may acquire image processing setting information related to setting of image processing of the imaging device 3b as an example of videographing setting information. Then, the brightness adjustment determination unit 35b, for example, may determine the behavior of the brightness adjustment using the motion information of the subject acquired as the inter-frame change information, the size information of the subject acquired as the intra-frame information, and the image processing setting information.

The videographing setting information acquisition unit 18, for example, acquires NR strength as image processing setting information. When the NR is weakened, the state within the screen of the imaging device 3b of the moving image tends to be complex. Accordingly, the brightness adjustment determination unit 35a, for example, may determine the behavior of the brightness adjustment to suppress the brightness adjustment when the NR strength is low. As the specific correction process, as in the first example, the brightness adjustment determination unit 35b, for example, may correct the behavior of the brightness adjustment according to Equation (10). At this time, the brightness adjustment determination unit 35b, for example, may be configured to decrease the brightness adjustment suppression coefficient β within Equation (10) when the NR strength is low.

Also, the videographing setting information acquisition unit 18, for example, may acquire representation enhancement process information representing the presence/absence or strength of a representation enhancement process as image processing setting information. Here, the representation enhancement process, for example, is a process of enhancing the color saturation of the entire image and colorfully impressively enhancing the captured image. When the representation enhancement process is applied, visual stimulus from the screen of the imaging device 3b becomes strong. Accordingly, the brightness adjustment determination unit 15b, for example, may determine the behavior of the brightness adjustment to suppress the brightness adjustment as the strength of the representation enhancement process increases. In addition, as another example, the brightness adjustment determination unit 35b, for example, may determine the behavior of the brightness adjustment to suppress the brightness adjustment when the strength of the representation enhancement process is high. As the specific correction process, as in the first example, the brightness adjustment determination unit 35b, for example, may correct the behavior of the brightness adjustment according to Equation (10).

At this time, the brightness adjustment determination unit 35b, for example, may be configured to decrease the brightness adjustment suppression coefficient β within Equation (10) when the strength of the representation enhancement process is high. In addition, as another example, the brightness adjustment determination unit 35b, for example, may be configured to decrease the brightness adjustment suppression coefficient β within Equation (10) when the representation enhancement process is present.

Figure 66:
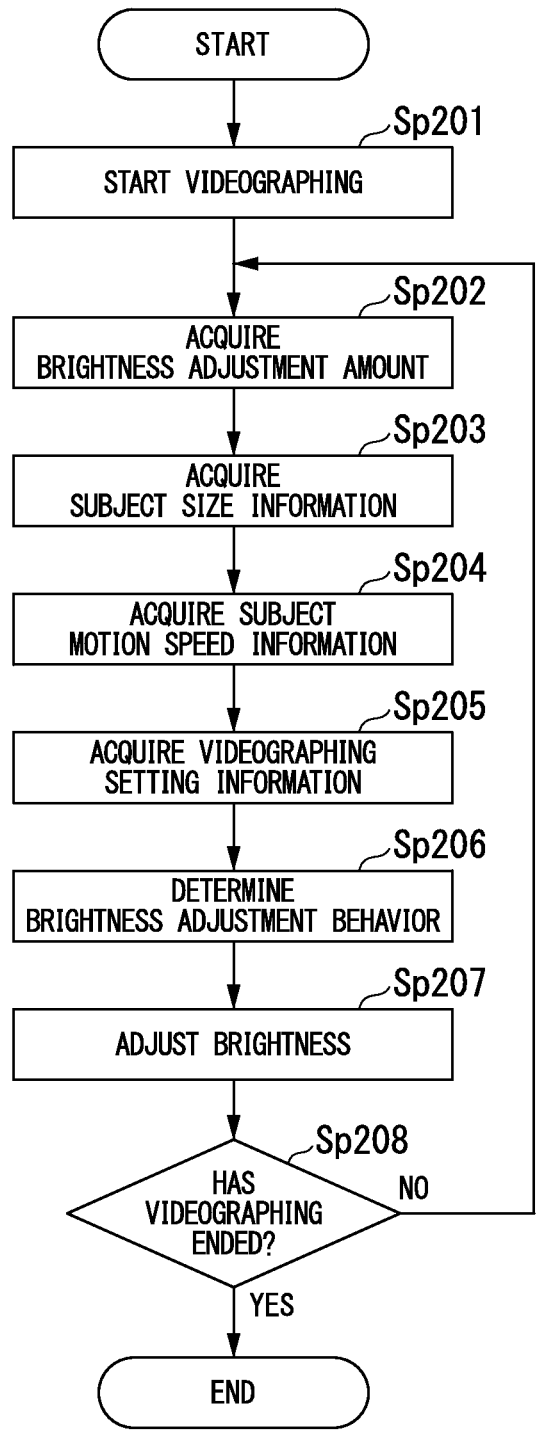
FIG. 66 is a flowchart showing an example of a flow of a process of the imaging device in the modified example 9 of the example 1 of the second embodiment.

FIG. 66 is a flowchart showing an example of a flow of a process of the imaging device 3b in the modified example 9 of the example 1 of the second embodiment.

Because steps Sp201 to Sp204 are the same as steps Sp101 to Sp104 of FIG. 63, a description thereof will be omitted.

(Step Sp205) Next, the videographing setting information acquisition unit 18 acquires videographing setting information.

(Step Sp206) Next, the brightness adjustment determination unit 35b, for example, determines the behavior of the brightness adjustment further using the videographing setting information in addition to the motion information of the subject acquired as the inter-frame change information and the size information of the subject acquired as the intra-frame information.

Because the processes of steps Sp207 and Sp208 are the same as steps Sp106 and Sp107 of FIG. 63, a description thereof will be omitted.

In modified example 9 of the above example 1, the brightness adjustment determination unit 35b, for example, determines the behavior of the brightness adjustment further using the videographing setting information in addition to the motion information of the subject and the size information of the subject. Because the behavior of the brightness adjustment is further determined using the videographing setting information, it is possible to provide a more preferable moving image for the videographer (or appreciator) through the behavior of the brightness adjustment.

<Example 2>

Next, example 2 will be described. In this example, the behavior of the brightness adjustment is determined using information related to an inter-frame change and information of a videographing situation and a subject situation determined from information within one frame as the information related to the human subjective brightness adjustment. This example will be described using a scene in which brightness of the subject changes and therefore a subject of attention, that is, a subject desired to be set in the optimum brightness state, changes in a state in which there is no motion or change in the imaging device itself as in FIG. 67 and a plurality of subjects are already present.

Figure 67:
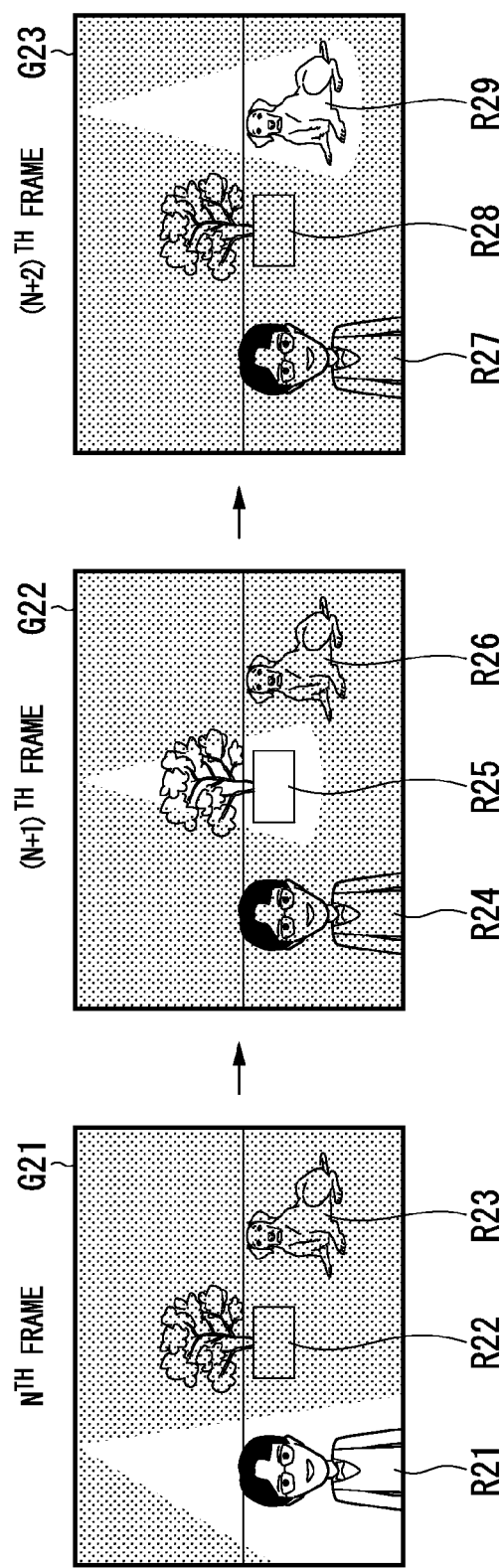
FIG. 67 is a diagram showing an example of a videographed scene in the example 2 of the second embodiment.

FIG. 67 is a diagram showing an example of a videographed scene in example 2. FIG. 67 shows a scene in which the position of a spotlight changes and the subject to which the appreciator pays attention changes. In an $N^{th}$ frame (N is a positive integer), the spotlight is on the videographer's daughter (registered in the imaging device) and no spotlight is on a white flower (which has not been registered in the imaging device) or the videographer's pet (registered in the imaging device). Because of this, in an image G21, an image region R21 of the videographer's daughter becomes white and an image region R22 of a white flower and an image region R23 of the videographer's pet becomes black.

In an $(N+1)^{th}$ frame, the spotlight is on the white flower and no spotlight is on the videographer's daughter or the videographer's pet. Because of this, in an image G22 of the $(N+1)^{th}$ frame, an image region R25 of a white flower becomes white, but an image region R24 of the videographer's daughter and an image region R26 of the videographer's pet become black.

In an $(N+2)^{th}$ frame, the spotlight is on the videographer's pet and no spotlight is on the videographer's daughter or the white flower. Because of this, in an image G23 of the $(N+2)^{th}$ frame, an image region R29 of the videographer's pet becomes white, but an image region R27 of the videographer's daughter and an image region R28 of the white flower become black.

Figure 68:
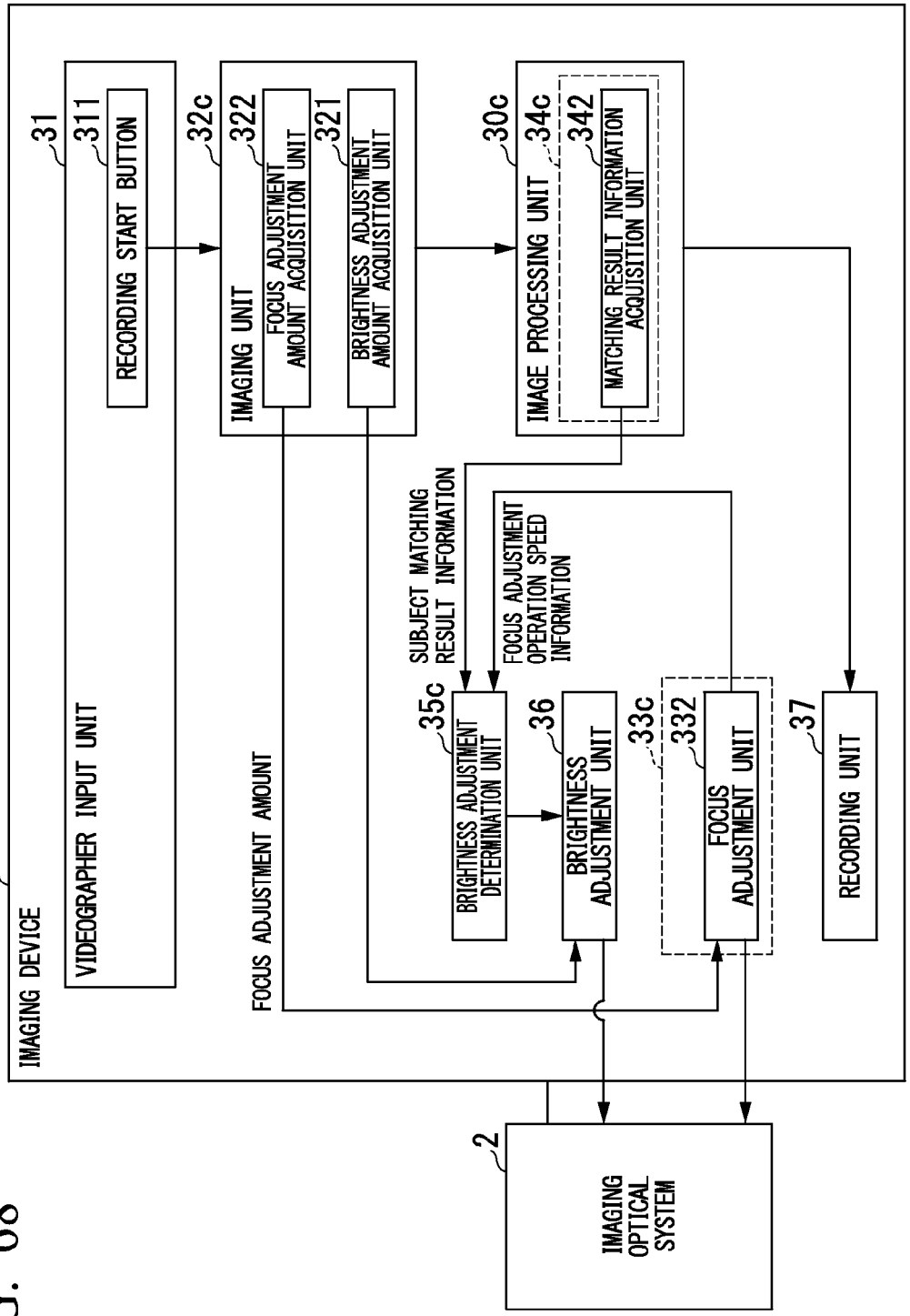
FIG. 68 is a schematic block diagram showing a configuration of an imaging device in the example 2 of the second embodiment.

FIG. 68 is a schematic block diagram showing a configuration of an imaging device 3c in example 2. Also, elements common with FIG. 61 are assigned the same reference signs and specific description thereof will be omitted. With respect to the configuration of the imaging device 3a of example 1 of FIG. 61, the configuration of the imaging device 3c in example 2 is configured by changing the image processing unit 30 to an image processing unit 30c, changing the imaging unit 32a to an imaging unit 32c, changing the brightness adjustment determination unit 35a to a brightness adjustment determination unit 35c, and changing the inter-frame change information acquisition unit 33a to an inter-frame change information acquisition unit 33c which is arranged outside the image processing unit 30c. The image processing unit 30c includes an intra-frame information acquisition unit 34c, and the intra-frame information acquisition unit 34c includes a matching result information acquisition unit 342. With respect to the imaging unit 32a of example 1 of FIG. 61, the imaging unit 32c additionally includes a focus adjustment amount acquisition unit 322. The inter-frame change information acquisition unit 33c includes a focus adjustment unit 332.

Next, a process of each part of the imaging device 3c will be described in the order of processing at the time of moving-image recording.

<Process 1>

The imaging device 3c sets a brightness adjustment target region. As an example in this example, the brightness adjustment amount acquisition unit 321 of the imaging device 3c sets a brightest region as a brightness adjustment target region in one frame image included in the moving-image signal obtained through videographing and holds the brightness adjustment target region. In addition, as an example, the focus adjustment is also performed by targeting the brightness adjustment target region.

<Process 2>

The recording start button 311 receives a videographing start instruction from the videographer, and outputs start instruction information representing the received videographing start instruction to the imaging unit 32a. Upon receiving the videographing start instruction input from the videographer input unit 31, the imaging unit 32a generates a moving-image signal by converting light incident from the subject via the imaging optical system 2 into an electrical signal at a predetermined shutter speed. Thereby, the imaging unit 32a can start the moving-image recording according to the instruction of the videographer. The imaging unit 32a outputs the generated moving-image signal to the image processing unit 30c <Process 3>

The brightness adjustment amount acquisition unit 321 acquires a brightness adjustment amount for setting the brightness adjustment target area in the optimum brightness state based on information of the brightness adjustment target area set by the brightness adjustment amount acquisition unit 321, and outputs the acquired brightness adjustment amount to the brightness adjustment unit 36. Specifically, for example, the brightness adjustment amount acquisition unit 321 acquires the brightness adjustment amount so that the pixel value of the brightness adjustment target region is included in a predetermined range. Thereby, it is possible to prevent the brightness adjustment target region from being excessively darkened or becoming pure white.

<Process 4>

Image data (for example, image data of a face) of a "subject (for example, a family member or the like) (hereinafter referred to as a registered subject)" to which the videographer is likely to pay attention imaged by the imaging device 3c, for example, is pre-stored in the recording unit 37. The matching result information acquisition unit 342, for example, extracts the feature amount of the registered subject from the image information, and pre-stores the extracted feature amount of the registered subject in a memory (not shown). The matching result information acquisition unit 342, for example, extracts the feature amount of the subject within the brightness adjustment target region (within the brightest region as an example) as intra-frame information, matches the extracted feature amount with the feature amount of the registered subject stored in the memory (not shown), and acquires a matching result. At this time, the matching result information acquisition unit 342, for example, obtains a matching result representing that a current subject is the registered subject if the extracted feature amount and the feature amount of the registered subject match at a matching rate of a predetermined reference or more.

The matching result information acquisition unit 342 outputs matching result information representing the acquired matching result to the brightness adjustment determination unit 35c.

<Process 5>

The focus adjustment unit 332, for example, acquires operation information of the focus adjustment (here, focus adjustment operation speed information representing the operation speed of the focus adjustment as an example) as the inter-frame change information, and outputs the acquired operation information to the brightness adjustment determination unit 35c. As an example in this example, the focus adjustment unit 332 compares the operation speed of the focus adjustment to first and second threshold values (here, the second threshold value is less than the first threshold value) pre-stored in a memory (not shown) within the imaging device 3c, thereby determining that the operation speed is "fast" when the operation speed is greater than that of the first threshold value, determining that the operation speed is "moderate" when the operation speed is less than or equal to the first threshold value and greater than that of the second threshold value, and determining that the operation speed is "slow" when the operation speed is less than or equal to the second threshold value. Also, the present invention is not limited thereto. The focus adjustment unit 322, for example, may employ the operation speed of the focus adjustment without change.

Although the focus adjustment optical system of the imaging optical system 2 is controlled to perform the focus adjustment in this example, the present invention is not limited to this process, videographing is performed using the imaging optical system 2 of a structure, for example, as shown in a reference literature of ["Light Field Videography with a Hand-Held Plenoptic Camera" Ren Ng et al. Stanford Tech Report CTSR 2005-02], and the focus adjustment unit 332 may perform the focus adjustment through image processing after videographing.

<Process 6>

The brightness adjustment determination unit 35c determines the behavior of the brightness adjustment based on matching result information acquired by the matching result information acquisition unit 342 and focus adjustment operation information (here, focus adjustment operation speed information as an example) acquired by the focus adjustment unit 332. Specifically, for example, a table in which a speed suppression coefficient $\alpha$ is associated for every set of focus adjustment speed information and matching result information is pre-stored in a memory (not shown) as shown in FIG. 69. In addition, the reference brightness adjustment speed $V_{base}$ of the moving-image videographing time is pre-stored in the memory (not shown). In this case, the brightness adjustment determination unit 35c reads the speed suppression coefficient $\alpha$ corresponding to a set of the acquired matching result information and the acquired focus adjustment operation speed information from the memory (not shown). Then, the brightness adjustment determination unit 35c reads the reference brightness adjustment speed $V_{base}$ of the moving-image videographing time from the memory (not shown), and determines a real brightness adjustment speed $V_{control}$ according to Equation (9) of example 1. The brightness adjustment determination unit 35c outputs the determined behavior of the brightness adjustment (here, the real brightness adjustment speed $V_{control}$ as an example) to the brightness adjustment unit 36.

FIG. 69 is an example of the table in which the speed suppression coefficient $\alpha$ is associated for every set of the focus adjustment speed and the matching result of the subject. In the table T13 of FIG. 69, when the focus adjustment speed is fast, the speed suppression coefficient $\alpha$ increases. Thereby, the brightness adjustment determination unit 35c, for example, can increase the real brightness adjustment speed $V_{control}$ when the focus adjustment speed is fast. In addition, the speed suppression coefficient $\alpha$ is higher when the subject matching result is that registration has been performed, which represents that the imaging target subject is pre-registered, than when no registration has been performed, which represents that the imaging target subject is not pre-registered. Thereby, the brightness adjustment determination unit 35c, for example, can increase the real brightness adjustment speed $V_{control}$ so as to be higher when the subject matching result represents that registration has been performed than when no registration has been performed.

For example, when the brightness of the subject within the screen of the imaging device 3c changes and the brightness adjustment (and focus adjustment) is performed in a state in which there is no motion or change in the imaging device as in FIG. 67, the videographer (or appreciator) tends to determine to set the subject in the optimum brightness state when the subject of the imaging target is easily detected by the videographer. Consequently, the brightness adjustment determination unit 35c, for example, increases the real brightness adjustment speed $V_{control}$ so as to be higher when the subject of the videographing target is pre-registered than when the subject of the videographing target is not registered. In addition, the videographer (or appreciator) tends to direct awareness to the subject when the focus adjustment is performed fast. Consequently, the brightness adjustment determination unit 35c, for example, increases the real brightness adjustment speed $V_{control}$ when the focus adjustment is fast.

<Process 7>

The brightness adjustment unit 36, for example, changes the aperture of the imaging optical system 2 to adjust the brightness of the frame image included in the moving-image signal so that the brightness is changed by the brightness adjustment amount input from the brightness adjustment amount acquisition unit 321 according to the behavior of the brightness adjustment determined by the brightness adjustment determination unit 35a (here, a real brightness adjustment speed $V_{control}$ as an example).

<Process 8>

The imaging device 3c iterates the above-described processes 3 to 7 until the videographer input unit 31 receives a videographing end instruction from the videographer.

Figure 70:
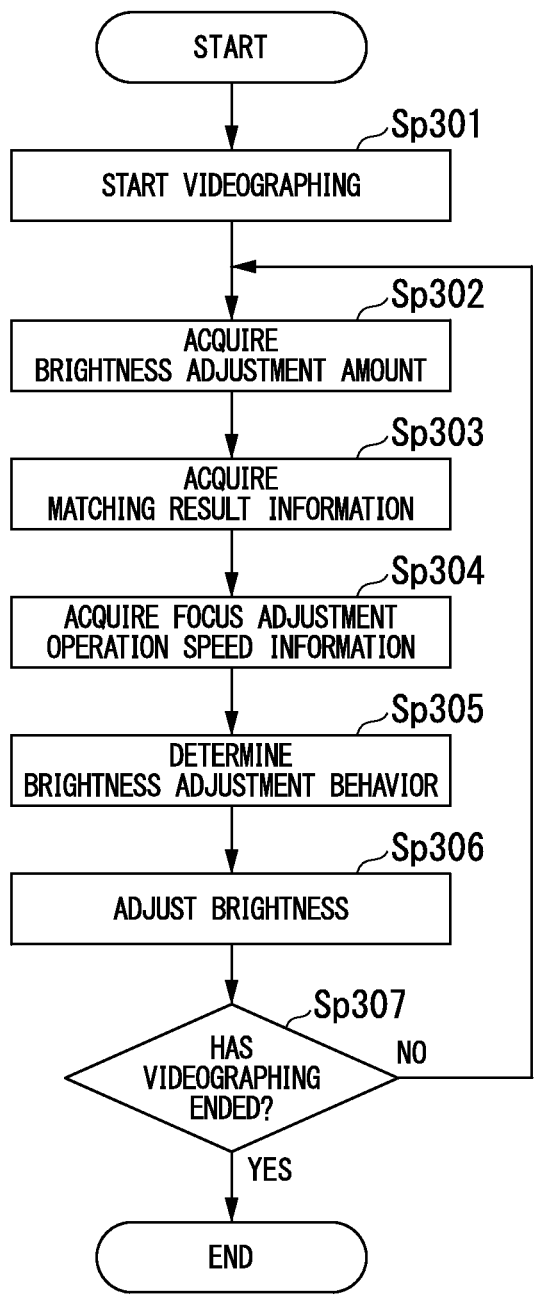
FIG. 70 is a flowchart showing an example of a flow of a process of the imaging device in the example 2 of the second embodiment.

FIG. 70 is a flowchart showing an example of a flow of a process of the imaging device 3c in example 2. Because the processes of steps Sp301 and Sp302 are the same as steps Sp101 and Sp102 of FIG. 63, description thereof will be omitted.

(Step Sp303) Next, the matching result information acquisition unit 342 acquires matching result information representing a matching result of the imaging target subject and the registered subject.

(Step Sp304) Next, the focus adjustment unit 332, for example, acquires focus adjustment operation speed information as an example of the focus adjustment operation information.

(Step Sp305) Next, the brightness adjustment determination unit 35c determines the behavior of the brightness adjustment based on the matching result information acquired by the matching result information acquisition unit 342 and the focus adjustment operation speed information acquired by the focus adjustment unit 332.

Because the processes of steps Sp306 and Sp307 are the same as steps Sp106 and Sp107 of FIG. 63, description thereof will be omitted. Accordingly, the process of this flowchart ends.

In the above example 2, the brightness adjustment determination unit 35c determines the behavior of the brightness adjustment based on the matching result information acquired by the matching result information acquisition unit 342 and the focus adjustment operation speed information acquired by the focus adjustment unit 332. At this time, the brightness adjustment determination unit 35c, for example, increases the real brightness adjustment speed $V_{control}$ so as to be higher when the subject of the videographing target is pre-registered than when the subject of the videographing target is not registered. Further, the brightness adjustment determination unit 35c, for example, increases the real brightness adjustment speed $V_{control}$ when the focus adjustment is fast. Thereby, it is possible to provide a moving image having a more preferable appearance for the videographer (or appreciator) because the brightness of the subject rapidly becomes bright when it is easy to catch the awareness of the videographer (or appreciator).

Furthermore, although the behavior of the brightness adjustment according to a situation (a situation of an imaging device of videographing, a situation of a subject, or the like) is implemented by changing the speed of the brightness adjustment in this example, the present invention is not limited thereto. The determination of the behavior of the brightness adjustment according to a situation may be implemented as follows.

(1) Acceleration in the brightness adjustment is determined according to the situation of the subject and the situation of the videographing.

(2) The timing at which deceleration starts in the brightness adjustment is determined according to the situation of the subject and the situation of the videographing.

(3) A required time from a brightness adjustment start to the optimum brightness point state is determined according to the situation of the subject and the situation of the videographing.

(4) The timing at which the brightness adjustment starts is determined according to the situation of the subject and the situation of the videographing.

Also, although the matching result information acquisition unit 342 acquires matching result information representing a matching result of the imaging target subject and the registered subject as intra-frame information in this example, other information described below may be acquired instead. In this case, the brightness adjustment determination unit 35c may determine the behavior of the brightness adjustment using the information and the inter-frame change information (for example, focus adjustment operation speed information).

<Modified Example 1: Subject Recognition Result Information>

The intra-frame information acquisition unit 34c includes a subject recognition result information acquisition unit instead of the matching result information acquisition unit 342, and the subject recognition result information acquisition unit may acquire subject recognition result information. Here, the subject recognition result information is information representing a result of recognizing a type of subject. The ease of catching awareness of the videographer (or appreciator) is changed according to the type of subject of the brightness adjustment target. For example, a human, an animal, a flower, or the like easily catches awareness, but a stone, a weed, or the like does not catch awareness as easily. Consequently, the brightness adjustment determination unit 35c, for example, may determine the behavior of the brightness adjustment to suppress the brightness adjustment when the subject recognition result information is a stone or a weed. In addition, for example, the behavior of the brightness adjustment may be determined to promote the brightness adjustment when the subject recognition result information is a human, an animal, or a flower. Thereby, because the brightness adjustment determination unit 35c can perform the brightness adjustment according to the ease of catching the awareness of the videographer (or appreciator), the imaging device 3c can provide a moving image having a more preferable appearance for the videographer (or appreciator).

<Modified Example 2: Information Related to Matching Result of Previously Videographed Subject and Subject of Brightness Adjustment Target>

The matching result information acquisition unit 342 may acquire the matching result of the previously videographed subject and the subject of the brightness adjustment target. Then, the brightness adjustment determination unit 35c, for example, may determine the behavior of the brightness adjustment using the information related to the matching result (for example, a frequency at which the subject of the videographing target has been previously videographed) and the focus adjustment operation speed information. Even in the same type of subject, the ease of catching awareness of the videographer (or appreciator) is changed according to whether it is a previously frequently videographed subject. The previously frequently videographed subject tends to catch awareness. Accordingly, the brightness adjustment determination unit 35c, for example, may determine the behavior of the brightness adjustment to promote the brightness adjustment when a frequency at which the subject of the videographing target has been videographed for a previously fixed period is greater than a predetermined threshold value. Thereby, because the brightness adjustment determination unit 35c can perform the brightness adjustment according to the ease of catching the awareness of the videographer (or appreciator), the imaging device 3c can provide a more preferable moving image for the videographer (or appreciator).

In addition, although the focus adjustment unit 332 acquires focus adjustment operation speed information as an example of operation information of the focus adjustment serving as inter-frame change information in this example, the focus adjustment unit 332 may acquire focus adjustment amount information, focus adjustment operation continuity information, or focus adjustment direction information shown below instead of the focus adjustment operation speed information. In this case, the brightness adjustment determination unit 35c, for example, may determine the behavior of the brightness adjustment using any one of the focus adjustment amount information, focus adjustment operation continuity information, and focus adjustment direction information and information (for example, matching result information) related to an intra-frame change.

<Modified Example 3: Focus Adjustment Amount Information>

The focus adjustment unit 332 may acquire focus adjustment amount information representing a focus adjustment amount as an example of the focus adjustment operation information serving as the inter-frame change information. After focus adjustment is performed by a certain amount, the videographer (or appreciator) tends to determine to set the next subject in the optimum brightness state. Accordingly, the brightness adjustment determination unit 35c, for example, may determine the behavior of the brightness adjustment to suppress the brightness adjustment when the focus adjustment amount is less than or equal to a predetermined threshold value, and determine the behavior of the brightness adjustment to promote the brightness adjustment when the focus adjustment amount exceeds the predetermined threshold value. Thereby, it is possible to suppress the focus adjustment until the focus adjustment is performed by a certain amount and promote the focus adjustment after the focus adjustment is performed by the certain amount. Because of this, the imaging device 3c can provide a more preferable moving image for the videographer (or appreciator).

<Modified Example 4: Focus Adjustment Operation Continuity Information>

The focus adjustment unit 332 may acquire focus adjustment operation continuity information representing continuity of the focus adjustment operation as an example of the operation information of the focus adjustment as the inter-frame change information. The focus adjustment unit 332, for example, determines the continuity of the focus adjustment operation based on the change acceleration of the focus position change value in several previous frames. Specifically, for example, the focus adjustment unit 332 determines that there is no continuity when positive and negative change accelerations are mixed (motion is not constant), and determines that there is continuity when the change acceleration is constant at the positive or negative change acceleration among several previous frames. When there is continuity in the focus adjustment operation, the videographer (or appreciator) tends to determine to set the next subject in the optimum brightness state. Accordingly, when the focus adjustment unit 332 determines that there is continuity in the focus adjustment operation, the brightness adjustment determination unit 35c, for example, may determine the behavior of the brightness adjustment to promote the brightness adjustment. Thereby, because the brightness adjustment determination unit 35c can rapidly set the brightness of the subject which is easily determined to be set by the videographer (or appreciator) in the optimum brightness state, the imaging device 3c can provide a more preferable moving image for the videographer (or appreciator).

<Modified Example 5: Focus Adjustment Direction Information>

The focus adjustment unit 332 may acquire focus adjustment direction information representing a direction of the focus adjustment as an example of the operation information of the focus adjustment serving as the inter-frame change information. For example, the videographer (or appreciator) is more likely to determine to set the next subject in the optimum brightness state when the focus adjustment is performed from the rear to the front than when the focus adjustment is performed from the front to the rear. Accordingly, the brightness adjustment determination unit 35c, for example, may determine the behavior of the brightness adjustment to promote the brightness adjustment when the focus adjustment is performed from the rear to the front more than when the focus adjustment is performed from the front to the rear. Thereby, because the brightness adjustment determination unit 35c can rapidly set the brightness of the subject which is more easily determined to be set by the videographer (or appreciator) in the optimum brightness state, the imaging device 3c can provide a more preferable moving image for the videographer (or appreciator).

<Modified Example 6: Case in which Time Required for Brightness Adjustment is Changed>

Although the change in the brightness adjustment behavior according to a videographing situation and a subject situation is implemented by changing the adjustment speed of the brightness adjustment using the focus adjustment speed and the subject matching result in this embodiment, the change in the brightness adjustment behavior, for example, may be additionally implemented by referring to the table as in FIG. 93, and determining a required time required for the brightness adjustment behavior.

For example, the table T16 in which one brightness adjustment speed suppression coefficient α is associated for a set of the subject matching result and the focus adjustment speed is stored in the memory (not shown) as in FIG. 93. In this case, the brightness adjustment determination unit 35a, for example, reads the brightness adjustment speed suppression coefficient α corresponding to the set of the acquired subject matching result and the acquired focus adjustment speed by referring to the table T16 of FIG. 93.

<Modified Example 7: Case in which Spatial Position Information of Imaging Device is Acquired>

Furthermore, although the behavior of the brightness adjustment is determined using the focus adjustment speed and the subject matching result information in this example, the spatial position information of the imaging device may be additionally acquired to determine the behavior of the brightness adjustment. In this case, the configuration of the imaging device is shown in FIG. 94.

Figure 94:
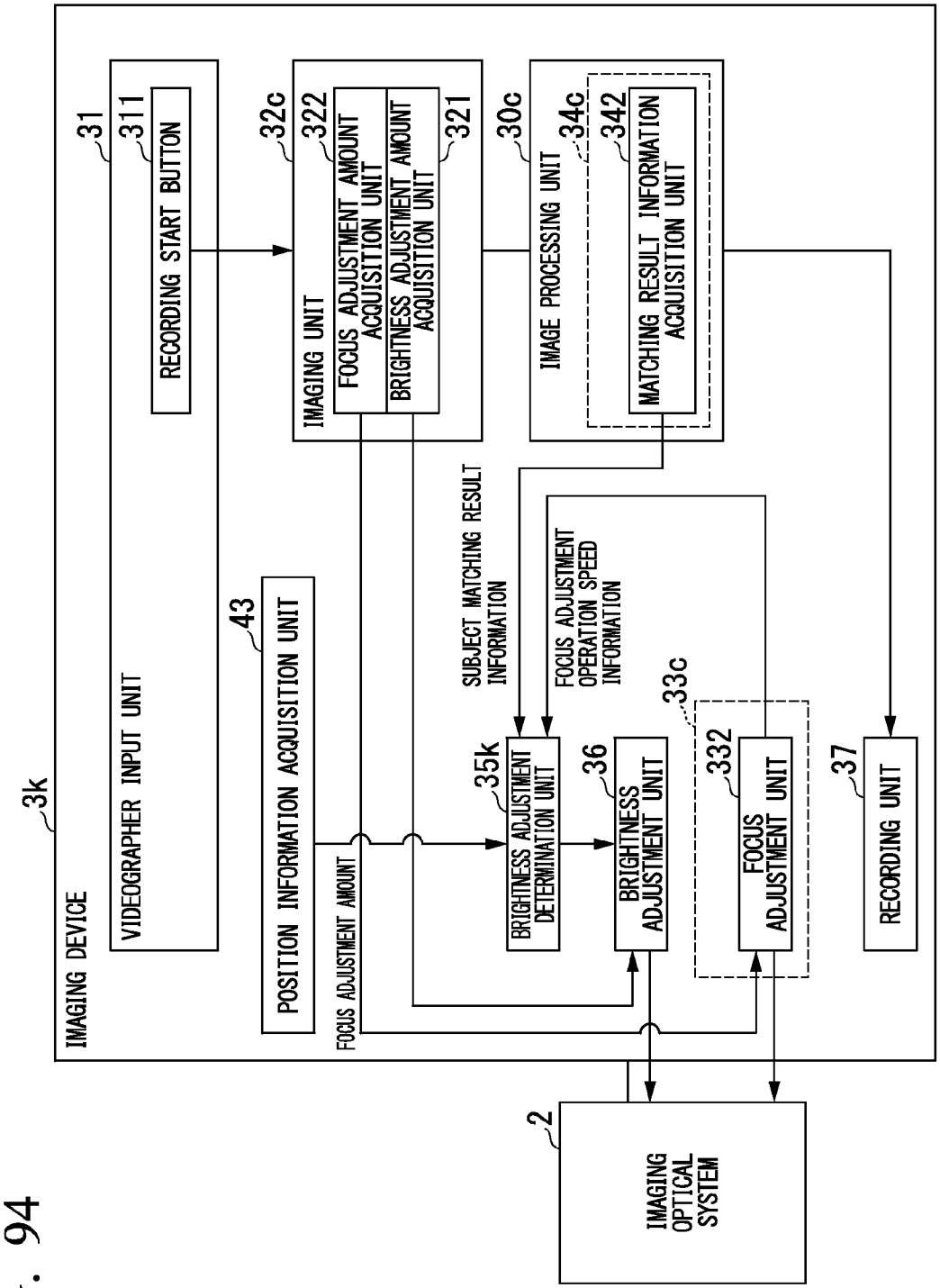
FIG. 94 is a schematic block diagram showing a configuration of an imaging device in a modified example 7 of the example 2 of the second embodiment.

FIG. 94 is a schematic block diagram showing a configuration of an imaging device 3k in the modified example 7 of the example 2 of the second embodiment. Also, elements common with FIG. 68 are assigned the same reference signs and a specific description thereof will be omitted. With respect to the configuration of the imaging device 3c of example 2 of FIG. 68, the configuration of the imaging device 3k in modified example 7 is configured by adding a position information acquisition unit 43 and changing the brightness adjustment determination unit 35c to a brightness adjustment determination unit 35k.

The spatial position information of the imaging device 3k is acquired using the position information acquisition unit 43 (Global Positioning System (GPS)) attached to the imaging device 3k. Although the spatial position information of the imaging device is acquired using the GPS unit within the imaging device in this modified example, the present invention is not limited thereto. GPS information or the like of a mobile terminal possessed by the videographer may be used or the videographer may directly input the position information.

According to the spatial position information of the imaging device, it is possible to determine what the subject is and what the weather/illumination condition is. According to the information, a desire for the brightness adjustment changes. For example, an object to be videographed in a place in which there is a world heritage temple is expected to be a building or the like having a detailed structure. Accordingly, in this case, it is preferable to perform the brightness adjustment slightly early. In addition, when videographing is performed at a tourist attraction such as a beach or the like, a landscape is normally videographed. In this case, because there is not substantially expected to be a subject having a fine structure, it is preferable to slowly perform brightness adjustment.

As a specific correction method, for example, a correction parameter β may be acquired using the table as in FIG. 95 and the brightness adjustment speed may be corrected using Equation (10).

<Example 3>

Next, example 3 will be described. In this example, the behavior of the focus adjustment is determined using information related to an inter-frame change and information of a situation of videographing and a situation of a subject determined from information within one frame as information related to human subjective brightness adjustment. In this example, description of a scene in which the curtain on the stage rises from the dark state as in FIG. 71 and WB adjustment is performed and brightness adjustment is performed when an illumination state changes will be given. Also, the imaging device of this example is in a fixed state.

Figure 71:
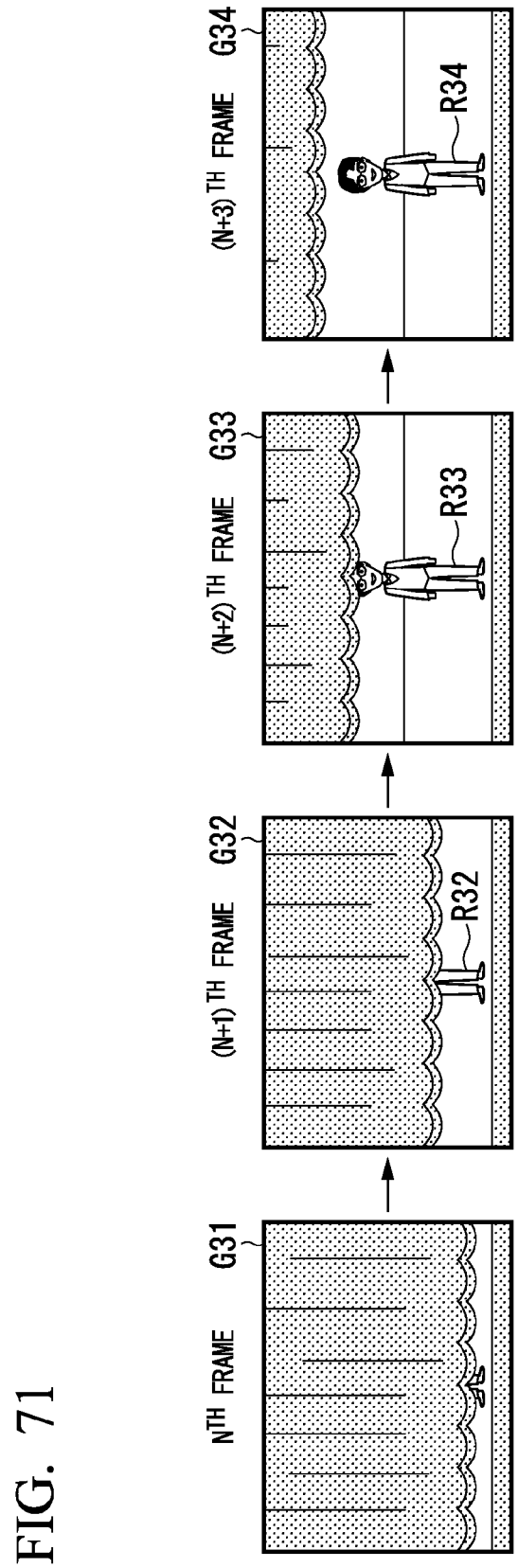
FIG. 71 is a diagram showing an example of a videographed scene in an example 3 of the second embodiment.

FIG. 71 is a diagram showing an example of a videographed scene in example 3. FIG. 71 shows the scene in which the curtain on the stage is raised from the dark state and the illumination state changes. The curtain on the stage is closed in an image G31 of an $N^{th}$ frame. In an image G32 of an $(N+1)^{th}$ frame, the curtain on the stage is raised more than in the image G31 of the $N^{th}$ frame, and part of the subject is displayed like an image region R32 of the subject which is shown. In an image G33 of an $(N+2)^{th}$ frame, the curtain on the stage is raised more than in the image G32 of the $(N+1)^{th}$ frame, and the entire subject is displayed like an image region R33 of the subject which is shown. In an image G34 of an $(N+3)^{th}$ frame, the curtain on the stage is raised more than in the image G33 of the $(N+2)^{th}$ frame, and the entire subject is displayed like an image region R34 of the subject which is shown. Also, in FIG. 71, the change in the brightness by WB adjustment and brightness adjustment is not shown.

Figure 72:
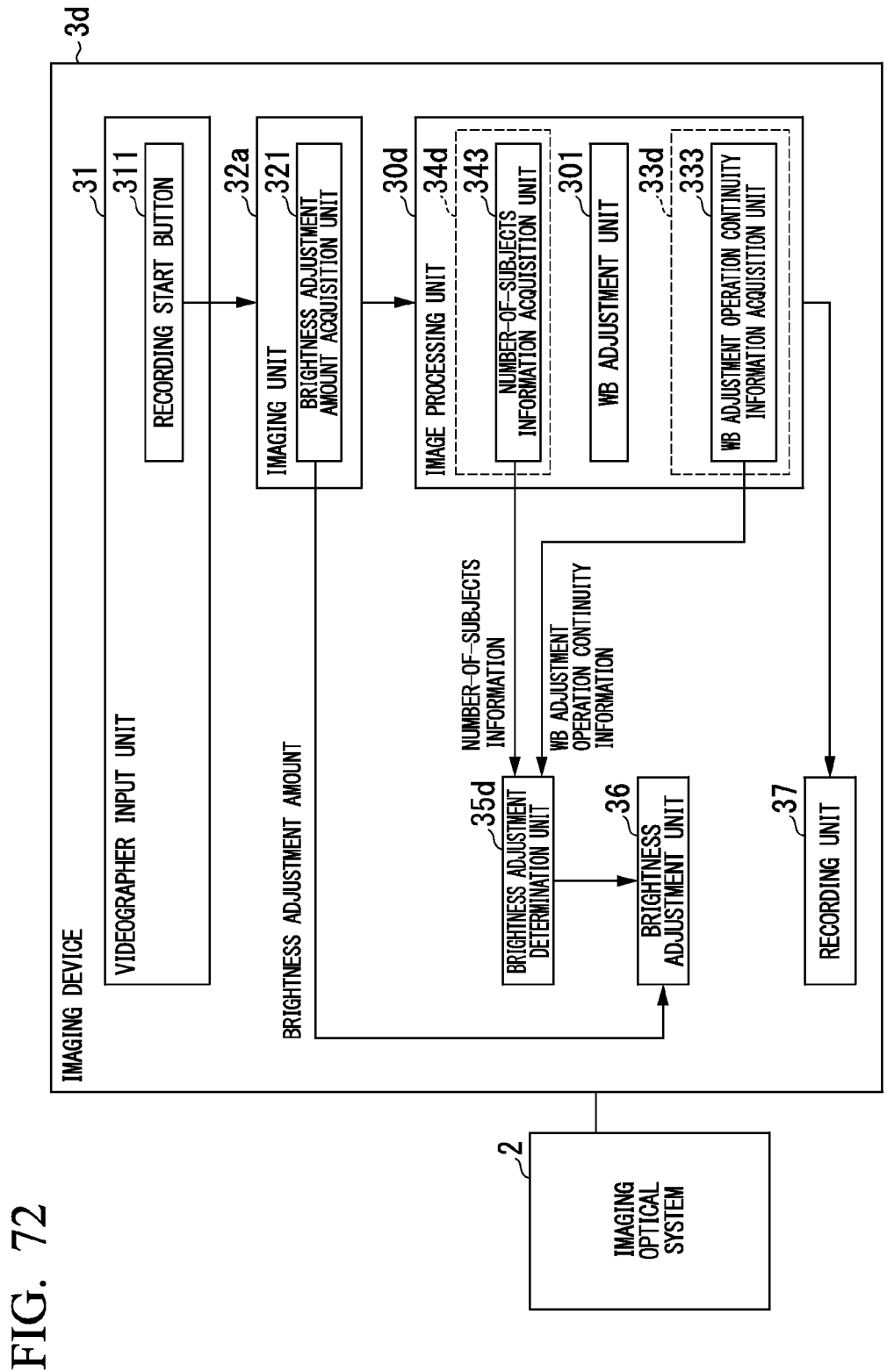
FIG. 72 is a schematic block diagram showing a configuration of an imaging device in the example 3 of the second embodiment.

FIG. 72 is a schematic block diagram showing a configuration of an imaging device 3d in example 3. Also, elements common with FIG. 61 are assigned the same reference signs and specific description thereof will be omitted. With respect to the configuration of the imaging device 3a of example 1 of FIG. 61, the configuration of the imaging device 3d in example 3 is configured by changing the image processing unit 30 to the image processing unit 30d and changing the brightness adjustment determination unit 35a to a brightness adjustment determination unit 35d. The image processing unit 30d includes an inter-frame change information acquisition unit 33d, an intra-frame information acquisition unit 34d, and a WB adjustment unit 301. The inter-frame change information acquisition unit 33d includes a WB adjustment operation continuity information acquisition unit 333. The intra-frame information acquisition unit 34d includes a number-of-subjects information acquisition unit 343.

Next, a process of each part of the imaging device 3d will be described in the order of processing at the time of moving-image recording.

<Process 1>

The videographer sets an area in which brightness adjustment and WB adjustment are performed. As an example in this example, the videographer performs designation for the subject around approximately the center of the screen of the imaging device 3d to perform brightness adjustment and WB adjustment for the subject. In this case, the videographer input unit 31, for example, receives the designation by the videographer and causes brightness adjustment target region information representing a brightness adjustment target region and WB adjustment target region information representing a WB adjustment target region to be stored in the memory (not shown) within the imaging device 3d. Here, as an example, the brightness adjustment target region and the WB adjustment target are the same region.

<Process 2>

The recording start button 311 receives a moving-image recording start instruction from the videographer and outputs start instruction information representing the received start instruction to the imaging unit 32a. Upon receiving the start instruction information from the videographer input unit 31, the imaging unit 32a generates a moving-image signal by converting light incident from the subject via the imaging optical system 2 into an electrical signal at a predetermined shutter speed. Thereby, the imaging unit 32a starts moving-image recording according to the instruction of the videographer. The imaging unit 32a outputs the generated moving-image signal to the image processing unit 30d.

<Process 3>

The WB adjustment unit 301 acquires a WB adjustment amount for setting a WB adjustment target area in an optimum WB state based on the WB adjustment target region information obtained when the videographer input unit 31 receives the designation by the videographer. Specifically, for example, the WB adjustment unit 301 extracts an uncolored white or gray region within each frame of the captured moving-image signal, and acquires a color conversion amount at which the extracted region becomes pure white as the WB adjustment amount. Also, the WB adjustment unit 301 may acquire the WB adjustment amount by extracting a region in which a specular reflection from each frame of the captured moving-image signal and estimating a color of the reflected region as a color of a light source.

<Process 4>

The brightness adjustment amount acquisition unit 321 acquires a brightness adjustment amount for setting the brightness adjustment target region in the optimum brightness state based on the set brightness adjustment target region information obtained when the videographer input unit 31 receives the designation by the videographer, and outputs the acquired brightness adjustment amount to the brightness adjustment unit 36. Specifically, for example, the brightness adjustment amount acquisition unit 321 acquires the brightness adjustment amount so that the pixel value of the brightness adjustment target region is included in a predetermined range. Thereby, it is possible to prevent the detected face from being excessively darkened or becoming pure white.

<Process 5>

The number-of-subjects information acquisition unit 343 acquires number-of-subjects information representing the number of subjects as an example of the subject information. At this time, the number-of-subjects information acquisition unit 343, for example, acquires information of the number of subjects by performing a figure-ground determination and the extraction of a subject region using a well-known technique from an image through image processing. Also, the present invention is not limited thereto. The videographer inputs the number of subjects in advance, and the videographer input unit 31 may receive the number of subjects input by the videographer and output number-of-subjects information representing the received number of subjects to the number-of-subjects information acquisition unit 343.

<Process 6>

The WB adjustment unit 301 executes WB adjustment with the acquired WB adjustment amount.

<Process 7>

The WB adjustment operation continuity information acquisition unit 333 acquires the operation information of the WB adjustment (here, WB adjustment operation continuity information representing continuity of a WB adjustment operation as an example) as the inter-frame change information. At this time, the WB adjustment operation continuity information acquisition unit 333, for example, determines the continuity of the WB operation from change acceleration in a variation value (a variation value of a color temperature) of WB in a number of previous frames. For example, the WB adjustment operation continuity information acquisition unit 333 determines that there is no continuity when positive and negative change accelerations of several previous frames are mixed (motion is not constant), and determines that there is continuity when change accelerations of several previous frames are constant at positive or negative change acceleration.

<Process 8>

The brightness adjustment determination unit 35d determines the behavior of the brightness adjustment (here, a brightness adjustment operation speed as an example) based on the number-of-subjects information acquired by the number-of-subjects information acquisition unit 343 and the WB adjustment operation continuity information acquired by the WB adjustment operation continuity information acquisition unit 333. Specifically, for example, as shown in FIG. 73, a table in which brightness adjustment operation speed information representing an operation speed of brightness adjustment is associated for every set of number-of-subjects information and WB adjustment operation continuity information is pre-stored in the memory (not shown). In this case, the brightness adjustment determination unit 35d determines the behavior of the brightness adjustment by reading brightness adjustment operation speed information corresponding to the acquired number-of-subjects information and WB adjustment operation continuity information from the memory.

FIG. 73 is an example of a table in which an operation speed of brightness adjustment is associated for every set of the number of subjects and presence/absence of continuity of a WB adjustment operation. In the table T14 of FIG. 73, the operation speed of the brightness adjustment is represented by EV/sec. As shown in the table T14 of FIG. 73, the operation speed of the brightness adjustment increases as the number of subjects decreases. Thereby, the brightness adjustment determination unit 35d can increase the operation speed of the brightness adjustment as the number of subjects decreases. In addition, when the number of subjects is identical, the operation speed of the brightness adjustment is faster when there is continuity in the WB adjustment operation than when there is no continuity. Thereby, when the number of subjects is identical, the brightness adjustment determination unit 35d can increase the operation speed of the brightness adjustment more when there is continuity in the WB adjustment operation than when there is no continuity.

For example, when the scene being videographed changes as in FIG. 71 and the brightness adjustment and the WB adjustment are simultaneously performed, the videographer (or appreciator) tends to determine to set the next subject in the optimum brightness state when there is continuity in the WB adjustment operation. In addition, as the number of subjects decreases, the videographer (or appreciator) tends to direct awareness to one subject. Consequently, the brightness adjustment determination unit 35d, for example, increases the operation speed of the brightness adjustment when there is continuity in the WB adjustment operation and the number of subjects decreases.

<Process 9>

The brightness adjustment unit 36 changes the shutter speed so that the brightness is changed by a brightness adjustment amount input from the brightness adjustment amount acquisition unit 321 according to the behavior of the brightness adjustment (here, the operation speed of the brightness adjustment as an example) determined by the brightness adjustment determination unit 35d.

<Process 10>

The imaging device 3d iterates the above-described processing of processes 3 to 9 until the videographer input unit 31 receives an input of a videographing end instruction from the videographer.

Figure 74:
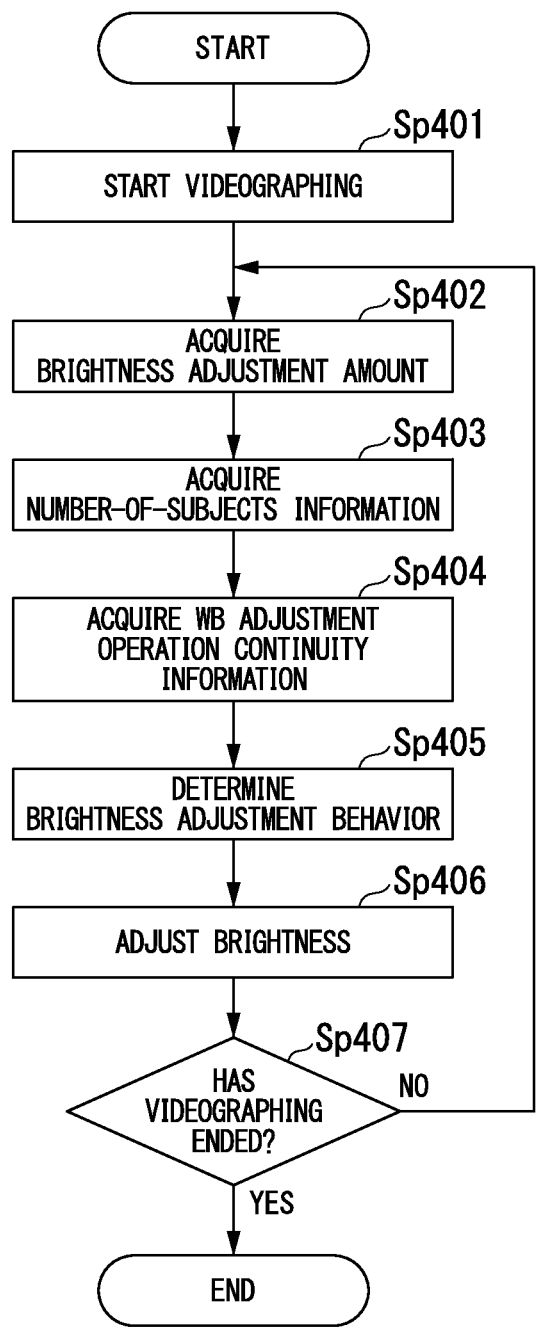
FIG. 74 is a flowchart showing an example of a flow of a process of the imaging device in the example 3 of the second embodiment.

FIG. 74 is a flowchart showing an example of a flow of a process of the imaging device 3d in example 3. Because steps Sp401 and Sp402 are the same as steps Sp101 and Sp102 of FIG. 63, a description thereof will be omitted.

(Step Sp403) Next, the number-of-subjects information acquisition unit 343 acquires number-of-subjects information as an example of subject information.

(step Sp404) Next, the WB adjustment operation continuity information acquisition unit 333 acquires WB adjustment operation continuity information as an example of operation information of WB adjustment.

(Step Sp405) Next, the brightness adjustment determination unit 35d determines the behavior of the brightness adjustment based on the number-of-subjects information acquired by the number-of-subjects information acquisition unit 343 and the WB adjustment operation continuity information acquired by the WB adjustment operation continuity information acquisition unit 333.

Because steps Sp406 and Sp407 are the same as steps Sp106 and Sp107 of FIG. 63, description thereof will be omitted. Accordingly, the process of this flowchart ends.

In the above example 3, the brightness adjustment determination unit 35d determines the behavior of the brightness adjustment based on the number-of-subjects information and the WB adjustment operation continuity information. At this time, the brightness adjustment determination unit 35d, for example, increases the operation speed of the brightness adjustment when there is continuity in the WB adjustment operation and the number of subjects decreases. Thereby, the brightness adjustment unit 36 can set the brightness in an optimum brightness state early for a subject which is easily determined to be set in the optimum brightness state as a subject to which the videographer (or appreciator) tends to direct awareness. Because of this, the imaging device 3d can provide a more preferable moving image for the videographer (or appreciator).

Also, although the inter-frame change information acquisition unit 33d acquires WB adjustment operation continuity information as operation information of WB adjustment in this example, the operation speed information of the WB adjustment or the operation amount information may be acquired instead. In this case, the brightness adjustment determination unit 35d may determine the behavior of the brightness adjustment based on the acquired information and the subject information (for example, number-of-subjects information). Hereinafter, a specific example will be described.

<Modified Example 1: Operation Speed of WB Adjustment>

The inter-frame change information acquisition unit 33d may include a WB adjustment operation speed acquisition unit instead of the WB adjustment operation continuity information acquisition unit 333. Then, the WB adjustment operation speed acquisition unit may acquire the operation speed of the WB adjustment. When the operation speed of the WB adjustment is fast, the videographer (or appreciator) is less likely to direct awareness to another subject during WB adjustment. Accordingly, the brightness adjustment determination unit 35d, for example, may determine the behavior of the brightness adjustment to suppress the brightness adjustment when the operation speed of the WB adjustment is fast.

<Modified Example 2: Execution Amount of WB Adjustment>

The inter-frame change information acquisition unit 33d may include a WB adjustment execution amount acquisition unit instead of the WB adjustment operation continuity information acquisition unit 333. Then, the WB adjustment execution amount acquisition unit may acquire an execution amount of the WB adjustment. When the WB adjustment is performed, the videographer (or appreciator) is more likely to direct awareness to the next subject in a state in which the WB has been changed to a certain degree than at the early stage of the WB adjustment start. Accordingly, the brightness adjustment determination unit 35d, for example, may determine the behavior of the brightness adjustment to suppress the brightness adjustment as the operation amount of the WB adjustment execution decreases. Thereby, when the execution amount of the WB adjustment is greater than or equal to a certain degree, the brightness adjustment unit 36 can perform the brightness adjustment.

<Modified Example 3: Subject Layout Information>

In addition, although the intra-frame information acquisition unit 34d includes a number-of-subjects information acquisition unit 343 and the number-of-subjects information acquisition unit 343 acquires number-of-subjects information as intra-frame information in this example, the present invention is not limited thereto. The intra-frame information acquisition unit 34d may include a subject layout information acquisition unit instead of the number-of-subjects information acquisition unit 343, and the subject layout information acquisition unit may acquire the subject layout information. In this case, the brightness adjustment determination unit 35d may determine the behavior of the brightness adjustment based on the subject layout information and the WB adjustment operation information (for example, WB adjustment operation continuity information). Hereinafter, a specific example will be described.

<Modified Example 3-1: Physical Position of Subject Serving as Subject Layout Information>

The subject layout information acquisition unit of the intra-frame information acquisition unit 34d may acquire the physical position of the subject as an example of the subject layout information. The subject layout information acquisition unit, for example acquires the physical position of the subject through image processing by well-known technology. Also, the subject layout information acquisition unit may acquire the physical position of the subject input by the videographer to the imaging device 3d. When the physical position of the subject is close to the imaging device, the videographer (or appreciator) tends to direct awareness to the subject. Accordingly, the brightness adjustment determination unit 35d, for example, may determine the behavior of the brightness adjustment to promote the brightness adjustment when the physical position of the subject is close to the imaging device 3d. Thereby, because the brightness adjustment unit 36 can set a close subject to which the videographer (or appreciator) tends to direct awareness in the optimum brightness state early, the imaging device 3d can provide a more preferable moving image for the videographer (or appreciator).

<Modified Example 3-2: Subject Distribution State as Subject Layout Information>

The subject layout information acquisition unit of the intra-frame information acquisition unit 34d may acquire the subject distribution state as an example of the subject layout information. When there are a plurality of subjects within the screen of the imaging device 3d, the videographer (or appreciator) tends to direct awareness to the subjects when the subjects are gathered in a similar place. Accordingly, the brightness adjustment determination unit 35d, for example, may determine the behavior of the brightness adjustment to promote the brightness adjustment when the subject distribution state is included in the predetermined range. Thereby, because the brightness adjustment unit 36 can set the subject to which the videographer (or appreciator) tends to direct awareness in the optimum brightness state early, the imaging device 3d can provide a more preferable moving image for the videographer (or appreciator).

<Modified Example 4: Information Specific to Imaging Optical System 2>

In addition, although the brightness adjustment determination unit 35d determines the behavior of the brightness adjustment using WB adjustment operation information acquired as inter-frame change information and subject information acquired as intra-frame information in this example, the behavior of the brightness adjustment may be determined further using information specific to the imaging optical system 2 attached to the imaging device 3d.

Although it is difficult to say that the information specific to the imaging optical system 2 is human-subjective-brightness-adjustment-related information itself, the information is an element which affects preferable brightness adjustment at the time of viewing a moving image. It is possible to additionally acquire the information and determine the more preferable behavior of the brightness adjustment by correcting the determined behavior of the brightness adjustment using the acquired information.

Figure 75:
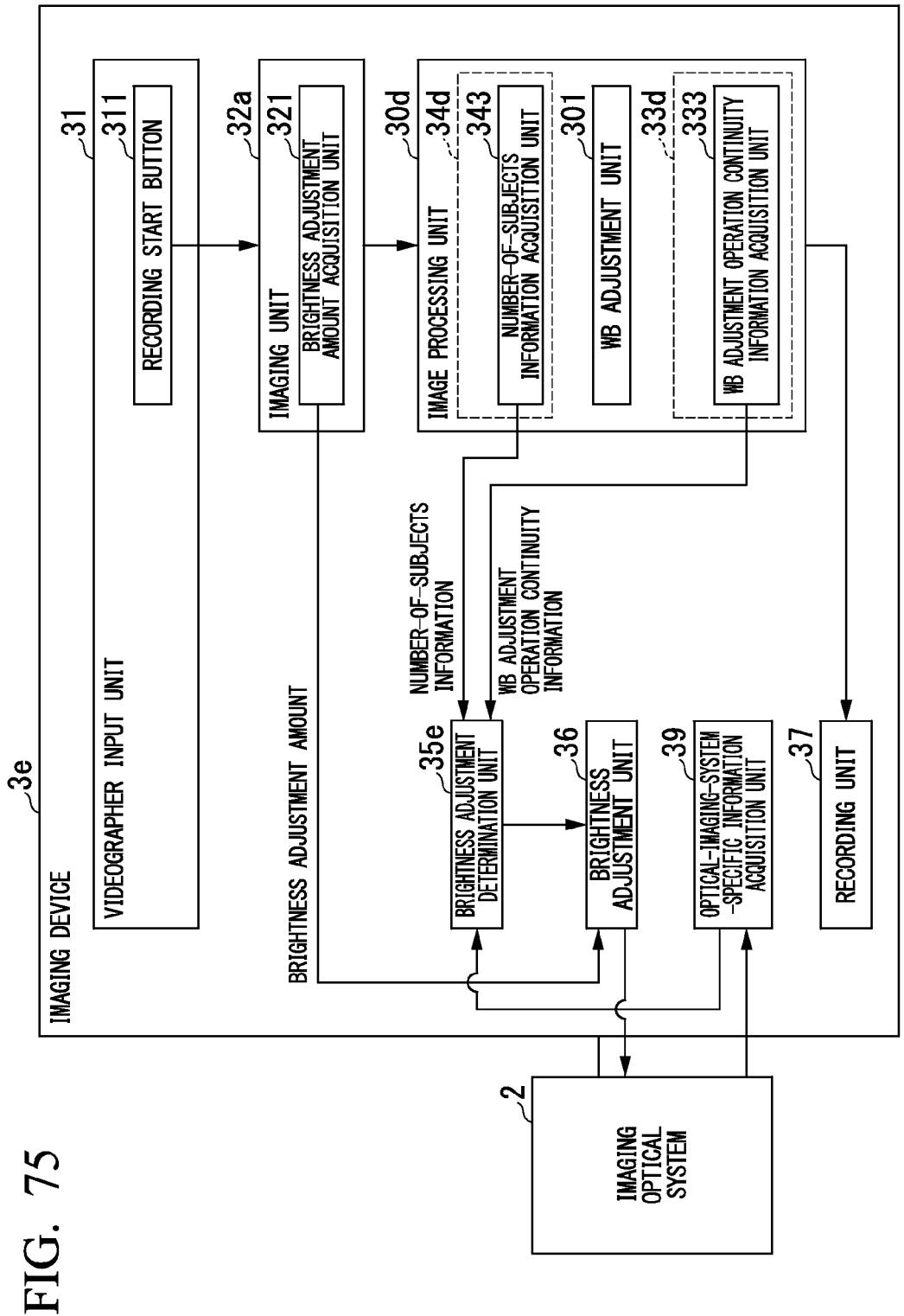
FIG. 75 is a schematic block diagram showing a configuration of an imaging device in a modified example 4 of the example 3 of the second embodiment.

FIG. 75 is a schematic block diagram showing a configuration of an imaging device 3e in the modified example 4 of the example 3 of the second embodiment. Also, elements common with FIG. 72 are assigned the same reference signs and a specific description thereof will be omitted. With respect to the configuration of the imaging device 3d of example 3 of FIG. 72, the configuration of the imaging device 3e in the modified example 4 of the example 3 of the second embodiment is configured by adding an optical-imaging-system-specific information acquisition unit 39 and changing the brightness adjustment determination unit 35d to a brightness adjustment determination unit 35e.

The optical-imaging-system-specific information acquisition unit 39 acquires information specific to the imaging optical system 2 attached to the imaging device 3e.

<Modified Example 4-1: Resolving Power Information as Optical-imaging-system-specific Information>

As the first example, the optical-imaging-system-specific information acquisition unit 39 acquires the resolving power information representing the resolving power of the imaging optical system 2 as an example of the optical-imaging-system-specific information which is information specific to the imaging optical system 2. The optical-imaging-system-specific information acquisition unit 39, for example, acquires the resolving power of the imaging optical system 2 by imaging a resolution test chart, for example, as prescribed in ISO 12233, or acquires the resolving power of the imaging optical system 2 by referring to the resolving power information saved in a memory (not shown) within the imaging device 3e. When the resolving power of the imaging optical system 2 is high, it is possible to image a fine change. Because of this, the brightness adjustment determination unit 35e, for example, may determine the behavior of the brightness adjustment to suppress the brightness adjustment when the resolving power of the imaging optical system 2 is high.

An example of a specific correction process will be described below. First, when a brightness adjustment speed determined by acquiring the WB adjustment operation continuity information and the number-of-subjects information is represented by $V_{control}$, the brightness adjustment suppression coefficient is represented by $\gamma$, and the corrected ultimate brightness adjustment speed is represented by $V_{correction}$, the brightness adjustment determination unit 35e determines an ultimate brightness adjustment speed $V_{correction}$ according to the following Equation (11).

$$V_{correction} = V_{control} \times \gamma \qquad \text{Equation (11)}$$

At this time, the brightness adjustment determination unit 35e determines the behavior of the brightness adjustment to suppress the brightness adjustment by decreasing the brightness adjustment suppression coefficient $\gamma$ when the resolving power of the imaging optical system 2 is high. Thereby, the imaging device 3e can provide a moving image having a more preferable appearance to the videographer (or appreciator) because the brightness adjustment is possible according to the ease of catching awareness of the videographer (or appreciator).

Figure 76:
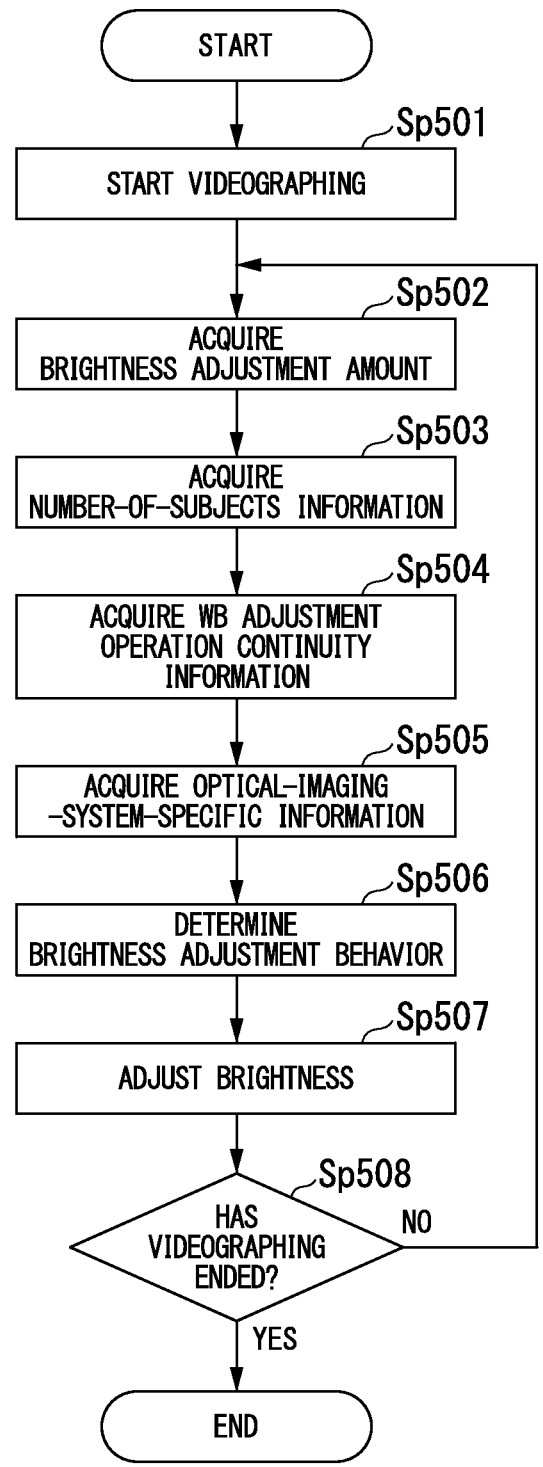
FIG. 76 is a flowchart showing an example of a flow of a process of the imaging device in the modified example 4 of the example 3 of the second embodiment.

FIG. 76 is a flowchart showing an example of a flow of a process of the imaging device 3e in the modified example 4 of the example 3 of the second embodiment. Because steps Sp501 and Sp502 are the same as steps Sp101 to Sp104 of FIG. 63, a description thereof will be omitted.

(Step Sp503) Next, the number-of-subjects information acquisition unit 343 acquires number-of-subjects information as an example of subject information.

(Step Sp504) Next, the WB adjustment operation continuity information acquisition unit 333 acquires WB adjustment operation continuity information as an example of operation information of WB adjustment.

(Step Sp505) Next, the optical-imaging-system-specific information acquisition unit 39 acquires optical-imaging-system-specific information (for example, resolving power information).

(Step Sp506) Next, the brightness adjustment determination unit 35e determines the behavior of the brightness adjustment based on the number-of-subjects information acquired by the number-of-subjects information acquisition unit 343, the WB adjustment operation continuity information acquired by the WB adjustment operation continuity information acquisition unit 333, and the optical-imaging-system-specific information acquired by the optical-imaging-system-specific information acquisition unit 39.

Because steps Sp507 and Sp508 are the same as steps Sp106 and Sp107 of FIG. 63, a description thereof will be omitted.

In the above example 4, the brightness adjustment determination unit 35e determines the behavior of the brightness adjustment based on the number-of-subjects information, the WB adjustment operation continuity information, and the optical-imaging-system-specific information. For example, the brightness adjustment determination unit 35e determines the behavior of the brightness adjustment to suppress the brightness adjustment by decreasing the brightness adjustment suppression coefficient $\gamma$ when the resolving power of the imaging optical system 2 is high. Thereby, the imaging device 3e can provide a moving image having a more preferable appearance to the videographer (or appreciator) because the brightness adjustment is possible according to ease of catching awareness of the videographer (or appreciator).

<Example 4-2: Presence/Absence of Optical System for Camera Shake Correction or Driving Width as Optical-imaging-system-specific Information>

Also, as the second example, the optical-imaging-system-specific information acquisition unit 39 may acquire the presence/absence of the optical system for the camera shake correction or the driving width as an example of the optical-imaging-system-specific information. Here, when the optical system for the camera shake correction is present, for example, the following phenomenon appears during the camera shake correction.

First, a change in attitude of peripheral darkening appears. When the optical system of the camera shake correction is driven for the camera shake correction, an optical-axis center and an image center are shifted. Although peripheral darkening appears vertically and horizontally symmetrically from the image center when there is no camera shake correction, the peripheral darkening appears asymmetrically with respect to the image center when the optical-axis center and the image center have been shifted. In addition, the attitude of peripheral darkening changes in chronological order. In this situation, incompatibility due an unnatural change of peripheral darkening is easily noticeable when the brightness adjustment is performed.

Second, a change in the state of a resolving power appears. Although the resolving power is deteriorated as the height of the statue is high vertically and horizontally symmetrically from the image center when there is no camera shake correction, the resolving power seems to be deteriorated asymmetrically with the image center when the optical-axis center and the image center are shifted. In addition to this, the way of deterioration changes in chronological order. In this situation, incompatibility due to an unnatural change of the resolving power sense is easily noticeable when the brightness adjustment is performed.

Accordingly, when there is an optical system for the camera shake correction in the attached imaging optical system 2, the brightness adjustment determination unit 35e, for example, may determine the behavior of the brightness adjustment to suppress the brightness adjustment when the camera shake correction is being driven. In addition, when the driving width of the camera shake correction is large, the behavior of the brightness adjustment may be determined to suppress the brightness adjustment. As this specific correction process, the brightness adjustment determination unit 35e, for example, determines the brightness adjustment suppression coefficient $\gamma$ from the optical-imaging-system-specific information and corrects the behavior of the brightness adjustment using an equation similar to Equation (11). At this time, the brightness adjustment determination unit 35e, for example, may set the brightness adjustment suppression coefficient γ to a small value when the camera shake correction is being driven, and set the brightness adjustment suppression coefficient γ to a small value when the driving width of the camera shake correction is large.

Thereby, the imaging device 3e can make incompatibility due to an unnatural change in the sense of resolving power less conspicuous and make incompatibility due to an unnatural change in peripheral darkening less conspicuous by preventing the brightness adjustment from being performed when driving for the optical system for the camera shake correction is in progress or its driving width is large. Because of this, the imaging device 3e can provide a moving image having a more preferable appearance to the videographer (or appreciator).

<Example 4>

Next, example 4 will be described. In this example, the behavior of the brightness adjustment is determined using information related to an inter-frame change and information of a situation of videographing and a situation of a subject determined from information within one frame as information related to human subjective brightness adjustment. In this example, a description of a scene in which panning is performed indoors as in FIG. 77 will be given.

Figure 77:
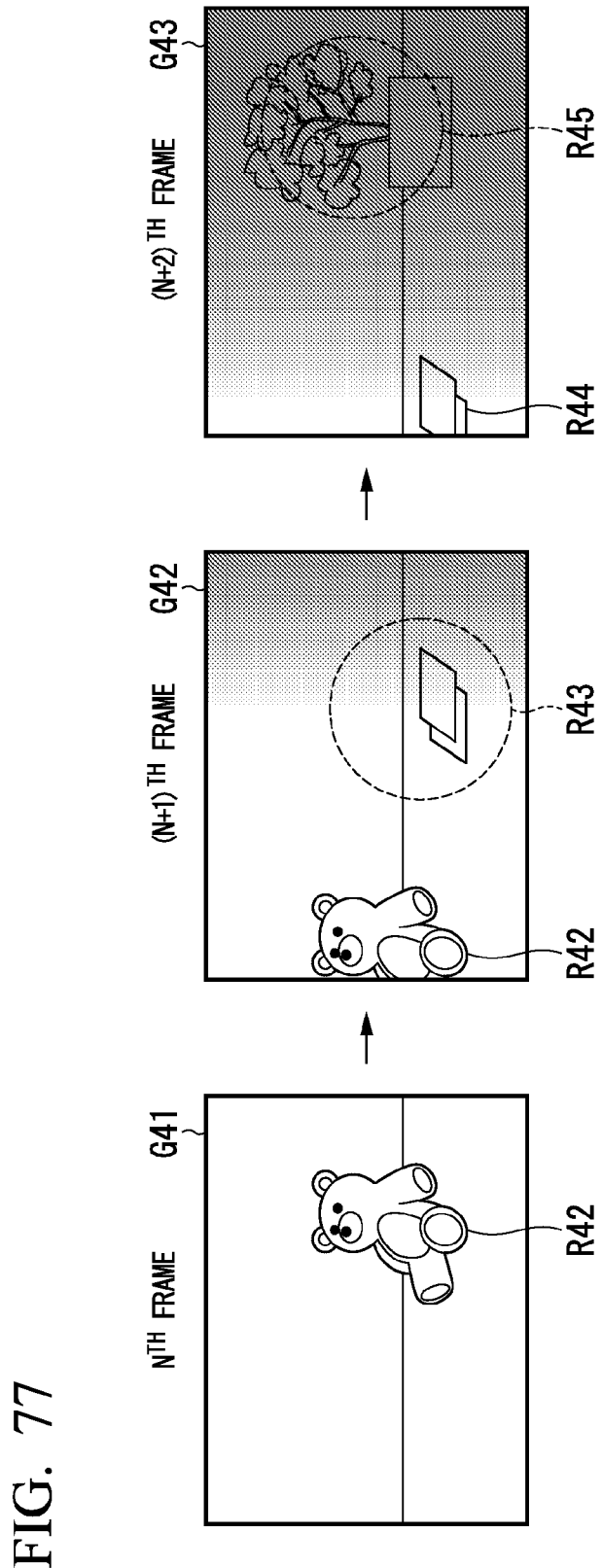
FIG. 77 is a diagram showing an example of a videographed scene in an example 4 of the second embodiment.

FIG. 77 is a diagram showing an example of a videographed scene in example 4. In FIG. 77, a scene in which a subject videographed by panning changes from a state in which a teddy bear is viewed and an achromatic memorandum and a bright red flower appear in this order is shown. In addition, the subject imaged by the panning is gradually darkened. In an image G41 of an $N^{th}$ frame, an image region R41 of the teddy bear is shown. In an image G42 of an $(N+1)^{th}$ frame, the image region R41 of the teddy bear and an achromatic memorandum image region R42 are shown. In addition, the image G42 of the $(N+1)^{th}$ frame is gradually darkened from the left region to the right region. In an image G43 of an $(N+2)^{th}$ frame, an achromatic memorandum image region R44 and a bright red flower image region R45 are shown. The image G43 of the $(N+2)^{th}$ frame is gradually darkened from the left region to the right region.

Figure 78:
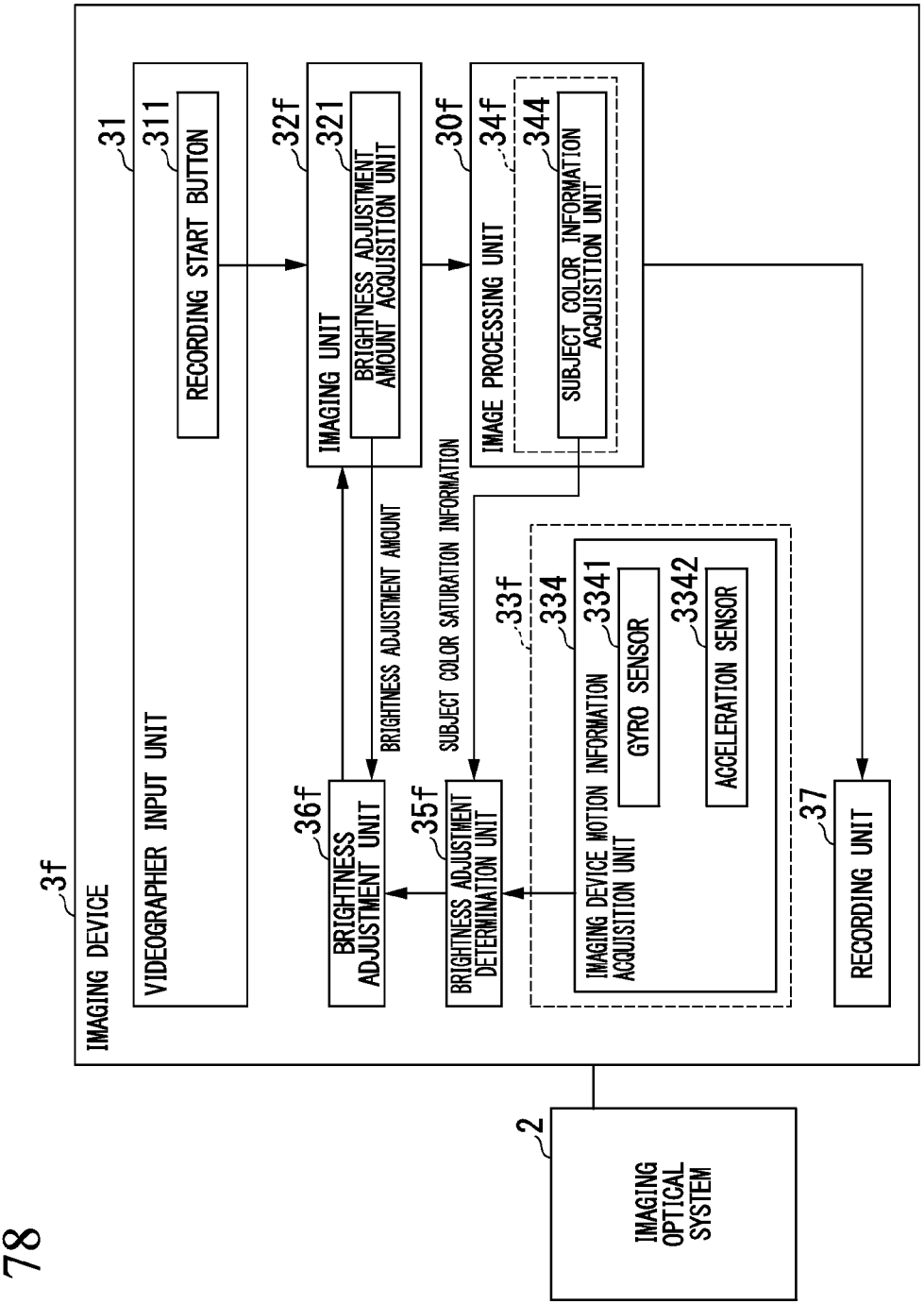
FIG. 78 is a schematic block diagram showing a configuration of an imaging device in the example 4 of the second embodiment.

FIG. 78 is a schematic block diagram showing a configuration of an imaging device 3f in example 4. Also, elements common with FIG. 61 are assigned the same reference signs and specific description thereof will be omitted. With respect to the configuration of the imaging device 3a of example 1 of FIG. 61, the configuration of the imaging device 3f in example 4 is configured by changing the image processing unit 30 to an image processing unit 30f, changing the imaging unit 32a to an imaging unit 32f, changing the brightness adjustment determination unit 35a to a brightness adjustment determination unit 35f, changing the brightness adjustment unit 36 to a brightness adjustment unit 36f, and changing the inter-frame change information acquisition unit 33a to an inter-frame change information acquisition unit 33f which is arranged outside the image processing unit 30f.

The image processing unit 30f includes an intra-frame information acquisition unit 34f, and the intra-frame information acquisition unit 34f includes a subject color information acquisition unit 344.

Although the imaging unit 32f has a similar function to the imaging unit 32a of example 1, the following point is different. The imaging unit 32f adjusts the brightness of the frame image included in the moving-image signal by changing ISO sensitivity of an imaging element under control of the brightness adjustment unit 36f.

The inter-frame change information acquisition unit 33f includes an imaging device motion information acquisition unit 334, and the imaging device motion information acquisition unit 334 includes a gyro sensor 3341 and an acceleration sensor 3342.

Next, a process of each part of the imaging device 3f will be described in the order of processing at the time of moving-image recording.

<Process 1>

The videographer sets a brightness adjustment target region of a target in which the videographer performs the brightness adjustment. As an example in this example, the videographer sets the left area of the screen of the imaging device 3f as the brightness adjustment target region because the brightness adjustment is performed on a subject around approximately the left of the screen of the imaging device 3f after panning. In this case, the videographer input unit 31, for example, receives the designation by the videographer, and outputs brightness adjustment target region information representing the designated brightness adjustment target region to the brightness adjustment amount acquisition unit 321 of the imaging unit 32f.

Also, although the user designates the brightness adjustment target region in this example, the imaging device 3f may automatically select the brightness adjustment target region through the following process. The imaging device motion information acquisition unit 334, for example, may acquire motion information (here, a sensor output as an example) representing the motion of the imaging device 3f using the gyro sensor 3341. The imaging device motion information acquisition unit 334 analyzes the motion information of the imaging device 3f from the sensor output of the gyro sensor 3341. In the scene shown in FIG. 77, the panning is analyzed to be performed toward the right of the screen of the imaging device 3f. Because the next subject can be expected to appear in a direction in which panning is performed when the panning is performed, the imaging device motion information acquisition unit 334 may select the right of the screen of the imaging device 3f as the brightness target region.

<Process 2>

The recording start button 311 receives a moving-image recording start instruction from the videographer, and outputs start instruction information representing the received start instruction to the imaging unit 32f. Upon receiving the start instruction information from the videographer input unit 31, the imaging unit 32f generates the moving-image signal by converting light incident from the subject via the imaging optical system 2 into an electrical signal at a predetermined shutter speed. Thereby, the imaging unit 32f can start the moving-image recording according to the instruction of the videographer. The imaging unit 32f outputs the generated moving-image signal to the image processing unit 30f.

<Process 3>

The brightness adjustment amount acquisition unit 321 acquires a brightness adjustment amount for setting the brightness adjustment target region in the optimum brightness state based on the brightness adjustment target region information obtained through designation received by the videographer input unit 31, and outputs the acquired brightness adjustment amount to the brightness adjustment unit 36E <Process 4>

The subject color information acquisition unit 344 acquires color information of the subject (here, subject color saturation information representing color saturation of the subject as an example) as intra-frame information, and outputs the acquired subject color information to the brightness adjustment determination unit 35f. At this time, the subject color information acquisition unit 344 acquires an average value of color saturation within the brightness adjustment target region as subject color saturation information as an example. Also, the present invention is not limited thereto. The subject color information acquisition unit 344 may extract the subject region from the frame image, and acquire the average value of the color saturation within the subject region in the vicinity of the brightness adjustment target region. Here, the vicinity of the brightness adjustment target area, for example, includes the brightness adjustment target region, and also includes pixels separated from a pixel outside the brightness adjustment target region by a predetermined number of pixels in a direction away from the brightness adjustment target region. In addition, although the color information of the subject is acquired from the brightness adjustment target region in this example, the color information of the subject may be acquired from an arbitrary region or acquired from the entire captured screen of the imaging device 3f.

<Process 5>

The imaging device motion information acquisition unit 334 acquires imaging device motion information (here, imaging device motion amount information representing a motion amount of the imaging device 3f as an example) representing the motion of the imaging device 3f as inter-frame change information, and outputs the acquired imaging device motion information to the brightness adjustment determination unit 35f. At this time, the imaging device motion information acquisition unit 334, for example, acquires the motion amount of the imaging device 3f from a panning start time point as the motion amount. Also, the present invention is not limited thereto. The imaging device motion information acquisition unit 334 may acquire a motion amount for arbitrary frames going back from a current time point as the motion amount.

Here, an example of a specific process of the imaging device motion information acquisition unit 334 will be described. The gyro sensor 3341 is a sensor for detecting an angular velocity of a rotation direction, and can detect rotation of a pitch direction (also referred to as a tilt direction) around an axis (x axis) of the horizontal direction toward the subject, rotation of a yaw direction (also referred to as a pan direction) around an axis (y axis) of the horizontal direction toward the subject, and an angular velocity of a roll direction around a z axis. It is possible to acquire one direction for one gyro sensor and it is only necessary to prepare three gyro sensors when rotational angular velocities of all three axes are desired to be detected.

The imaging device motion information acquisition unit 334, for example, calculates each of movement amounts of pitch, yaw, and roll rotation directions as one motion amount by integrating each of angular velocities of the pitch, yaw, and roll rotation directions detected by the gyro sensor 3341.

The acceleration sensor 3342, for example, is a three-axis acceleration sensor, and detects accelerations of the x-axis direction, the y-axis direction, and the z-axis direction.

The imaging device motion information acquisition unit 334, for example, calculates each of the movement amounts of the x-axis direction, the y-axis direction, and the z-axis direction as one motion amount by performing double integration on each of the accelerations of the x-axis direction, the y-axis direction, and the z-axis direction detected by the acceleration sensor 3342. The imaging device motion information acquisition unit 334 outputs information representing the calculated motion amount as the imaging device motion amount information to the brightness adjustment determination unit 35f.

Also, the imaging device motion information acquisition unit 334, for example, may obtain the motion information through image processing from the captured moving image as well as the use of the gyro sensor or the acceleration sensor.

<Process 6>

The brightness adjustment determination unit 35f determines the behavior of the brightness adjustment from the subject color saturation information acquired by the subject color information acquisition unit 344 and the imaging device motion amount information acquired by the imaging device motion information acquisition unit 334. Specifically, for example, information representing a quadratic function in which the color saturation of the subject is set as an objective variable and the motion amount of the imaging device is set as an independent variable is pre-stored in a memory (not shown). In this case, the brightness adjustment determination unit 35f, for example, reads the quadratic function from the memory, and determines whether to operate or prohibit the brightness adjustment using the read quadratic function.

Figure 79:
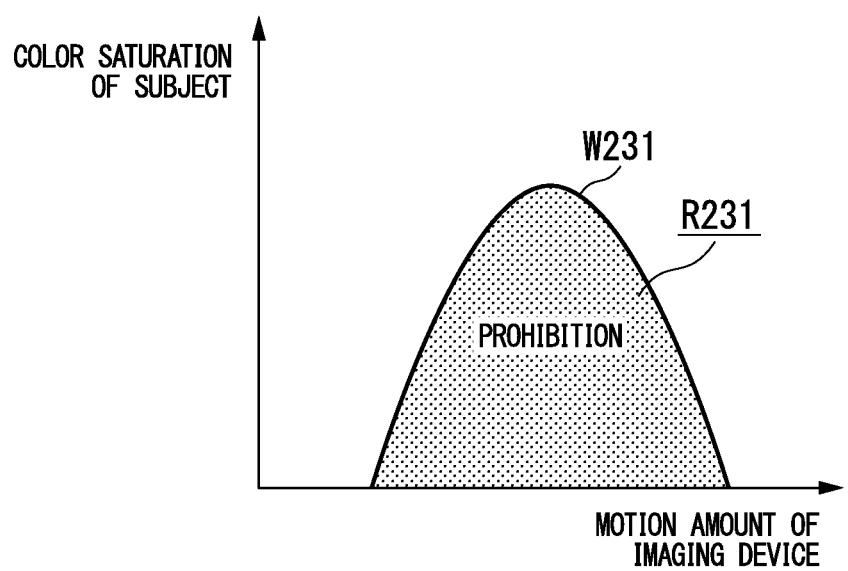
FIG. 79 is an example of a prohibition region.

FIG. 79 is an example of a prohibition region. In FIG. 79, the vertical axis (y axis) is the color saturation of the subject and the horizontal axis (x axis) is the motion amount of the imaging device. A brightness adjustment prohibition region R231 is a region surrounded by a curve W231 represented by the read quadratic function and the x axis. In the example of FIG. 79, the brightness adjustment determination unit 35f, for example, prohibits the brightness adjustment if the xy coordinates are included in the brightness adjustment prohibition region R231 when the acquired color saturation of the subject is set as a y coordinate and the acquired motion amount of the imaging device is set as an x coordinate.

For example, because the state is not yet determined to be a panning state and is determined to be a still state when the state is close to a panning start state in the case of a scene in which content of the subject imaged from moment to moment according to panning changes as in FIG. 77, the videographer (or appreciator) tends to change the subject desired to be set in the optimum brightness state. In addition, because the state is that in which the subject desired to be focused on by sufficiently performing the panning is determined to have changed as the motion amount of the imaging device 3f from a panning start time increases to be greater than a fixed value, the videographer (or appreciator) tends to change the subject desired to be set in the optimum brightness state. In addition, because the state in that in which it is determined that the subject is noticeable when the color saturation of the subject is high, the videographer (or appreciator) tends to change the subject desired to be set in the optimum brightness state.

Because of this, the brightness adjustment determination unit 35f, for example, can perform natural brightness adjustment by controlling the brightness adjustment unit 36f as follows. The brightness adjustment determination unit 35f, for example, controls the brightness adjustment unit 36f to perform the brightness adjustment because the state is close to the panning start state when the imaging device 3f does not move a predetermined amount or more. In the case of an $N^{th}$ frame of FIG. 77, the brightness adjustment determination unit 35f, for example, controls the brightness adjustment unit 36f to perform the brightness adjustment on a "teddy bear" imaged in a panning start state.

In addition, when the imaging device 3f, for example, moves the predetermined amount or more and the color saturation of the subject is greater than or equal to a predetermined color saturation threshold value, the brightness adjustment unit 36f is controlled to perform the brightness adjustment. In the case of an example of an $(N+1)^{th}$ frame of FIG. 77, the brightness adjustment determination unit 35f, for example, controls the brightness adjustment unit 36f to prohibit the brightness adjustment because the imaging device 3f moves a predetermined amount or more by performing panning, but the color saturation of the memorandum shown in an image region R43 is less than a color saturation threshold value. In the case of an example of an $(N+2)^{th}$ frame of FIG. 77, the brightness adjustment determination unit 35f, for example, controls the brightness adjustment unit 36f to perform the brightness adjustment because the imaging device 3f moves a predetermined amount or more by performing panning and the color saturation of the red flower shown in an image region R45 is greater than or equal to the color saturation threshold value.

Also, although the brightness adjustment determination unit 35f determines a condition (or region) which determines "prohibition of brightness adjustment" or "execution of brightness adjustment" using the quadratic function as this example, the present invention is not limited thereto. Other polynomials or function formulas may be used.

<Process 7>

The brightness adjustment unit 36f controls the ISO sensitivity of the imaging element provided in the imaging unit 32f and adjusts the brightness of the frame image included in the moving-image signal so that the brightness is changed by a brightness adjustment amount input from the brightness adjustment amount acquisition unit 321 according to the behavior of the brightness adjustment (whether to operate or prohibit the brightness adjustment) determined by the brightness adjustment determination unit 35f.

<Process 8>

The imaging device 3f iterates the processing of processes 3 to 7 until the videographer input unit 31 receives an input of a videographing end instruction from the videographer.

Figure 81:
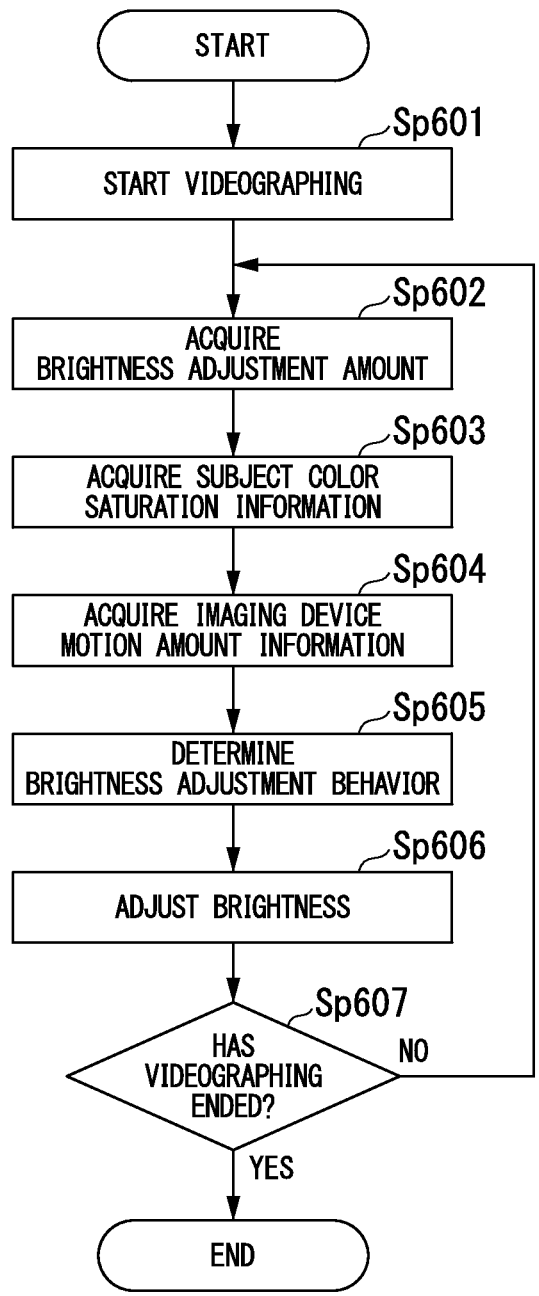
FIG. 81 is a flowchart showing an example of a flow of a process of the imaging device in the example 4 of the second embodiment.

FIG. 81 is a flowchart showing an example of a flow of a process of the imaging device 3f in example 4. Because steps Sp601 and Sp602 are the same as steps Sp101 and Sp102 of FIG. 63, a description thereof will be omitted.

(Step Sp603) Next, the subject color information acquisition unit 344 acquires subject color saturation information as an example of subject color information.

(Step Sp604) Next, the imaging device motion information acquisition unit 334 acquires imaging device motion amount information as an example of imaging device motion information.

(Step SP605) Next, the brightness adjustment determination unit 35f determines the behavior of the brightness adjustment based on the subject color saturation information acquired by the subject color information acquisition unit 344 and the imaging device motion amount information acquired by the imaging device motion information acquisition unit 334.

Because the processes of steps Sp606 and Sp607 are the same as steps Sp106 and Sp107 of FIG. 63, a description thereof will be omitted. Accordingly, the process of this flowchart ends.

In the above example 4, the brightness adjustment determination unit 35f determines the behavior of the brightness adjustment based on the subject color saturation information acquired by the subject color information acquisition unit 344 and the imaging device motion amount information acquired by the imaging device motion information acquisition unit 334. At this time, the brightness adjustment determination unit 35f, for example, controls the brightness adjustment unit 36f to perform the brightness adjustment when the imaging device 3f moves a predetermined amount or more by performing panning and the color saturation of the subject is greater than or equal to the color saturation threshold value. In addition, the brightness adjustment determination unit 35f, for example, controls the brightness adjustment unit 36f to prohibit the brightness adjustment when the imaging device 3f moves a predetermined amount or more by performing panning, but the color saturation of the subject is less than the color saturation threshold value. Thereby, when the videographer (or appreciator) tends to change the subject desired to be set in the optimum brightness state, it is possible to change the brightness of the subject to the optimum state. Because of this, the imaging device 3f can provide a moving image having a more preferable appearance for the videographer (or appreciator).

Also, although the imaging device motion information acquisition unit 334 acquires imaging device motion amount information as an example of imaging device motion information, a motion speed, motion continuity information, or camera shake information may be acquired instead of the imaging device motion information. In this case, the brightness adjustment determination unit 35f may determine the behavior of the brightness adjustment based on any one of the motion speed, the motion continuity information, and the camera shake information and the subject color saturation information. Hereinafter, a specific example will be described.

<Modified Example 1: Motion Speed>

The imaging device motion information acquisition unit 334 may acquire the motion speed of the imaging device 3f as an example of the imaging device motion information. At this time, the imaging device motion information acquisition unit 334, for example, may acquire the motion speed of the imaging device 3f using a dedicated sensor (the gyro sensor 3341 or the acceleration sensor 3342) or image processing as in the above-described motion amount. Although the videographer (or appreciator) tends to change the determined subject desired to be set in the optimum brightness state when the imaging device 3f moves at a low speed, it is difficult to change the determined subject desired to be set in the optimum brightness state when the imaging device 3f moves at a high speed. Accordingly, when the motion speed of the imaging device 3f is fast, the brightness adjustment determination unit 35f, for example, may determine the behavior of the brightness adjustment so that the brightness adjustment is easily prohibited.

In addition, when the brightness adjustment determination unit 35f temporarily determines that it is preferable to perform brightness adjustment, a process of performing the brightness adjustment in a fast operation becomes brightness adjustment having little incompatibility for the videographer (or appreciator) when the motion speed of the imaging device 3f is fast compared to when the motion of the imaging device 3f is slow. This is obvious from a result of subjective evaluation shown below.

Figure 80:
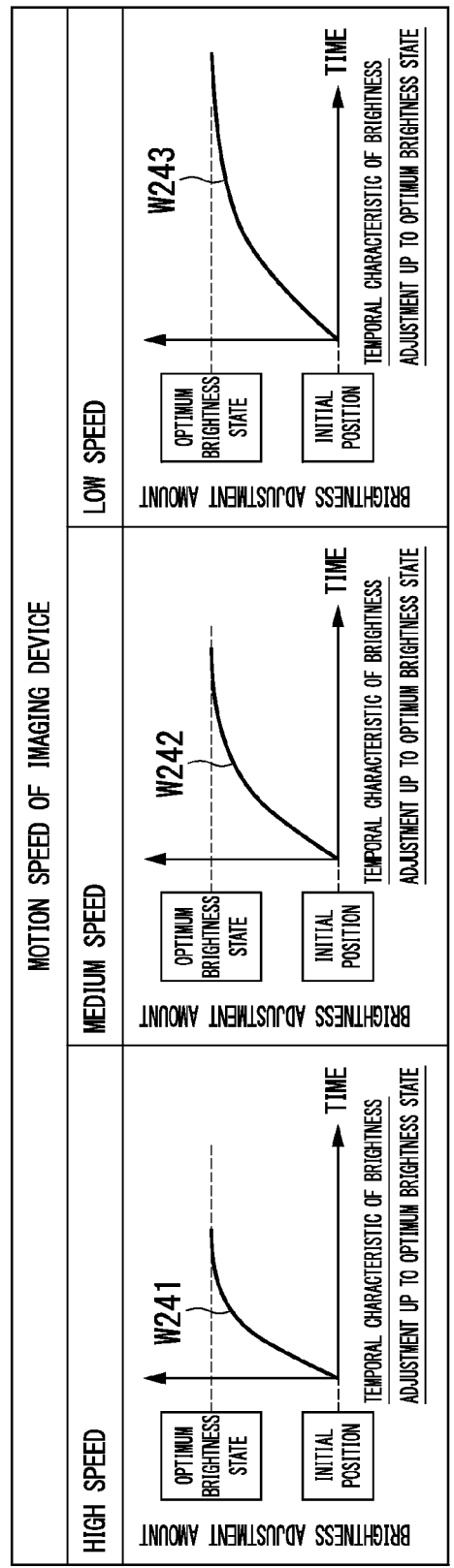
FIG. 80 is a conceptual diagram of a table in which a motion speed of the imaging device is associated with temporal characteristics of brightness adjustment up to an optimum brightness state.

Multiple people were requested to view moving images of temporal characteristics of brightness adjustment of up to three types of optimum brightness states as shown in FIG. 80 applied to the cases in which the motion speed of the imaging device was a "high speed," a "medium speed," and a "low speed." Subjective evaluation results of viewers are shown in eleven steps as in FIG. 102. For example, a moving image which is considered to be likable is marked 10 points, a moving image which is considered to be neither likable nor unlikable is marked 5 points, and a moving image which is considered to be unlikable is marked 0 points. The results shown in FIG. 102 are evaluation results of a moving image on which brightness adjustment was performed in behavior based on three brightness adjustment characteristics shown in FIG. 80 as an example. Accordingly, after determining whether to "operate" or "prohibit" the brightness adjustment according to the motion speed of the imaging device 3f, the brightness adjustment determination unit 35f, for example, may determine a temporal characteristic of the brightness adjustment from the initial state to the optimum brightness state in the following process.

A specific example of the process of determining the temporal characteristic of the brightness adjustment from the initial state to the optimum brightness state will be described. The imaging device motion information acquisition unit 334 acquires motion speed information related to the motion speed of the imaging device 3f. Here, as an example, the imaging device motion information acquisition unit 334 classifies the motion speed of the imaging device as the "high speed," the "medium speed," or the "low speed" using a first speed threshold value and a second speed threshold value which is less than the first speed threshold value pre-stored in a memory (not shown) within the imaging device 3f, and designates the classification result as motion speed information.

Specifically, for example, the imaging device motion information acquisition unit 334 classifies the operation speed as the "high speed" when the motion speed of the imaging device 3f is greater than or equal to the first speed threshold value, classifies the operation speed as the "medium speed" when the motion speed of the imaging device 3f is less than the first speed threshold value and greater than or equal to the second speed threshold value, and classifies the operation speed as the "low speed" when the motion speed of the imaging device 3f is less than the second speed threshold value. Also, the present invention is not limited thereto. The imaging device motion information acquisition unit 334 may use the motion speed (for example, an output [degrees/sec] obtained from the gyro sensor 3341) of the imaging device as the motion speed information without change.

For example, a table in which information representing the motion speed of the imaging device is associated with the temporal characteristic of the brightness adjustment up to the optimum brightness state is stored in the memory (not shown) within the imaging device 3f. For example, the brightness adjustment determination unit 35f determines the temporal characteristic of the brightness adjustment up to the optimum brightness state by referring to the above-described table stored in the memory (not shown) and reading the temporal characteristic corresponding to the acquired motion speed of the imaging device 3f.

Next, the table in which the information representing the motion speed of the imaging device is associated with the temporal characteristic of the brightness adjustment up to the optimum brightness state will be described using FIG. 80. FIG. 80 is a conceptual diagram of the table in which the information representing the motion speed of the imaging device is associated with the temporal characteristic of the brightness adjustment up to the optimum brightness state. In FIG. 80, the motion speed of the imaging device is classified as the high speed, the medium speed, or the low speed, and the temporal characteristic of the brightness adjustment up to the optimum brightness state is associated with each speed. Specifically, the temporal characteristic of the brightness adjustment shown in the curve W241 is associated in the case of the high speed, the temporal characteristic of the brightness adjustment shown in a curve W242 is associated in the case of the medium speed, and the temporal characteristic of the brightness adjustment shown in the curve W243 is associated in the case of the low speed. As seen from FIG. 80, the brightness adjustment is performed in the fast operation when the motion of the imaging device 3f is fast. Consequently, the brightness adjustment determination unit 35f, for example, determines the behavior of the brightness adjustment to perform the brightness adjustment in the fast operation when the motion of the imaging device 3f is fast by referring to the table as shown in the conceptual diagram of FIG. 80.

Furthermore, a curve (non-linear) shape of the temporal characteristic of brightness adjustment up to the optimum brightness state shown in FIG. 80 is derived from such a non-linear shape of a generally known physical brightness adjustment characteristic (motion referred to as light adaptation/dark adaptation by cones and rods). It is possible to perform more preferable brightness adjustment by forming the temporal characteristic of the brightness adjustment in such a shape.

<Modified Example 2: Information Related to Continuity of Motion>

The imaging device motion information acquisition unit 334 may acquire the information related to the continuity of the motion of the imaging device 3f as an example of the imaging device motion information. At this time, the imaging device motion information acquisition unit 334, for example, may acquire the motion-continuity-related information using a dedicated sensor (the gyro sensor 3341 or the acceleration sensor 3342) or image processing as in the motion amount. Specifically, for example, the imaging device motion information acquisition unit 334, for example, may determine continuity from variation in the acceleration of the imaging device 3f in a predetermined number of previous frames using the sensor output of the acceleration sensor 3342. The imaging device motion information acquisition unit 334, for example, may determine that there is no continuity when both positive and negative accelerations are detected among a predetermined number of previous frames. The imaging device motion information acquisition unit 334 may determine that there is continuity when acceleration of a fixed direction is detected among a predetermined number of previous frames.

Although the videographer (or appreciator) tends to change the determined subject desired to be set in the optimum brightness state when there is continuity in the motion of the imaging device 3f, it is difficult to make a change when there is no continuity in the motion of the imaging device 3f. Accordingly, the brightness adjustment determination unit 35f, for example, may determine the behavior of the brightness adjustment to suppress the brightness adjustment when it is determined that there is no continuity in the motion of the imaging device 3f.

<Modified Example 3: Camera Shake Information>

The imaging device motion information acquisition unit 334 may acquire the camera shake information representing a camera shake amount as an example of the imaging device motion information. At this time, the imaging device motion information acquisition unit 334, for example, may acquire the camera shake information using a dedicated sensor (the gyro sensor 3341 or the acceleration sensor 3342) or image processing as in the above-described motion amount. Specifically, for example, the imaging device motion information acquisition unit 334 may extract a high-frequency component as the camera shake information from the motion speed obtained from a sensor output of the gyro sensor 3341. In addition, the imaging device motion information acquisition unit 334 may extract a high-frequency component as the camera shake information from the acceleration obtained from a sensor output of the acceleration sensor 3342.

For example, when it is determined that the camera shake amount is large, that is, when a change in a screen of the imaging device 3f due to camera shake is severe, the case in which an additional brightness change is not excessively caused appears natural to the videographer (or appreciator). Accordingly, the brightness adjustment determination unit 35*f*, for example, may determine the behavior of the brightness adjustment to suppress the brightness adjustment when the camera shake information is large (for example, when the high-frequency component of the motion speed or the high-frequency component of the acceleration is large).

In addition, although the subject color information acquisition unit 344 acquires color information of the subject (color saturation information of the subject as an example) as intra-frame information in this example, other color information shown below may be acquired instead of the color saturation information of the subject.

<Modified Example 4: Information Related to Color Saturation Difference between Arbitrary Subject and other Subject (Including Background) within Frame>

The subject color information acquisition unit 344 may acquire information related to the color saturation difference between the arbitrary subject and the other subject (including background) within the frame, and output the acquired information to the brightness adjustment determination unit 35*f*. Although the awareness of the videographer (or appreciator) tends to be directed to a subject having high color saturation when there is only one subject having high color saturation among subjects having low color saturation, a specific subject does not catch awareness as easily when both the background and the subject have high color saturation. Accordingly, the brightness adjustment determination unit 35*f*, for example, may determine the behavior of the brightness adjustment to suppress the brightness adjustment when a color saturation difference obtained from information related to the color saturation difference between the arbitrary subject and the other subject (including a background) within the frame is less than a predetermined threshold value.

<Modified Example 5: Hue Information of Arbitrary Subject within Frame>

The subject color information acquisition unit 344 may acquire the hue information of the arbitrary subject within the frame, and output the acquired hue information to the brightness adjustment determination unit 35*f*. The sensitivity of a human eye is high for a green object (a medium-wavelength object) and is sequentially lower for red (a long-wavelength object) and blue (a short-wavelength object). The videographer (or appreciator) tends to direct awareness to a subject which is easily perceived by his or her eye. Accordingly, the brightness adjustment determination unit 35*f*, for example, may determine the behavior of the brightness adjustment to suppress the brightness adjustment when the color of the arbitrary subject within the frame is blue (has a short wavelength) using information representing the hue of the arbitrary subject within the frame.

<Modified Example 6: Information Related to Hue Difference between Arbitrary Subject and other Subject (Including Background) within Frame>

The subject color information acquisition unit 344 may acquire the information related to the hue difference between the arbitrary subject and the other subject (including the background) within the frame, and output the acquired information to the brightness adjustment determination unit 35*f*. When there is only one subject having a different hue among subjects of similar hues, the videographer (or appreciator) tends to direct awareness to the subject of the different hue. Accordingly, the brightness adjustment determination unit 35*f*, for example, may determine the behavior of the brightness adjustment to suppress the brightness adjustment when the hue difference obtained from information related to the hue difference between the arbitrary subject and the other subject (including the background) within the frame is less than a predetermined threshold value.

<Modified Example 7: Brightness Information of Arbitrary Subject within Frame>

The subject color information acquisition unit 344 may acquire information representing brightness of an arbitrary subject within the frame and output the acquired information to the brightness adjustment determination unit 35*f*. The videographer (or appreciator) tends to direct awareness to a bright (but unsaturated) subject. Accordingly, the brightness adjustment determination unit 35*f*, for example, may determine the behavior of the brightness adjustment to promote the brightness adjustment when the brightness obtained from the subject brightness information is in a predetermined range.

Thereby, the brightness adjustment unit 36*f* can perform the brightness adjustment when the brightness is not too low or high.

<Modified Example 8: Information Related to Brightness Difference between Arbitrary Subject and other Subject (Including Background) within Frame>

The subject color information acquisition unit 144 may acquire the information related to the brightness difference between the arbitrary subject and the other subject (including background) within the frame, and output the acquired information to the brightness adjustment determination unit 35*f*. When there is only one subject having different brightness among subjects of similar brightness, the videographer (or appreciator) particularly tends to direct awareness to the subject of the different brightness. Accordingly, the brightness adjustment determination unit 35*f*, for example, may determine the behavior of the brightness adjustment to suppress the brightness adjustment when the brightness difference obtained from information related to the brightness difference between the arbitrary subject and the other subject (including the background) within the frame is less than a predetermined threshold value.

In addition, although the behavior of the brightness adjustment is determined using the imaging device motion information acquired as the inter-frame change information and the subject color information acquired as the intra-frame change information, the following information may be additionally acquired and the behavior of the brightness adjustment may also be determined using the additionally acquired information.

<Modified Example 9: Information Related to Moving-imaging Recording of Imaging Device>

Figure 82:
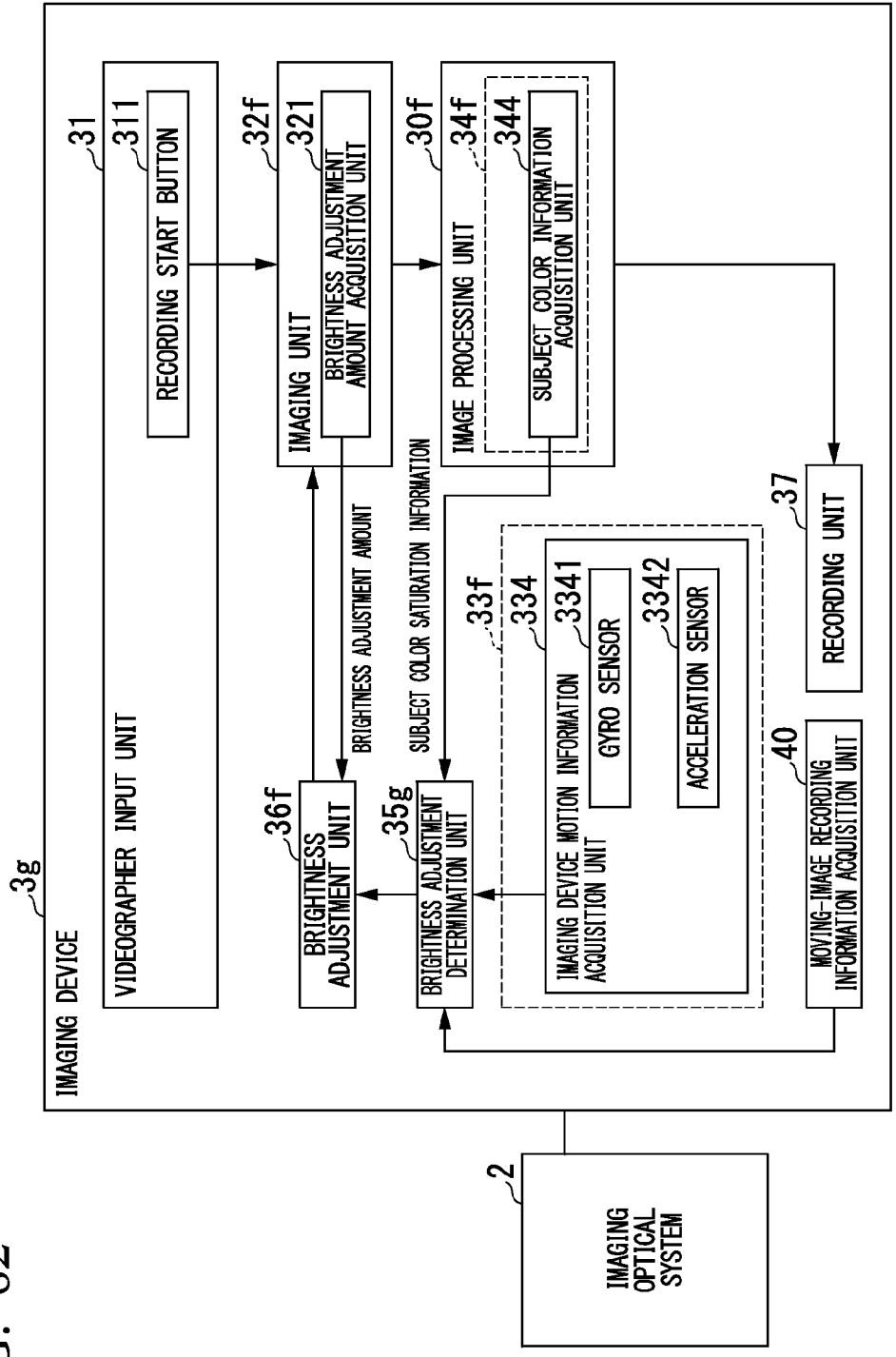
FIG. 82 is a schematic block diagram showing a configuration of an imaging device in a modified example 9 of the example 4 of the second embodiment.

FIG. 82 is a schematic block diagram showing a configuration of an imaging device 3*g* in a modified example 9 of the example 4 of the second embodiment. Also, elements common with FIG. 78 are assigned the same reference signs and specific description thereof will be omitted. With respect to the configuration of the imaging device 3*f* of example 4 of FIG. 78, the configuration of the imaging device 3*g* in the modified example 9 of the example 4 of the second embodiment is configured by adding a moving-image recording information acquisition unit 40 and changing the brightness adjustment determination unit 35*f* to a brightness adjustment determination unit 35*g*.

<Modified Example 9-1: Recording Size of Moving Image>

The moving-image recording information acquisition unit 40, for example, acquires a recording size of the moving image as an example of information related to the moving-image recording of the imaging device 3*g*, and outputs the acquired recording size of the moving image to the brightness adjustment determination unit 35*g*. Because the videographer (or appreciator) tends to be sensitive to a change within a moving-image screen of the imaging device 3*g* when the recording size of the moving image is large (particularly remarkable when the number of pixels exceeds five million), there is a tendency for a change due to unnecessary brightness adjustment to be less favorable than when the recording size of the moving image is small. Accordingly, the brightness adjustment determination unit 35g, for example, may determine the behavior of the brightness adjustment to suppress the brightness adjustment operation as the recording size of the moving image increases.

Figure 83:
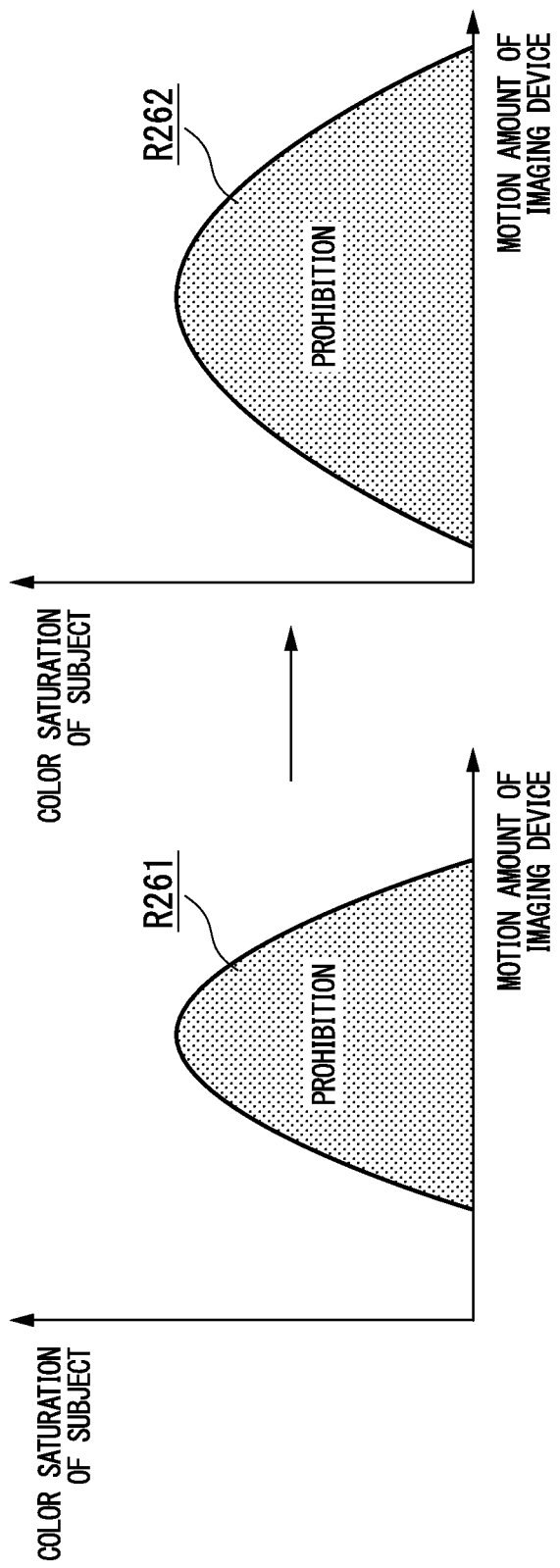
FIG. 83 is an example of a change in a prohibition region.

Although the focus adjustment is not prohibited in a prohibition region 8261 because the prohibition region 8261 is extended to a prohibition region 8262 as shown in FIG. 83 in this modified example, the focus adjustment can be prohibited in the prohibition region 8262 in some cases. Accordingly, the brightness adjustment determination unit 35g, for example, may change the behavior of the brightness adjustment by correcting the quadratic function for determining the behavior of the brightness adjustment in addition to the imaging motion information and the subject color information.

FIG. 83 is an example of a change in a prohibition region. In FIG. 83, the vertical axis is color saturation of the subject and the horizontal axis is a motion amount of the imaging device. In FIG. 83, a left prohibition region R261 is before correction and a right prohibition region 8262 is after the correction. According to the correction, the prohibition region 8261 is extended to the prohibition region 8262. In this example, the brightness adjustment determination unit 35g extends the prohibition region 8261 to the prohibition region 8262 by correcting a predetermined quadratic function. Then, the brightness adjustment determination unit 35g determines whether the xy coordinates obtained by setting the acquired color saturation of the subject as a y-coordinate value and setting the motion amount of the imaging device 3g as an x-coordinate value are included in the prohibition region 8262. Then, when the xy coordinates are included in the prohibition region 8262, the brightness adjustment determination unit 35g determines the behavior of the brightness adjustment to suppress the brightness adjustment. On the other hand, when the xy coordinates are not included in the prohibition region 8262, the brightness adjustment determination unit 35g determines the behavior of the brightness adjustment so that the brightness adjustment is not prohibited.

Figure 84:
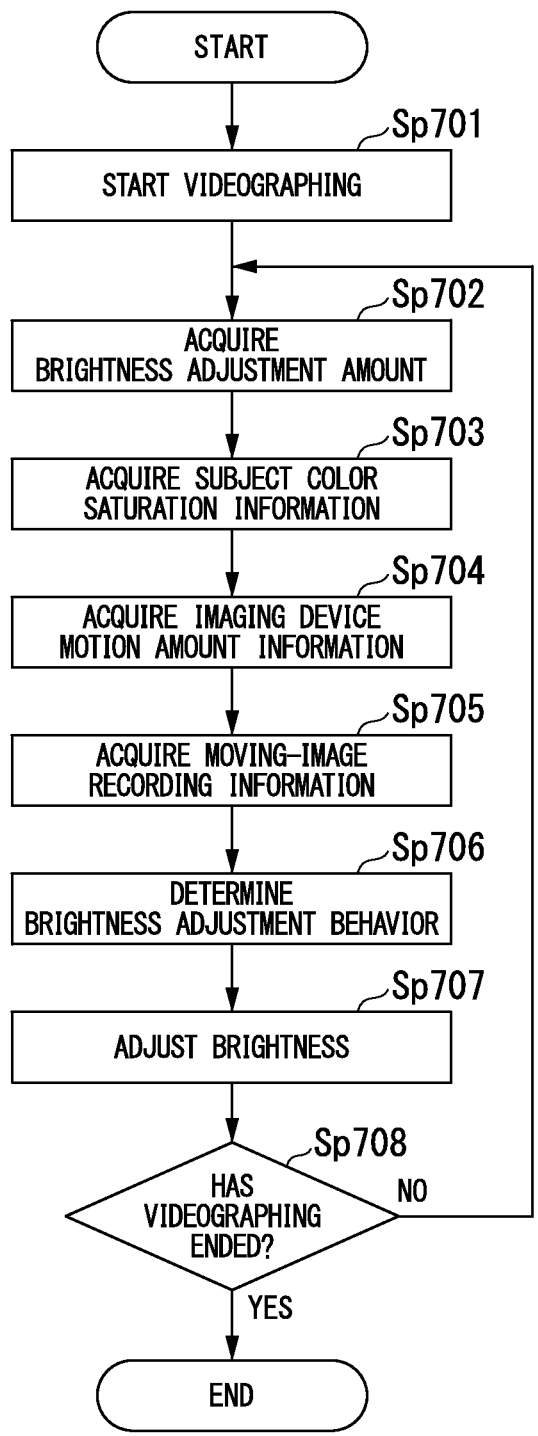
FIG. 84 is a flowchart showing an example of a flow of a process of the imaging device in the modified example 9 of the example 4 of the second embodiment.

FIG. 84 is a flowchart showing an example of a flow of a process of the imaging device 3g in the modified example 9 of the example 4 of the second embodiment. Because the processes of steps Sp701 to Sp704 are the same as the processes of steps Sp601 to Sp604 of FIG. 81, a description thereof will be omitted.

(Step Sp705) Next, the moving-image recording information acquisition unit 40 acquires a recording size of the moving image as an example of information related to the moving-image recording of the imaging device 3g.

(Step Sp706) Next, the brightness adjustment determination unit 35g determines the behavior of the brightness adjustment based on the subject color saturation information acquired by the subject color information acquisition unit 344, the imaging device motion amount information acquired by the imaging device motion information acquisition unit 334, and the moving-image recording size acquired by the moving-image recording information acquisition unit 40.

Because the processes of steps Sp707 and Sp708 are the same as the processes of steps Sp606 and Sp607 of FIG. 81, a description thereof will be omitted. Accordingly, the process of this flowchart ends.

According to the above, the brightness adjustment determination unit 35g, for example, corrects the behavior of the brightness adjustment to suppress the brightness adjustment as the recording size of the moving image increases. Thereby, the imaging device 3g can be configured to prohibit the brightness adjustment when the recording size of the moving image is large. Because of this, the imaging device 3g can provide a preferable moving image for the videographer (or appreciator) having a tendency to dislike a change due to unnecessary brightness adjustment when the recording size of the moving image is large.

<Modified Example 9-2: Recording Codec of Moving Imaging>

Also, the moving-image recording information acquisition unit 40 may acquire recording codec information representing a moving-image recording codec as an example of information related to moving-image recording of the imaging device 3g, and output the acquired recording codec information to the brightness adjustment determination unit 35g. The attitude of compression noise is changed according to the recording codec of the moving image and the variation amount within the moving-image screen of the imaging device 3g changes. For example, block noise tends to appear when compression such as compression of H.264 is performed. When the variation amount within the moving-image screen of the imaging device 3g is large, the videographer (or appreciator) tends to dislike the occurrence of a further change within the moving-image screen of the imaging device 3g more according to brightness adjustment. Accordingly, the brightness adjustment determination unit 35g, for example, may determine a change amount of a quadratic function according to a recording codec of the moving image. At this time, the brightness adjustment determination unit 35g, for example, may determine the behavior of the brightness adjustment so that MPEG2 promotes the brightness adjustment more than H.264 and RAW promotes the brightness adjustment more than MPEG2.

<Modified Example 9-3: Recording Frame Rate>

Also, the moving-image recording information acquisition unit 40 may acquire information representing a recording frame rate as an example of information related to moving-image recording of the imaging device 3g, and output the acquired information to the brightness adjustment determination unit 35g. The smoothness of appearance of the moving image is changed according to the recording frame rate of the moving image. When it is not smooth, suppressing unnecessary brightness adjustment appears natural to the videographer (or appreciator). Accordingly, the brightness adjustment determination unit 35g, for example, may determine the behavior of the brightness adjustment to suppress the brightness adjustment when the moving-image recording frame rate is low.

<Modified Example 10: Imaging-element-specific Information>

Figure 85:
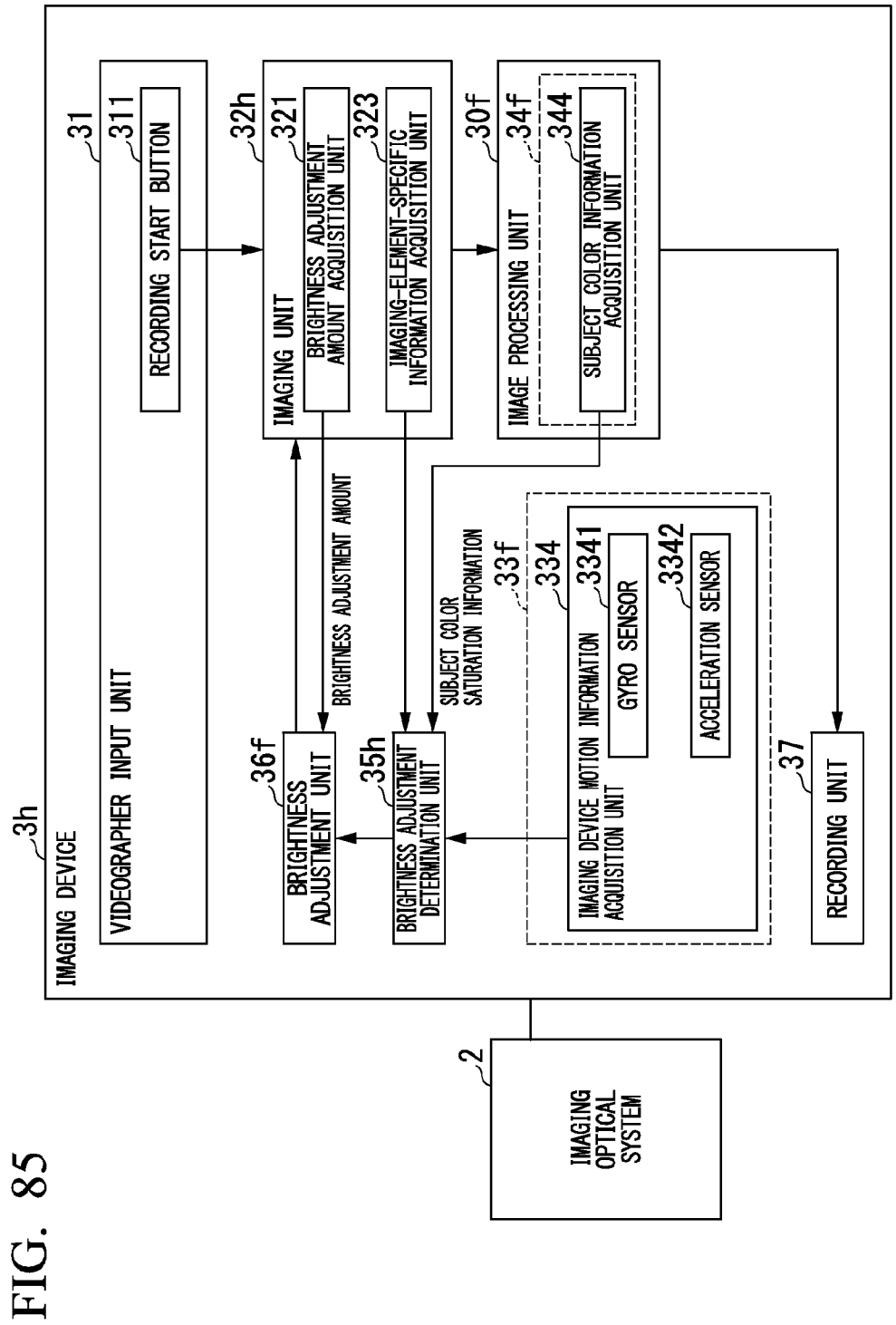
FIG. 85 is a schematic block diagram showing a configuration of an imaging device in a modified example 10 of the example 4 of the second embodiment.

FIG. 85 is a schematic block diagram showing a configuration of an imaging device 3h in the modified example 10 of the example 4 of the second embodiment. Also, elements common with FIG. 78 are assigned the same reference signs and a specific description thereof will be omitted. With respect to the configuration of the imaging device 3f of example 4 of FIG. 78, the configuration of the imaging device 3h in the modified example 10 of the example 4 of the second embodiment is configured by changing the imaging unit 32f to an imaging unit 32h and changing the brightness adjustment determination unit 35f to a brightness adjustment determination unit 35h. With respect to the configuration of the imaging unit 32f of FIG. 78, the configuration of the imaging unit 32h additionally includes an imaging-element-specific information acquisition unit 323.

The imaging-element-specific information acquisition unit 323 acquires imaging element size information representing a size of the imaging element as an example of the imaging-element-specific information which is a characteristic of the imaging element provided in the imaging unit 32h, and outputs the acquired imaging element size information to the brightness adjustment determination unit 35h. The depth of field of an image captured according to the size of the imaging element changes. When the depth of field is shallow, a degree of attention to one subject becomes high. Accordingly, the brightness adjustment determination unit 35h, for example, may determine the behavior of the brightness adjustment to suppress the brightness adjustment when the imaging element is large. As a specific correction process, as in the "case in which the information related to the moving-image recording of the imaging device is acquired," the brightness adjustment determination unit 35h, for example, may correct the quadratic function so that the prohibition region is extended to easily prohibit the brightness adjustment as the size of the imaging element is large.

Figure 86:
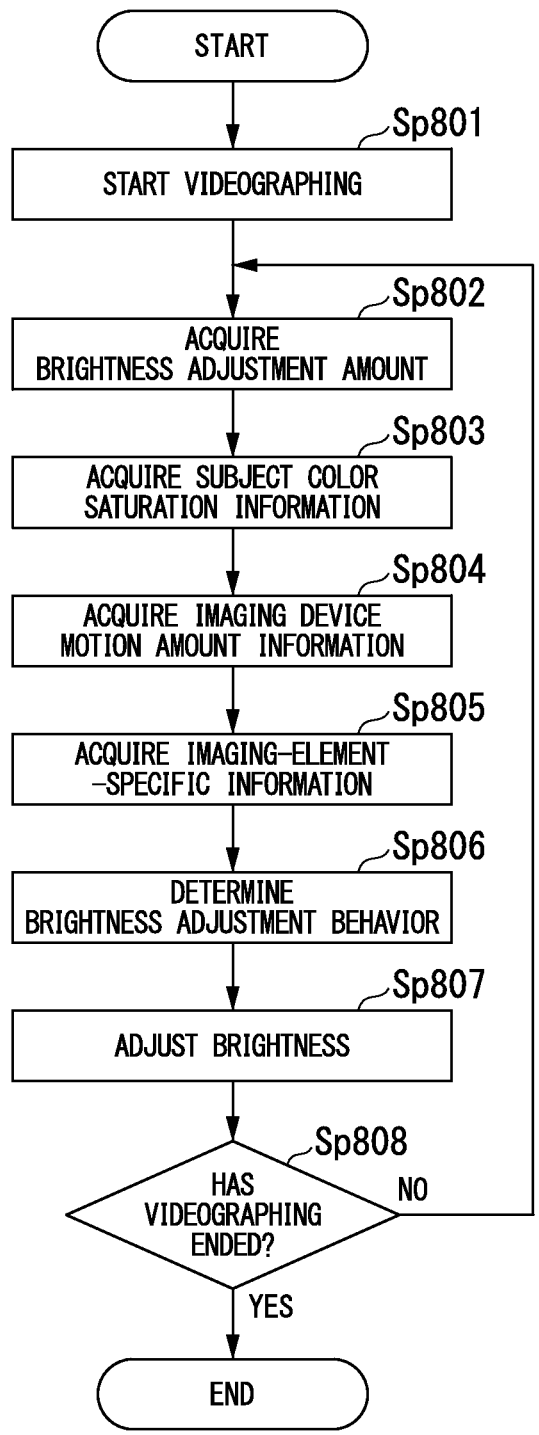
FIG. 86 is a flowchart showing an example of a flow of a process of the imaging device in the modified example 10 of the example 4 of the second embodiment.

FIG. 86 is a flowchart showing an example of a flow of a process of the imaging device 3h in the modified example 10 of the example 4 of the second embodiment. Because the processes of steps Sp801 to Sp804 are the same as the processes of steps Sp601 to Sp604 of FIG. 81, a description thereof will be omitted.

(Step Sp805) Next, the imaging-element-specific information acquisition unit 323 acquires imaging element size information as an example of imaging-element-specific information provided in the imaging unit 32h.

(Step Sp806) Next, the brightness adjustment determination unit 35h determines the behavior of the brightness adjustment using the subject color saturation information acquired by the subject color information acquisition unit 344, the imaging device motion amount information acquired by the imaging device motion information acquisition unit 334, and the imaging element size information acquired by the imaging-element-specific information acquisition unit 323.

Because the processes of steps Sp807 and Sp808 are the same as the processes of steps Sp606 and Sp607 of FIG. 81, a description thereof will be omitted. Accordingly, the process of this flowchart ends.

In modified example 10 of the above example 4, the brightness adjustment determination unit 35h, for example, extends the prohibition region by correcting the quadratic function when the size of the imaging element is large. Thereby, when the size of the imaging element is large, the brightness adjustment tends to be prohibited. Thereby, even when the size of the imaging element is large and a degree of attention to one subject becomes high, it is possible to prohibit unnecessary brightness adjustment. Because of this, the imaging device 3h can provide a more preferable moving image for the videographer (or appreciator).

Also, the imaging-element-specific information acquisition unit 323 may acquire information representing the color filter array of the imaging element as an example of information specific to the imaging element, and output the acquired information to the brightness adjustment determination unit 35h. When Bayer arrangement and Bayer interpolation for color filters of an imaging element are performed, jaggies tend to occur within a moving image. On the other hand, when line arrangement and interpolation for the color filter are absent, the jaggies do not occur as easily. Accordingly, the brightness adjustment determination unit 35h, for example, may determine the behavior of the brightness adjustment to suppress the brightness adjustment operation when the Bayer arrangement is made for the color filters of the imaging element. As a specific correction process, as in the case in which the information related to the moving-image recording of the imaging device is acquired, the brightness adjustment determination unit 35h, for example, may correct the quadratic function so that the brightness adjustment tends to be prohibited when the color filter arrangement of the imaging element is the Bayer arrangement.

<Modified Example 11: Brightness Adjustment Target Setting Information>

Although spot photometry for determining the brightness adjustment amount around the brightness adjustment target region received by the videographer input unit 31 is performed in this example, the present invention is not limited thereto. The imaging device in modified example 11 may use a mode such as center-focused photometry for determining a brightness adjustment amount from a screen of the imaging device 3i center area or evaluative photometry for determining a brightness adjustment amount from the entire screen.

Figure 87:
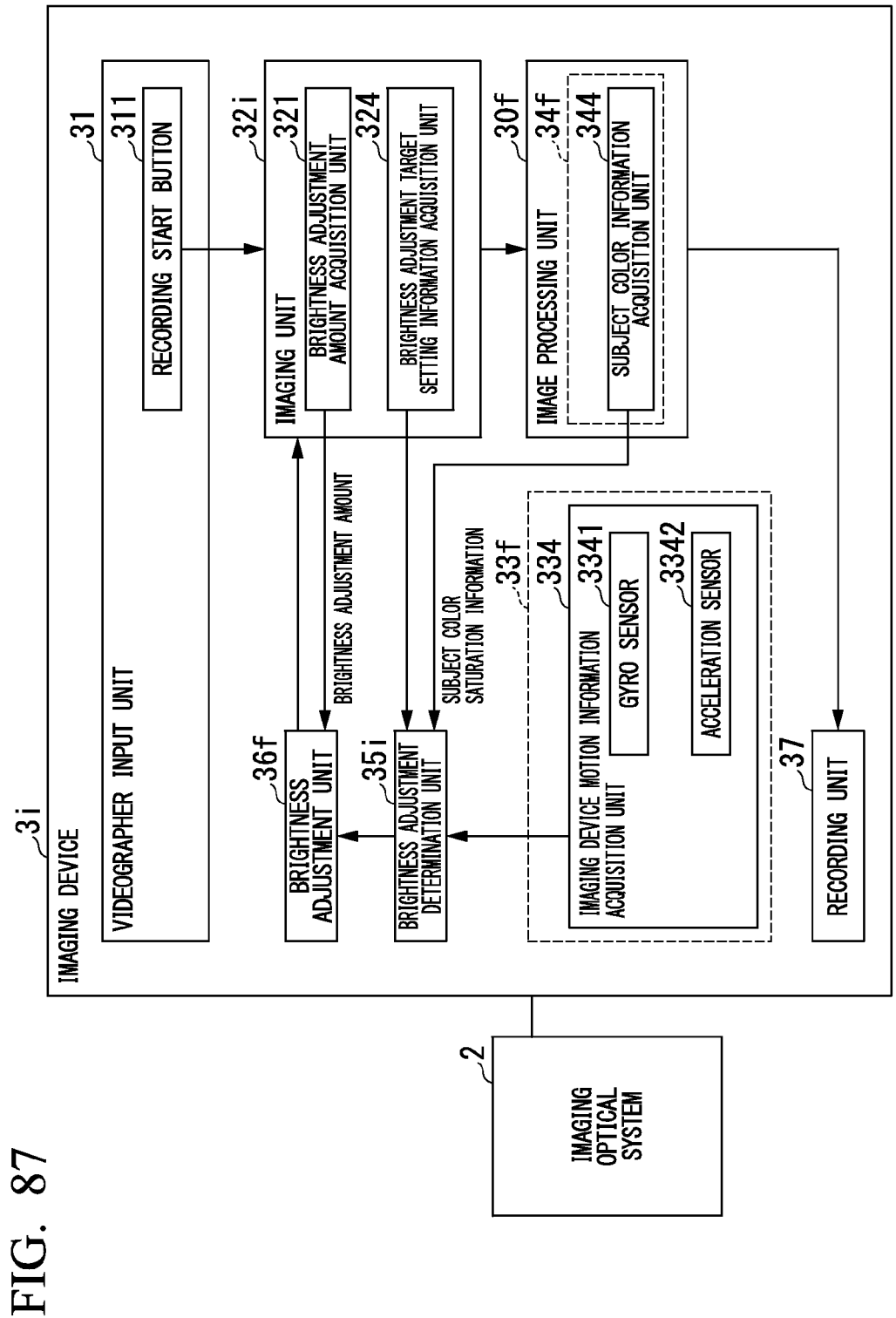
FIG. 87 is a schematic block diagram showing a configuration of an imaging device in a modified example 11 of the example 4 of the second embodiment.

FIG. 87 is a schematic block diagram showing a configuration of an imaging device 3i in a modified example 11 of the example 4 of the second embodiment. Also, elements common with FIG. 78 are assigned the same reference signs and specific a description thereof will be omitted. With respect to the configuration of the imaging device 3f in example 4 of FIG. 78, the configuration of the imaging device 3i in the modified example 11 of the example 4 of the second embodiment is configured by changing the imaging unit 32f to an imaging unit 32i and changing the brightness adjustment determination unit 35f to a brightness adjustment determination unit 35i. The imaging unit 32i includes the brightness adjustment target setting information acquisition unit 324.

The brightness adjustment target setting information acquisition unit 324 may acquire target region setting information representing how the brightness adjustment target region is set as an example of brightness adjustment target setting information related to setting of a brightness adjustment target and output the acquired target region setting information to the brightness adjustment determination unit 35i. Then, the brightness adjustment determination unit 35i may correct the behavior of the brightness adjustment based on the target region setting information input from the brightness adjustment target setting information acquisition unit 324.

For example, when the brightness adjustment amount is acquired using the local region within the screen of the imaging device 3i as in the spot photometry or center-focused photometry, the brightness adjustment amount tends to be changed as compared to when the brightness adjustment amount is acquired using the information of the entire screen of the imaging device 3i as in evaluative photometry. Accordingly, the brightness adjustment determination unit 35i, for example, may correct the behavior of the brightness adjustment to suppress the brightness adjustment by a predetermined amount when the brightness adjustment amount is acquired using the local region within the screen as in the spot photometry or center-focused photometry. Thereby, the brightness adjustment unit 36f can slightly suppress brightness adjustment.

As a specific correction process in this example, as in the case in which the information related to the moving-image recording of the imaging device is acquired, the brightness adjustment determination unit 35i, for example, may correct the quadratic function to extend the prohibition region so that the brightness adjustment tends to be prohibited when the brightness adjustment amount is determined in a spot or center-focused scheme.

Figure 88:
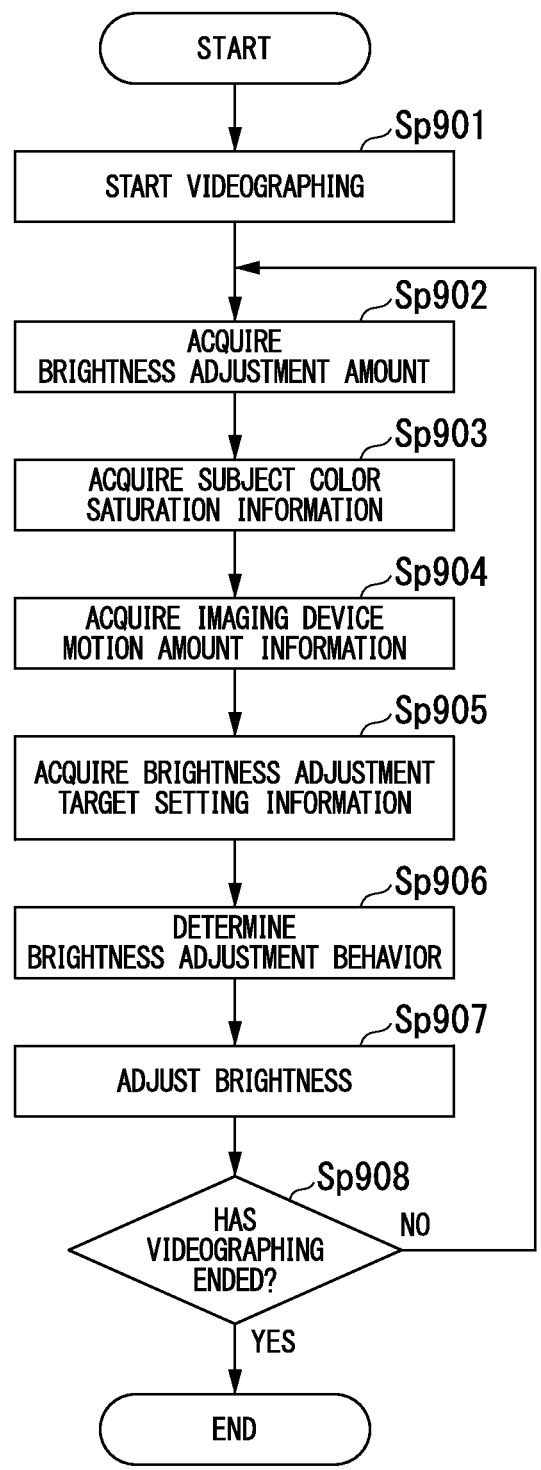
FIG. 88 is a flowchart showing an example of a flow of a process of the imaging device in the modified example 11 of the example 4 of the second embodiment.

FIG. 88 is a flowchart showing an example of a flow of a process of the imaging device 3i in the modified example 11 of the example 4 of the imaging device 3i. Because the processes of steps Sp901 to Sp904 are the same as the processes of steps Sp601 to Sp604 of FIG. 81, a description thereof will be omitted.

(Step Sp905) Next, the brightness adjustment target setting information acquisition unit 324 acquires target region setting information representing how the brightness adjustment target region is set as an example of the brightness adjustment target setting information related to the setting of the brightness adjustment target.

(Step Sp906) Next, the brightness adjustment determination unit 35*h* determines the behavior of the brightness adjustment based on the subject color saturation information acquired by the subject color information acquisition unit 344, the imaging device motion amount information acquired by the imaging device motion acquisition unit 334, and the target region setting information acquired by the brightness adjustment target setting information acquisition unit 324.

Because the processes of steps Sp907 and Sp908 are the same as the processes of steps Sp606 and Sp607 of FIG. 81, a description thereof will be omitted. Accordingly, the process of this flowchart ends.

In modified example 11 of the above example 4, the quadratic function is corrected to extend the prohibition region when the brightness adjustment amount is determined in a spot or center-focused scheme. Thereby, unnecessary brightness adjustment is not performed because the brightness adjustment tends to be prohibited even when the brightness adjustment amount tends to be changed by determining the brightness adjustment amount in the spot or center-focused scheme. Thereby, the imaging device 3*i* can provide a moving image having a more preferable appearance for the videographer (or appreciator).

<Modified Example 12: Brightness Adjustment Direction Information is Acquired as Inter-frame Change Information>

Furthermore, although the behavior of the brightness adjustment is determined by acquiring the motion information of the imaging device as the inter-frame change information, for example, the behavior of the brightness adjustment may be determined by additionally acquiring brightness adjustment direction information. In this case, the configuration of an imaging device 3*m* is shown in FIG. 96 and the flowchart is shown in FIG. 97.

Figure 96:
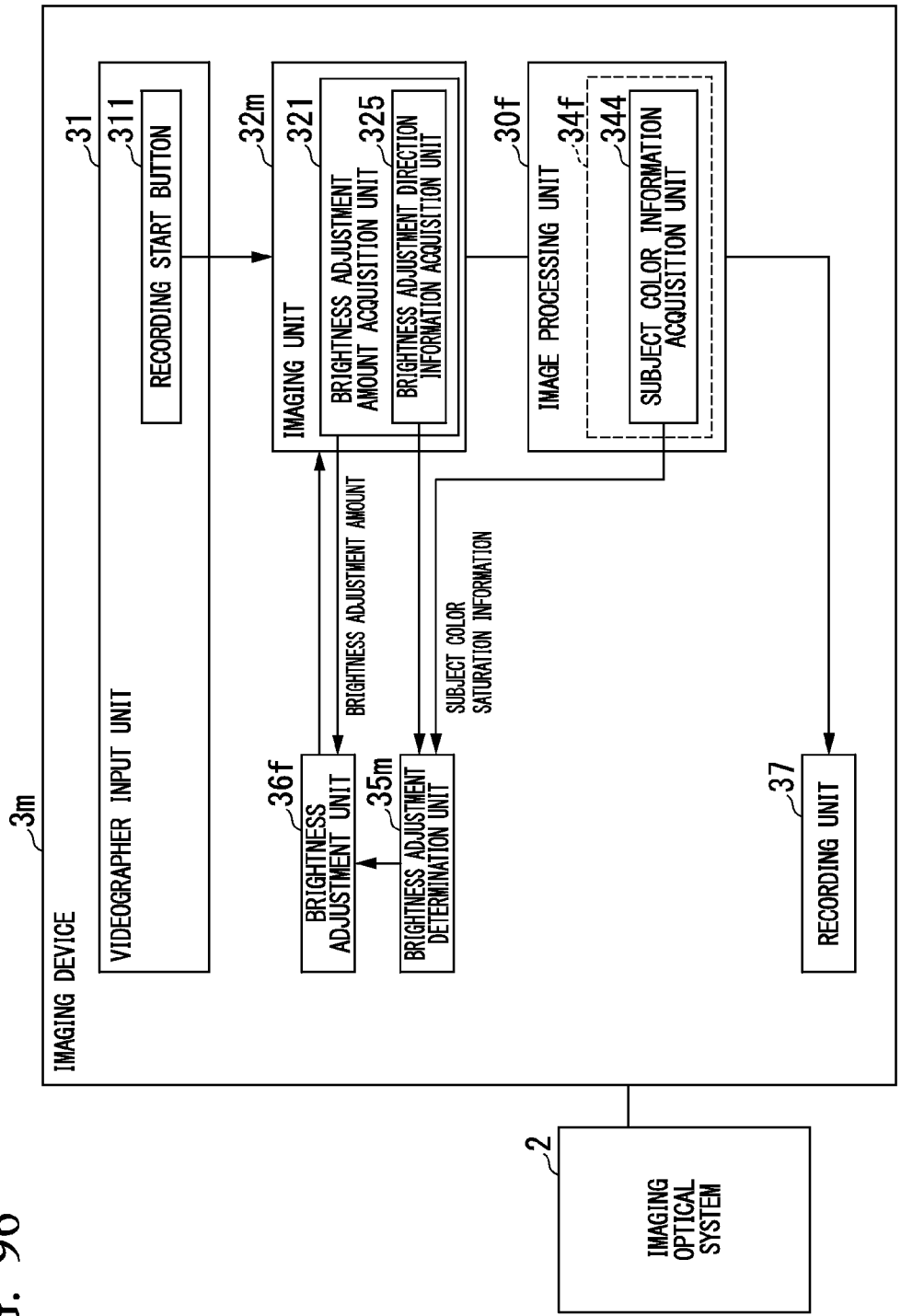
FIG. 96 is a schematic block diagram showing a configuration of an imaging device in a modified example 12 of the example 4 of the second embodiment.
Figure 97:
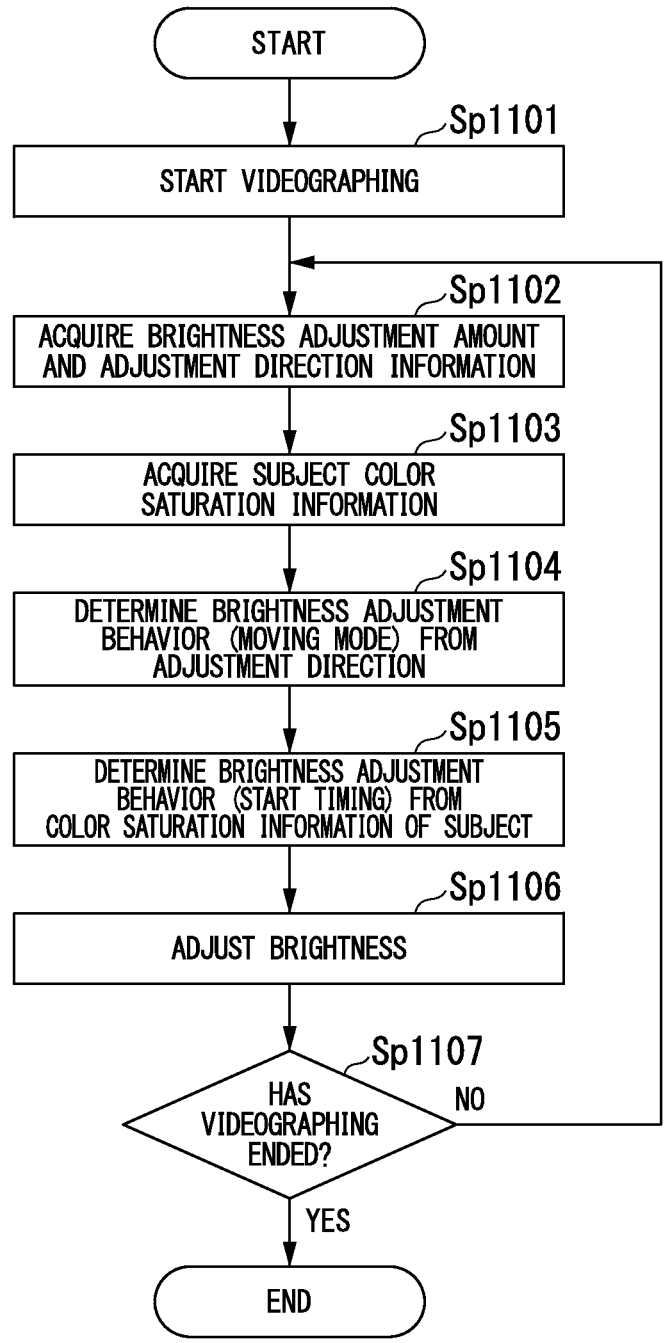
FIG. 97 is a flowchart showing an example of a flow of a process of the imaging device in the modified example 12 of the example 4 of the second embodiment.

FIG. 96 is a schematic block diagram showing the configuration of the imaging device 3*m* in the modified example 12 of the example 4 of the second embodiment. Also, elements common with FIG. 78 are assigned the same reference signs and specific description thereof will be omitted. With respect to the configuration of the imaging device 3*f* in example 4 of FIG. 78, the configuration of the imaging device 3*m* in the modified example 12 of the example 4 of the second embodiment is configured by changing the imaging unit 32*f* to an imaging unit 32*m* and changing the brightness adjustment determination unit 35*f* to a brightness adjustment determination unit 35*m*. The brightness adjustment amount acquisition unit 321 of the imaging unit 32*m* includes a brightness adjustment direction information acquisition unit 325.

A flow of the process of the case of this modified example is shown as follows.

<Process 1>

The videographer sets a brightness adjustment target region of a target on which the videographer performs the brightness adjustment. As an example in this example, the videographer designates the left area of the screen of the imaging device 3*m* as the brightness adjustment target region because the brightness adjustment is performed on a subject around approximately the left of the screen of the imaging device 3*m* after panning. In this case, the videographer input unit 31, for example, receives the designation by the videographer and outputs brightness adjustment target region information representing the designated brightness adjustment target region to the brightness adjustment amount acquisition unit 321 of the imaging unit 32*m*.

<Process 2>

The recording start button 311 receives a moving-image recording start instruction from the videographer, and outputs start instruction information representing the received start instruction to the imaging unit 32*m*. Upon receiving the start instruction information from the videographer input unit 31, the imaging unit 32*m* generates a moving-image signal by converting light incident from the subject via the imaging optical system into an electrical signal at a predetermined shutter speed. Thereby, the imaging unit 32*m* can start moving-image recording according to the instruction of the videographer. The imaging unit 32*m* outputs the generated moving-image signal to the image processing unit 30*f*.

<Process 3>

The brightness adjustment amount acquisition unit 321 acquires a brightness adjustment amount for setting the brightness adjustment target region in the optimum brightness state based on the brightness adjustment target region information obtained through designation received by the videographer input unit 31, and outputs the acquired brightness adjustment amount to the brightness adjustment unit 36*f*. Furthermore, at this time, simultaneously, the brightness adjustment direction information (information of whether to perform the transition from the bright state to the dark state or whether to perform the transition from the dark state to the bright state) is acquired. The brightness adjustment direction information representing the transition from the bright state to the dark state is acquired in this modified example.

<Process 4>

The subject color information acquisition unit 344 acquires subject color information (here, subject color saturation information representing subject color saturation as an example) as intra-frame information, and outputs the acquired subject color information to the brightness adjustment determination unit 35*m*. At this time, the subject color information acquisition unit 344 acquires an average value of color saturation within the brightness adjustment target region as the subject color saturation information as an example. Here, information acquired by comparing the acquired subject color saturation to an arbitrary threshold value pre-recorded on the imaging device 3*m* is classified as "high color saturation," "medium color saturation," or "low color saturation."

<Process 5>

The brightness adjustment determination unit 35*m* determines the behavior of the brightness adjustment (motion from the brightness adjustment start state to the final state) using the table as in FIG. 98 from the brightness adjustment direction information acquired in process 3.

FIG. 98 is a conceptual diagram of a table in which brightness adjustment direction information is associated with a temporal characteristic of brightness adjustment up to an optimum brightness state. In FIG. 98, the brightness adjustment direction is classified into two directions of a direction from the "bright" state to the "dark" state and a direction from the "dark" state to the "bright" state, and the temporal characteristic of the brightness adjustment up to the optimum brightness state is associated for each direction. As seen from FIG. 98, the brightness adjustment is performed at a high speed when the brightness adjustment direction is from the "bright" state to the "dark" state. Consequently, the brightness adjustment determination unit 35*m*, for example, determines the behavior of the brightness adjustment by referring to the table as shown in the conceptual diagram of FIG. 98.

<Process 6>

The starting timing of the brightness adjustment (the number of seconds from the appearance of the subject in a state in which the brightness adjustment is to be performed to the start of the brightness adjustment in the brightness adjustment target area) is determined using the table as in FIG. 99 based on the color saturation information of the subject acquired in process 4. FIG. 99 is an example of a table in which subject color saturation is associated with a start timing of brightness adjustment. In the table T17 of FIG. 99, the brightness adjustment start timing tends to be advanced when the subject color saturation is high. The brightness adjustment determination unit 35*m* determines the behavior of the brightness adjustment to start the brightness adjustment at the early timing at which the subject color saturation is high by referring to the table as shown in FIG. 99.

According to this modified example, slower brightness adjustment is performed, for example, when panning is performed indoors and the transition from the bright state to the dark state is performed as in FIG. 77 than in a reverse state (which is the case in which the transition from the dark state to the bright state is performed; for example, the reverse state is obtained by reversing the scene start position/camera transition direction of FIG. 77). This is derived from a result of subjective evaluation shown as follows.

Figure 100A:
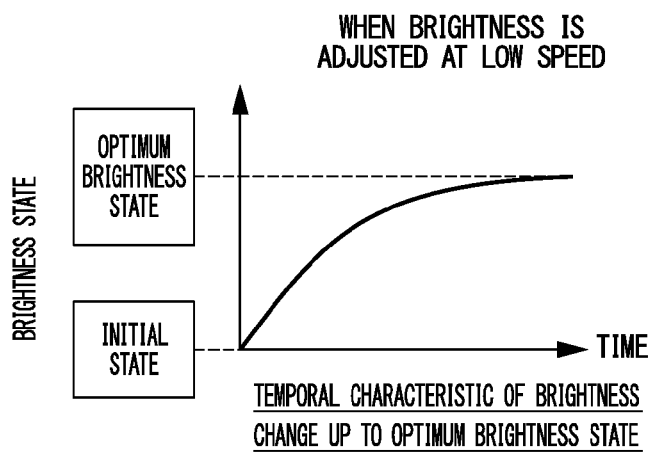
FIG. 100A is an example of a temporal characteristic from the brightness adjustment start to the optimum brightness state.
Figure 100B:
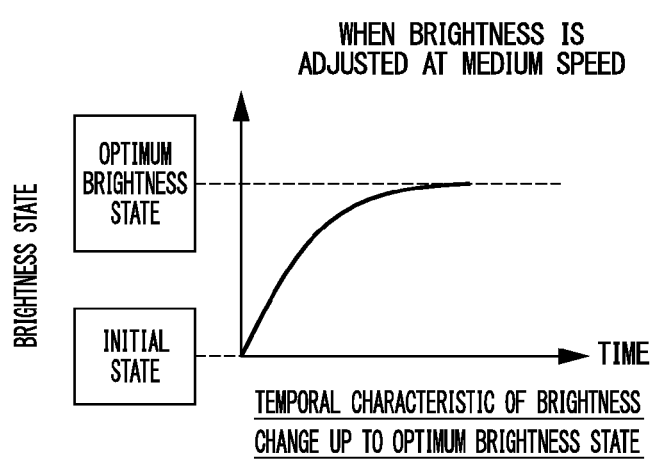
FIG. 100B is an example of a temporal characteristic from the brightness adjustment start to the optimum brightness state.
Figure 100C:
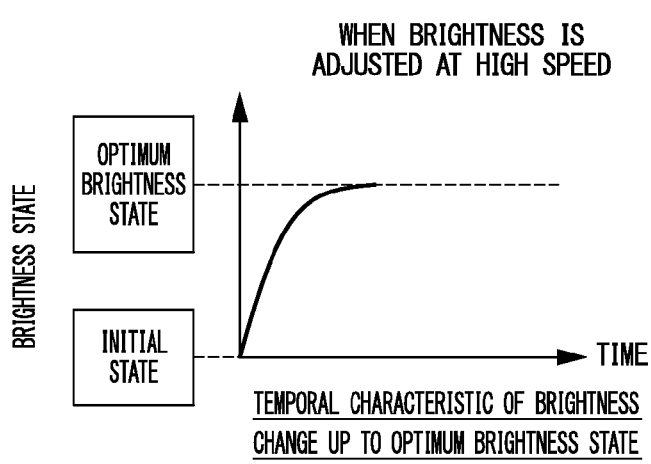
FIG. 100C is an example of a temporal characteristic from the brightness adjustment start to the optimum brightness state.

In each of the scenes shown in FIG. 77 and the reverse scene thereof (which is obtained by reversing the scene start position/camera transition direction, the speed or required time of the panning are completely the same), an examinee group of a plurality of people were requested to view a moving image captured by applying a plurality of temporal characteristics of brightness adjustment as shown in FIGS. 100A to 100C, and results (Unlikable: 0 points, Neither unlikable nor likable: 5 points, and Likable: 10 points) obtained by subjectively evaluating the likability of the video in eleven steps are shown in FIG. 101. According to human senses, a human does not feel any particular fear in relation to a state (too bright state) in which the brightness of a bright place is not adjusted. However, in contrast, a human tends to feel fear in relation to a state (too dark state) in which the exposure of the dark place is not adjusted (a state in which nothing is seen is felt as dangerous). Accordingly, it can be said that this result is because the strength of the desire in which the "next state is desired to be rapidly viewed in an accurate state" is changed according to the brightness change direction. Because of this, it is possible to perform brightness adjustment with little incompatibility by lengthening a time required for brightness adjustment more in adjustment in which the transition from the dark state to the bright state is performed than in adjustment in which the transition from the bright state to the dark state is performed.

In addition, it is preferable for the timing at which the brightness adjustment starts to be the timing at which the appreciator recognizes the subject. This timing is advanced as the color saturation of the subject is high. Accordingly, it is possible to perform the brightness adjustment with little incompatibility by determining the start timing of the brightness adjustment from the subject color saturation information.

FIG. 97 is a flowchart showing an example of a flow of a process of the imaging device 3*m* in the modified example 12 of the example 4 of the second embodiment.

(Step Sp1101) First, the imaging unit 32*a* starts videographing when the recording start button 111 has been pressed.

(Step Sp1102) Next, the brightness adjustment amount acquisition unit 321 acquires a brightness adjustment amount and brightness adjustment direction information.

(Step Sp1103) Next, the subject color information acquisition unit 344 acquires subject color saturation information as an example of the subject color information.

(Step Sp1104) Next, the brightness adjustment determination unit 35*m* determines the behavior of the brightness adjustment (the motion from the start of the brightness adjustment to the ultimate state) based on the brightness adjustment amount and the brightness adjustment direction information acquired by the brightness adjustment amount acquisition unit 321 and the subject color saturation information acquired by the subject color information acquisition unit 344.

(Step Sp1105) Next, the brightness adjustment determination unit 35*m* determines the start timing of the brightness adjustment based on the subject color saturation information acquired by the subject color information acquisition unit 344.

Because the processes of steps Sp1106 and Sp1107 are the same as the processes of steps Sp106 and Sp107 of FIG. 63, a description thereof will be omitted.

<Modified Example 13: Presence/Absence Information of Brightness Adjustment Target Indication by Videographer is Acquired>

In this example, the videographer indicates the brightness adjustment target. In this case, a degree of attention is higher for the brightness adjustment target of the videographer than when the imaging device has automatically determined the brightness adjustment target. Accordingly, it is preferable to promote the brightness adjustment when there is a brightness adjustment target indication from the videographer.

<Example 5>

Next, example 5 will be described. In this example, description will be given using a scene in which a zoom-out operation is performed from a telephoto side to a wide angle side indoors as in FIG. 89.

Figure 89:
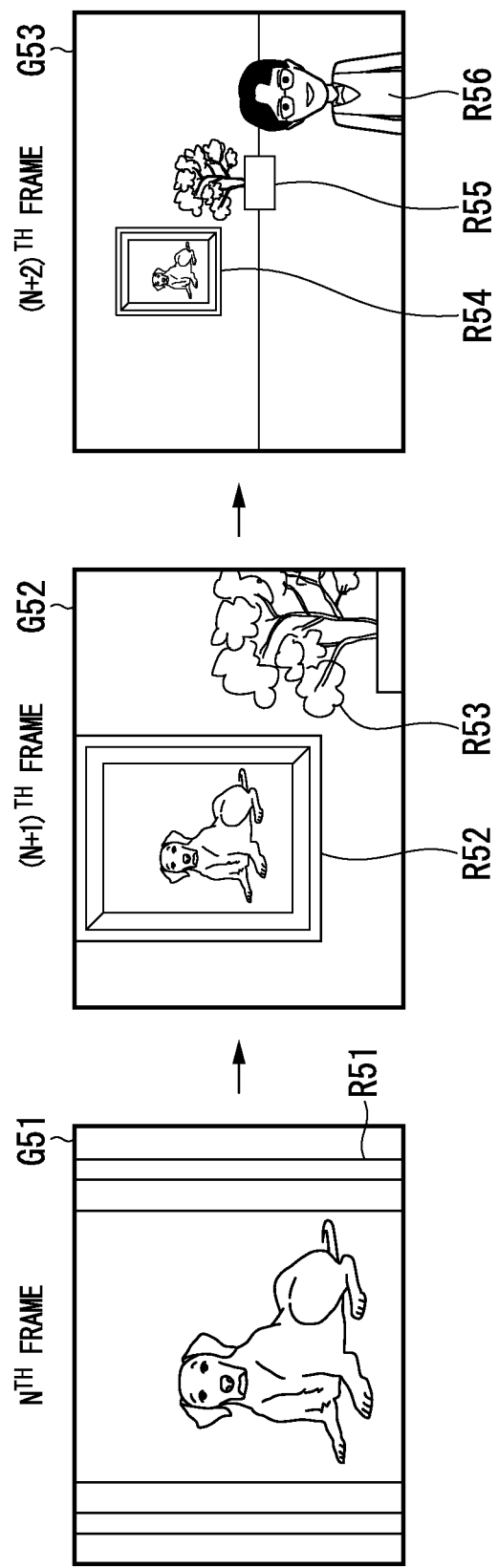
FIG. 89 is a diagram showing an example of a videographed scene in an example 5 of the second embodiment.

FIG. 89 is a diagram showing an example of a videographed scene in example 5. FIG. 89 shows scenes appearing in the order of a dark flower and a brightly colored human by performing a zoom-out operation from a state in which a picture of a comparatively brightly colored dog is viewed. An image G51 of an $N^{th}$ frame includes an image region R51 of a picture of the dog. An image G52 of an $(N+1)^{th}$ frame is a captured image which is zoomed out more than in the image G51 of the $N^{th}$ frame, and includes an image region R52 of the picture of the dog and an image region R53 of the dark flower. An image G53 of an $(N+2)^{th}$ frame is a captured image which is zoomed out more than in the image G52 of the $(N+1)^{th}$ frame, and includes an image region R54 of the picture of the dog, an image region R55 of the dark flower, and an image region R56 of the human.

Figure 90:
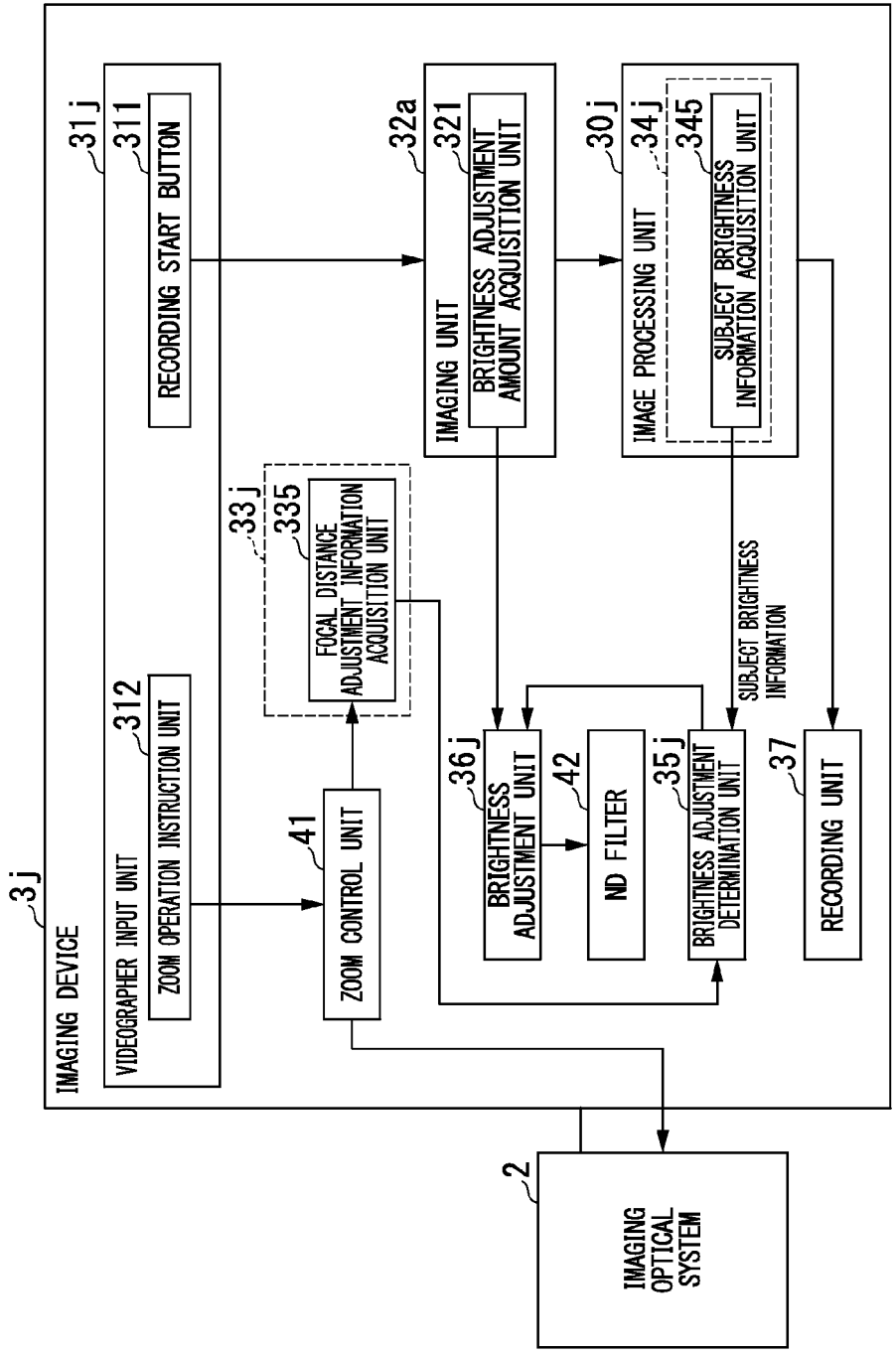
FIG. 90 is a schematic block diagram showing a configuration of an imaging device in the example 5 of the second embodiment.

FIG. 90 is a schematic block diagram showing a configuration of an imaging device 3*j* in example 5. Also, elements common with FIG. 61 are assigned the same reference signs and specific description thereof will be omitted. With respect to the configuration of the imaging device 3*a* of example 1 of FIG. 61, the configuration of the imaging device 3*j* in example 5 is configured by changing the image processing unit 30 to an image processing unit 30*j*, changing the videographer input unit 31 to a videographer input unit 31*j*, changing the brightness adjustment determination unit 35*a* to a brightness adjustment determination unit 35*j*, changing the brightness adjustment unit 36 to a brightness adjustment unit 36*j*, and adding a zoom control unit 41 and an ND filter 42. Furthermore, the inter-frame change information acquisition unit 33*a* is changed to an inter-frame change information acquisition unit 33j which is configured to be arranged outside the image processing unit 30j differently from the configuration of the imaging device 3a in example 1.

The image processing unit 30j includes an intra-frame information acquisition unit 34j, and the intra-frame information acquisition unit 34j includes a subject brightness information acquisition unit 345.

With respect to the configuration of the videographer input unit 31 in example 1 of FIG. 61, the configuration of the videographer input unit 31j is configured by adding a zoom operation instruction unit 312. The zoom operation instruction unit 312 receives a zoom operation instruction from the videographer and outputs information representing the received zoom operation instruction to the zoom control unit 41.

The zoom control unit 41 controls the imaging optical system 2 according to the information input from the zoom operation instruction unit 312 to change a zoom.

The ND filter 42 is a stepwise ND filter as an example, and is controlled by the brightness adjustment unit 36j. The ND filter 42 reduces light incident from the imaging optical system 2 and guides light after the light reduction to the imaging unit 32a.

Next, a process of each part of the imaging device 3j will be described in the order of processing at the time of moving-image recording.

<Process 1>

The videographer sets a brightness adjustment target region in which brightness adjustment is performed. In this example, as an example, the videographer designates approximately a lower-right area of the screen of the imaging device 3j as the brightness adjustment target region to perform brightness adjustment for an approximately lower-right subject of the screen of the imaging device 3j after zoom-out. In this case, the videographer input unit 31j, for example, receives the designation by the videographer, and outputs brightness adjustment target region information representing a brightness adjustment target region to the brightness adjustment amount acquisition unit 321.

<Process 2>

The recording start button 311 receives a moving-image recording start instruction from the videographer, and outputs start instruction information representing the received start instruction to the imaging unit 32a. Upon receiving the start instruction input from the videographer input unit 31j, the imaging unit 32a generates a moving-image signal by converting light incident from the subject via the imaging optical system 2 and the ND filter 42 into an electrical signal at a predetermined shutter speed. Thereby, the imaging unit 32a can start the moving-image recording according to the instruction of the videographer. The imaging unit 32a outputs the generated moving-image signal to the image processing unit 30j.

<Process 3>

The brightness adjustment amount acquisition unit 321 acquires the brightness adjustment amount for setting the brightness adjustment target region in the optimum brightness state based on the brightness adjustment target region input from the videographer input unit 31j, and outputs the acquired brightness adjustment amount to the brightness adjustment unit 36j. Specifically, for example, the brightness adjustment amount acquisition unit 321 acquires the brightness adjustment amount so that the pixel value of the brightness adjustment target region is included in a predetermined range. Thereby, it is possible to prevent the brightness adjustment target region from being excessively darkened or becoming pure white.

<Process 4>

The subject brightness information acquisition unit 345 acquires subject brightness information representing the brightness of the subject as intra-frame information, and outputs the acquired subject brightness information to the brightness adjustment determination unit 35j. Specifically, for example, the subject brightness information acquisition unit 345 acquires an average value of luminance pixels within the brightness adjustment target region as the subject brightness information. Also, the present invention is not limited thereto. The subject brightness information acquisition unit 345 may extract the subject region from the frame image, and acquire an average value of luminance pixel values within the subject region in the vicinity of the brightness adjustment target region. Here, the vicinity of the brightness adjustment target region, for example, includes the brightness adjustment target region, and also includes pixels separated from a pixel outside the brightness adjustment target region by a predetermined number of pixels in a direction away from the brightness adjustment target region.

<Process 5>

The focal distance adjustment information acquisition unit 335 acquires focal distance adjustment information (here, zoom operation speed information related to a zoom operation speed as an example) as inter-frame change information, and outputs the acquired zoom operation speed information to the brightness adjustment determination unit 35j. Specifically, for example, the focal distance adjustment information acquisition unit 335 classifies a zoom speed as one of three types of "fast," "moderate," and "slow" speeds by comparing the zoom speed to a predetermined threshold value stored in the memory (not shown) within the imaging device 3j, and designates a classification result as the zoom operation speed information. Also, the focal distance adjustment information acquisition unit 335 may use the acquired zoom speed as the zoom operation speed information without change. The focal distance adjustment information acquisition unit 335 outputs the acquired zoom operation speed information to the brightness adjustment determination unit 35j.

<Process 6>

The brightness adjustment determination unit 35j determines the behavior of the brightness adjustment based on the subject brightness information acquired by the subject brightness information acquisition unit 345 and the focal distance adjustment information (here, zoom operation speed information as an example) acquired by the focal distance adjustment information acquisition unit 335. Specifically, for example, the brightness adjustment determination unit 35j determines the behavior of the brightness adjustment in the following process.

An equation $f_{base}(t)$ representing a temporal characteristic serving as a reference from a brightness adjustment start to an end (optimum brightness state) is pre-stored in a memory (not shown) within the imaging device 3j. Here, t is the number of frames from the brightness adjustment start. $f_{base}(t)$, for example, is represented by a polynomial of the following Equation (12).

$$f_{base}(t) = C_1 t^4 + C_2 t^3 + C_3 t^2 + C_4 t + C_5 \qquad \text{Equation (12)}$$

Here, although $f_{base}(t)$ is a quartic polynomial as an example, the degree may be another degree.

In a memory (not shown) within the imaging device 3j, for example, the table T15 in which the focus adjustment control coefficient α is associated for every set of a zoom operation speed and a luminance pixel average value as shown in FIG. 91 is pre-stored.

As the next process, the brightness adjustment determination unit 35j, for example, determines the brightness adjustment control coefficient α by referring to the table T15 of FIG. 91 from the subject brightness information acquired by the subject brightness information acquisition unit 345 and the zoom operation speed information acquired by the focal distance adjustment information acquisition unit 335. Specifically, for example, the brightness adjustment determination unit 35j determines the brightness adjustment control coefficient α by reading the brightness adjustment control coefficient α corresponding to the set of the luminance pixel average value serving as an example of the acquired subject brightness information and the acquired focal distance adjustment information from the table T15 of the memory.

FIG. 91 is an example of the table T15 in which the brightness adjustment suppression coefficient α is associated for every set of a zoom operation speed and a luminance pixel average value. Because the appreciator does not want to pay attention to details of an overexposed subject which has excessively high luminance and appears whitened in an example of FIG. 91, the brightness adjustment control coefficient α is smaller when the luminance is 240 or more than when the luminance is greater than or equal to 200 and less than or equal to 239. Consequently, the brightness adjustment determination unit 35j, for example, decreases the brightness adjustment control coefficient α more when the luminance is 240 or more than when the luminance is greater than or equal to 200 and less than or equal to 239 by referring to the table T15 of FIG. 91. In addition, if the luminance is less than or equal to 239, the brightness adjustment control coefficient α is large when the luminance is large. Consequently, the brightness adjustment determination unit 35j, for example, increases the brightness adjustment control coefficient α when the luminance is high if the luminance is less than or equal to 239 by referring to the table T15 of FIG. 91.

As the next process, the brightness adjustment determination unit 35j, for example, determines the temporal characteristic $f_{AE}(t)$ of the brightness adjustment up to the ultimate optimum brightness state according to the following Equation (13).

$$f_{AE}(t) = f_{base}(\alpha t) \quad \text{Equation (13)}$$

t is the number of frames from the brightness adjustment start. Here, the number t of frames is that until $f_{base}(\alpha t)$ reaches the optimum brightness state.

When the subject for which the optimum brightness state is desired to be obtained is changed while the zoom-out operation is performed as in FIG. 89, the videographer (or appreciator) tends to determine to set the subject in the optimum brightness state when the bright subject appears during the zoom-out operation. However, the videographer (or appreciator) tends not to pay attention to a subject that is too bright.

Consequently, the brightness adjustment determination unit 35j, for example, determines the brightness adjustment control coefficient α by referring to the table of FIG. 91. Thereby, because it is possible to suppress the brightness adjustment during the too bright state and the too dark state, it is possible to promote the brightness adjustment in a comparatively bright case (for example, when the luminance pixel average value is greater than or equal to 200 and less than or equal to 239). Thus, because the imaging device 3j can perform brightness adjustment according to ease of catching awareness of the videographer (or appreciator), it is possible to provide a moving image having a preferable appearance to the videographer (or appreciator).

Because the subject to be in focus successively changes when the zoom operation speed (focal distance adjustment speed) is fast, the videographer (or appreciator) is less likely to direct awareness to the next subject. Consequently, the brightness adjustment determination unit 35j, for example, determines the behavior of the brightness adjustment to suppress the brightness adjustment when the zoom operation speed is fast. Thereby, because the imaging device 3j can perform brightness adjustment according to ease of catching awareness of the videographer (or appreciator), it is possible to provide a moving image having a preferable appearance for the videographer (or appreciator).

<Process 7>

The brightness adjustment unit 36j, for example, controls the ND filter 42 attached within the imaging device 3j to adjust the brightness of the frame image included in the moving-image signal so that the brightness is changed by the brightness adjustment amount input from the brightness adjustment amount acquisition unit 321 according to the temporal characteristic $f_{AE}(t)$ of the brightness adjustment determined by the brightness adjustment determination unit 35j.

<Process 8>

Until the videographer input unit 31 receives an instruction of a videographing end from the videographer, the imaging device 3j iterates processing of the above-described processes 3 to 7.

Figure 92:
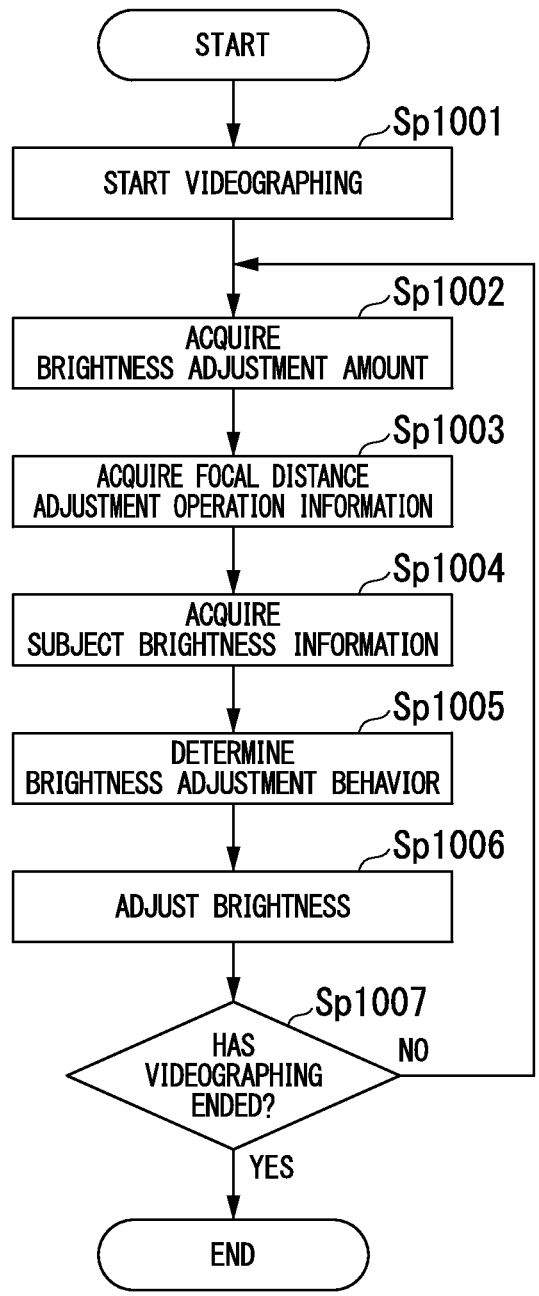
FIG. 92 is a flowchart showing an example of a flow of a process of the imaging device in the example 5 of the second embodiment.

FIG. 92 is a flowchart showing an example of a flow of a process of the imaging device 3j in example 5. Because the processes of steps Sp1001 and Sp1002 are the same as steps Sp101 and Sp102 of FIG. 63, a description thereof will be omitted.

(Step Sp1003) Next, the focal distance adjustment information acquisition unit 335 acquires zoom operation speed information as an example of focal distance adjustment information.

(Step Sp1004) Next, the subject brightness information acquisition unit 345 acquires subject brightness information as an example of the intra-frame information.

(Step Sp1005) Next, the brightness adjustment determination unit 35j determines the behavior of the brightness adjustment based on the zoom operation speed information acquired by the focal distance adjustment information acquisition unit 335 and the subject brightness information acquired by the subject brightness information acquisition unit 345.

Because the processes of steps Sp1006 and Sp1007 are the same as steps Sp106 and Sp107 of FIG. 63, description thereof will be omitted. Accordingly, the process of this flowchart ends.

In the above example 5, the brightness adjustment determination unit 35j, for example, determines the brightness adjustment control coefficient α by referring to the table of FIG. 91. Thereby, it is possible to promote the brightness adjustment in the comparatively bright case (for example, the case in which a luminance pixel average value is greater than or equal to 200 and less than or equal to 239). Thereby, when the comparatively bright subject appears during the zoom-out operation, the imaging device 3j can set the subject in the optimum brightness state. Because of this, it is possible to rapidly set the subject which is easily determined to be set by the videographer (or appreciator) in the optimum brightness state in the optimum brightness state and the videographer (or appreciator) can be provided with a moving image having a preferable appearance.

In addition, because it is possible to suppress the brightness adjustment during the too bright state and the too dark state, the imaging device 3j can prevent the subject from being bright when the subject that is too bright appears during the zoom-out operation. Because of this, the imaging device 3j can prevent the subject to which the videographer (or appreciator) is considered not to want to pay attention from being set in the optimum brightness state, and it is possible to provide a moving image having a preferable appearance to the videographer (or appreciator).

In addition, when the zoom operation speed is fast, it is possible to suppress the brightness adjustment. Thereby, when the zoom operation speed during the zoom-out operation is fast, the imaging device 3j can prevent the successively appearing subject from being bright. Because of this, the imaging device 3j can prevent the subject that does not easily catch awareness of the videographer (or appreciator) from being set in the optimum brightness state and it is possible to provide a moving image having a preferable appearance to the videographer (or appreciator).

Also, although the focal distance adjustment information acquisition unit 355 acquires zoom operation speed information as an example of focal distance adjustment information in this example, the present invention is not limited thereto. Focal distance adjustment direction information representing a focal distance adjustment direction may be acquired. In this case, the brightness adjustment determination unit 35j may determine the behavior of the brightness adjustment based on the focal distance adjustment direction information and the subject brightness information. When the zoom-in operation is performed, the videographer (or appreciator) is more likely to direct awareness to the next subject than when the zoom-out operation is performed. Accordingly, the brightness adjustment determination unit 35j, for example, may determine the behavior of the brightness adjustment to control the brightness adjustment when the zoom-out operation is performed.

Also, the above-described various processes according to each imaging device may be performed by recording a program for executing the processes of each imaging device on a computer-readable recording medium to cause the computer system to read and execute the program recorded on the recording medium.

Also, the "computer system" used here may include an operating system (OS) and hardware such as peripheral devices. In addition, the computer system may include a homepage providing environment (or displaying environment) when a World Wide Web (WWW) system is used. In addition, the computer-readable recording medium refers to a storage device, including a flexible disk, a magneto-optical disc, a read only memory (ROM), a writable nonvolatile memory such as a flash memory, a portable medium such as a compact disc (CD)-ROM, and a hard disk embedded in the computer system.

Furthermore, the "computer-readable recording medium" is a medium that holds a program for a constant period of time, such as a volatile memory (e.g., dynamic random access memory (DRAM)) inside a computer system serving as a server or a client when the program is transmitted via a network such as the Internet or a communication circuit such as a telephone circuit. In addition, the above-described program may be transmitted from a computer system storing the program in a storage device or the like via a transmission medium or transmitted to another computer system by transmission waves in a transmission medium. Here, the "transmission medium" refers to a medium having a function of transmitting information, such as a network (communication network) like the Internet or a communication circuit (communication line) like a telephone circuit. In addition, the above-described program may be a program for implementing some of the above-described processes. Further, the above-described program may be a program, i.e., a so-called differential file (differential program), capable of implementing the above-described processes in combination with a program already recorded on a computer system.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device comprising:
    an imaging sensor configured to capture an image of a subject formed by an imaging optical system and to generate a moving-image signal based on the captured image; and
    a processor comprising hardware, wherein the processor is configured to implement:
        a focus adjustment information acquisition unit configured to acquire focus adjustment information related to human subjective focus adjustment; and
        a focus adjustment determination unit configured to determine behavior of a focus adjustment of the imaging optical system based on the focus adjustment information obtained by the focus adjustment information acquisition unit,
    wherein the focus adjustment information is information based on a physical focus adjustment characteristic of a human eyeball, or information obtained by approximating the physical focus adjustment characteristic of the human eyeball, and
    wherein the physical focus adjustment characteristic of the human eyeball is a temporal characteristic from a focus adjustment start to a focused state.

2. The imaging device according to claim 1,
    wherein the processor is further configured to implement:
        an inter-frame change information acquisition unit configured to acquire inter-frame change information related to a change which occurred between at least two frames of the moving-image signal; and
        an intra-frame information acquisition unit configured to acquire intra-frame information which is information within one frame included in the moving-image signal,
    wherein the focus adjustment information is the information obtained by approximating the physical focus adjustment characteristic of the human eyeball, and
    wherein the information obtained by approximating the physical focus adjustment characteristic of the human eyeball is based on both the inter-frame change information acquired by the inter-frame change information acquisition unit and the intra-frame information acquired by the intra-frame information acquisition unit.

3. The imaging device according to claim 2,
    wherein the inter-frame change information is information related to a change which occurred between frames in the imaging device itself, motion performed by the imaging device itself, and a process performed by the imaging device itself.

4. The imaging device according to claim 2,
    wherein the inter-frame change information is a signal change of a frame image obtained for every frame from the moving-image signal.

5. The imaging device according to claim 2,
wherein the intra-frame information is information related to one of a size of the subject, a color of the subject, a brightness of the subject, a number of the subject, and a position of the subject.

6. The imaging device according to claim 2,
wherein the intra-frame information is one of:
information related to a recognition result of what the subject is,
information related to a matching result between a previously videographed subject and the subject, and
information related to whether the subject is pre-registered in the imaging device itself.

7. The imaging device according to claim 2,
wherein the intra-frame information is information related to the moving-image signal within the frame.

8. The imaging device according to claim 1,
wherein the focus adjustment determination unit is configured to determine the behavior of the focus adjustment so that acceleration and a speed in the focus adjustment for setting the subject in a focused state are changed based on the focus adjustment information obtained by the focus adjustment information acquisition unit.

9. The imaging device according to claim 1,
wherein the focus adjustment determination unit is configured to determine the behavior of the focus adjustment so that a timing at which deceleration in the focus adjustment for setting the subject in a focused state starts is changed based on the focus adjustment information acquired by the focus adjustment information acquisition unit.

10. The imaging device according to claim 1,
wherein the focus adjustment determination unit is configured to determine the behavior of the focus adjustment so that a timing at which focus adjustment for setting the subject in a focused state starts is changed based on the focus adjustment information acquired by the focus adjustment information acquisition unit.

11. The imaging device according to claim 1,
wherein the focus adjustment determination unit is configured to determine whether to drive the imaging optical system according to the focus adjustment information acquired by the focus adjustment information acquisition unit.

12. The imaging device according to claim 1,
wherein the focus adjustment determination unit is configured to determine the behavior of the focus adjustment so that a time required to reach the focused state from the focus adjustment start in the focus adjustment for setting the subject in the focused state is changed according to the focus adjustment information acquired by the focus adjustment information acquisition unit.

13. The imaging device according to claim 1,
wherein the information obtained by approximating the physical focus adjustment characteristic of the human eyeball is information approximated so that deceleration for stopping the focus adjustment is less than acceleration for starting the focus adjustment according to the physical focus adjustment characteristic of the human eyeball.

14. The imaging device according to claim 1,
wherein the information obtained by approximating the physical focus adjustment characteristic of the human eyeball is information approximated to start deceleration of the focus adjustment in an interval of 10% to 80% of a process from the focus adjustment start to the focused state according to the physical focus adjustment characteristic of the human eyeball.

15. The imaging device according to claim 1,
wherein the information obtained by approximating the physical focus adjustment characteristic of the human eyeball is information approximated to perform monotonous acceleration/deceleration movement in an interval until deceleration of the focus adjustment starts from 10% of a process from the focus adjustment start to the focused state according to the physical focus adjustment characteristic of the human eyeball.

16. The imaging device according to claim 1,
wherein the information obtained by approximating the physical focus adjustment characteristic of the human eyeball is information approximated so that a time from the focus adjustment start to the focused state is at least 0.7 seconds or more according to the physical focus adjustment characteristic of the human eyeball.

17. The imaging device according to claim 1,
wherein the processor is further configured to implement:
a focus adjustment amount acquisition unit configured to acquire a focus adjustment amount of the imaging optical system necessary to obtain the focused state for the subject, the imaging optical system being configured to be one of fixed to and removable from the imaging device; and
a focus adjustment unit configured to control the focus adjustment based on the focus adjustment amount.

18. A non-transitory computer-readable storage medium storing a program for causing an imaging device having an imaging sensor configured to capture images of a subject formed by an imaging optical system and to generate a moving-image signal based on the captured images, to execute:
a focus adjustment information acquisition step of acquiring focus adjustment information related to human subjective focus adjustment; and
a focus adjustment determination step of determining behavior of a focus adjustment of the imaging optical system based on the focus adjustment information acquired in the focus adjustment information acquisition step,
wherein the focus adjustment information is information on a physical focus adjustment characteristic of a human eyeball or information obtained by approximating the physical focus adjustment characteristic of the human eyeball, and
wherein the physical focus adjustment characteristic of the human eyeball is a temporal characteristic from a focus adjustment start to a focused state.

* * * * *